US012801636B2

(12) United States Patent
Mehta et al.

(10) Patent No.: US 12,801,636 B2
(45) Date of Patent: Nov. 17, 2026

(54) DATABASE GROUP MANAGEMENT

(71) Applicant: Nutanix, Inc., San Jose, CA (US)

(72) Inventors: Tarun Mehta, Mahrashtra (IN); Suseendran Babu N, San Jose, CA (US); Shravan Dhawan, San Jose, CA (US); Akshay Chandak, Nagpur (IN)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 18/940,810

(22) Filed: Nov. 7, 2024

(65) Prior Publication Data

US 2025/0068654 A1 Feb. 27, 2025

Related U.S. Application Data

(63) Continuation of application No. 17/686,167, filed on Mar. 3, 2022, now Pat. No. 12,174,856.

(60) Provisional application No. 63/271,585, filed on Oct. 25, 2021.

(51) Int. Cl.
*G06F 16/28* (2019.01)
*G06F 16/2455* (2019.01)

(52) U.S. Cl.
CPC ...... *G06F 16/285* (2019.01); *G06F 16/24553* (2019.01)

(58) Field of Classification Search
None
See application file for complete search history.

(56) References Cited

U.S. PATENT DOCUMENTS

| | | | |
|---|---|---|---|
| 625,315 A | 5/1899 | Bradford | |
| 749,117 A | 1/1904 | Wagner | |
| 966,543 A | 8/1910 | Hawkins | |
| 4,742,482 A | 5/1988 | Inskeep et al. | |

(Continued)

FOREIGN PATENT DOCUMENTS

| | | | |
|---|---|---|---|
| CN | 104408071 A | 3/2015 | |
| CN | 105446828 A | 3/2016 | |

(Continued)

OTHER PUBLICATIONS

BackupAssist, "https://secure.backupassist.com/support/en/backupassist/manage/calendar.htm"; "https://secure.backupassist.com/ support/en/references/backup-schedules.htm", Jul. 1, 2017 (Year: 2017).

(Continued)

*Primary Examiner* — Christopher J Raab
(74) *Attorney, Agent, or Firm* — Foley & Lardner LLP

(57) ABSTRACT

A system and method include receiving request to create a database group, receiving selection of a database server virtual machine on which to create the database group, receiving selection of at least one database from a list of databases that are not part of another database group to add to the database group, receiving selection of a Service Level Agreement ("SLA") and a protection schedule, and creating the database group on the database server virtual machine, including associating the database group with the SLA and the protection schedule and adding the at least one database to the database group. Each of the at least one database is protected using the same SLA and the protection schedule that is associated with the database group.

20 Claims, 36 Drawing Sheets

(56) References Cited

U.S. PATENT DOCUMENTS 5,594,859 A 1/1997 Palmer et al.
6,064,975 A 5/2000 Moon et al.
6,243,715 B1 6/2001 Bogantz et al.
6,542,893 B1 4/2003 Quernemoen
6,766,477 B2 7/2004 Grucci et al.
D508,248 S 8/2005 Ording
D521,521 S 5/2006 Jewitt et al.
7,046,134 B2 5/2006 Hansen
7,136,865 B1 11/2006 Ra et al.
7,225,189 B1 5/2007 Mccormack et al.
7,331,000 B2 2/2008 Ohno et al.
7,389,300 B1 6/2008 Shah et al.
7,634,679 B2 12/2009 Quintiliano
7,725,671 B2 5/2010 Prahlad et al.
D625,315 S 10/2010 Jewitt et al.
7,814,057 B2 10/2010 Kathuria et al.
7,840,533 B2 11/2010 Prahlad et al.
7,873,610 B2 1/2011 Poulsen
7,873,684 B2 1/2011 Souder et al.
7,941,470 B2 5/2011 Le et al.
7,953,764 B2 5/2011 Baffier et al.
7,971,094 B1 6/2011 Benn et al.
7,974,942 B2 7/2011 Pomroy et al.
8,117,165 B1 2/2012 Winckelmann et al.
8,146,080 B2 3/2012 Carter et al.
D656,948 S 4/2012 Kundsen et al.
8,150,808 B2 4/2012 Zha et al.
8,250,033 B1 8/2012 De Souter et al.
8,291,409 B2 10/2012 Winner et al.
8,335,765 B2 12/2012 Sivasubramanian et al.
8,364,648 B1 1/2013 Sim-Tang
8,429,630 B2 4/2013 Nickolov et al.
8,447,728 B2 5/2013 Prahlad et al.
8,448,170 B2 5/2013 Wipfel et al.
D684,160 S 6/2013 Truelove et al.
D684,161 S 6/2013 Truelove et al.
8,468,174 B1 6/2013 Yueh et al.
8,549,518 B1 10/2013 Aron et al.
8,572,031 B2 10/2013 Merriman et al.
8,601,473 B1 12/2013 Aron et al.
8,612,396 B1 12/2013 Mcalister et al.
8,635,421 B2 1/2014 Gupta et al.
8,656,123 B2 2/2014 Lee
8,656,303 B2 2/2014 Hughes
8,677,085 B2 3/2014 Vaghani et al.
8,713,060 B2 4/2014 Sivasubramanian et al.
8,762,335 B2 6/2014 Prahlad et al.
8,769,537 B1 7/2014 Ruggiero et al.
8,775,438 B1 7/2014 Brooker et al.
8,832,028 B2 9/2014 Susairaj et al.
8,843,441 B1 9/2014 Rath et al.
8,849,850 B2 9/2014 Baffier et al.
8,850,130 B1 9/2014 Aron et al.
8,856,189 B1 * 10/2014 Bull ...................... G06Q 10/10 707/802
8,863,124 B1 10/2014 Aron
8,874,749 B1 10/2014 Vittal et al.
8,914,567 B2 12/2014 Miroshnichenko et al.
8,924,974 B1 12/2014 Ruggiero et al.
8,972,347 B1 3/2015 Sim-Tang
9,009,106 B1 4/2015 Aron et al.
9,069,708 B2 6/2015 Gill et al.
D733,745 S 7/2015 Huang
9,116,737 B2 8/2015 Aswathanarayana et al.
9,116,803 B1 8/2015 Agrawal et al.
9,116,862 B1 8/2015 Rath et al.
9,213,727 B1 12/2015 Esposito
9,244,717 B2 1/2016 Pissay et al.
D749,117 S 2/2016 Huang
9,256,383 B2 2/2016 De Spiegeleer et al.
9,268,610 B2 2/2016 Hegdal et al.
9,270,521 B2 2/2016 Tompkins
D753,135 S 4/2016 Vazquez
D753,140 S 4/2016 Kouvas et al.
9,305,068 B1 4/2016 Esposito
9,311,330 B1 4/2016 Chockalingam et al.
9,336,060 B2 5/2016 Nori et al.
9,336,132 B1 5/2016 Aron et al.
9,372,758 B2 6/2016 Ashutosh et al.
D761,288 S 7/2016 Cianflone et al.
9,384,254 B2 7/2016 Tekade et al.
9,389,962 B1 7/2016 Yueh et al.
D763,890 S 8/2016 Pan
9,405,634 B1 8/2016 Ambastha et al.
9,413,810 B2 8/2016 Rezvani et al.
9,436,556 B2 9/2016 Siden et al.
D771,102 S 11/2016 Protzman et al.
9,495,435 B2 11/2016 Zhang et al.
9,507,579 B2 11/2016 Gambardella et al.
9,529,551 B2 12/2016 Kesavan et al.
9,529,808 B1 12/2016 Sudarsanam et al.
D777,747 S 1/2017 Derby et al.
D778,296 S 2/2017 Belkin et al.
D779,514 S 2/2017 Baris et al.
9,582,297 B2 2/2017 Jin et al.
D781,887 S 3/2017 Dziuba et al.
9,600,193 B2 3/2017 Ahrens et al.
9,621,680 B2 4/2017 D'Costa et al.
9,639,429 B2 5/2017 Stewart et al.
9,652,265 B1 5/2017 Narayanasamy et al.
9,659,080 B1 5/2017 Drobychev et al.
9,665,437 B2 5/2017 Bhargava et al.
D794,666 S 8/2017 Havaldar et al.
D794,667 S 8/2017 Havaldar et al.
9,733,958 B2 8/2017 Cui et al.
9,740,472 B1 8/2017 Sohi et al.
9,740,723 B2 8/2017 Prahlad et al.
9,747,287 B1 8/2017 Bhardwaj et al.
D797,116 S 9/2017 Chapman et al.
9,753,713 B2 9/2017 Mani et al.
9,760,396 B2 9/2017 Apte et al.
9,772,866 B1 9/2017 Aron et al.
9,778,992 B1 10/2017 Yueh et al.
D802,608 S 11/2017 Hicks et al.
D803,231 S 11/2017 Guinness et al.
9,830,082 B1 11/2017 Srinivasan et al.
D807,902 S 1/2018 Cong et al.
9,858,155 B2 1/2018 Ashutosh et al.
9,881,168 B2 1/2018 Chari et al.
D809,530 S 2/2018 Matheson et al.
D815,652 S 4/2018 Protzman et al.
9,934,107 B1 4/2018 Chikkanayakanahally et al.
D817,976 S 5/2018 Shilwant et al.
9,960,963 B2 5/2018 Selvaraj et al.
10,013,313 B2 7/2018 Zhang et al.
10,033,833 B2 7/2018 Fu et al.
10,055,300 B2 8/2018 Zhang et al.
10,057,279 B1 8/2018 Balduzzi et al.
10,061,852 B1 8/2018 Plenderleith
10,078,465 B1 9/2018 Wu et al.
10,108,496 B2 10/2018 Hoobler et al.
10,108,685 B2 10/2018 Amdur et al.
10,146,848 B2 12/2018 Narayanan et al.
10,162,715 B1 12/2018 Mcalister et al.
D838,288 S 1/2019 Sunshine et al.
10,185,627 B2 1/2019 Wong et al.
D839,913 S 2/2019 Chen et al.
10,206,092 B1 2/2019 Mellquist et al.
10,210,048 B2 2/2019 Sancheti
10,212,195 B2 2/2019 Maskalik et al.
D843,388 S 3/2019 Protzman et al.
10,235,250 B1 3/2019 Ambastha et al.
10,248,657 B2 4/2019 Prahlad et al.
10,261,867 B1 4/2019 Terry et al.
10,268,551 B1 4/2019 Wong
10,275,267 B1 4/2019 De Kadt et al.
10,282,201 B2 5/2019 Tekade et al.
10,339,110 B2 7/2019 Marinov et al.
10,346,431 B1 7/2019 Broda et al.
10,372,329 B1 8/2019 Ahrens et al.
10,379,957 B2 8/2019 Ngo
10,379,963 B2 8/2019 Bhargava et al.
D862,512 S 10/2019 Schubart
10,445,298 B2 10/2019 Ramu et al.

(56) References Cited

U.S. PATENT DOCUMENTS

| | | | |
|---|---|---|---|
| 10,447,806 | B1 | 10/2019 | Sahay et al. |
| 10,476,955 | B2 | 11/2019 | Mutalik et al. |
| D870,762 | S | 12/2019 | Mendoza Corominas et al. |
| 10,496,302 | B1 | 12/2019 | Gaurav et al. |
| 10,503,612 | B1 | 12/2019 | Wang et al. |
| 10,509,798 | B2 | 12/2019 | Chow et al. |
| D875,108 | S | 2/2020 | Chitalia et al. |
| 10,572,292 | B2 | 2/2020 | Bhandari et al. |
| D877,753 | S | 3/2020 | Chitalia et al. |
| 10,579,364 | B2 | 3/2020 | Doshi et al. |
| 10,599,423 | B2 | 3/2020 | Coleman et al. |
| 10,606,578 | B2 | 3/2020 | Kruglikov et al. |
| 10,613,938 | B2 | 4/2020 | Blumenau et al. |
| 10,637,914 | B2 | 4/2020 | Basavaiah et al. |
| 10,700,991 | B2 | 6/2020 | Khinvasara et al. |
| 10,705,755 | B2 | 7/2020 | Wang et al. |
| 10,719,407 | B1 | 7/2020 | Chockalingam et al. |
| 10,725,866 | B1 | 7/2020 | Palaiah et al. |
| 10,728,255 | B2 | 7/2020 | Jindal et al. |
| 10,757,036 | B2 | 8/2020 | Tung et al. |
| 10,776,329 | B2 | 9/2020 | Ramohalli Gopala Rao et al. |
| 10,778,750 | B2 | 9/2020 | Ringdahl |
| 10,785,029 | B2 | 9/2020 | Gupta et al. |
| 10,785,255 | B1 | 9/2020 | Otvagin et al. |
| 10,812,582 | B2 | 10/2020 | Spillane et al. |
| 10,817,157 | B2 | 10/2020 | Kuchibhotla et al. |
| 10,824,522 | B2 | 11/2020 | Sadavarte et al. |
| 10,824,956 | B1 | 11/2020 | Natanzon et al. |
| 10,855,554 | B2 | 12/2020 | Freeman et al. |
| D911,356 | S | 2/2021 | Varghese et al. |
| 10,922,957 | B2 | 2/2021 | Rhoads et al. |
| 10,938,924 | B1 | 3/2021 | Jensen et al. |
| 10,949,309 | B2 | 3/2021 | Hajare et al. |
| 10,951,496 | B2 | 3/2021 | Baker et al. |
| 10,959,098 | B2 | 3/2021 | Cidon et al. |
| 10,965,737 | B1 | 3/2021 | Parulkar et al. |
| 10,984,041 | B2 | 4/2021 | Bedadala et al. |
| 10,999,165 | B2 | 5/2021 | Cidon et al. |
| 11,010,336 | B2 | 5/2021 | Kuchibhotla et al. |
| 11,010,487 | B2 | 5/2021 | Noe et al. |
| 11,036,696 | B2 | 6/2021 | Higginson et al. |
| D926,200 | S | 7/2021 | Murphy et al. |
| 11,055,352 | B1 | 7/2021 | Beitchman et al. |
| 11,061,709 | B2 | 7/2021 | Cao et al. |
| D927,507 | S | 8/2021 | Norman |
| 11,099,956 | B1 | 8/2021 | Polimera et al. |
| 11,100,020 | B2 | 8/2021 | Shah et al. |
| 11,108,629 | B1 | 8/2021 | Cahyadi et al. |
| 11,120,011 | B2 | 9/2021 | Priebe et al. |
| 11,126,426 | B2 | 9/2021 | Zhu et al. |
| 11,169,887 | B2 | 11/2021 | Bajaj et al. |
| 11,182,372 | B1 | 11/2021 | Jain et al. |
| 11,243,703 | B2 | 2/2022 | Watkins |
| 11,243,971 | B2 | 2/2022 | Geigel |
| D947,216 | S | 3/2022 | Leininger |
| D947,239 | S | 3/2022 | Rubin et al. |
| D947,240 | S | 3/2022 | Rubin et al. |
| 11,275,573 | B1 | 3/2022 | Javadekar |
| 11,308,114 | B1 | 4/2022 | Moghe |
| 11,320,978 | B2 | 5/2022 | Kuchibhotla et al. |
| 11,372,820 | B1 | 6/2022 | Harjono et al. |
| 11,386,058 | B2 | 7/2022 | Hung et al. |
| 11,561,864 | B1 | 1/2023 | Brahmadesam et al. |
| 11,604,705 | B2 | 3/2023 | Mehta et al. |
| 11,604,806 | B2 | 3/2023 | Mankad et al. |
| 11,609,828 | B2 | 3/2023 | Khandkar et al. |
| 11,640,340 | B2 | 5/2023 | Sontakke et al. |
| 11,741,380 | B2 | 8/2023 | Khawas et al. |
| 11,816,066 | B2 | 11/2023 | Kuchibhotla et al. |
| 11,860,818 | B2 | 1/2024 | Kuchibhotla et al. |
| 11,892,918 | B2 | 2/2024 | Rayaraddi et al. |
| 11,899,685 | B1 | 2/2024 | Pandis et al. |
| 11,907,507 | B2 | 2/2024 | Kibo |
| 12,010,227 | B1 | 6/2024 | Chhabra et al. |
| 12,019,523 | B2 | 6/2024 | Mehta et al. |
| 12,081,604 | B1 | 9/2024 | Hinds et al. |
| 12,093,715 | B2 | 9/2024 | Zhao et al. |
| 12,153,499 | B2 | 11/2024 | Sontakke et al. |
| 12,321,244 | B1 | 6/2025 | Rather et al. |
| 2001/0014867 | A1 | 8/2001 | Conmy |
| 2002/0019920 | A1 | 2/2002 | Reuter et al. |
| 2002/0038554 | A1 | 4/2002 | Monk et al. |
| 2002/0073089 | A1 | 6/2002 | Schwartz et al. |
| 2002/0082858 | A1 | 6/2002 | Heddaya et al. |
| 2002/0104376 | A1 | 8/2002 | Danyluk et al. |
| 2002/0174098 | A1 | 11/2002 | Wu et al. |
| 2003/0046353 | A1 | 3/2003 | Chung et al. |
| 2003/0147309 | A1 | 8/2003 | Weisberg |
| 2004/0059878 | A1 | 3/2004 | Madany |
| 2005/0027661 | A1 | 2/2005 | Lober et al. |
| 2005/0149757 | A1 | 7/2005 | Corbett et al. |
| 2006/0029096 | A1 | 2/2006 | Babbar et al. |
| 2006/0107006 | A1 | 5/2006 | Green et al. |
| 2006/0143412 | A1 | 6/2006 | Armangau |
| 2006/0161444 | A1 | 7/2006 | Lubrecht et al. |
| 2006/0161462 | A1 | 7/2006 | Sharma |
| 2006/0161879 | A1 | 7/2006 | Lubrecht et al. |
| 2006/0242189 | A1 | 10/2006 | Leetaru et al. |
| 2006/0253472 | A1 | 11/2006 | Wasserman et al. |
| 2007/0022065 | A1 | 1/2007 | Hatano et al. |
| 2007/0100793 | A1 | 5/2007 | Brown et al. |
| 2007/0183224 | A1 | 8/2007 | Erofeev |
| 2007/0185852 | A1 | 8/2007 | Erofeev |
| 2007/0185922 | A1 | 8/2007 | Kapoor et al. |
| 2007/0185937 | A1 | 8/2007 | Prahlad et al. |
| 2007/0234115 | A1 | 10/2007 | Saika |
| 2007/0300221 | A1 | 12/2007 | Hartz et al. |
| 2008/0059894 | A1 | 3/2008 | Cisler et al. |
| 2008/0126945 | A1 | 5/2008 | Munkvold et al. |
| 2008/0239985 | A1 | 10/2008 | Karve et al. |
| 2008/0256311 | A1 | 10/2008 | Lee |
| 2009/0022285 | A1 | 1/2009 | Swanburg et al. |
| 2009/0028082 | A1 | 1/2009 | Wynn et al. |
| 2009/0037914 | A1 | 2/2009 | Chagoly et al. |
| 2009/0112881 | A1 | 4/2009 | Kodama |
| 2009/0125858 | A1 | 5/2009 | Vishweshwara et al. |
| 2009/0132543 | A1 | 5/2009 | Chatley et al. |
| 2009/0161547 | A1 | 6/2009 | Riddle et al. |
| 2009/0228669 | A1 | 9/2009 | Slesarev et al. |
| 2009/0276771 | A1 | 11/2009 | Nickolov et al. |
| 2009/0276833 | A1 | 11/2009 | Paul et al. |
| 2009/0319582 | A1 | 12/2009 | Simek et al. |
| 2010/0017801 | A1 | 1/2010 | Kundapur |
| 2010/0023564 | A1 | 1/2010 | Yerneni et al. |
| 2010/0198791 | A1 | 8/2010 | Wu et al. |
| 2010/0251242 | A1 | 9/2010 | Sivasubramanian et al. |
| 2011/0004586 | A1 | 1/2011 | Cherryholmes et al. |
| 2011/0022882 | A1 | 1/2011 | Jaehde et al. |
| 2011/0071981 | A1 | 3/2011 | Ghosh et al. |
| 2011/0093435 | A1 | 4/2011 | Zha et al. |
| 2011/0099420 | A1 | 4/2011 | Macdonald Mcalister et al. |
| 2011/0138383 | A1 | 6/2011 | Le |
| 2011/0252420 | A1 | 10/2011 | Tung et al. |
| 2012/0011378 | A1 | 1/2012 | Dalton et al. |
| 2012/0084260 | A1 | 4/2012 | Cherkauer et al. |
| 2012/0123999 | A1 | 5/2012 | Ashutosh et al. |
| 2012/0271797 | A1 | 10/2012 | Patil |
| 2012/0290714 | A1 | 11/2012 | Cohen |
| 2013/0019015 | A1 | 1/2013 | Devarakonda et al. |
| 2013/0031136 | A1 * | 1/2013 | Shah .................. G06F 21/6218 707/783 |
| 2013/0091285 | A1 | 4/2013 | Devarakonda et al. |
| 2013/0110779 | A1 | 5/2013 | Taylor et al. |
| 2013/0117441 | A1 | 5/2013 | Kuchibhotla et al. |
| 2013/0232470 | A1 | 9/2013 | Yung |
| 2013/0232497 | A1 | 9/2013 | Jalagam et al. |
| 2013/0238331 | A1 | 9/2013 | Mikan et al. |
| 2013/0263119 | A1 | 10/2013 | Pissay et al. |
| 2013/0290180 | A1 | 10/2013 | Baffier et al. |
| 2013/0332251 | A1 | 12/2013 | Ioannidis et al. |
| 2014/0006350 | A1 | 1/2014 | Fukui et al. |
| 2014/0018947 | A1 | 1/2014 | Ales |
| 2014/0059226 | A1 | 2/2014 | Messerli et al. |
| 2014/0101117 | A1 | 4/2014 | Uzzaman |

(56) References Cited

U.S. PATENT DOCUMENTS

2014/0108339 A1 4/2014 Marsden
2014/0108352 A1 4/2014 Ahrens et al.
2014/0189685 A1 7/2014 Kripalani
2014/0201171 A1 7/2014 Vijayan et al.
2014/0229504 A1 8/2014 Kim et al.
2014/0229698 A1 8/2014 Sivasubramanian et al.
2014/0250081 A1 9/2014 Stewart et al.
2014/0282256 A1 9/2014 Fish et al.
2014/0337844 A1 11/2014 Jin et al.
2014/0359058 A1 12/2014 Karnawat et al.
2015/0019495 A1 1/2015 Siden et al.
2015/0033223 A1 1/2015 Chari et al.
2015/0039837 A1 2/2015 Quan et al.
2015/0052108 A1 2/2015 Volk et al.
2015/0074054 A1 3/2015 Antony
2015/0121453 A1 4/2015 Gupta
2015/0127611 A1* 5/2015 Westerman ......... H04L 41/5003 707/639
2015/0142610 A1 5/2015 Manoharan et al.
2015/0143064 A1 5/2015 Bhargava et al.
2015/0188775 A1 7/2015 Van Der Walt
2015/0188789 A1 7/2015 Jayaprakash
2015/0195347 A1 7/2015 Luft
2015/0207682 A1 7/2015 Moraes Nichele et al.
2015/0207683 A1 7/2015 Adogla
2015/0207703 A1 7/2015 Gallagher et al.
2015/0227435 A1 8/2015 Ashutosh et al.
2015/0227602 A1 8/2015 Ramu et al.
2015/0254141 A1 9/2015 Wertheimer et al.
2015/0301814 A1 10/2015 Chen et al.
2015/0331923 A1 11/2015 Kim
2015/0339941 A1* 11/2015 Lu .......................... G06F 16/21 434/309
2015/0347987 A1 12/2015 Ali
2015/0358417 A1 12/2015 Patil et al.
2015/0370641 A1 12/2015 Susairaj et al.
2016/0041997 A1 2/2016 Gokhale et al.
2016/0048408 A1 2/2016 Madhu et al.
2016/0057077 A1 2/2016 Gomatam et al.
2016/0066201 A1 3/2016 Kerpez et al.
2016/0077923 A1 3/2016 Zhang et al.
2016/0077925 A1 3/2016 Tekade et al.
2016/0078104 A1 3/2016 Clifford et al.
2016/0092535 A1 3/2016 Kuchibhotla et al.
2016/0094401 A1 3/2016 Anwar et al.
2016/0094410 A1 3/2016 Anwar et al.
2016/0094647 A1 3/2016 Mordani et al.
2016/0125059 A1 5/2016 Jain et al.
2016/0127307 A1 5/2016 Jain et al.
2016/0162845 A1 6/2016 Carroll et al.
2016/0182328 A1 6/2016 Bhasin et al.
2016/0188421 A1 6/2016 Karinta et al.
2016/0191348 A1 6/2016 Lee et al.
2016/0197835 A1 7/2016 Luft
2016/0224259 A1 8/2016 Ahrens et al.
2016/0239637 A1 8/2016 Miller et al.
2016/0246503 A1 8/2016 Phelan et al.
2016/0248629 A1 8/2016 Erdmann et al.
2016/0266913 A1 9/2016 Achillopoulos
2016/0267105 A1 9/2016 Sun et al.
2016/0274981 A1 9/2016 Wilkinson
2016/0292358 A1 10/2016 Heger
2016/0306840 A1 10/2016 Deshmukh et al.
2016/0321339 A1 11/2016 Tekade et al.
2016/0335369 A1* 11/2016 Picard ................... G06F 16/958
2016/0337473 A1 11/2016 Rao
2016/0344582 A1 11/2016 Shivanna et al.
2016/0378361 A1 12/2016 Uriel
2016/0378622 A1 12/2016 Ren et al.
2016/0380809 A1 12/2016 Hou et al.
2017/0031775 A1 2/2017 Arumugham et al.
2017/0039236 A1 2/2017 Li et al.
2017/0060699 A1 3/2017 Hohl et al.
2017/0068469 A1 3/2017 Shankar et al.
2017/0091231 A1 3/2017 Difranco et al.
2017/0115978 A1 4/2017 Modi et al.
2017/0199753 A1 7/2017 Gong
2017/0220777 A1 8/2017 Wang et al.
2017/0228227 A1 8/2017 Winterfeldt et al.
2017/0235563 A1 8/2017 Bafna et al.
2017/0235758 A1 8/2017 Gopalapura Venkatesh et al.
2017/0235950 A1 8/2017 Gopalapura Venkatesh et al.
2017/0243275 A1 8/2017 Goens et al.
2017/0262232 A1 9/2017 Zhao et al.
2017/0264684 A1 9/2017 Spillane et al.
2017/0272359 A1 9/2017 Behringer et al.
2017/0286517 A1 10/2017 Horowitz et al.
2017/0286518 A1 10/2017 Horowitz et al.
2017/0315877 A1 11/2017 Kaplingat et al.
2017/0322827 A1 11/2017 Little et al.
2017/0344618 A1 11/2017 Horowitz et al.
2017/0351584 A1 12/2017 Griffith et al.
2017/0351716 A1 12/2017 Higginson et al.
2017/0357667 A1 12/2017 Auch et al.
2017/0371547 A1 12/2017 Fruchtman et al.
2017/0374136 A1 12/2017 Ringdahl
2018/0025007 A1 1/2018 Dai
2018/0060119 A1 3/2018 Zamir
2018/0063088 A1 3/2018 Hardy
2018/0113622 A1 4/2018 Sancheti
2018/0121239 A1 5/2018 Sawhney et al.
2018/0121494 A1 5/2018 Antonopoulos et al.
2018/0121521 A1 5/2018 Bivol
2018/0157561 A1 6/2018 Venkatesh et al.
2018/0173452 A1 6/2018 Hu et al.
2018/0181469 A1 6/2018 Yueh et al.
2018/0203771 A1 7/2018 Heidel et al.
2018/0232142 A1 8/2018 Shekar et al.
2018/0253676 A1 9/2018 Sheth et al.
2018/0270219 A1 9/2018 Li
2018/0275881 A1 9/2018 Ashraf et al.
2018/0285201 A1 10/2018 Bangalore et al.
2018/0285353 A1 10/2018 Ramohalli Gopala Rao et al.
2018/0293397 A1 10/2018 Demember et al.
2018/0300203 A1 10/2018 Kathpal et al.
2018/0307728 A1 10/2018 Crupi et al.
2018/0324279 A1 11/2018 Barton et al.
2019/0005407 A1 1/2019 Harris et al.
2019/0018738 A1 1/2019 Chen
2019/0034240 A1 1/2019 Nabi et al.
2019/0065322 A1 2/2019 Chakankar et al.
2019/0075031 A1 3/2019 Skelton et al.
2019/0087279 A1 3/2019 Kumar et al.
2019/0089597 A1 3/2019 Pathak et al.
2019/0102257 A1 4/2019 Zhou et al.
2019/0102411 A1 4/2019 Hung et al.
2019/0116237 A1 4/2019 Gibson
2019/0121671 A1 4/2019 Guim Bernat
2019/0125828 A1 5/2019 Bortz
2019/0129799 A1 5/2019 Kumarasamy
2019/0138631 A1 5/2019 Crane
2019/0155699 A1 5/2019 Luo et al.
2019/0155936 A1 5/2019 Du et al.
2019/0158605 A1 5/2019 Markuze et al.
2019/0179711 A1 6/2019 Luo et al.
2019/0182213 A1 6/2019 Saavedra et al.
2019/0230156 A1 7/2019 Mclarty et al.
2019/0235904 A1 8/2019 Epping et al.
2019/0238412 A1 8/2019 Vohra et al.
2019/0238520 A1 8/2019 Espinosa et al.
2019/0245704 A1 8/2019 Pala
2019/0266268 A1 8/2019 Polinati et al.
2019/0310926 A1 10/2019 Hashimoto et al.
2019/0324865 A1* 10/2019 Weissman ........... G06F 11/1471
2019/0332582 A1 10/2019 Kumar et al.
2019/0339870 A1 11/2019 Meiri et al.
2019/0340091 A1 11/2019 Chandrasekaran et al.
2019/0349194 A1 11/2019 Fan
2019/0361412 A1 11/2019 Park et al.
2019/0361748 A1 11/2019 Walters et al.
2019/0362004 A1 11/2019 Oks et al.
2019/0370146 A1 12/2019 Babu et al.
2019/0384496 A1 12/2019 Abdul Rasheed et al.
2019/0391880 A1 12/2019 Wang et al.

(56) References Cited

U.S. PATENT DOCUMENTS

| | | | |
|---|---|---|---|
| 2019/0394093 A1 | 12/2019 | Kulkarni et al. | |
| 2020/0028932 A1 | 1/2020 | Yang et al. | |
| 2020/0034178 A1 | 1/2020 | Gupta et al. | |
| 2020/0034245 A1 | 1/2020 | Kohler | |
| 2020/0042293 A1* | 2/2020 | Elango | G06Q 10/10 |
| 2020/0050522 A1 | 2/2020 | Coleman et al. | |
| 2020/0059411 A1 | 2/2020 | Olmsted-Thompson et al. | |
| 2020/0081704 A1 | 3/2020 | Bafna et al. | |
| 2020/0097177 A1 | 3/2020 | Ashokkumar et al. | |
| 2020/0097325 A1 | 3/2020 | Vadapandeshwara et al. | |
| 2020/0099692 A1 | 3/2020 | Jindal et al. | |
| 2020/0104375 A1 | 4/2020 | Earnesty et al. | |
| 2020/0104376 A1 | 4/2020 | Earnesty et al. | |
| 2020/0104377 A1 | 4/2020 | Earnesty et al. | |
| 2020/0106737 A1 | 4/2020 | Beedu et al. | |
| 2020/0110675 A1 | 4/2020 | Wang et al. | |
| 2020/0137157 A1 | 4/2020 | Joseph et al. | |
| 2020/0153898 A1 | 5/2020 | Sabath et al. | |
| 2020/0162380 A1 | 5/2020 | Pilkington et al. | |
| 2020/0193388 A1 | 6/2020 | Tran-Kiem et al. | |
| 2020/0201526 A1 | 6/2020 | Kuchibhotla et al. | |
| 2020/0210378 A1 | 7/2020 | Kuchibhotla et al. | |
| 2020/0210379 A1 | 7/2020 | Kuchibhotla et al. | |
| 2020/0250046 A1 | 8/2020 | Wong et al. | |
| 2020/0250059 A1 | 8/2020 | Bothello et al. | |
| 2020/0285608 A1 | 9/2020 | Chakankar et al. | |
| 2020/0285652 A1 | 9/2020 | Wang et al. | |
| 2020/0314173 A1 | 10/2020 | Pahwa et al. | |
| 2020/0322425 A1 | 10/2020 | Sharma et al. | |
| 2020/0349018 A1 | 11/2020 | Meadowcroft et al. | |
| 2020/0351332 A1 | 11/2020 | Palladino et al. | |
| 2020/0366661 A1 | 11/2020 | Mehta et al. | |
| 2020/0379793 A1 | 12/2020 | Parihar et al. | |
| 2021/0005330 A1 | 1/2021 | Patil et al. | |
| 2021/0034471 A1 | 2/2021 | Khandkar et al. | |
| 2021/0051530 A1 | 2/2021 | Venkataraman et al. | |
| 2021/0064512 A1 | 3/2021 | Sirov et al. | |
| 2021/0064591 A1* | 3/2021 | Sun | G06F 16/182 |
| 2021/0075700 A1 | 3/2021 | Palladino et al. | |
| 2021/0117293 A1 | 4/2021 | Luo et al. | |
| 2021/0133031 A1 | 5/2021 | Moldvai et al. | |
| 2021/0135983 A1 | 5/2021 | Farnham | |
| 2021/0141921 A1 | 5/2021 | Toplak | |
| 2021/0141923 A1 | 5/2021 | Wu et al. | |
| 2021/0144060 A1 | 5/2021 | Cencini et al. | |
| 2021/0194825 A1 | 6/2021 | Goodman et al. | |
| 2021/0200643 A1 | 7/2021 | Luo et al. | |
| 2021/0218598 A1 | 7/2021 | Ganapathy et al. | |
| 2021/0281428 A1 | 9/2021 | Kempf et al. | |
| 2021/0328979 A1 | 10/2021 | M | |
| 2021/0391999 A1 | 12/2021 | Chilamakuri et al. | |
| 2021/0400533 A1 | 12/2021 | Kwok | |
| 2021/0406132 A1 | 12/2021 | Gupta et al. | |
| 2021/0406717 A1 | 12/2021 | Tauheed et al. | |
| 2022/0004469 A1 | 1/2022 | Shen et al. | |
| 2022/0050753 A1 | 2/2022 | Mehta et al. | |
| 2022/0066993 A1 | 3/2022 | Khanuja et al. | |
| 2022/0116445 A1 | 4/2022 | Filippou et al. | |
| 2022/0311681 A1 | 9/2022 | Palladino et al. | |
| 2022/0351169 A1 | 11/2022 | Kim et al. | |
| 2022/0417205 A1 | 12/2022 | Nainar et al. | |
| 2023/0065444 A1 | 3/2023 | Pyla et al. | |
| 2023/0095814 A1* | 3/2023 | Sarkar | G06F 11/1464 707/641 |
| 2023/0096071 A1* | 3/2023 | Sarkar | G06F 11/1469 714/6.3 |
| 2023/0108625 A1 | 4/2023 | Yi et al. | |
| 2023/0115093 A1 | 4/2023 | Zhou | |
| 2023/0125754 A1 | 4/2023 | Willett et al. | |
| 2023/0164567 A1 | 5/2023 | Fellows et al. | |
| 2023/0185823 A1 | 6/2023 | Chu et al. | |
| 2023/0195529 A1 | 6/2023 | Luthra et al. | |
| 2023/0214305 A1 | 7/2023 | Hockey et al. | |
| 2023/0216736 A1 | 7/2023 | Almadani et al. | |
| 2023/0231912 A1 | 7/2023 | Vohra et al. | |
| 2023/0247087 A1 | 8/2023 | Nagaraja et al. | |
| 2023/0251938 A1 | 8/2023 | Sontakke et al. | |
| 2023/0344885 A1 | 10/2023 | Arnold et al. | |
| 2023/0379699 A1 | 11/2023 | Oerton et al. | |
| 2023/0418639 A1 | 12/2023 | Vaishnav et al. | |
| 2024/0045585 A1 | 2/2024 | Kuchibhotla et al. | |
| 2024/0045834 A1 | 2/2024 | Kuchibhotla et al. | |
| 2024/0126777 A1 | 4/2024 | Tylik et al. | |
| 2024/0134824 A1 | 4/2024 | Khanuja et al. | |
| 2024/0161006 A1 | 5/2024 | Dey et al. | |

FOREIGN PATENT DOCUMENTS

| | | | |
|---|---|---|---|
| CN | 108664660 | A | 10/2018 |
| CN | 113010599 | A | 6/2021 |
| EP | 1 654 683 | B1 | 5/2006 |
| EP | 2 980 707 | A1 | 2/2016 |
| GB | 2 451 943 | A | 2/2009 |
| LU | 102236 | B1 | 11/2020 |
| TW | 201600970 | A1 | 1/2016 |
| WO | WO-2010/106578 | | 9/2010 |
| WO | WO-2016/069029 | A1 | 5/2016 |
| WO | WO-2020/026476 | A1 | 2/2020 |
| WO | WO-2020/072338 | A1 | 4/2020 |
| WO | WO-2021/108075 | A1 | 6/2021 |

OTHER PUBLICATIONS

Oracle, "https://web.archive.org/web/20170829005212/https://docs.oracle.com/cd/E24628_01lem.121/e27046/cloning_database.htm#EMLCM93230", Aug. 29, 2017 (Year: 2017).
Affidavit of Nathaniel E Frank-White, Aug. 10, 2024.
Expedia, Preferred Class Drop Down, www.expedia.com/.
Foreign Action other than Search Report on PCT Dtd Jan. 2, 2025.
McGraw-Hill Dictionary of Scientific and Technical Terms, recoil milking—recovery system, pp. 4, 6th edition.
MySQL, "Supported Platforms: MySQL Database", https://web.archive.org/web/20181106221826/https://www.mysql.com/support/supportedplatforms/database.html.
New Oxford American Dictionary, Third Edition, "authorized—avail", 4 pages, 2010.
*Nutanix* v. *Tessell,* "Civil Docket for Case 3:24-cv-01729-AMO".
*Nutanix* v. *Tessell,* "Order Setting initial Case Management Conference and ADR Deadlines", Northern District of California, Mar. 20, 2024.
*Tessell* v. *Nutanix* IPR Power of Attorney.
*Tessell* v. *Nutanix,* IPR2025-00322, Dec. 18, 2024, pp. 7.
"Recommended Practice for Patch Management of Control Systems", Steven Tom, Idaho National Laboratory, Dec. 2008, Cybersecurity Infrastructure Security Agency (CISA), US. Department of Homeland Security (Year: 2008).
High availability software—Wikipedia (Year: 2016).
"About Snapshots and Clones", Administering Oracle Java Cloud Service, https://docs.oracle.com/en/cloud/paas/java-cloud/jscag/snapshots-and-clones1.html#GUID-28871F48-A458-41C1-86F8-566ED842C3D5.
"Amazon RDS Now Supports Setting Up Connectivity Between Your RDS Database and EC2 Compute Instance in 1-Click", Amazon Web Services, Oct. 23, 2009. https://aws.amazon.com/rds.
"Azure Arc extends the Azure control plane", May 17, 2022. https://infohub.delltechnologies.com/l/techbook-dell-emc-integrated-system-for-microsoft-azure-stack-hci-2/azure-arc-extends-the-azure-control-plane-14.
"Cloning a volume for an Amazon Aurora DB cluster", https://docs.aws.amazon.com/AmazonRDS/latest/AuroraUserGuide/Aurora.Managing.Clone.html.
"Configure cross-tenant access settings for B2B collaboration", Azure AD, Microsoft Entra, May 24, 2022, 21pp.
"Connected Machine Agent Prerequisites", Sep. 27, 2022, https://learn.microsoft.com/en-us/azure/azure-arc/servers/prerequisites.
"Control Plane", Jun. 23, 2022. https://docs.controlplane.com.
"Dell PS Series Snapshots and Clones: Best Practices and Sizing Guidelines", Dell Storage Engineering, Nov. 2019, https://dl.dell.com/manuals/common/ps-series-snapshots-clones-bp1027_en-us.pdf.

(56) References Cited

OTHER PUBLICATIONS

"Enterprise Manager Cloud Administration Guide", Oracle Help Center, 2024, https://docs.oracle.com/cd/E24628_01/doc.121/e28814/cloud_db_clonesnap.htm#CEGCJCBC.
"Exadata Database Service onCloud@Customer Administrator'sGuide", Feb. 4, 2022. https://docs.oracle.com/en/engineered-systems/exadata-cloud-at-customer/ecccm/ecc-network-requirements.html#GUID-F06BD75B-E971-48ED-8699-E1004D4B4AC1.
Features and Capabilities of Azure Arcenabled SQL Managed Instance:, Aug. 13, 2022, https://learn.microsoft.com/en-us/azure/azure-arc/data/managed-instance-features.
"Managing Cloud-Native Workloads with Anthos", Oct. 19, 2021. https://authors.packtpub.com/wp-content/uploads/2021/10/Chapter-8-Professional-Cloud-Architect-1.pdf.
"Oracle Exadata Cloud@Customer X9M", Version 1.17, 2022, https://www.oracle.com/dk/a/ocom/docs/engineered-systems/exadata/exacc-x9m-ds.pdf.
"Overview of Azure Connected Machine Agent", Sep. 4, 2022, https://learn.microsoft.com/en-us/azure/azure-arc/servers/agent-overview.
"Protecting Microsoft SQL Server with Rubrik", Rubrik Technical Marketing, Sep. 2023, https://www.rubrik.com/content/dam/rubrik/en/resources/white-paper/rwp-protecting-microsoft-sql-server-with-rubrik.pdf.
"Row-Level Security", Sep. 17, 2022, https://learn.microsoft.com/en-us/sql/relational-databases/security/row-level-security?view=sql-server-ver16.
"Use Azure Private Link to Securely Connect Servers to Azure Arc", Jul. 28, 2022, https://learn.microsoft.com/en-us/azure/azure-arc/servers/private-link-security.
Actifio Enablement Team, "https:/Awww.youtube.com/watch?v=7mCcJTXxFM3|", "Oracle Advanced Data Protection and Workflows", May 15, 2018 ) (Year: 2018).
Adobe. "Creating and configuring the database" Experience League. Dec. 2021. Retrieved from https://experienceleague.adobe.com/docs/campaign-classic/using/installing-campaign-classic/initial-configuration/creating-and-configuring-the-database.html?lang=en (accessed Jul. 26, 2023).
Alhamazani, et al., "Cross-Layer Multi-Cloud Real-Time Application QoS Monitoring and Benchmarking As-a-Service Framework", Sep. 30, 2020. https://arxiv.org/ftp/arxiv/papers/1502/1502.00206.pdf.
Aluciani. "Provisioning PostgreSQL to be Highly Available and Resilient on Nutanix" Nutanix Community Blog. 2019. Retrieved from https://next.nutanix.com/community-blog-154/provisioning-postgresql-to-be-highly-available-and-resilient-on-nutanix-33726 (Year: 2019).
Amazon Web Services, "Amazon RDS Now Supports Setting up Connectivity Between You RDS Database and EC2 Compute Instance in 1-Click", Aug. 22, 2022. https://aws.amazon.com/about-aws/whats-new/2022/08/amazon-rds-setting-up-connectivity-rds-database-ec2-compute-instance-1-click/.
Amazon Web Services, "Amazon RDS on Outposts", Mar. 22, 2022. https://aws.amazon.com/rds/outposts/?pg=ln&sec=hiw.
Amazon Web Services, "Configuring and Using Oracle Connection Manager on Amazon EC2 for Amazon RDS for Oracle", Jan. 12, 2021, https://aws.amazon.com/blogs/database/configuring-and-using-oracle-connection-manager-on-amazon-ec2-for-amazon-rds-for-oracle.
Amazon Web Services, "SaaS Tenant Isolation Strategies. Isolating Resources in a Multi-Tenant Environment", (Aug. 2020).
Amazon, "Amazon Aurora User Guide for Aurora: Overview of multi-master clusters" Amazon Aurora User Guide from https://docs.aws.amazon.com/AmazonRDS/latest/AuroraUserGuide/aurora-ug.pdf#aurora-multi-master (accessed Jun. 28, 2021).
Amudala, Rajasekhar. "Add Targets Manually on EM Cloud Control 13c" Oracle DBA—Tips and Techniques. Jul. 13, 2020. Retrieved from http://www.br8dba.com/add-targets-manually-on-em-cloud-control-13c/ (accessed Aug. 30, 2023).
Anjum, Maaz, "Database Provisioning in EM12c: Provision me a Database Now!" Slideshare, (Dec. 12, 2013) from https://www.slideshare.net/MaazAnjum/maaz-anjum-gouser-database-provisioning-in-em12c-provision-me-a-database-now (accessed Jun. 28, 2021).
Anthos Technical Overview, Jun. 29, 2019. https://cloud.google.com/anthos/docs/concepts/overview.
ApexSQL, "Automated database provisioning using ApexSQL DevOps toolkit" ApexSQL Knowledgebase (2020) from https://knowledgebase.apexsql.com/automated-database-provisioning-using-apexsql-devops-toolkit/ (accessed Jun. 28, 2021).
Arslan, Erman, "Delphix—Notes vol. 1, my new toy for the upcoming months," Erman Arslan's Oracle Blog, published Aug. 8, 2016, retrieved on Jan. 2, 2023 from http://ermanarslan.blogspot.com/2016/08/delphix-notes-vol-1-my-new-toy-for.html.
Asanka, Dinesh, "Point in Time Recovery with SQL Server" SQL Shack, published Dec. 19, 2016, retrieved Feb. 11, 2022 from <https://www.sqlshack.com/point-in-time-recovery-with-sql-server/> (Year: 2016).
AWS Database Blog, "Configuring and Using Oracle Connection Manager on Amazon for EC2 for Amazon RDS for Oracle", Jan. 12, 2021, https://aws.amazon.com/blogs/database/configuring-and-using-oracle-connection-manager-on-amazon-ec2-for-amazon-rds-for-oracle/.
AWS Prescriptive Guidance, "PostgreSQL Pool Model", Jul. 1, 2022. https://docs.aws.amazon.com/prescriptive-guidance/latest/saas-multitenant-managed-postgresql/pool.html.
AWS Prescriptive Guidance, "Row-Level Security Recommendations", Jul. 1, 2022. https://docs.aws.amazon.com/prescriptive-guidance/latest/saas-multitenant-managed-postgresql/rls.html.
AWS Serverless SaaS Workshop—Lab4 : Isolating tenant data in a pooled model—Adding the missing code.
AWS Serverless SaaS Workshop—Lab4 : Isolating tenant data in a pooled model—Revisiting Authentication, Authorization, & Tenant Isolation.
AWS, "Working with Aurora multi-master clusters" User Guide for Aurora. 2020. Received from https://docs.aws.amazon.com/AmazonRDS/latest/AuroraUserGuide/aurora-multi-master.html (Year: 2020).
AWS. "Amazon CloudFormation" Amazon CloudFormation. Oct. 25, 2021. Retrieved from https://web.archive.org/web/20211025042539/https://www.amazonaws.cn/en/cloudformation/ (accessed Sep. 14, 2023).
AWS. "Amazon DocumentDB elastic clusters: how it works" Amazon DocumentDB. Jan. 2023. Retrieved from https://docs.aws.amazon.com/documentdb/latest/developerguide/elastic-how-it-works.html (accessed Apr. 6, 2023).
AWS. "Amazon EC2 M5 Instances" Amazon DocumentDB. Amazon EC2. Nov. 2017. Retrieved from https://aws.amazon.com/ec2/instance-types/m5/ (accessed Apr. 6, 2023).
AWS. "Amazon ECS clusters" Amazon Elastic Container Service. Dec. 2019. Retrieved from https://docs.aws.amazon.com/AmazonECS/latest/developerguide/clusters.html (accessed Apr. 6, 2023).
AWS. "Amazon RDS Backup & Restore Using AWS Backup How-To Guide" Getting Started Resource Center. Jun. 14, 2021. Retrieved from https://aws.amazon.com/getting-started/hands-on/amazon-rds-backup-restore-using-aws-backup/ (accessed Dec. 7, 2023).
AWS. "Amazon RDS Backup and Restore" AWS. Sep. 18, 2020. Retrieved from https://aws.amazon.com/rds/features/backup/ (accessed Dec. 7, 2023).
AWS. "Amazon RDS Custom architecture" Amazon Relational Database Service. May 24, 2022. Retrieved from https://docs.aws.amazon.com/AmazonRDS/latest/UserGuide/custom-concept.html (accessed Aug. 30, 2023).
AWS. "Amazon Relational Database Service (RDS)" Amazon Relational Database Service. Dec. 24, 2017. Retrieved from https://web.archive.org/web/20171224182936/https:/aws.amazon.com/rds/#features (accessed Sep. 6, 2023).
AWS. "Amazon Virtual Private Cloud" User Guide. Oct. 2022. Retrieved from https://docs.aws.amazon.com/pdfs/vpc/latest/userguide/vpc-ug.pdf#what-is-amazon-vpc (accessed Apr. 6, 2023).
AWS. "Amazon VPC FAQs" Amazon VPC. Dec. 14, 2021. Retrieved from https://aws.amazon.com/vpc/faqs/ (accessed Sep. 6, 2023).

(56) References Cited

OTHER PUBLICATIONS

AWS. "Announcing Amazon RDS Custom for Oracle" Amazon Relational Database Service. Oct. 26, 2021. Retrieved from https://aws.amazon.com/about-aws/whats-new/2021/10/amazon-rds-custom-oracle/ (accessed Aug. 30, 2023).
AWS. "AWS CloudFormation concepts" AWS CloudFormation. Oct. 22, 2021. Retrieved from https://docs.aws.amazon.com/AWSCloudFormation/latest/UserGuide/cfn-whatis-concepts.html (accessed Sep. 6, 2023).
AWS. "AWS glossary" AWS General Reference Guide. Jan. 2013. Retrieved from https://docs.aws.amazon.com/general/latest/gr/glos-chap.html (accessed Apr. 6, 2023).
AWS. "AWS Rule Functions" AWS CloudFormation. Sep. 24, 2021. Retrieved from https://web.archive.org/web/20210924041142/https:/docs.aws.amazon.com/AWSCloudFormation/latest/UserGuide/intrinsic-function-reference-rules.html (accessed Sep. 6, 2023).
AWS. "AWS::EC2::Subnet" AWS CloudFormation. Oct. 2021. Retrieved from https://docs.aws.amazon.com/AWSCloudFormation/latest/UserGuide/aws-resource-ec2-subnet.html (accessed Sep. 6, 2023).
AWS. "Backup with AWS" AWS. Jun. 2019. Retrieved from https://pages.awscloud.com/rs/112-TZM-766/images/AWS004%20B%26R%20eBook%20R4i.pdf (accessed Dec. 7, 2023).
AWS. "Configuring a DB instance for Amazon RDS Custom for Oracle" Amazon Relational Database Service. Dec. 3, 2021. Retrieved from https://docs.aws.amazon.com/AmazonRDS/latest/UserGuide/custom-creating.html (accessed Aug. 30, 2023).
AWS. "Copy a snapshot" Amazon Elastic Compute Cloud. Dec. 2012. Retrieved from https://docs.aws.amazon.com/AWSEC2/latest/UserGuide/ebs-copy-snapshot.html#ebs-snapshot-copy (accessed Apr. 6, 2023).
AWS. "CopySnapshot" Amazon Elastic Compute Cloud. Dec. 2014. Retrieved from https://docs.aws.amazon.com/AWSEC2/latest/APIReference/API_CopySnapshot.html (accessed Apr. 6, 2023).
AWS. "Create a custom Windows AMI" Amazon Elastic Compute Cloud. Jan. 15, 2013. Retrieved from https://docs.aws.amazon.com/AWSEC2/latest/WindowsGuide/Creating_EBSbacked_WinAMI.html (accessed Aug. 30, 2023).
AWS. "Create a DB instance" Amazon Relational Database Service. Jan. 2016. Retrieved from https://docs.aws.amazon.com/AmazonRDS/latest/UserGuide/CHAP_Tutorials.WebServerDB.CreateDBInstance.html (accessed Jul. 26, 2023).
AWS. "Create a VPC" Amazon Virtual Private Cloud. Mar. 2023. Retrieved from https://docs.aws.amazon.com/vpc/latest/userguide/create-vpc.html (accessed Jul. 26, 2023).
AWS. "Create and Connect to a MySQL Database with Amazon RDS" Getting Started Resource Center. Feb. 3, 2023. Retrieved from https://aws.amazon.com/getting-started/hands-on/create-mysql-db/ (accessed Jul. 26, 2023).
AWS. "CreateDBInstanceReadReplica" Amazon Relational Database Service. Jan. 16, 2013. Retrieved from https://docs.aws.amazon.com/AmazonRDS/latest/APIReference/API_CreateDBInstanceReadReplica.html (accessed Apr. 25, 2023).
AWS. "Creating a CEV" Amazon Relational Database Service. Jul. 3, 2022. Retrieved from https://docs.aws.amazon.com/AmazonRDS/latest/UserGuide/custom-cev.create.html (accessed Aug. 30, 2023).
AWS. "Creating a MySQL DB Instance and Connecting to a Database on a MySQL DB Instance" Amazon Relational Database Service. Dec. 22, 2017. Retrieved from https://web.archive.org/web/20171222204154/https:/docs.aws.amazon.com/AmazonRDS/latest/UserGuide/CHAP_GettingStarted.CreatingConnecting.MySQL.html (accessed Sep. 6, 2023).
AWS. "Creating an Amazon RDS DB instance" Amazon Relational Database Service. 2020. Retrieved from https://docs.aws.amazon.com/AmazonRDS/latest/UserGuide/USER_CreateDBInstance.html (accessed Jul. 26, 2023).
AWS. "Creating an Amazon RDS DB instance" Amazon Relational Database Service. May 13, 2020. Retrieved from https://docs.aws.amazon.com/AmazonRDS/latest/UserGuide/USER_CreateDBInstance.html#USER_CreateDBInstance.Settings (accessed Aug. 30, 2023).
AWS. "Creating and connecting to a MySQL DB instance" Amazon Relational Database Service. May 2014. Retrieved from https://docs.aws.amazon.com/AmazonRDS/latest/UserGuide/CHAP_GettingStarted.CreatingConnecting.MySQL.html (accessed Jul. 26, 2023).
AWS. "Creating and connecting to an Oracle DB instance" Amazon Relational Database Service. Jun. 6, 2014. Retrieved from https://docs.aws.amazon.com/AmazonRDS/latest/UserGuide/CHAP_GettingStarted.CreatingConnecting.Oracle.html (accessed Aug. 30, 2023).
AWS. "Getting started 3: Create a scheduled backup" AWS Backup. Oct. 21, 2019. Retrieved from https://docs.aws.amazon.com/aws-backup/latest/devguide/create-a-scheduled-backup.html (accessed Dec. 7, 2023).
AWS. "How Amazon VPC works" Amazon VPC. Oct. 26, 2021. Retrieved from https://docs.aws.amazon.com/vpc/latest/userguide/how-it-works.html (accessed Sep. 6, 2023).
AWS. "Introducing Five New Amazon EC2 Bare Metal Instances" Amazon Web Services. Feb. 13, 2019. Feb. 2019. Retrieved from https://aws.amazon.com/about-aws/whats-new/2019/02/introducing-five-new-amazon-ec2-bare-metal-instances/ (accessed Apr. 6, 2023).
AWS. "Kubernetes on AWS" Amazon Web Services. Jun. 2018. Retrieved from https://aws.amazon.com/kubernetes/#:~:text=Kubernetes%20manages%20clusters%20of%20Amazon, premises%20and%20in%20the%20cloud (accessed Apr. 6, 2023).
AWS. "Maintaining a DB instance" Amazon Relational Database Service. Sep. 5, 2015. Retrieved from https://docs.aws.amazon.com/AmazonRDS/latest/UserGuide/USER_UpgradeDBInstance.Maintenance.html#OS_Updates (accessed Aug. 30, 2023).
AWS. "RDS Custom for Oracle workflow" Amazon Relational Database Service. Jun. 28, 2022. Retrieved from https://docs.aws.amazon.com/AmazonRDS/latest/UserGuide/custom-concept.workflow.html (accessed Aug. 30, 2023).
AWS. "Regions and Availability Zones" About AWS. Apr. 2019. Retrieved from https://aws.amazon.com/about-aws/global-infrastructure/regions_az/?p=ngi&loc=2 (accessed Jul. 26, 2023).
AWS. "Regions and Availability Zones" Amazon Relational Database Service. Dec. 22, 2017. Retrieved from https://web.archive.org/web/20171222195304/http:/docs.aws.amazon.com/AmazonRDS/latest/UserGuide/Concepts.RegionsAndAvailabilityZones.html (accessed Sep. 6, 2023).
AWS. "Rules" AWS CloudFormation. Feb. 9, 2021. Retrieved from https://docs.aws.amazon.com/AWSCloudFormation/latest/UserGuide/Welcome.html (accessed Sep. 6, 2023).
AWS. "Storage" Amazon Elastic Compute Cloud. Sep. 14, 2014. Retrieved from https://docs.aws.amazon.com/AWSEC2/latest/WindowsGuide/Storage.html (accessed Apr. 6, 2023).
AWS. "Tagging Amazon RDS resources" Amazon Relational Database Service. Jan. 16, 2013. Retrieved from https://docs.aws.amazon.com/AmazonRDS/latest/UserGuide/USER_Tagging.html (accessed Dec. 7, 2023).
AWS. "Use EBS direct APIs to access the contents of an EBS snapshot" Amazon Elastic Compute Cloud. Apr. 27, 2020. Retrieved from https://docs.aws.amazon.com/AWSEC2/latest/UserGuide/ebs-accessing-snapshot.html (accessed Apr. 6, 2023).
AWS. "User Guide for Linux Instances" Amazon Elastic Compute Cloud. Oct. 19, 2022. Retrieved from https://docs.aws.amazon.com/pdfs/AWSEC2/latest/UserGuide/ec2-ug.pdf#ebs-accessing-snapshot (accessed Apr. 6, 2023).
AWS. "User Guide" Amazon Relational Database Service. 2023. Retrieved from https://docs.aws.amazon.com/pdfs/AmazonRDS/latest/UserGuide/rds-ug.pdf#WhatsNew (accessed Jul. 26, 2023).
AWS. "What Is An Instance In Cloud Computing?" Amazon Web Services. Sep. 17, 2022. Retrieved from https://aws.amazon.com/what-is/cloud-instances/#:~:text=You%20can%20run%20multiple%20virtual,of%20sharing%20and%20scaling%20resources (accessed Apr. 6, 2023).
AWS. "What is AWS CloudFormation?" AWS CloudFormation. Feb. 18, 2020. Retrieved from https://docs.aws.amazon.com/AWSCloudFormation/latest/UserGuide/Welcome.html (accessed Sep. 6, 2023).

(56) References Cited

OTHER PUBLICATIONS

AWS. "Working with Amazon RDS Custom" Amazon Relational Database Service. Nov. 27, 2021. Retrieved from https://docs.aws.amazon.com/AmazonRDS/latest/UserGuide/rds-custom.html (accessed Aug. 30, 2023).
AWS. "Working with backups" Amazon Relational Database Service. Jan. 16, 2013. Retrieved from https://docs.aws.amazon.com/AmazonRDS/latest/UserGuide/USER_WorkingWithAutomatedBackups.html (accessed Dec. 7, 2023).
AWS. "Working with custom engine versions for Amazon RDS Custom for Oracle" Amazon Relational Database Service. Dec. 3, 2021. Retrieved from https://docs.aws.amazon.com/AmazonRDS/latest/UserGuide/custom-cev.html (accessed Aug. 30, 2023).
AWS. "Working with DB instance read replicas" Amazon Relational Database Service. Jan. 18, 2013. Retrieved from https://docs.aws.amazon.com/AmazonRDS/latest/UserGuide/USER_ReadRepl.html (accessed Apr. 25, 2023).
AWS. "Working with read replicas for Microsoft SQL Server in Amazon RDS" Amazon Relational Database Service. Nov. 30, 2020. Retrieved from https://docs.aws.amazon.com/AmazonRDS/latest/UserGuide/SQLServer.ReadReplicas.html (accessed Apr. 25, 2023).
AWS. "Working with SSM Agent" AWS Systems Manager. May 4, 2022. Retrieved from https://docs.aws.amazon.com/systems-manager/latest/userguide/ssm-agent.html (accessed Oct. 9, 2023).
Ay, Neslisah. "How to Set Up a High Available PostgreSQL Cluster Using Patroni" Neslisah Ay Medium Page. Mar. 18, 2019. Retrieved from https://medium.com/@neslisah.demirci/how-to-set-up-a-high-available-postgresql-cluster-using-patroni-d7044a754d2f (Year: 2019).
BackupAssist, "https://backupassist.com/support/en/backupassist/manage/calendar.htm", Jul. 1, 2017 (Year: 2017).
Bailey, Chris, et al. "IBM joins the Crossplane community" IBM Developer Blog. Dec. 15, 2020. Retrieved from https://developer.ibm.com/blogs/ibm-joins-the-crossplane-community/ (accessed Sep. 28, 2023).
Baird, Colin. "MongoDB Atlas Security" Medium. Oct. 28, 2021. Retrieved from https://medium.com/@colinbaird_51123/mongodb-atlas-security-46996fb214e (accessed Sep. 28, 2023).
Balasubramanian, Sudhir, "Virtual Volumes for Database Backup and Recovery" VMware Virtualize Applications (Nov. 5, 2015) from https://blogs.vmware.com/apps/2015/11/virtual-volumes-for-database-backup-and-recovery-2.html (accessed Jun. 2, 2021).
Banthia, Bakul. "Can a tenant change an existing password policy?" Tessell. 2023. Retrieved from https://help.tessell.com/en/articles/7117867-can-a-tenant-change-an-existing-password-policy (accessed Dec. 7, 2023).
Banthia, Bakul. "Can I share snapshots with specific users?" Tessell. 2023. Retrieved from https://help.tessell.com/en/articles/7118615-can-i-share-snapshots-with-specific-users (accessed Apr. 6, 2023).
Banthia, Bakul. "Database Backup Compliance Made Effortless with Tessell" Tessell. Aug. 26, 2023. Retrieved from https://www.tessell.com/blogs/database-backup-compliance-made-effortless-with-tessell (accessed Dec. 7, 2023).
Banthia, Bakul. "Do I need to enable snapshots for my database service or is it done automatically?" Tessell. 2023. Retrieved from https://help.tessell.com/en/articles/7118606-do-i-need-to-enable-snapshots-for-my-database-service-or-is-it-done-automatically (accessed Apr. 6, 2023).
Banthia, Bakul. "Does PostgreSQL support multi-master replication (MMR)?" Tessell. 2023. Retrieved from https://help.tessell.com/en/articles/7240499-does-postgresql-support-multi-master-replication-mmr (accessed Dec. 7, 2023).
Banthia, Bakul. "Does Tessell for Oracle support security features like Database Access Monitoring (DAM)?" Tessell. 2023. Retrieved from https://help.tessell.com/en/articles/6614100-does-tessell-for-oracle-support-security-features-like-database-access-monitoring-dam (accessed Dec. 7, 2023).
Banthia, Bakul. "Does Tessell provide support for Oracle GoldenGate replication?" Tessell. 2023. Retrieved from https://help.tessell.com/en/articles/7892856-does-tessell-provide-support-for-oracle-goldengate-replication (accessed Dec. 7, 2023).
Banthia, Bakul. "Elevating MySQL Management with Tessell: A Comprehensive Overview" Tessell. Aug. 22, 2023. Retrieved from https://www.tessell.com/blogs/elevating-mysql-management-with-tessell-a-comprehensive-overview (accessed Dec. 7, 2023).
Banthia, Bakul. "How can documents be stored in Milvus?" Tessell. 2023. Retrieved from https://help.tessell.com/en/articles/8462644-how-can-documents-be-stored-in-milvus (accessed Dec. 7, 2023).
Banthia, Bakul. "How can I implement an Oracle Maximum Availability Architecture with Tessell?" Tessell. 2023. Retrieved from https://help.tessell.com/en/articles/7892862-how-can-i-implement-an-oracle-maximum-availability-architecture-with-tessell (accessed Dec. 7, 2023).
Banthia, Bakul. "How can I migrate an Oracle database from on-premises to Tessell? Does Tessell provide any tooling or automation for this?" Tessell. 2023. Retrieved from https://help.tessell.com/en/articles/7892843-how-can-i-migrate-an-oracle-database-from-on-premises-to-tessell-does-tessell-provide-any-tooling-or-automation-for-this (accessed Dec. 7, 2023).
Banthia, Bakul. "How can I perform cross-region snapshots and point-in-time-restore (PITR) for my disaster recovery needs?" Tessell. 2023. Retrieved from https://help.tessell.com/en/articles/6614103-how-can-i-perform-cross-region-snapshots-and-point-in-time-restore-pitr-for-my-disaster-recovery-needs (accessed Apr. 6, 2023).
Banthia, Bakul. "How can Milvus be used for Generative AI?" Tessell. 2023. Retrieved from https://help.tessell.com/en/articles/8462645-how-can-milvus-be-used-for-generative-ai (accessed Dec. 7, 2023).
Banthia, Bakul. "How do I migrate my on-premise Oracle database to Tessell?" Tessell. 2023. Retrieved from https://help.tessell.com/en/articles/6614444-how-do-i-migrate-my-on-premise-oracle-database-to-tessell (accessed Dec. 7, 2023).
Banthia, Bakul. "How do I provision a database service?" Tessell. 2023. Retrieved from https://help.tessell.com/en/articles/7118590-how-do-i-provision-a-database-service (accessed Apr. 6, 2023).
Banthia, Bakul. "How does billing work in Tessell?" Tessell. 2023. Retrieved from https://help.tessell.com/en/articles/6624926-how-does-billing-work-in-tessell (accessed Apr. 6, 2023).
Banthia, Bakul. "How does Milvus work with PostgreSQL?" Tessell. 2023. Retrieved from https://help.tessell.com/en/articles/8462637-how-does-milvus-work-with-postgresql (accessed Dec. 7, 2023).
Banthia, Bakul. "How does Milvus work?" Tessell. 2023. Retrieved from https://help.tessell.com/en/articles/8462632-how-does-milvus-work (accessed Dec. 7, 2023).
Banthia, Bakul. "How does Tessell guarantee Zero Data Loss for Oracle?" Tessell. 2023. Retrieved from https://help.tessell.com/en/articles/7118627-how-does-tessell-guarantee-zero-data-loss-for-oracle (accessed Apr. 6, 2023).
Banthia, Bakul. "How does Tessell guarantee Zero Data Loss for Oracle?" Tessell. 2023. Retrieved from https://help.tessell.com/en/articles/7945508-how-does-tessell-guarantee-zero-data-loss-for-oracle (accessed Dec. 7, 2023).
Banthia, Bakul. "How does Tessell host Oracle databases on Azure?" Tessell. 2023. Retrieved from https://help.tessell.com/en/articles/7118621-how-does-tessell-host-oracle-databases-on-azure (accessed Apr. 6, 2023).
Banthia, Bakul. "How does the license option impact DB service scaling?" Tessell. 2023. Retrieved from https://help.tessell.com/en/articles/6613933-how-does-the-license-option-impact-db-service-scaling (accessed Dec. 7, 2023).
Banthia, Bakul. "How is Tessell able to offer comparatively very high IOPS?" Tessell. 2023. Retrieved from https://help.tessell.com/en/articles/6624922-how-is-tessell-able-to-offer-comparatively-very-high-iops (accessed Dec. 7, 2023).
Banthia, Bakul. "How is Tessell integrated with other Azure Data Services such as DB Link, Data Factory, Synapse Analytics, etc.?" Tessell. 2023. Retrieved from https://help.tessell.com/en/articles/7892845-how-is-tessell-integrated-with-other-azure-data-services-such-as-db-link-data-factory-synapse-analytics-etc (accessed Dec. 7, 2023).
Banthia, Bakul. "How to use Tessell&#x2019s API and use it to support your production use cases?" Tessell. 2023. Retrieved from

(56) References Cited

OTHER PUBLICATIONS https://help.tessell.com/en/articles/7118589-how-to-use-tessell-s-api-and-use-it-to-support-your-production-use-cases (accessed Jul. 26, 2023).
Banthia, Bakul. "If I have a ULA/PULA with Oracle, then how can I use that with Tessell?" Tessell. 2023. Retrieved from https://help.tessell.com/en/articles/7892830-if-i-have-a-ula-pula-with-oracle-then-how-can-i-use-that-with-tessell (accessed Dec. 7, 2023).
Banthia, Bakul. "Is Oracle RAC supported on Tessell?" Tessell. 2023. Retrieved from https://help.tessell.com/en/articles/6614092-is-oracle-rac-supported-on-tessell (accessed Dec. 7, 2023).
Banthia, Bakul. "Manage Data on Your Multi-tenant SaaS Environment with Tessell" Tessell. Feb. 25, 2023. Retrieved from https://tessell.com/blogs/manage-multi-tenant-saas-metadata (accessed May 9, 2023).
Banthia, Bakul. "Mastering Data Management with Tessell: A Comprehensive Guide" Tessell. Aug. 20, 2023. Retrieved from https://www.tessell.com/blogs/mastering-data-management-with-tessell-a-comprehensive-guide (accessed Dec. 7, 2023).
Banthia, Bakul. "Navigating the Unpredictable: Disaster Recovery in Tessell" Tessell. Aug. 25, 2023. Retrieved from https://www.tessell.com/blogs/navigating-the-unpredictable-disaster-recovery-in-tessell (accessed Dec. 7, 2023).
Banthia, Bakul. "Resilience Redefined: Multi-AZ HA Database Service in Tessell" Tessell. Aug. 23, 2023. Retrieved from https://www.tessell.com/blogs/resilience-redefined-multi-az-ha-database-service-in-tessell (accessed Dec. 7, 2023).
Banthia, Bakul. "Seamless Operations in Any Storm: Ensuring Business Continuity with Tessell" Tessell. Aug. 27, 2023. Retrieved from https://www.tessell.com/blogs/seamless-operations-in-any-storm-ensuring-business-continuity-with-tessell (accessed Dec. 7, 2023).
Banthia, Bakul. "Securing Data with Precision: Data Masking and Sanitization in Tessell" Tessell. Aug. 19, 2023. Retrieved from https://www.tessell.com/blogs/securing-data-with-precision-data-masking-and-sanitization-in-tessell (accessed Dec. 7, 2023).
Banthia, Bakul. "Snapshots" Tessell. 2023. Retrieved from https://help.tessell.com/en/collections/3899147-snapshots (accessed Apr. 6, 2023).
Banthia, Bakul. "Unlocking Advanced Possibilities with Tessell for PostgreSQL" Tessell. Aug. 21, 2023. Retrieved from https://www.tessell.com/blogs/unlocking-advanced-possibilities-with-tessell-for-postgresql (accessed Dec. 7, 2023).
Banthia, Bakul. "What are all the Apps in Tessell?" Tessell. 2023. Retrieved from https://help.tessell.com/en/articles/7118551-what-are-all-the-apps-in-tessell (accessed Apr. 6, 2023).
Banthia, Bakul. "What are Oracle DB engine versions supported on Tessell and how do they relate to Oracle Patch Sets?" Tessell. Mar. 2023. Retrieved from https://help.tessell.com/en/articles/6614073-what-are-oracle-db-engine-versions-supported-on-tessell-and-how-do-they-relate-to-oracle-patch-sets (accessed Jul. 26, 2023).
Banthia, Bakul. "What are the backup strategies supported in PostgreSQL?" Tessell. 2023. Retrieved from https://help.tessell.com/en/articles/7240493-what-are-the-backup-strategies-supported-in-postgresql (accessed Dec. 7, 2023).
Banthia, Bakul. "What are the high-availability solutions that PostgreSQL offers?" Tessell. Jun. 2023. Retrieved from https://help.tessell.com/en/articles/7240543-what-are-the-high-availability-solutions-that-postgresql-offers (accessed Jul. 26, 2023).
Banthia, Bakul. "What are the typical RPO and RTO numbers for an Oracle database managed by Tessell?" Tessell. 2023. Retrieved from https://help.tessell.com/en/articles/7943537-what-are-the-typical-rpo-and-rto-numbers-for-an-oracle-database-managed-by-tessell (accessed Dec. 7, 2023).
Banthia, Bakul. "What happens to my snapshots if I delete my database service?" Tessell. 2023. Retrieved from https://help.tessell.com/en/articles/7118608-what-happens-to-my-snapshots-if-i-delete-my-database-service (accessed Dec. 7, 2023).
Banthia, Bakul. "What High Availability and Disaster Recovery options does Tessell Support?" Tessell. 2023. Retrieved from https://help.tessell.com/en/articles/7892817-what-high-availability-and-disaster-recovery-options-does-tessell-support (accessed Dec. 7, 2023).
Banthia, Bakul. "What High Availability and Disaster Recovery options does Tessell Support?" Tessell. Jul. 2023. Retrieved from https://help.tessell.com/en/articles/7945359-what-high-availability-and-disaster-recovery-options-does-tessell-support (accessed Jul. 26, 2023).
Banthia, Bakul. "What is a vector database?" Tessell. 2023. Retrieved from https://help.tessell.com/en/articles/8462619-what-is-a-vector-database (accessed Dec. 7, 2023).
Banthia, Bakul. "What is an Availability Machine?" Tessell. 2023. Retrieved from https://help.tessell.com/en/articles/7118549-what-is-an-availability-machine (accessed Apr. 6, 2023).
Banthia, Bakul. "What is Dataflix?" Tessell. Mar. 2023. Retrieved from https://help.tessell.com/en/articles/7118550-what-is-dataflix (accessed Jul. 26, 2023).
Banthia, Bakul. "What is Milvus?" Tessell. 2023. Retrieved from https://help.tessell.com/en/articles/8462624-what-is-milvus (accessed Dec. 7, 2023).
Banthia, Bakul. "What is Tenant's Password Policy?" Tessell. 2023. Retrieved from https://help.tessell.com/en/articles/7117806-what-is-tenant-s-password-policy (accessed Dec. 7, 2023).
Banthia, Bakul. "What is Tessell and how does it work?" Tessell. 2023. Retrieved from https://help.tessell.com/en/articles/7118534-what-is-tessell-and-how-does-it-work (accessed Apr. 6, 2023).
Banthia, Bakul. "What is Tessell Password Policy?" Tessell. 2023. Retrieved from https://help.tessell.com/en/articles/7117787-what-is-tessell-password-policy (accessed Dec. 7, 2023).
Banthia, Bakul. "What is Tessell's security posture?" Tessell. 2023. Retrieved from https://help.tessell.com/en/articles/6624923-what-is-tessell-s-security-posture (accessed Apr. 25, 2023).
Banthia, Bakul. "What is Tessell's unified data management?" Tessell. Mar. 2023. Retrieved from https://help.tessell.com/en/articles/6624933-what-is-tessell-s-unified-data-management (accessed Apr. 6, 2023).
Banthia, Bakul. "What is the patch set composition of DB engine version for Oracle?" Tessell. 2023. Retrieved from https://help.tessell.com/en/articles/6614079-what-is-the-patch-set-composition-of-db-engine-version-for- oracle (accessed Apr. 6, 2023).
Banthia, Bakul. "What types of licensing options are available with Tessell for Oracle?" Tessell. 2023. Retrieved from https://help.tessell.com/en/articles/6537778-what-types-of-licensing-options-are-available-with-tessell-for-oracle (accessed Dec. 7, 2023).
Banthia, Bakul. "What types of licensing options are available with Tessell for SQL Server" Tessell. 2023. Retrieved from https://help.tessell.com/en/articles/6720684-what-types-of-licensing-options-are-available-with-tessell-for-sql-server (accessed Dec. 7, 2023).
Banthia, Bakul. "Where are my automated snapshots stored and how do I manage their retention?" Tessell. 2023. Retrieved from https://help.tessell.com/en/articles/7118607-where-are-my-automated-snapshots-stored-and-how-do-i-manage-their-retention (accessed Apr. 6, 2023).
Banthia, Bakul. "Where are the databases hosted in Tessell?" Tessell. 2023. Retrieved from https://help.tessell.com/en/articles/6624929-where-are-the-databases-hosted-in-tessell (accessed Apr. 6, 2023).
Banthia, Bakul. "Which character sets are supported for Oracle Database on Tessell?" Tessell. 2023. Retrieved from https://help.tessell.com/en/articles/661 4093-which-character-sets-are-supported-for-oracle-database-on-tessell (accessed Dec. 7, 2023).
Banthia, Bakul. "Which parameters make up Tessell's password policy?" Tessell. 2023. Retrieved from https://help.tessell.com/en/articles/7117893-which-parameters-make-up-tessell-s-password-policy (accessed Dec. 7, 2023).
Banthia, Bakul. "Which partitioning features are available in PostgreSQL?" Tessell. 2023. Retrieved from https://help.tessell.com/en/articles/7240498-which-partitioning-features-are-available-in-postgresql (accessed Dec. 7, 2023).
Banthia, Bakul. "Why choose Tessell for your startup?" Tessell. Mar. 24, 2023. Retrieved https://tessell.com/blogs/why-tessell-for-startups (accessed May 9, 2023).
Barr, Jeff. "Amazon EC2 Bare Metal Instances with Direct Access to Hardware" AWS News Blog. Nov. 28, 2017. Retrieved from

(56) References Cited

OTHER PUBLICATIONS https://aws.amazon.com/blogs/aws/new-amazon-ec2-bare-metal-instances-with-direct-access-to-hardware/ (accessed Apr. 6, 2023).
Barr, Jeff. "New—Cross-Account Copying of Encrypted EBS Snapshots" AWS News Blog. Jun. 21, 2016. Retrieved from https://aws.amazon.com/blogs/aws/new-cross-account-copying-of-encrypted-ebs-snapshots/ (accessed Apr. 6, 2023).
Berger, Martin. "AWS Custom Engine Versions for Amazon RDS Custom for Oracle—Sightseeing Tour Part 1/3—Setup" Martinberger.com. May 15, 2022. Retrieved from https://www.martinberger.com/2022/05/aws-custom-engine-versions-for-amazon-rds-custom-for-oracle-sightseeing-tour-part-1-3-setup/ (accessed Aug. 30, 2023).
Bettis, Nick, et al. "Lightning eMotors' telematics solution, Lightning Insights, optimizes fleet planning and deployment with massive database managed by Tessell" Lightning eMotors. Oct. 17, 2023. Retrieved from https://lightningemotors.com/lightning-emotors-telematics-solution-lightning-insights-optimizes-fleet-planning-and-deployment-with-massive-database-managed-by-tessell/ (accessed Dec. 7, 2023).
Bhrara, Raminder. "Oracle Cloud Infrastructure OCI Gen-2 Cloud Security—Part II (Identity and Access Management)" RedThunder. Blog. Dec. 31, 2018. Retrieved from https://redthunder.blog/2018/12/31/oracle-cloud-infrastructure-oci-gen-2-cloud-security-part-ii-identity-and-access-management/ (accessed Sep. 14, 2023).
Bolton, Dean et al. "Database-as-a-Service (DBaaS) Reference Architecture with VMware and Tintri" VMware Tintri VLSS (2015) from https://blogs.vmware.com/apps/files/2015/10/vRA_DBAAS_VLSS_Tintri.pdf (Jun. 2, 2021).
Brooks, Aaron, "19 Best A/B Testing Tools in 2021" (published Aug. 12, 2020) Venture Harbour, from https://www.ventureharbour.com/best-a-b-testing-tools/ (accessed Sep. 14, 2021).
Brull, Jim, "Oracle Cloud Database vs On-Premises—Understanding the Differences" Centroid—OCI, Oracle Cloud. 2020. Received from https://www.centroid.com/blog/oracle-cloud-database-vs-on-premises/ (Year: 2020).
Brummitt, Karis et al., "Database provisioning just got a lot easier—and a lot smarter" RealWire (Feb. 27, 2017) from https://www.realwire.com/releases/Database-provisioning-just-got-a-lot-easier-and-a-lot-smarter (accessed Jun. 28, 2021).
Bucur, et al., "Multi-Cloud Resource Management Techniques for Cyber-Physical Systems", MDPI, Dec. 15, 2021, https://www.ncbi.nlm.nih.gov/pmc/articles/PMC8706026/.
BugSnag. "Install using CloudFormation" SmartBear BugSnag Docs. Jul. 28, 2021. Retrieved from https://web.archive.org/web/20210728140402/https://docs.bugsnag.com/on-premise/clustered/cloudformation-installation/ (accessed Sep. 14, 2023).
Cano, Ignacio, et al. "Curator: Self-Managing Storage for Enterprise Clusters" (Mar. 27, 2017), from https://www.usenix.org/conference/nsdi17/.
CIOReview. "Tessel Recognized as a Finalist of 2023 Microsoft OSS on Azure Partner of the Year" CIOReview. Jul. 4, 2023. Retrieved from https://www.cioreview.com/news/tessell-recognized-as-a-finalist-of-2023-microsoft-oss-on-azure-partner-of-the-year-nid-37693-cid-244.html (accessed Dec. 7, 2023).
Cisco Public "Hyperconvergence for Databases" (2019) from https://www.cisco.com/c/dam/en/us/products/collateral/hyperconverged-infrastructure/hyperflex-hx-series/le-60303-hxsql-aag.pdf (accessed Dec. 18, 2019).
Cisco Public, "Cisco HyperFlex All-Flash Systems for Oracle Database Deployments" (Jun. 2017) from https://www.cisco.com/c/en/us/products/collateral/hyperconverged-infrastructure/hyperflex-hx-series/whitepaper_c11-739237.pdf (accessed Dec. 18, 2019).
Cisco Public, "Cisco HyperFlex All-NVMe Systems for Oracle Database: Reference Architecture" (2019) from https://www.cisco.com/c/en/us/products/collateral/hyperconverged-infrastructure/hyperflex-hx-series/hx-oracle-wp.html (accessed Dec. 18, 2019).
Cisco Public, "Cisco HyperFlex HX Data Platform" (2018) from https://www.cisco.com/c/dam/en/us/products/collateral/hyperconverged-infrastructure/hyperflex-hx-series/white-paper-c11-736814.pdf (accessed Dec. 18, 2019).
CloudThat. "Virtualization in Amazon Web Services" CloudThat. Oct. 16, 2014. Retrieved from https://www.cloudthat.com/resources/blog/virtualization-in-amazon-web-services (accessed Aug. 30, 2023).
Commvault. "Adding a Database Group for Alibaba Cloud ApsaraDB RDS for MySQL" Essential. Sep. 22, 2020. Retrieved from https://documentation.commvault.com/v11/essential/122970_adding_database_group_for_alibaba_cloud_apsaradb_rds_for_mysql.html (accessed Aug. 30, 2023).
Commvault. "Creating a Server Backup Plan" Essential. Nov. 6, 2020. Retrieved from https://documentation.commvault.com/v11/essential/130962_creating_server_backup_plan.html (accessed Aug. 30, 2023).
Commvault. "Creating a Server Plan" Essential. Oct. 27, 2021. Retrieved from https://documentation.commvault.com/2023e/essential/86648_creating_server_plan.html (accessed Aug. 30, 2023).
Commvault. "Restoring a Database Group for Alibaba Cloud ApsaraDB RDS for MySQL" Essential. Feb. 18, 2021. Retrieved from https://documentation.commvault.com/2023e/essential/122176_restoring_database_group_for_alibaba_cloud_apsaradb_rds_for_mysql.html (accessed Aug. 30, 2023).
Cormac, "Virtual Volumes (VVols) and Replication/DR" cormachogan.com (Apr. 13, 2015) from https://cormachogan.com/2015/04/13/virtual-volumes-vvols-and-replicationdr/ (accessed Jun. 2, 2021).
Cunnhingham, "Introducing PlanetScale Managed Cloud", Nov. 3, 2021, https://planetscale.com/blog/introducing-planetscale-managed-cloud.
Dbinsight. "Turn your Database into a Service " A dbInsight white paper for Nutanix. Feb. 2020. Retrieved from https://nutanix.com/content/dam/nutanix/resources/white-papers/wp-turn-your-database-into-a-service.pdf (accessed Jul. 26, 2023).
Delphix "Backup and Recovery Strategies for the Delphix Engine" (published 2017) Delphix Corp., from https://docs.delphix.com/docs/data-backup-and-recovery-solutions/backup-and-recovery-strategies-for-the-delphix-engine (accessed Dec. 19, 2019).
Delphix "Database Provisioning Overview" (published 2017) Delphix Corp., from https://docs.delphix.com/docs/introduction/database-virtualization-with-delphix/database-provisioning-overview (accessed Dec. 19, 2019).
Delphix "Quick Start Guides" (published 2017) Delphix Corp., from https://docs.delphix.com/docs52/quick-start-guides (accessed Dec. 19, 2019).
Delphix "Replication" (Published 2017) Delphix Corp., from https://docs.delphix.com/docs52/data-backup-and-recovery-solutions/replication (accessed Dec. 19, 2019).
Delphix Corp., "Delphix Engine User Guide," Delphix, published Dec. 2017, retrieved Jan. 2, 2023 from https://docs.delphix.com/docs52/files/83053093/83053098/2/1512670775673/Delphix Engine User Guide.pdf.
Delphix Corp., "Delphix Engine User Guide," Delphix, published Nov. 2018, retrieved Jan. 2, 2023 from https://docs.delphix.com/docs531/files/98113199/98116076/2/1542301179433/User Guide.pdf.
Delphix Corp., "Delphix Engine User Guide," Delphix, published Oct. 2017, retrieved Jan. 2, 2023 from https://docs.delphix.com/docs-old/files/74711255/74715951/5/1509647013871/Delphix Engine User Guide.pdf.
Delphix Corp., "FAQ: SnapShot and SnapSync (KBA1014)," Delphix, published Mar. 4, 2022, retrieved Jan. 2, 2023 from https://support.delphix.com/Continuous_Data_Engine_(formerly_Virtualization_Engine)/Delphix_Admin/FAQ%3A_SnapShot_and_SnapSync_(KBA1014).
Delphix Corp., "Linking to a Database," Database Linking Overview, published Dec. 2017, retrieved on Jan. 2, 2023 from https://docs.delphix.com/docs52/introduction/database-virtualization-with-delphix/database-linking-overview.
Delphix Corp., "Understanding Timelines," Understanding Timelines and How to Preserve Data in a Point in Time, published Jun. 2018, retrieved Jan. 2, 2023 from https://docs.delphix.com/docs526/delphix-self-service/delphix-self-service-data-user-guide/understanding-timelines-and-how-to-preserve-data-in-a-point-in-time.
Delphix Corp., "What Does the Delphix Engine Do?," Delphix Engine Overview, published Dec. 2017, retrieved on Jan. 2, 2023

(56) References Cited

OTHER PUBLICATIONS from https://docs.delphix.com/docs52/introduction/database-virtualization-with-delphix/delphix-engine-overview.
Delphix Corp., "What's New Guide for 5.2," Delphix, published Dec. 2017, retrieved on Jan. 2, 2023 from https://docs.delphix.com/docs52/files/83053093/83056028/2/1513184739765/What%27s New Guide for 5.2.pdf.
Delphix, "Provisioning and Managing Virtual Databases" Delphix Engine 6.0.8.0 Documentation (2020) from https://docs.delphix.com/docs/datasets/getting-started/provisioning-and-managing-virtual-databases (accessed Jun. 28, 2021).
Delphix, "Understanding SnapSync and LogSync for Oracle" (May 5, 2013) from https://www.delphix.com/blog/data-virtualization/understanding-snapsync-and-logsync-oracle (accessed Jan. 7, 2020).
Donchovski, Igor. "Maintenance for MongoDB Replica Sets" SlideShare. Oct. 2, 2019. Retrieved from https://www.slideshare.net/IgorLE/maintenance-for-mongodb-replica-sets (accessed Aug. 30, 2023).
Drake, Sam et al. "Architecture of Highly Available Databases" International Service Availability Symposium, pp. 1-16. Springer, Berlin, Heidelberg, 2004. (Year: 2004).
Dremio, "Multiple AWS Clusters" Dremio. 2020. Received from https://docs.dremio.com/deployment/provisioning-ec2.html (Year: 2020).
Duvuri, Aditya. "Policies in Oracle Cloud Infrastructure (OCI) Data Integration" Oracle Cloud Infrastructure Blog. Aug. 17, 2020. Retrieved from https://blogs.oracle.com/dataintegration/post/policies-in-oracle-cloud-infrastructure-oci-data-integration (accessed Sep. 14, 2023).
Erwin, Danyelle. "What's New in SAP HANA Cockpit 2.0 SP 12" SAP Community. Jun. 22, 2020. Retrieved from https://blogs.sap.com/2020/06/22/whats-new-in-sap-hana-cockpit-2.0-sp-12/ (accessed Aug. 30, 2023).
Ex Parte Quayle Action with Refs. on U.S. Appl. No. 29/733,571 Dtd Feb. 11, 2022.
Extended European Search Report re EP21192308.1 Dtd Jan. 24, 2022.
Extended European Search Report re EP21192379.2 Dtd Jan. 26, 2022.
Featonby, Malcolm. "Amazon ECS availability best practices" Containers. Nov. 8, 2019. Retrieved from https://aws.amazon.com/blogs/containers/amazon-ecs-availability-best-practices/ (accessed Apr. 6, 2023).
Fenton, Tom, "How To Create VMware Virtual Volumes" Virtualization & Cloud Review (Feb. 26, 2015) from https://virtualizationreview.com/articles/2015/02/26/how-to-create-vmware-virtual-volumes.aspx (accessed Jun. 2, 2021).
Flecha, Pete, "Whats New in Virtual Volumes (vVols) 2.0" VMware vSAN Virtual Blocks Blog (Oct. 18, 2016) from https://blogs.vmware.com/virtualblocks/2016/10/18/whats-new-in-virtual-volumes-2-O/ (accessed Jun. 2, 2021).
Flexera. "How can I copy an EBS snapshot between different EC2 regions?" Flexera CMP Docs. Dec. 19, 2015. Retrieved from https://docs.rightscale.com/faq/clouds/aws/How_can_I_copy_an_EBS_snapshot_between_different_EC2_regions.html (accessed Apr. 6, 2023).
Fontaine, Dimitri. "hapostgres/pg_auto_failover" GitHub. Oct. 2022. Retrieved from https://github.com/hapostgres/pg_auto_failover (accessed Jul. 26, 2023).
Foreign Action other than Search Report on EP 21192308.1 Dtd Apr. 6, 2022.
Foreign Action other than Search Report on EP 21192308.1 Dtd Jun. 10, 2022.
Foreign Action other than Search Report on EP 21192379.2 Dtd Jun. 15, 2022.
Foreign Search Report on EP Dtd May 9, 2023.
Foreign Search Report on PCT Dtd Sep. 7, 2023.
FreeCodeCamp. "MongoDB Atlas Tutorial—How to Get Started" FreeCodeCamp. Feb. 4, 2021. Retrieved from https://www.freecodecamp.org/news/get-started-with-mongodb-atlas/ (accessed Sep. 28, 2023).
Friedman, Vitaly, "Designing the Perfect Date and Time Picker." Smashing Magazine, published Jul. 2017 (Retrieved from the Internet Apr. 7, 2020). Internet URL: <https://www .smashingmagazine.com/2017 /07/designing-perfect-date-time-picker/> (Year: 2017).
Fritchey, Grant, "SQL Server Database Provisioning" Redgate, (Nov. 4, 2016) from https://www.red-gate.com/simple-talk/devops/database-devops/sql-server-database-provisioning/ (accessed Jun. 28, 2021).
Geek University, "VM snapshot files," VMware ESXi course, retrieved Sep. 11, 2022 from https://geek-university.com/vm-snapshot-files/.
Geier, Eric, "Using Static IP Addresses on Your Network" Cisco Press. Sep. 14, 2009. Received from https://www.ciscopress.com/articles/article.asp?p=1393495. (Year: 2009).
Github. "Multi-tenancy & Row-level Security" Tableau Embedding Playbook. Jul. 7, 2020. Retrieved from https:/tableau.github.io/embedding-playbook/pages/04_multitenancy_and_rls (accessed Sep. 28, 2023).
Google Cloud, "Architectures for high availability of PostgreSQL clusters on Compute Engine" Google Cloud Architecture Center, (Jan. 21, 2021) from https://cloud.google.com/architecture/architectures-high-availability-postgresql-clusters-compute-engine (accessed Dec. 14, 2021).
Google Cloud. "Configurations Overview" Cloud Deployment Manager. Oct. 16, 2021. Retrieved from https://web.archive.org/web/20211016075925/https:/cloud.google.com/deployment-manager/docs/configuration/ (accessed Sep. 6, 2023).
Google Cloud. "Creating Instances" Database Products. Sep. 18, 2018. Retrieved from https://web.archive.org/web/20180918103721/https:/cloud.google.com/sql/docs/mysql/create-instance (accessed Sep. 6, 2023).
Google Cloud. "Deployment Manager Fundamentals" Cloud Deployment Manager. Feb. 27, 2021. Retrieved from https://web.archive.org/web/20210227173536/https:/cloud.google.com/deployment-manager/docs/fundamentals (accessed Sep. 6, 2023).
Google Cloud. "Google Cloud Deployment Manager Documentation" Cloud Deployment Manager. Dec. 14, 2021. Retrieved from https://web.archive.org/web/20211214023957/https://cloud.google.com/deployment-manager/docs (accessed Sep. 14, 2023).
Google Cloud. "REST Resource: networks" Compute Engine. Nov. 5, 2021. Retrieved from https://cloud.google.com/compute/docs/reference/rest/beta/networks (accessed Sep. 6, 2023).
Google Cloud. "REST Resource: subnetworks" Compute Engine. Jul. 1, 2019. Retrieved from https://cloud.google.com/compute/docs/reference/rest/beta/subnetworks (accessed Sep. 6, 2023).
Google Cloud. "Supported resource types" Cloud Deployment Manager. Sep. 16, 2021. Retrieved from https://web.archive.org/web/20210916123002/https:/cloud.google.com/deployment-manager/docs/configuration/supported-resource-types (accessed Sep. 6, 2023).
Google Cloud. "VPC networks" Virtual Private Cloud. Oct. 29, 2021. Retrieved from https://cloud.google.com/vpc/docs/vpc (accessed Sep. 6, 2023).
Google, Creating Instances, Cloud SQL for MySQL, pp. 1-5.
Google. "Create a MySQL database hosted in Google Cloud" AppSheet Help. 2020. Retrieved from https://support.google.com/appsheet/answer/10107301?hl=en&ref_topic=10102124&sjid=7557016717740597161-AP (accessed Jul. 26, 2023).
Grace, Cato, "What's New in SRM and vSphere Replication 8.3" VMware vSAN Virtual Blocks Blog (Mar. 10, 2020) from https://blogs.vmware.com/virtualblocks/2020/03/10/whats-new-srm-vr-83/ (accessed Jun. 2, 2021).
Guevara, Introducing PlanetScale Insights: Advanced query monitoring, May 26, 2022, https://planetscale.com/blog/introducing-planetscale-insights-advanced-query-monitoring.
Gui, Huan et al. "Network A/B Testing: From Sampling to Estimation" Proceedings of the 24th International Conference on World Wide Web (WWW 15), pp. 399-409, May 18, 2015. DOI: 10.1145/2736277.2741081 (Year: 2015).
Hammerspace, "Simplify Database Deployment Across Kubernetes Clusters" Hammerspace Solution Brief. 2020. Received from https://hammerspace.com/wp-content/uploads/2019/03/HS0107-USEN-Multi-Cluster-Database-Deployments.pdf (Year: 2020).

(56) References Cited

OTHER PUBLICATIONS

Hashicorp Terraform. "tessell_dap (Data Source)" Tessell. 2023. Retrieved from https://registry.terraform.io/providers/TessellDevelopment/tessell/latest/docs/data-sources/dap#nestedatt--target_cloud_locations (accessed Apr. 6, 2023).
Hashicorp Terraform. "tessell_database_backup (Resource)" tessell. 2023. Retrieved from https://registry.terraform.io/providers/TessellDevelopment/tessell/latest/docs/resources/database_backup (accessed Apr. 6, 2023).
Hashicorp Terraform. "tessell_db_service (Resource)" tessell. Jun. 2023. Retrieved from https://registry.terraform.io/providers/tessell-cloud/tessell/latest/docs/resources/db_service#snapshot_configuration (accessed Apr. 6, 2023).
Havewala, Porus Homi. "A New Kind of DBaaS—Fully Managed Multi-Database Engine" IT Brief. May 29, 2023. Retrieved from https://itbrief.com.au/story/a-new-kind-of-dbaas-fully-managed-multi-database-engine (accessed Dec. 7, 2023).
Havewala, Porus. "Back Up a Thousand Databases Using Enterprise Manager Cloud Control 12c" Technical Article. Jan. 2014. Retrieved from https://www.oracle.com/technical-resources/articles/enterprise-manager/havewala-rman-em12c.html (accessed Aug. 30, 2023).
Hinker, Stefan. "A Patch Train Solution for OCI OS Management" A-Team Chronicles. Jul. 17, 2020. Retrieved from https://www.ateam-oracle.com/post/a-patch-train-solution-for-oci-os-management (accessed Aug. 30, 2023).
Hosterman, Cody, "Introducing vSphere Virtual Volumes on the FlashArray" Pure Storage (Jun. 13, 2017) from https://blog.purestorage.com/purely-technical/introducing-vsphere-virtual-volumes-on-the-flasharray/ (accessed Jun. 2, 2021).
Hosterman, Cody, "Introducing vSphere Virtual Volumes on the FlashArray" Pure Storage, (Jun. 13, 2017) from https://blog.purestorage.com/purely-technical/introducing-vsphere-virtual-volumes-on-the-flasharray/ (accessed Jun. 28, 2021).
Hosterman, Cody, "Virtual Volumes and Array Snapshots Part I: Managed Snapshots" codyhosterman.com (Jul. 30, 2018) from https://www.codyhosterman.com/2018/07/virtual-volumes-and-array-snapshots-part-i-managed-snapshots/ (accessed Jun. 2, 2021).
Hosterman, Cody, "What's New in vSphere 7.0 Storage Part I: vVols are all over the place!" codyhosterman.com (Mar. 10, 2021) from https://www.codyhosterman.com/2020/03/whats-new-in-vsphere-7-0-storage-part-i-vvols-are-all-over-the-place/ (accessed Jun. 2, 2021).
Hu et al. "Architecture of Highly Available Databases" Lecture Notes in Computer Science (LCNS). vol. 3335, pp. 1-16. May 2004. DOI: 10.1007/978-3-540-30225-4_1. (Year: 2004).
Husemoller, John. "Automate AWS Backups with AWS Service Catalog" AWS Cloud Operations & Migrations Blog. Jan. 31, 2021. Retrieved from https://aws.amazon.com/blogs/mt/automate-aws-backups-with-aws-service-catalog/ (accessed Dec. 7, 2023).
Hussain, Sadequl. "Running SQL Server Databases in the Amazon Cloud—RDS Backup and Restore (Part 3)" MSSQL Tips. Jul. 2014. Retrieved from https://www.mssqltips.com/sqlservertip/3290/running-sql-server-databases-in-the-amazon-cloud-rds-backup-and-restore-part-3/ (accessed Dec. 7, 2023).
IBM, "Creating a database deployment on the cluster" IBM Cloud Paks 2.1.0 (2021) from https://www.ibm.com/docs/en/cloud-paks/cp-data/2.1.0?topic=database-creating-deployment (accessed Jun. 28, 2021).
Invitation to File Search Results on EP 21192308.1 Dtd Apr. 6, 2022.
Jain, Viral. "How To Create SQL Database In AWS" C-Sharp Corner. May 4, 2018. Retrieved from https://www.c-sharpcorner.com/article/how-to-create-sql-database-in-aws/ (accessed Jul. 26, 2023).
Kaplan, Steve. "Slashing the high cost of running databases in the cloud" Medium. May 15, 2023. Retrieved from https://roidude.medium.com/slashing-the-high-cost-of-running-databases-in-the-cloud-acf27128b14f (accessed Dec. 7, 2023).
Kaplan, Steve. "The Tessellator Crunches Cloud Costs" Tessellator Book 1. Dec. 2022. Retrieved from https://tessell.com/documents/Tessellator%20Book%201.pdf (accessed Apr. 6, 2023).
Kaplan, Steven. "Bringing the Art and Science of Tessellation to Data" Tessell. Feb. 20, 2023. Retrieved from https://tessell.com/blogs/tessellation-of-data (accessed May 9, 2023).
Kaplan, Steven. "The Tessell Alternative to Oracle Database Services for Microsoft Azure" Tessell. Feb. 15, 2023. Retrieved from https://tessell.com/blogs/the-tessell-alternative-to-oracle-dbaas-on-azure (accessed May 9, 2023).
Kaplan, Steven. "The Why and How of Cloud Databases . . . and how Tessell changes the game" Tessell. Jan. 24, 2023. Retrieved from https://tessell.com/blogs/the-why-and-how-of-cloud-databases (accessed May 9, 2023).
Katz, Jonathan S. "Multi-Kubernetes Cluster PostgreSQL Deployments" Crunchy Data. May, 7, 2020. Received from https://info.crunchydata.com/blog/multi-kubernetes-cluster-postgresql-deployments (Year: 2020).
Kelly, Jeff. "Reduce Database Patching Pain with Nutanix Database Service 2.5" Nutanix. Oct. 19, 2022. Retrieved from https://www.nutanix.com/blog/reduce-database-patching-pain-with-nutanix-database-service (accessed Jul. 26, 2023).
Kesavan, Sreejith, et al. "Choose the Right Database Deployment Option" Tessell. Aug. 24, 2023. Retrieved from https://www.tessell.com/blogs/choose-the-right-database-deployment-option (accessed Dec. 7, 2023).
Khanuja, Kamaldeep. "Benchmark Tessell RDS PostgreSQL performance using PGIO (SLOB)" Tessell. Mar. 1, 2023. Retrieved from https://tessell.com/blogs/postgresql-benchmark (accessed May 9, 2023).
Khanuja, Kamaldeep. "Tessell supports AWS PrivateLink" Tessell. Jan. 11, 2023. Retrieved from https://tessell.com/blogs/aws-tessell-privatelink (accessed Apr. 25, 2023).
Khanuja, Kamaldeep. "Tessell supports AWS PrivateLink" Tessell. Jan. 11, 2023. Retrieved from https://tessell.com/blogs/aws-tessell-privatelink (accessed May 9, 2023).
Kohavi, Ron et al., "Online Controlled Experiments and A/B Testing" Encyclopedia of Machine Learning and Data Mining, vol. 7, No. 8, pp. 922-929. Jan. 2017. DOI: 10.1007/978-1-4899-7502-7 891-1 (Year: 2017).
Kolasa, Konrad, "Date Picker." Dribbble, published Feb. 28, 2017 (Retrieved from the Internet Apr. 7, 2020). Internet URL: <https://dribbble.com/shots/3326020-Date-Picker> (Year: 2017).
Krishnia, Rajesh. "Fully Managed Oracle Database Service on Azure with Tessell" Tessell. Mar. 5, 2023. Retrieved from https://tessell.com/blogs/azure-tessell-oracle-dbaas (accessed May 9, 2023).
Kubernetes "Configure Access to Multiple Clusters" Kubernetes Documentation. Oct. 22, 2020. Retrieved from https://kubernetes.io/docs/tasks/access-application-cluster/configure-access-multiple-clusters/ (Year: 2020).
Kubernetes, "Configure Access to Multiple Clusters" Kubernetes Documentation. Oct. 22, 2020. Received from https://kubernetes.io/docs/tasks/access-application-cluster/configure-access-multiple-clusters/ (Year: 2020).
Kubernetes. "Access Clusters Using the Kubernetes API" Kubernetes Documentation. Apr. 11, 2019. Retrieved from https://kubernetes.io/docs/tasks/administer-cluster/access-cluster-api/ (accessed Oct. 11, 2023).
Kubernetes. "Accessing the Kubernetes API from a Pod" Kubernetes Documentation. May 30, 2022. Retrieved from https://kubernetes.io/docs/tasks/run-application/access-api-from-pod/ (accessed Oct. 9, 2023).
Kubernetes. "Authenticating" Kubernetes Documentation. Jul. 12, 2018. Retrieved from https://kubernetes.io/docs/reference/access-authn-authz/authentication/ (accessed Oct. 11, 2023).
Kubernetes. "Communication between Nodes and the Control Plane" Kubernetes Documentation. May 1, 2020. Retrieved from https://kubernetes.io/docs/concepts/architecture/control-plane-node-communication/ (accessed Oct. 9, 2023).
Kubernetes. "Kubelet Configuration (v1beta1)" Kubernetes Documentation. May 30, 2022. Retrieved from https://kubernetes.io/docs/reference/config-api/kubelet-config.v1beta1/ (accessed Oct. 9, 2023).

(56) References Cited

OTHER PUBLICATIONS

Kubernetes. "kubelet" Kubernetes Documentation. May 4, 2022. Retrieved from https://kubernetes.io/docs/reference/command-line-tools-reference/kubelet/ (accessed Oct. 9, 2023).
Kubernetes. "Kubernetes Components" Kubernetes Documentation. May 20, 2022. Retrieved from https://kubernetes.io/docs/concepts/overview/components/ (accessed Oct. 9, 2023).
Kubernetes. "Nodes" Kubernetes Documentation. Jul. 14, 2017. Retrieved from https://kubernetes.io/docs/concepts/architecture/nodes/ (accessed Oct. 11, 2023).
Kubernetes. "Operating etcd clusters for Kubernetes" Kubernetes Documentation. Sep. 27, 2018. Retrieved from https://kubernetes.io/docs/tasks/administer-cluster/configure-upgrade-etcd/ (accessed Oct. 11, 2023).
Kubernetes. "PKI certificates and requirements" Kubernetes Documentation. Jun. 16, 2019. Retrieved from https://kubernetes.io/docs/setup/best-practices/certificates/ (accessed Oct. 11, 2023).
Kubernetes. "Pod v1 core" Kubernetes Documentation. Mar. 30, 2022. Retrieved from https://kubernetes.io/docs/reference/generated/kubernetes-api/v1.23/#pod-v1-core (accessed Oct. 9, 2023).
Kubernetes. "Reconfiguring a kubeadm cluster" Kubernetes Documentation. May 16, 2022. Retrieved from https://kubernetes.io/docs/tasks/administer-cluster/kubeadm/kubeadm-reconfigure/ (accessed Oct. 9, 2023).
Kubernetes. "The Kubernetes API" Kubernetes Documentation. May 3, 2022. Retrieved from https://kubernetes.io/docs/concepts/overview/kubernetes-api/ (accessed Oct. 9, 2023).
Kuchibhotla, Bala. "Tessell's journey: How and why it all started?" Tessell. Mar. 24, 2023. Retrieved from https://tessell.com/blogs/why-tessell (accessed May 9, 2023).
Kuchibhotla, Bala. "Why choose Tessell for your enterprise?" Tessell. Mar. 24, 2023. Retrieved from https://tessell.com/blogs/why-tessell-for-enterprises (accessed May 9, 2023).
Kumar, Dinesh. "Extensions on Tessell for PostgreSQL" Tessell. Aug. 31, 2023. Retrieved from https://www.tessell.com/blogs/extensions-on-tessell-for-postgresql (accessed Dec. 7, 2023).
Kumar, Madan. "Managing High Availability in PostgreSQL—Part III: Patroni" ScaleGrid. Aug. 22, 2019. Retrieved from https://scalegrid.io/blog/managing-high-availability-in-postgresql-part-3/ (Year: 2019).
Kumar, Sandip. "Benchmark Tessell RDS Oracle performance using SLOB" Tessell. Apr. 13, 2023. Retrieved from https://tessell.com/blogs/oracle-benchmark (accessed May 9, 2023).
Launier, Jeremy et al. "Introducing A New Era in Database Management" Nutanix. Oct. 6, 2020. Retrieved from https://www.nutanix.com/blog/introducing-new-era-in-database-management (accessed Jul. 26, 2023).
Lctree, "Lctree," Linked Clone Tree Visualizer for vCloud Director, published (Nov. 28, 2012).
Lee, Brandon, "VMware vSphere 7 vVols New Features" VirtualiztaionHowto (Jun. 3, 2020) from https://www.virtualizationhowto.com/2020/06/vmware-vsphere-7-vvols-new-features/ (accessed Jun. 2, 2021).
Lei, Joanne. "Cross-tenancy access: AssumeRole in OCI" Oracle Cloud Infrastructure Blog. Mar. 1, 2022. Retrieved from https://blogs.oracle.com/cloud-infrastructure/post/cross-tenancy-access-assumerole-in-oci (accessed Sep. 14, 2023).
M. A. Metawai et al. "Load balancing in distributed multi-agent computing systems" Ain Shams Engineering Journal. ASEJ. May 23, 2012. p. 237-249. (Year: 2012).
Magerramov, Joe. "Avoiding overload in distributed systems by putting the smaller service in control" Amazon Builder's Library. May 18, 2022. Retrieved from https://aws.amazon.com/builders-library/avoiding-overload-in-distributed-systems-by-putting-the-smaller-service-in-control/ (accessed Oct. 9, 2023).
Maruthachalam, et al., "A Distributed System Design for Next Generation Storage and Remote Replication", 2014, https://ieeexplore.ieee.org/abstract/document/6814686.
Mathew, Prince. "Custom Database Software Images now available on Gen2 Exadata Cloud@Customer" Oracle Database Insider. Jun. 10, 2021. Retrieved from https://blogs.oracle.com/database/post/custom-database-software-images-now-available-on-gen2-exadata-cloudcustomer (accessed Aug. 30, 23).
Matijaca, Ante, "Dashboard" Dribbble, published Dec. 21, 2015, retrieved Feb. 11, 2022 from <https://dribbble.com/shots/2417233-Dashboard> (Year: 2015).
Meadowcroft, Ben, "Virtual Volumes First Year In Review" VMware vSAN Virtual Blocks Blog (Mar. 14, 2016) from https://blogs.vmware.com/virtualblocks/2016/03/14/virtual-volumes-first-year-in-review/ (accessed Jun. 28, 2021).
Mehta, Siddharth, "Analytics with Bower BI Desktop Dynamic Line References" MSSQL Tips, published Oct. 2, 2017, retrieved Feb. 11, 2022 from <https://www.mssqltips.com/sqlservertip/5084/analytics-with-power-bi-desktop-dynamic-line-references/? (Year: 2017).
Mellor, Chris "Beam, Flow and Era: Not a yoga class, silly, Nutanix's move into copy data management" (published May 10, 2019) The Register, from https://www.theregister.co.uk/2018/05/10/nutanix_beam_flow_era/ (accessed Dec. 18, 2019).
Mellor, Chris "Delphix sends database virtualization sailing up the Amazon" (published Dec. 1, 2017) The Register, from https://www.theregister.co.uk/2017/12/01/delphix_database_virtualization_comes_to_aws/ (accessed Dec. 18, 2019).
Melo, Gilson. "Overview of the Interconnect Between Oracle and Microsoft" Oracle Cloud Infrastructure Blog. Jun. 5, 2019 Retrieved from https://blogs.oracle.com/cloud-infrastructure/post/overview-of-the-interconnect-between-oracle-and-microsoft (accessed Sep. 28, 2023).
Melo, Gilson. "Overview of the Interconnect Between Oracle and Microsoft" Oracle Cloud Infrastructure Blog. Jun. 5, 2019. Retrieved from https://blogs.oracle.com/cloud-infrastructure/post/overview-of-the-interconnect-between-oracle-and-microsoft (accessed Sep. 14, 2023).
Microsoft Docs, "Always On availability groups: a high-availability and disaster-recovery solution" Microsoft SQL Docs, Apr. 23, 2019 (2019), https://docs.microsoft.com/en-us/sql/database-engine/availability-groups/windows/always-on-availability-groups-sql-server?view=sql-server-ver15.
Microsoft Docs, "What is an Always On availability group?" Microsoft SQL Docs, Apr. 29, 2020 (2020) https://docs.microsoft.com/en-us/sql/database-engine/availability-groups/windows/overview-of-always-on-availability-groups-sql-server?view=sql-server-ver15.
Microsoft SQL, "Upgrading Always On Availability Group Replica Instances" Microsoft SQL Docs, Jan. 10, 2018, retrieved from https://docs.microsoft.com/en-us/sql/database-engine/availability-groups/windows/upgrading-always-on-availability-group-replica-instances?view=sql-server-ver15 (retrieved Feb. 15, 2021).
Microsoft, "Use a template to create an Access desktop database," Microsoft Office Support, retrieved Sep. 29, 2022 from https://support.microsoft.com/en-us/office/use-a-template-to-create-an-access-desktop-database-d9354d47-e4ce-4efb-878b-c48f3650fb73.
Microsoft, "Database Engine Instances (SQL Server)" Oct. 2, 2020, from https://docs.microsoft.com/en-us/sql/database-engine/configure-windows/database-engine-instances-sql-server?view=sql-server-ver15 (retrieved Jan. 25, 2022).
Microsoft. "Basic Always On availability groups for a single database" SQL Server. Mar. 3, 2023. Retrieved from https://learn.microsoft.com/en-us/sql/database-engine/availability-groups/windows/basic-availability-groups-always-on-availability-groups?view=sql-server-ver16 (accessed Apr. 25, 2023).
Microsoft. "How Project schedules tasks: Behind the scenes" Project Desktop. Nov. 12, 2020. Retrieved from https://support.microsoft.com/en-us/office/how-project-schedules-tasks-behind-the-scenes-df3431ab-8d8a-4047-afc6-a87b547dbac0 (accessed Sep. 28, 2023).
Microsoft. "Tessell: Migrate and Manage Oracle on Azure" Azure Marketplace. 2023. Retrieved from https://azuremarketplace.microsoft.com/en/marketplace/apps/tessellinc1655919615020.tessell_database_service?tab=Overview (accessed Dec. 7, 2023).
Microsoft. "What is BareMetal Infrastructure on Azure?" BareMetal Infrastructure. Apr. 10, 2023. Retrieved from https://learn.microsoft.com/en-us/azure/baremetal-infrastructure/concepts-baremetal-infrastructure-overview (accessed Apr. 20, 2023).

(56) References Cited

OTHER PUBLICATIONS

Mitchell, Cal. "Migrating On Prem SQL Server To Multi Cloud With Tessell" SQLpipe. Feb. 18, 2023. Retrieved from https://www.sqlpipe.com/blog/migrating-on-prem-sql-server-to-multi-cloud-with-tessell (accessed Apr. 6, 2023).
MongoDB. "mongo Shell Methods" Reference. Aug. 2019. Retrieved from https://www.mongodb.com/docs/v4.2/reference/method/ (accessed Aug. 30, 2023).
MongoDB. "mongodb" GitHub. Mar. 2015. Retrieved from https://github.com/mongodb/docs/blob/v4.2/source/core/replica-set-priority-0-member.txt (accessed Aug. 30, 2023).
MongoDB. "Multi-cloud Management" MongoDB. Jan. 21, 2022. Retrieved from https://www.mongodb.com/multicloud/management (accessed Sep. 28, 2023).
MongoDB. "Priority 0 Replica Set Members" MongoDB Manual. Aug. 2019. Retrieved from https://www.mongodb.com/docs/manual/core/replica-set-priority-0-member/ (accessed Aug. 30, 2023).
MongoDB. "Replica Set Elections" MongoDB Manual. Aug. 2019. Retrieved from https://www.mongodb.com/docs/manual/core/replica-set-elections/ (accessed Aug. 30, 2023).
MongoDB. "Replica Set Members" Replication. Aug. 2019. Retrieved from https://www.mongodb.com/docs/v4.2/core/replica-set-members/#replica-set-secondary-members (accessed Aug. 30, 2023).
MongoDB. "The mongo Shell" MongoDB. Aug. 2019. Retrieved from https://www.mongodb.com/docs/v4.2/mongo/ (accessed Aug. 30, 2023).
MongoDB. "Troubleshoot Replica Sets" MongoDB Manual. Aug. 2019. Retrieved from https://www.mongodb.com/docs/manual/tutorial/troubleshoot-replica-sets/ (accessed Aug. 30, 2023).
MongoDB. "Upgrade a Replica Set to 4.2" Replication. Aug. 2019. Retrieved from https://www.mongodb.com/docs/v4.2/release-notes/4.2-upgrade-replica-set/ (accessed Aug. 30, 2023).
MongoDB. "What is Multi-Cloud?" MongoDB. May 26, 2022. Retrieved from https://www.mongodb.com/basics/multicloud (accessed Sep. 28, 2023).
MP4 Video screenshots for Tessell. "Backups" Tessell. 2023. Retrieved from https://tessell.com/videos/Backups.mp4 (accessed Apr. 25, 2023).
MP4 Video screenshots for Tessell. "Data Flow" Tessell. 2023. Retrieved from https://tessell.com/videos/DataFlow.mp4 (accessed Apr. 25, 2023).
Mulford, Juan, "vSphere 7—Describe Instant Clone Architecture And Use Cases," Mulcas Cloudy Infrastructures, published Dec. 28, 2021, retrieved Sep. 11, 2022 from https://mulcas.com/vsphere-7-describe-instant-clone-architecture-and-use-cases/.
Murugan, Palani, "Delphix Dynamic Data Platform on VMware vSAN," VMware Virtual Blocks Blog, published Nov. 20, 2017, retrieved on Jan. 2, 2023 from https://blogs.vmware.com/virtualblocks/2017/11/20/delphix-vsan/.
MVware, "Horizon Architecture", Nov. 18, 2020. https://techzone.vmware.com/resource/horizon-architecture#introduction.
MySQL. "Creating a MySQL Server Deployment" Documentation. Mar. 13, 2017. Retrieved from https://web.archive.org/web/20170313043247/http:/docs.oracle.com/cloud/latest/mysql-cloud/UOMCS/GUID-D03FE523-AD8D-4C53-935C-D5D6513D2A24.htm#GUID-D03FE523-AD8D-4C53-935C-D5D6513D2A24 (accessed Sep. 6, 2023).
Net App Support, "Data replication from one destination to another in a series (cascading)" Net App. 2015. Received from https://library.netapp.com/ecmdocs/ECMP1635994/html/GUID-25C143ED-C369-4129-B055-C532FDB8AB79.html (Year: 2015).
Netapp Support, "Cloning databases using SnapManager" (Aug. 2013) from, https://library.netapp.com/ecmdocs/ECMP1217281/html/GUID-EAA4950A-C186-423D-9574-6EA12A92E53D.html (accessed Dec. 17, 2019).
Netapp Support, "Types of SnapManager restore operations" (Aug. 2013) from, https://library.netapp.com/ecmdocs/ECMP1217281/html/GUID-599DF5AE-C49F-4BF0-A96C-E6E71FAFF102.html (accessed Dec. 17, 2019).
Nizhegolenko, Alexey. "High-Availability MySQL cluster with load balancing using HAProxy and Heartbeat." Towards Data Science. Dec. 3, 2018. Retrieved from https://towardsdatascience.com/high-availability-mysql-cluster-with-load-balancing-using-haproxy-and-heartbeat-40a16e134691 (Year: 2018).
Notice of Allowance on U.S. Appl. No. 16/228,728 Dtd Jul. 1, 2020.
Notice of Allowance on U.S. Appl. No. 16/234,547 Dtd Sep. 26, 2023.
Notice of Allowance on U.S. Appl. No. 16/234,553 Dtd Mar. 30, 2021.
Notice of Allowance on U.S. Appl. No. 16/805,581 Dtd Apr. 3, 2023.
Notice of Allowance on U.S. Appl. No. 17/122,740 Dtd Jan. 11, 2023.
Notice of Allowance on U.S. Appl. No. 17/122,740 Dtd Nov. 2, 2022.
Notice of Allowance on U.S. Appl. No. 17/181,586 Dtd Jan. 9, 2023.
Notice of Allowance on U.S. Appl. No. 17/181,586 Dtd Aug. 16, 2022.
Notice of Allowance on U.S. Appl. No. 17/181,586 Dtd Nov. 16, 2022.
Notice of Allowance on U.S. Appl. No. 17/182,511 Dtd Mar. 23, 2023.
Notice of Allowance on U.S. Appl. No. 17/237,599 Dtd Jan. 25, 2023.
Notice of Allowance on U.S. Appl. No. 17/237,599 Dtd Dec. 5, 2022.
Notice of Allowance on U.S. Appl. No. 17/325,757 Dtd Jul. 31, 2024.
Notice of Allowance on U.S. Appl. No. 17/337,197 Dtd Dec. 21, 2023.
Notice of Allowance on U.S. Appl. No. 17/694,964 Dtd Dec. 6, 2023.
Notice of Allowance on U.S. Appl. No. 17/727,554 Dtd Jun. 8, 2023.
Notice of Allowance on U.S. Appl. No. 17/727,554 Dtd Sep. 7, 2023.
Notice of Allowance on U.S. Appl. No. 17/951,632 Dtd Jan. 31, 2024.
Notice of Allowance on U.S. Appl. No. 18/113,528 Dtd Sep. 19, 2023.
Notice of Allowance on U.S. Appl. No. 18/113,528 Dtd Nov. 15, 2023.
Notice of Allowance on U.S. Appl. No. 18/114,427 Dtd Mar. 22, 2024.
Notice of Allowance on U.S. Appl. No. 29/673,554 Dtd Apr. 17, 2020.
Notice of Allowance on U.S. Appl. No. 29/733,571 Dtd Apr. 28, 2022.
Notion, "Database templates," Notion Help Center, retrieved Sep. 29, 2022 from https://www.notion.so/help/database-templates.
Nutanix "Nutanix announces Flow, Era and Beam and .NEXT 2018" (published May 9, 2018) Nutanix Youtube, from https://www.youtube.com/watch?v=w40asaGtrkU (accessed Dec. 19, 2019).
Nutanix Inc., "Prism 5.5, Prism Central Guide" (Jul. 7, 2020) pp. 1-618.
Nutanix, "Blueprints Usage," Nutanix Support and Insights, retrieved Sep. 29, 2022 from https://portal.nutanix.com/page/documents/details?targetId=Nutanix-Calm-Admin-Operations-Guide-v3_2_7:nuc-nucalm-blueprints-intro-c.html.
Nutanix, "Creating a Playbook," Nutanix Support and Insights, retrieved Sep. 29, 2022 from https://portal.nutanix.com/page/documents/details?targetld=Nutanix-Beam-User-Guide:bea-playbook-create-t.html.
Nutanix, "Creating a Service Now Template in Beam," Nutanix Support and Insights, retrieved Sep. 29, 2022 from https://portal.nutanix.com/page/documents/details?targetld=Nutanix-Beam-User-Guide:bea-servicenow-template-create-cg-t.html.
Nutanix, "Nutanix Hybrid Cloud Infrastructure Now Available on Amazon Web Services" Nutanix Press Release. Aug. 11, 2020. Received from https://www.nutanix.com/press-releases/2020/nutanix-clusters-on-aws?icid=111AJWOZPW22N (Year: 2020).

(56) References Cited

OTHER PUBLICATIONS

Nutanix, Inc. "Prism Central Guide", Acropolis 5.0, (Oct. 18, 2018), pp. 1-374.
Nutanix, Inc., "Acropolis Advance Administration Guide" Acropolis 5.0 Feb. 9, 2018, pp. 1-60.
Nutanix, Inc., "Acropolis Advanced Administration Guide" Acropolis 5.1, Jul. 11, 2018, pp. 1-63.
Nutanix, Inc., "Prism Central Guide", Acropolis 5.1, (Oct. 18, 2018), pp. 1-410.
Nutanix, Inc., "Prism Web Console Guide" Prism 5.8, (Mar. 19, 2019), pp. 1-808.
Nutanix. "Calm Administration and Operations Guide" Self-Service (formerly Calm) 3.6. Sep. 6, 2022. Retrieved from https://portal.nutanix.com/page/documents/details?targetId=Nutanix-Calm-Admin-Operations-Guide-v3_6_0:nuc-blueprint-confi%20qguring-service-vm-package-aws-t.html (accessed Sep. 6, 2023).
Nutanix. "Clone Management" Nutanix Support and Insights. Jan. 2022. Retrieved from https://portal.nutanix.com/page/documents/details?targetId=Nutanix-Era-User-Guide-v2_4:top-clone-database-management-c.html (accessed Jul. 26, 2023).
Nutanix. "Configuring AWS VM, Package, and Service" Nutanix Support and Insights. Sep. 2022. Retrieved from https://portal.nutanix.com/page/documents/details?targetId=Nutanix-Calm-Admin-Operations-Guide-v3_6_0:nuc-blueprint-configuring-service-vm-package-aws-t.html (accessed Jul. 26, 2023).
Nutanix. "Era Overview" Nutanix Support and Insights. Jan. 2022. Retrieved from https://portal.nutanix.com/page/documents/details?targetId=Nutanix-Era-User-Guide-v2_4:top-era-overview-c.html (accessed Jul. 26, 2023).
Nutanix. "Era Profiles" Nutanix Support and Insights. Jan. 2022. Retrieved from https://portal.nutanix.com/page/documents/details?targetId=Nutanix-Era-User-Guide-v2_4:top-era-getting-started-profiles-c.html (accessed Jul. 26, 2023).
Nutanix. "Era Terminology Reference" Nutanix Support and Insights. Jan. 2022. Retrieved from https://portal.nutanix.com/page/documents/details?targetId=Nutanix-Era-User-Guide-v2_4:top-era-terminology-reference-r.html (accessed Jul. 26, 2023).
Nutanix. "Era Time Machine Management" Nutanix Support and Insights. Jan. 2022. Retrieved from https://portal.nutanix.com/page/documents/details?targetId=Nutanix-Era-User-Guide-v2_4:top-era-time-machine-management-c.html (accessed Jul. 26, 2023).
Nutanix. "Era User Guide" Nutanix Database Service (formerly Era) 2.4. Jul. 26, 2023. Retrieved from https://download.nutanix.com/documentation/Era_v2_4/Nutanix-Era-User-Guide-v2_4.pdf (accessed Jul. 26, 2023).
Nutanix. "Get Started with Era" Nutanix Support and Insights. Jan. 2022. Retrieved from https://portal.nutanix.com/page/documents/details?targetId=Nutanix-Era-User-Guide-v2_4:top-era-getting-started-c.html (accessed Jul. 26, 2023).
Nutanix. "Launching a Blueprint from the Marketplace" Nutanix Support and Insights. Sep. 2022. Retrieved from https://portal.nutanix.com/page/documents/details?targetId=Nutanix-Calm-Admin-Operations-Guide-v3_6_0:nuc-marketplace-launch-application-blueprint-t.html (accessed Jul. 26, 2023).
Nutanix. "Launching a Blueprint" Nutanix Support and Insights. Sep. 2022. Retrieved from https://portal.nutanix.com/page/documents/details?targetId=Nutanix-Calm-Admin-Operations-Guide-v3_6_0:nuc-blueprints-launch-blueprint-page-t.html (accessed Jul. 26, 2023).
Nutanix. "MongoDB Database Management" Nutanix Support and Insights. Oct. 2022. Retrieved from https://portal.nutanix.com/page/documents/details?targetId=Nutanix-NDB-MongoDB-Database-Management-Guide-v2_5:top-mongo-db-management-c.html (accessed Jul. 26, 2023).
Nutanix. "MongoDB on Nutanix" Best Practices. Jun. 2023. Retrieved from https://download.nutanix.com/solutionsDocs/BP-2023-Mongo DB-on-Nutanix.pdf (accessed Jul. 26, 2023).
Nutanix. "MongoDB on Nutanix" Nutanix Support and Insights. Jun. 8, 2023. Retrieved from https://portal.nutanix.com/page/documents/solutions/details?targetId=BP-2023-MongoDB-on-Nutanix:BP-2023-MongoDB-on-Nutanix (accessed Jul. 26, 2023).
Nutanix. "Multi-Cluster Management" Nutanix Support and Insights. Oct. 2020. Retrieved from https://portal.nutanix.com/page/documents/details?targetId=Nutanix-Era-User-Guide-v2_0:era-era-multicluster-management-c.html (accessed Jul. 26, 2023).
Nutanix. "Nutanix Calm Overview" Nutanix Support and Insights. Jul. 2021. Retrieved from https://portal.nutanix.com/page/documents/solutions/details?targetId=RA-2093-Nutanix-Calm:top-nutanix-calm-overview.html (accessed Jul. 26, 2023).
Nutanix. "Nutanix Cluster Management" Nutanix Support and Insights. Jan. 2022. Retrieved from https://portal.nutanix.com/page/documents/details?targetId=Nutanix-Era-User-Guide-v2_4:top-era-multicluster-management-c.html (accessed Jul. 26, 2023).
Nutanix. "Nutanix Database Service MongoDB Database Management Guide" Nutanix Database Service (formerly Era) 2.5. Jul. 5, 2023. Retrieved from https://download.nutanix.com/documentation/NDB_v2_5/Nutanix-NDB-MongoDB-Database-Management-Guide-v2_5.pdf (accessed Jul. 26, 2023).
Nutanix. "Nutanix Database Service SQL Server Database Management Guide" Nutanix Database Service (formerly Era) 2.5. Aug. 29, 2023. Retrieved from https://download.nutanix.com/documentation/NDB_v2_5/Nutanix-NDB-SQL-Server-Database-Management-Guide-v2_5.pdf (accessed Aug. 30, 2023).
Nutanix. "Nutanix Database Service SQL Server Database Management Guide" Nutanix Support and Insights. Jul. 20, 2023. Retrieved from https://portal.nutanix.com/page/documents/details?targetId=Nutanix-NDB-SQL-Server-Database-Management-Guide (accessed Jul. 26, 2023).
Nutanix. "One-Click Patching" Nutanix Support and Insights. Oct. 2022. Retrieved from https://portal.nutanix.com/page/documents/details?targetId=Nutanix-NDB-User-Guide-v2_5:top-patching-c.html (accessed Jul. 26, 2023).
Nutanix. "Operating System Patching" Nutanix Support and Insights. Oct. 2022. Retrieved from https://portal.nutanix.com/page/documents/details?targetId=Nutanix-NDB-User-Guide-v2_5:top-operating-system-patch-c.html (accessed Jul. 26, 2023).
Nutanix. "Patching a MongoDB Server Cluster" Nutanix Support and Insights. Oct. 2022. Retrieved from https://portal.nutanix.com/page/documents/details?targetId=Nutanix-NDB-MongoDB-Database-Management-Guide-v2_5:top-mongodb-db-cluster-patch-t.html (accessed Jul. 26, 2023).
Nutanix. "Provisioning a MongoDB Replica Set" Nutanix Support and Insights. Sep. 2021. Retrieved from https://portal.nutanix.com/page/documents/details?targetId=Nutanix-Era-User-Guide-v2_3:top-era-provision-mongodb-replica-t.html (accessed Jul. 26, 2023).
Nutanix. "Provisioning a PostgreSQL Instance" Nutanix Support and Insights. Jan. 2021. Retrieved from https://portal.nutanix.com/page/documents/details?targetId=Nutanix-Era-User-Guide-v2_3:top-era-provisioning-a-postgresql-database-t.html (accessed Jul. 26, 2023).
Nutanix. "Provisioning a SQL Server Availability Database" Nutanix Support and Insights. Oct. 2022. Retrieved from https://portal.nutanix.com/page/documents/details?targetId=Nutanix-NDB-SQL-Server-Database-Management-Guide-v2_5:top-sql-server-cluster-database-provision-t.html (accessed Jul. 26, 2023).
Nutanix. "Provisioning a SQL Server Database as a Group" Nutanix Support and Insights. Oct. 2022. Retrieved from https://portal.nutanix.com/page/documents/details?targetId=Nutanix-NDB-SQL-Server-Database-Management-Guide-v2_5:top-sqlserver-group-db-provision-t.html (accessed Jul. 26, 2023).
Nutanix. "Registering a MongoDB Replica Set" Nutanix Support and Insights. Oct. 2022. Retrieved from https://portal.nutanix.com/page/documents/details?targetId=Nutanix-NDB-MongoDB-Database-Management-Guide-v2_5:top-mongodb-replica-db-registration-t.html (accessed Jul. 26, 2023).
Nutanix. "Registering a SQL Server Database as a Group" Nutanix Support and Insights. Oct. 2022. Retrieved from https://portal.nutanix.com/page/documents/details?targetId=Nutanix-NDB-SQL-Server-Database-Management-Guide-v2_5:top-sqlserver-group-db-register-t.html (accessed Jul. 26, 2023).
Nutanix. "Sql Server Always On Availability Groups (AG) Support" Nutanix Support and Insights. Oct. 2022. Retrieved from https://portal.nutanix.com/page/documents/details?targetId=Nutanix-NDB-SQL-Server-Database-Management-Guide-v2_5:top-always-on-availability-group-sql-server-c.html (accessed Jul. 26, 2023).

(56) References Cited

OTHER PUBLICATIONS

Nutanix. "Viewing Application Details" Nutanix Support and Insights. Sep. 2022. Retrieved from https://portal.nutanix.com/page/documents/details?targetId=Nutanix-Calm-Admin-Operations-Guide-v3_6_0:nuc-marketplace-view-application-details-t.html (accessed Jul. 26, 2023).
Nyffenegger et al., "SQL Server Instance" 2017, from https://renenyffenegger.ch/notes/development/databases/SQL-Server/architecture/instance (retrieved Jan. 25, 2022).
Opster, "High Availability in Elasticsearch—Cross Cluster Replication and Alternatives" Opster. 2020. Received from https://opster.com/blogs/elasticsearch-cross-cluster-replication-overview/ (Year: 2020).
Opster, "Multi-Cluster Load Balancer-An Alternative to Cross Cluster Replication" Opster. 2020. Received from https://opster.com/elasticsearch-multi-cluster-load-balancer/ (Year: 2020).
Or, Andrew, "Understanding your Apache Spark Application Through Visualization" Data Bricks, published Jun. 22, 2015, retrieved Feb. 11, 2022 from <https://databricks.com/blog/2015/06/22/understanding-your-spark-application-through-visualization.html> (Year: 2015).
Oracle Cloud, "Using Oracle Autonomous Database on Shared Exadata Infrastructure" published Dec. 2022.
Oracle Communications, "Provisioning Database Interface User's Guide, Release 16.0" (Sep. 2014) Oracle, p. 1-174.
Oracle Help Center, "Enterprise Manager Lifecycle Management Administrator's Guide, 4. Overview of Database Provisioning" (2019) from, https://docs.oracle.com/cd/E24628_01/em.121/e27046/prov_db_overview.htm#EMLCM12206, (accessed Dec. 17, 2019).
Oracle, "Creating Databases Using Database Template," Cloud Administration Guide, retrieved Sep. 29, 2022 from https://docs.oracle.com/en/enterprise-manager/cloud-control/enterprise-manager-cloud-control/13.4/emclo/creating-databases-using-database-template.html#GUID-BB3923BE-192D-40A2-9C5D-AAC5BA3326C0.
Oracle, "Creating Databases Using Database Template," Cloud Administration Guide, retrieved on Oct. 17, 2022 from https://docs.oracle.com/en/enterprise-manager/cloud-control/enterprise-manager-cloud-control/13.4/emclo/creating-databases-using-database-template.html#GUID-BB3923BE-192D-40A2-9C5D-AAC5BA3326C0.
Oracle, "Creating Databases Using Database Template," Enterprise Manager Cloud Administration Guide, retrieved Sep. 29, 2022 from https://docs.oracle.com/cd/E91266_01/EMCLO/GUID-BB3923BE-192D-40A2-9C5D-AAC5BA3326C0.htm#EMCLO2097.
Oracle, "Creating Databases Using Database Template," Enterprise Manager Cloud Administration Guide, retrieved on Oct. 17, 2022 from https://docs.oracle.com/cd/E91266_01/EMCLO/GUID-BB3923BE-192D-40A2-9C5D-AAC5BA3326C0.htm#EMCLO2097.
Oracle, "Exadata Cloud@Customer Security Controls", Version 2.18, Jul. 27, 2022, https://www.oracle.com/a/ocom/docs/engineered-systems/exadata/exadata-cloud-at-customer-security-controls.pdf.
Oracle, "Introduction to Blueprints," Enterprise Manager Cloud Administration Guide, retrieved Sep. 29, 2022 from https://docs.oracle.com/cd/E63000_01/EMCLO/blueprint.htm#EMCLO1910.
Oracle, "Oracle Exadata Cloud@Customer X9M", Version 1.17, 2022, https://www.oracle.com/dk/a/ocom/docs/engineered-systems/exadata/exacc-x9m-ds.pdf.
Oracle, "Oracle Gen 2 Exadata Cloud@Customer Security Controls", version 2.18, Jul. 27, 2022, https://www.oracle.com/a/ocom/docs/engineered-systems/exadata/exadata-cloud-at-customer-security-controls.pdf.
Oracle, "Using the DBaaS Self Service Portal," Cloud Administration Guide, Nov. 30, 2021. retrieved on Oct. 17, 2022 from https://docs.oracle.com/en/enterprise-manager/cloud-control/enterprise-manager-cloud-control/13.4/emclo/using-dbaas-self-service-portal.html#GUID-2FDAFF57-E1D2-4049-8E78-2704BB12D2FD.
Oracle, "Using the DBaaS Self Service Portal," Cloud Administration Guide, retrieved Sep. 29, 2022 from https://docs.oracle.com/en/enterprise-manager/cloud-control/enterprise-manager-cloud-control/13.4/emclo/using-dbaas-self-service-portal.html#GUID-2FDAFF57-E1D2-4049-8E78-2704BB12D2FD.
Oracle, "Part III: Database Provisioning" Enterprise Manager Lifecycle Management Administrator's Guide (2012) from https://docs.oracle.com/cd/E24628_01/em.121/e27046/part_db_prov.htm#CHDBHBCE (accessed Jun. 28, 2021).
Oracle, "Webinar: Automate your database provisioning to increase efficiency and standardization" (published Jul. 14, 2020) Oracle Youtube, from https://www.youtube.com/watch?v=nUMdekXyqr4 (accessed Jun. 28, 2021).
Oracle. "About Managed Targets" Enterprise Manager Cloud Control Extensibility Programmer's Guide. May 2014. Retrieved from https://docs.oracle.com/cd/E24628_01/doc.121/e25159/managed_targets.htm#EMPRG140 (accessed Aug. 30, 2023).
Oracle. "Accessing Object Storage Resources Across Tenancies" Oracle Cloud Infrastructure Documentation. Sep. 21, 2021. Retrieved from https://web.archive.org/web/20210921123150/https://docs.oracle.com/en-us/iaas/Content/Object/Concepts/accessingresourcesacrosstenancies.htm (accessed Sep. 14, 2023).
Oracle. "Create a DB System Using the Console" Oracle Base Database Service. May 2023. Retrieved from https://docs.oracle.com/en/cloud/paas/bm-and-vm-dbs-cloud/dbshqbqu/index.html#articletitle (accessed Jul. 26, 23).
Oracle. "Create Oracle Database Homes on an Exadata Cloud Infrastructure System" Oracle Cloud Infrastructure Documentation. May 16, 2022. Retrieved from https://docs.oracle.com/en-us/iaas/exadatacloud/exacs/creating-database-homes-exacc.html (accessed Aug. 30, 2023).
Oracle. "Database Provisioning and Management" Oracle Cloud Infrastructure Documentation. Dec. 8, 2022. Retrieved from https://docs.oracle.com/en-us/iaas/odsaz/odsa-database-provisioning-and-management.html (accessed Aug. 30, 2023).
Oracle. "Exadata Database Service on Cloud@Customer Administrator's Guide" Oracle Exadata. Aug. 2023. Retrieved from https://docs.oracle.com/en/engineered-systems/exadata-cloud-at-customer/ecccm/oracle-exadata-database-service-cloudcustomer.pdf (accessed Aug. 30, 2023).
Oracle. "Exadata Database Service on Cloud@Customer Security Controls" Oracle Gen 2 Exadata Database Service on Cloud@Customer Security Controls. Oct. 26, 2020. Retrieved from https://www.oracle.com/a/ocom/docs/engineered-systems/exadata/exadata-cloud-at-customer-security-controls.pdf (accessed Oct. 9, 2023).
Oracle. "Exadata Database Service on Dedicated Infrastructure Security Controls" Oracle OCI Exadata Database Service on Dedicated Infrastructure Security Controls. Jan. 23, 2022. Retrieved from https://www.oracle.com/a/ocom/docs/engineered-systems/exadata/exadata-cloud-service-security.pdf (accessed Oct. 11, 2023).
Oracle. "Managing Groups" Enterprise Manager Cloud Control Administrator's Guide. Feb. 2016. Retrieved from https://docs.oracle.com/cd/E24628_01/doc.121/e24473/group_management.htm#EMADM9216 (accessed Aug. 30, 2023).
Oracle. "Managing Software Sources" Oracle Cloud Infrastructure Documentation. Sep. 17, 2021. Retrieved from https://docs.oracle.com/en-us/iaas/os-management/osms/osms-software-sources.htm (accessed Aug. 30, 2023).
Oracle. "Overview of Identity and Access Management" Oracle Cloud Infrastructure Documentation. May 5, 2022. Retrieved from https://web.archive.org/web/20220505171702/https://docs.oracle.com/en-us/iaas/Content/Identity/Concepts/overview.htm (accessed Sep. 14, 2023).
Oracle. "Securing Object Storage" Oracle Cloud Infrastructure Documentation. Apr. 2021. Retrieved from https://docs.public.oneportal.content.oci.oraclecloud.com/en-us/iaas/Content/Security/Reference/objectstorage_security.htm (accessed Sep. 14, 2023).
Oracle. "Setting Up Identity Policies" Oracle Cloud Infrastructure Documentation. Sep. 26, 2022. Retrieved from https://docs.oracle.com/en-us/iaas/data-labeling/data-labeling/using/set-up-identity-policies.htm (accessed Sep. 28, 2023).
Oracle. "Update Your Database Homes and Grid Infrastructure Via the OCI Web Console on the Exadata Cloud Service" Oracle Database Insider. May 2, 2020. Retrieved from https://blogs.oracle.com/database/post/update-your-database-homes-and-grid-infrastructure-via-the-oci-web-console-on-the-exadata-cloud-service (accessed Aug. 30, 23).

(56) References Cited

OTHER PUBLICATIONS

Oracle. "User Credentials" Oracle Cloud Infrastructure Documentation. May 19, 2022. Retrieved from https://web.archive.org/web/20220519195404/https:/docs.oracle.com/en-us/iaas/Content/Identity/Concepts/usercredentials.htm (accessed Sep. 14, 2023).
Oracle. "User Guide" Oracle Cloud Infrastructure. Nov. 26, 2019. Retrieved from https://docs.oracle.com/cd/E97706_01/pdf/ug/OCI_User_Guide.pdf (accessed Aug. 30, 23).
Oracle. "Using DBMS_Rolling to Perform a Rolling Upgrade" Concepts and Administration. Sep. 2020. Retrieved from https://docs.oracle.com/en/database/oracle/oracle-database/19/sbydb/using-DBMS_ROLLING-to-perform-rolling-upgrade.html#GUID-70C09F5B-90BE-4C8C-96A5-45A52E05D380 (accessed Aug. 30, 2023).
Oracle. "Using Pre-Authenticated Requests" Oracle Cloud Infrastructure Documentation. Apr. 2021. Retrieved from https://docs.public.oneportal.content.oci.oraclecloud.com/en-us/iaas/Content/Object/Tasks/usingpreauthenticatedrequests.htm#Using_PreAuthenticated_Requests (accessed Sep. 14, 2023).
Palmer, Brent, "Date Range." Dribbble, published Oct. 21, 2015 (Retrieved from the Internet Apr. 7, 2020). Internet URL: <https://dribbble.com/shots/2306949-Date-Range> (Year: 2015).
Parikh, Priyank. "Benchmark Tessell RDS MySQL performance using Sysbench" Tessell. Apr. 19, 2023. Retrieved from https://tessell.com/blogs/mysql-benchmark (accessed May 9, 2023).
Patil, Manoj E. et al. "Design and Implementation of Graphical User Interface for Relational Database Management System" (2012), International Jounral of Computer Science and Information Technologies (IJCSIT), vol. 3 (3), p. 3871-3874.
Pawar, Mohan. "Simplified Kubernetes Architecture" Medium. Feb. 25, 2023. Retrieved from https://mohan08p.medium.com/simplified-kubernetes-architecture-3febe12480eb (accessed Oct. 9, 2023).
Pederson, Jenna. "Provisioning an RDS Database With Cloudformation (Part 2)" Jenna Pederson. Jun. 28, 2021. Retrieved from https://jennapederson.com/blog/2021/6/28/provisioning-an-rds-database-with-cloudformation-part-2/ (accessed Sep. 6, 2023).
Pillai, Animesh. "High-performance data infrastructure for the cloud era" Tessell. 2023. Retrieved from https://app.hubspot.com/documents/20843544/view/494538972?accessId=b713c0 (accessed Apr. 13, 2023).
PlanetScale, Deployment Options Documentation, Aug. 1, 2022, https://planetscale.com/docs/concepts/deployment-options#cloud.
PlanetScale, Query Insights Documentation, 2022, https://planetscale.com/docs/concepts/query-insights#insights-page-overview.
PlanetScale, The MySQL-compatible serverless database platform, 2022, https://planetscale.com.
PlanetScale. "PlanetScale is the world's most advanced serverless MySQL platform" PlanetScale. Retrieved from https://planetscale.com/ (accessed Apr. 6, 2023).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Sep. 17, 2019), from https://nutanixbible.com/.
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Polovyi, Ivan. "AWS ECS Cluster using the EC2 Launch Type" AWS in Plain English. Jul. 25, 2021. Retrieved from https://aws.plainenglish.io/aws-ecs-cluster-using-the-ec2-launch-type-cb5ae2347b46 (accessed Apr. 6, 2023).
Principled Technologies, "VMware vCloud Automation Center DBaaS: Provision databases in minutes" A Principled Technologies Test Report (Aug. 2014) from https://www.principledtechnologies.com/vmware/vCAC_DBaaS_0914.pdf (accessed Jun. 2, 2021).
Progress. "Multi-tenant database architecture" Progress Documentation. Sep. 5, 2021. Retrieved fromhttps://docs.progress.com/bundle/openedge-database-management-117/page/Multi-tenant-database-architecture.html (accessed Sep. 28, 2023).
Progress. "Multi-tenant features" Progress Documentation. Apr. 12, 2017. Retrieved from https://docs.progress.com/bundle/openedge-database-management-117/page/Multi-tenant-features.html (accessed Sep. 28, 2023).
Progress. "Simple tenancy" Progress Documentation. Apr. 12, 2017. Retrieved from https://docs.progress.com/bundle/openedge-database-management-117/page/Simple-tenancy.html (accessed Sep. 28, 2023).
Progress. "Table partitioning details" Progress Documentation. Sep. 6, 2021. Retrieved from https://docs.progress.com/bundle/openedge-database-management-117/page/Table-partitioning-details.html (accessed Sep. 28, 2023).
Progress. "Tenant ID" Progress Documentation. Apr. 12, 2017. Retrieved from https://docs.progress.com/bundle/openedge-database-multitenancy-117/page/Tenant-ID.html (accessed Sep. 28, 2023).
Progress. "Tenant-ID() method" Progress Documentation. Jun. 2011. Retrieved from https://docs.progress.com/bundle/abl-reference/page/TENANT-ID-method.html# (accessed Sep. 28, 2023).
Progress. "What is multi-tenancy?" Progress Documentation. Apr. 12, 2017. Retrieved from https://docs.progress.com/bundle/openedge-database-multitenancy-117/page/What-is-multi-tenancy.html (accessed Sep. 28, 2023).
Quest. "Creating custom User-defined Database Groups" Support. Aug. 16, 2017. Retrieved from https://support.quest.com/kb/4229519/creating-custom-user-defined-database-groups (accessed Aug. 30, 2023).
Raffic, Mohammed, "Creating Linked Clone Desktop Pools in VMware Horizon View 6.X," VMware Arena, published Mar. 15, 2017, retrieved Sep. 11, 2022 from http://www.vmwarearena.com/creating-linked-clone-desktop-pools-in-vmware-horizon-view-6-x/.
Rakesh, Rajnikant, et al. "PostgreSQL 15—What's new?" Tessell. Aug. 16, 2023. Retrieved from https://www.tessell.com/blogs/whats-new-in-postgresql-15 (accessed Dec. 7, 2023).
Rakesh, Rajnikant. "Benchmark Tessell for PostgreSQL against Aurora PostgreSQL" Tessell. Aug. 18, 2023. Retrieved from https://www.tessell.com/blogs/benchmark-postgresql-tessell-against-aurora (accessed Dec. 7, 2023).
Rakesh, Rajnikant. "Provision Tessell for Oracle with Terraform" Tessell. Jul. 4, 2023. Retrieved from https://tessell.com/blogs/tessell-oracle-terraform (accessed Jul. 26, 2023).
Rakesh, Rajnikant. "Provision Tessell for Oracle with Terraform" Tessell. Jul. 4, 2023. Retrieved from https://www.tessell.com/blogs/tessell-oracle-terraform (accessed Dec. 7, 2023).
Rawat, Maneesh. "Nitro Boost your PostgreSQL Workloads" PGConf India. Feb. 23, 2023. Retrieved from https://pgconf.in/conferences/pgconfin2023/program/proposals/356 (accessed Apr. 6, 2023).
Red Hat "Chapter 4. Configuring The Haproxy Load Balancer" Red Hat Customer Portal. 2020. Retrieved on Dec. 22, 2020 from https://access.redhat.com/documentation/en-us/red_hat_cloudforms/4.6/html/high_availability_guide/configuring_haproxy (Year: 2020).
Reed, Kate "Nutanix Introduces Database Services with Era" (published May 9, 2018) Business Wire, from https://www.businesswire.com/news/home/20180509005397/en/ (accessed Dec. 18, 2019).
Reed, Kate "Nutanix Introduces Database Services with Era" (published May 9, 2018) Nutanix Press Releases, from https://ir.nutanix.com/company/press-releases/press-release-details/2018/Nutanix-Introdu/ (accessed Dec. 18, 2019).
Reinero, Bryan. "Your Ultimate Guide to Rolling Upgrades" MongoDB. May 1, 2018. Retrieved from https://www.mongodb.com/blog/post/your-ultimate-guide-to-rolling-upgrades (accessed Aug. 30, 2023).
Rocheleau, Jake, "30 Best Free Calendar & Datepicker jQuery Plugins." Vandelay Design, published Aug. 29, 2018 (Retrieved from the Internet Apr. 7, 2020). Internet URL: <https://www.vandelaydesign.com/30-best-free-jquery-plugins/> (Year: 2018).

(56) References Cited

OTHER PUBLICATIONS

Rubrik, "Exploring the Depth of Simplicity: Protecting Microsoft SQL Server with Rubrik," Technical White Paper, published Mar. 2017, retrieved on Jan. 2, 2023 from https://www.rubrik.com/content/dam/rubrik/en/resources/white-paper/Protecting-Microsoft-SQLServer-with-Rubrik.pdf.
Rubrik, "Hyperconverged Infrastructure with the Simplest Data Protection," published Jan. 2016, retrieved on Jan. 2, 2023 from https://web.archive.org/web/20210117100439/https://www.rubrik.com/wp-content/uploads/2015/12/Joint-Solution-Brief-Nutanix-and-Rubrik.pdf.
Saleforce. "Row-Level Security Example based on Role Hierarchy and Record Ownership" SalesForce Help. Apr. 2021. Retrieved from https://help.salesforce.com/s/articleView?language=en_US&id=sf.bi_security_rowlevel_example_rolehierarchy.htm&type=5 (accessed Sep. 28, 2023).
Salesforce. "Platform Multitenant Architecture" Salesforce Architects. Aug. 2022. Retrieved from https://architect.salesforce.com/fundamentals/platform-multitenant-architecture (accessed Sep. 28, 2023).
Sandbu, Marius. "Tessell—A new way to provide DBaaS in Public Cloud" Marius Sandbu Tech Ramblings. Nov. 1, 2022. Retrieved from https://msandbu.org/tessell-a-new-way-to-provide-dbaas-in-public-cloud/ (accessed Apr. 6, 2023).
Sanglaji, Maryam et al. "Nutanix Era: Databases Made Simple" (published 2018) Nutanix, from https://www.nutanix.com/blog/nutanix-era-databases-made-simple (accessed Dec. 18, 2019).
Sanglaji, Maryam et al. "Nutanix Era: One-click Database Management (London)" (published 2018) .NEXT Conference 2018, from https://next.nutanix.com/next-conference-2018-54/nutanix-era-one-click-database-manag (accessed Dec. 18, 2019).
Sanglaji, Maryam et al. "Nutanix Era: One-click Database Management" (published 2018) .NEXT Conference 2018, from https://www.dropbox.com/s/tfhw1nbOrcvexg3/NEXTEURO2018%20-%20Nutanix%20Era-One%20click%20Database%20Management.pdf?dl=0 (accessed Dec. 18, 2019).
SAP. "Add or Remove Databases in a Database Group" SAP HANA Administration with SAP HANA Cockpit. Mar. 13, 2023. Retrieved from https://help.sap.com/docs/SAP_HANA_COCKPIT/afa922439b204e9caf22c78b6b69e4f2/f22f53ea802443b9bb4f2ce428b35f54.html (accessed Aug. 30, 2023).
SAP. "Create a Database Group" SAP HANA Administration with SAP HANA Cockpit. Mar. 13, 2023. Retrieved from https://help.sap.com/docs/SAP_HANA_COCKPIT/afa922439b204e9caf22c78b6b69e4f2/7b3a48291307478d840af842722ad69d.html (accessed Aug. 30, 2023).
Sathaye, Praseeda. "Using IAM database authentication with workloads running on Amazon EKS" AWS Blog. May 27, 2022. Retrieved from https://aws.amazon.com/blogs/containers/using-iam-database-authentication-with-workloads-running-on-amazon-eks/ (accessed Oct. 11, 2023).
Savjani, Parikshit, "Automate your Azure Database for MySQL deployments using ARM templates," Microsoft Azure, published Nov. 1, 2018, retrieved Sep. 29, 2022 from https://azure.microsoft.com/en-us/blog/automate-your-azure-database-for-mysql-deployments-using-arm-templates/.
Sereno Cloud Solution. "Nutanix 1 Click Database Service by ERA" Medium Enterprise Clouds. Jan. 2021. Retrieved from https://www.serenoclouds.com/medium-enterprise-clouds/private-hybrid-clouds/nutanix-enterprise-cloud-solution/nutanix-1-click-database-service-by-era/ (accessed Jul. 26, 2023).
Shah, Manish. "Gen 2 Exadata Cloud at Customer New Features: Shared Oracle_Home" Exadata Database Machine. Jun. 2, 2020. Retrieved from https://blogs.oracle.com/exadata/post/gen-2-exadata-cloud-at-customer-new-features-shared-oracle-home (accessed Aug. 30, 2023).
Sharif, Ashraf. "Making Your Database Components Highly Available (HA) via Load Balancers". Several Nines. Mar. 20, 2018. Retrieved from https://severalnines.com/blog/become-clustercontrol-dba-making-your-db-components-ha-load-balancers (Year: 2018).
Sharma, Madhurkant. "Cloud Computing Platforms and Technologies" Geeks for Geeks. Sep. 8, 2018. Retrieved from https://www.geeksforgeeks.org/cloud-computing-platforms-and-technologies/ (accessed Jul. 26, 2023).
Singh, Deepak. "Cluster Management with Amazon ECS" AWS Compute Blog. Feb. 6, 2015. Retrieved from https://aws.amazon.com/blogs/compute/cluster-management-with-amazon-ecs/ (accessed Apr. 6, 2023).
Sommer, Chris. "Beware the automated backup window when running native SQL Server backups in RDS" SQL Server Central. Aug. 4, 2017. Retrieved from https://www.sqlservercentral.com/blogs/beware-the-automated-backup-window-when-running-native-sql-server-backups-in-rds (accessed Dec. 7, 2023).
Sontakke, Sagar, et al. "Tessell Availability Machine: Why, What, How?" Tessell. Aug. 17, 2023. Retrieved from https://www.tessell.com/blogs/why-what-how-of-tessell-availability-machine (accessed Dec. 7, 2023).
Stack Exchange Users. "PostgreSQL High Availability/Scalability using HAProxy and PGBouncer" Stack Exchange. Nov. 2020. Retrieved from https://dba.stackexchange.com/questions/56559/postgresql-high-availability-scalability-using-haproxy-and-pgbouncer (Year: 2020).
Stepan, "How to Set Up Multi-Cluster Load Balancing with GKE", DoiT International. Aug. 17, 2020. Received from https://blog.doit-intl.com/how-to-setup-multi-cluster-load-balancing-with-gke-4b407e1f3dff (Year: 2020).
Steven Tom, Idaho National Laboratory, "Recommended Practice for Patch Management of Control Systems", Dec. 2008, Cybersecurity Infrastructure Security Agency (CISA), U.S. Department of Homeland Security. (Year: 2008).
Stone, "Cross Tenant Access", LoanPro Help, https://help.loanpro.io/article/vyy37c5bhd-cross-tenant-access, accessed Jun. 29, 2022.
Storti, Brian "A Primer on Database Replication" Brianstorti.com (May 23, 2017) from https://www.brianstorti.com/replication/ (accessed Jun. 28, 2021).
Tabbara, Bassam, et al. "Introducing Crossplane—An Open Source Multi-Cloud Control-Plane" Dec. 4, 2018. Retrieved from https://docs.google.com/document/d/1whncqdUeU2cATGEJhHvzXWC9xdK29Er45NJeoemxebo/mobilebasic (accessed Sep. 28, 2023).
Tahir, Saqlain. "Field Notes: SQL Server Deployment Options on AWS Using Amazon EC2" AWS Architecture Blog. Jun. 18, 2021. Retrieved from https://aws.amazon.com/blogs/architecture/field-notes-sql-server-deployment-options-on-aws-using-amazon-ec2/ (accessed Apr. 6, 2023).
Taking a Backup Using Snapshots, Lvm Howto, Chapter 13 Recipes.
Tang, "Multi-tenant access control for cloud services", Aug. 2014, The University of Texas at San Antonio College of Sciences.
Tarvo, Alexander et al., "CanaryAdvisor: a statistical-based tool for canary testing (demo)" Proceedings of the 2015 International Symposium on Software Testing and Analysis (ISSTA 2015), pp. 418-422, Jul. 13, 2015, DOI: 10.1145/2771783.2784770 (Year: 2015).
Ten Six. "How to Assign a Task Calendar in Microsoft Project" Ten Six Consulting. Feb. 27, 2018. Retrieved from https://tensix.com/how-to-assign-a-task-calendar-in-microsoft-project/ (accessed Sep. 28, 2023).
Tessell for Oracle, "Fully-managed, high-performance Oracle databases with enterprise-grade data protection, security, and compliance@ your terms", 2022, https://www.tessell.io/services/oracle.
Tessell. "Announcing SOC 2 Type I Certification for Tessell" Tessell. Mar. 31, 2023. Retrieved from https://tessell.com/blogs/tessell-soc2-type1 (accessed May 9, 2023).
Tessell. "Announcing SOC 2 Type II Certification for Tessell" Tessell. Jul. 11, 2023. Retrieved from https://www.tessell.com/blogs/tessell-soc2-type2 (accessed Dec. 7, 2023).
Tessell. "Availability Machine" GitHub. Nov. 2022. Retrieved from https://raw.githubusercontent.com/tessell-cloud/terraform-provider-tessell/main/internal/model/availability_machine.go (accessed Jul. 26, 2023).
Tessell. "AWS Tessell for Oracle" Tessell. Jun. 2023. Retrieved from https://tessell.com/aws/oracle (accessed Jul. 26, 2023).

(56) References Cited

OTHER PUBLICATIONS

Tessell. "Azure Tessell for Oracle" Microsoft. Retrieved from https://azuremarketplace.microsoft.com/en-us/marketplace/apps/tessellinc1655919615020.tessell_database_service?ocid=GTMRewards_WhatsNewBlog_healthcareazurecloudsecurityassessment_Vol160&tab=Overview (accessed Apr. 6, 2023).
Tessell. "Azure Tessell for Oracle" Tessell. May 2023. Retrieved from https://tessell.com/azure/oracle (accessed Jul. 26, 2023).
Tessell. "Cloud Databases. Done Right. At Scale." Tessell. Retrieved from https://tessell.com/ (accessed Apr. 6, 2023).
Tessell. "Differentiated Infrastructure. Delightful Management." Tessell. 2023. Retrieved from https://query.prod.cms.rt.microsoft.com/cms/api/am/binary/RW13XNT (accessed Apr. 6, 2023).
Tessell. "It's official: Tessell's DBaaS is Co-Sell Ready with Microsoft Azure" LinkedIn. May 2023. Retrieved from https://www.linkedin.com/posts/tessell-inc_its-official-tessells-dbaas-is-co-sell-activity-7059272432456495105-ql_A/?trk=public_profile_like_view (accessed Dec. 7, 2023).
Tessell. "It's official: Tessell's DBaaS is Co-Sell Ready with Microsoft Azure" Tessell. Mar. 10, 2023. Retrieved from https://tessell.com/blogs/azure-tessell-ip-co-sell (accessed May 9, 2023).
Tessell. "It's official: Tessell's DBaaS is Co-Sell Ready with Microsoft Azure" Tessell. Mar. 10, 2023. Retrieved from https://www.tessell.com/blogs/azure-tessell-ip-co-sell (accessed Dec. 7, 2023).
Tessell. "Microsoft SQL Server patching support in Tessell" What's new on Tessell. Jun. 27, 2023. Retrieved from https://release-notes.tessell.com/en/microsoft-sql-server-patching-support-in-tessell-kdeFTDgb?utm_source=beamer&utm_medium=standalone&utm_campaign=Microsoft-SQL-Server-patching-support-in-Tessell&utm_content=textlink (accessed Dec. 7, 2023).
Tessell. "Migrating a #SQLServer #database to a multi-cloud environment poses many challenges." Twitter. Retrieved from https://twitter.com/tessell/status/1631039267672674304 (accessed Apr. 20, 2023).
Tessell. "Multi-AZ High Availability for Oracle Standard Edition 2" Tessell. Jun. 2022. Retrieved from https://query.prod.cms.rt.microsoft.com/cms/api/am/binary/RW10vv8 (accessed Apr. 13, 2023).
Tessell. "Multi-AZ High Availability for Oracle Standard Edition 2" Tessell. Jun. 2022. Retrieved from https://query.prod.cms.rt.microsoft.com/cms/api/am/binary/RW13XNV (accessed Apr. 6, 2023).
Tessell. "Patch your databases in one-click @ your terms" What's new on Tessell. May 5, 2023. Retrieved fromhttps://release-notes.tessell.com/en/patch-your-databases-in-one_click-your-terms-qOzrS7ua (accessed Dec. 7, 2023).
Tessell. "Plans & Pricing" Tessell. Retrieved from https://tessell.com/pricing?show=service (accessed Apr. 6, 2023).
Tessell. "Pricing Guide" Tessell. Retrieved from https://tessell.com/pricing/guide?engine=PostgreSQL&cloud=AWS&workload=High Performance&deploymentOption=Professional&workflow=self (accessed Apr. 6, 2023).
Tessell. "Product Help, FAQs, Knowledge Base, and more . . . " Tessell. Retrieved from https://help.tessell.com/en/ (accessed Apr. 6, 2023).
Tessell. "Product Overview" AWS Marketplace. Retrieved from https://aws.amazon.com/marketplace/pp/prodview-h2caqujt4pp3q (accessed Apr. 6, 2023).
Tessell. "Tessell Blogs" Tessell. Retrieved from https://tessell.com/blogs (accessed May 9, 2023).
Tessell. "Tessell Database as a Service" AWS Marketplace. Retrieved from https://aws.amazon.com/marketplace/seller-profile?id=37c6e91e-5c34-43b2-b938-91ac9f9b9a73 (accessed Apr. 6, 2023).
Tessell. "Tessell for Enterprises" Tessell. Jan. 2023. Retrieved from https://tessell.com/platform/enterprises (accessed Apr. 6, 2023).
Tessell. "Tessell for MySQL" Tessell. Dec. 1, 2022. Retrieved from https://tessell.io/services/mysql (accessed Dec. 7, 2023).
Tessell. "Tessell for MySQL" Tessell. Mar. 2023. Retrieved from https://tessell.com/services/mysql (accessed Apr. 6, 2023).
Tessell. "Tessell for Oracle on Azure" LinkedIn. Jun. 2022. Retrieved from https://www.linkedin.com/posts/tessell-inc_tessell-for-oracle-on-azure-activity-7069795242467557376-1Guw/?utm_source=share&utm_medium=member_desktop (accessed Jul. 26, 2023).
Tessell. "Tessell for Oracle" Tessell. Dec. 2022. Retrieved from https://tessell.com/services/oracle (accessed Apr. 6, 2023).
Tessell. "Tessell for PostgreSQL" Tessell. Retrieved from https://tessell.com/services/postgresql (accessed Apr. 6, 2023).
Tessell. "Tessell for SQL Server" Tessell. Jan. 2023. Retrieved from https://tessell.com/services/sqlserver (accessed Apr. 6, 2023).
Tessell. "Tessell for Startups" Tessell. 2023. Retrieved from https://www.tessell.com/platform/startups (accessed Dec. 7, 2023).
Tessell. "Tessell for Startups" Tessell. Retrieved from https://tessell.com/platform/developers (accessed Apr. 6, 2023).
Tessell. "Tessell Welcomes Oracle Database@Azure" Tessell. Sep. 19, 2023. Retrieved from https://www.tessell.com/blogs/tessell-welcomes-oracle-database-azure (accessed Dec. 7, 2023).
Tessell. "Tessell" LinkedIn. 2023. Retrieved from https://www.linkedin.com/company/tessell-inc/posts/?feedView=all (accessed Jul. 26, 2023).
Tessell. "Tessell" Twitter. Retrieved from https://twitter.com/tessell (accessed Apr. 20, 2023).
Tessell. "Tessell" YouTube. Retrieved from https://www.youtube.com/channel/UCMSdbKchVXPIEreaRbW-fLw?app=desktop (accessed Apr. 6, 2023).
Tessell. "tessell_db_service (Resource)" Terraform. Jun. 2023. Retrieved from https://registry.terraform.io/providers/tessell-cloud/tessell/latest/docs/resources/db_service#nested-schema-for-instances (accessed Jul. 26, 2023).
Tessell. "The Tessell platform provides unparalleled security for your data and users" Tessell Data Transform Enterprise. Retrieved from https://query.prod.cms.rt.microsoft.com/cms/api/am/binary/RE50pqt (accessed Apr. 13, 2023).
Tessell. "The Tessell platform provides unparalleled security for your data and users" Tessell. Jun. 2022. Retrieved from https://query.prod.cms.rt.microsoft.com/cms/api/am/binary/RW13XNU (accessed Apr. 6, 2023).
Tessell. "We take care of your data infrastructure and data management needs" Tessell. Retrieved from https://www.tessell.com/about-us (accessed Apr. 6, 2023).
Tessell. "What's new on Tessell" Tessell. Dec. 4, 2023. Retrieved from https://release-notes.tessell.com/en (accessed Dec. 7, 2023).
The Nutanix Bible; from https://nutanixbible.com/; accessed on Jan. 12, 2016.
The Nutanix Bible; from https://nutanixbible.com/; accessed on Jun. 25, 2018.
The Nutanix Bible; from https://nutanixbible.com/; accessed on Jan. 3, 2017.
The Nutanix Bible; from https://nutanixbible.com/; accessed on Jan. 3, 2018.
The Nutanix Bible; from https://nutanixbible.com/; accessed on Sep. 4, 2015.
The Nutanix Bible; from https://nutanixbible.com/; accessed on Jan. 8, 2019.
The Nutanix Bible; from https://nutanixbible.com/; accessed on Jun. 8, 2017.
The Nutanix Bible; from https://nutanixbible.com/; accessed on Jun. 9, 2016.
Tudip Digital. "What is Deployment Manager?" Tudip. Jun. 24, 2019. Retrieved from https://tudip.com/blog-post/what-is-deployment-manager/ (accessed Sep. 6, 2023).
Twitter Video screenshots for Tessell. "Tessell's delightful data management . . . " Twitter. Apr. 19, 2023. https://twitter.com/tessell/status/1648775051980816385 [twitter.com].
US Notice of Allowance on U.S. Appl. No. 17/006,595 Dtd Feb. 18, 2022.
Virtualization Works, "VMware vFabric Data Director" Virtualization Works: VMware Authorized Online Reseller, (Jun. 2021) from https://www.virtualizationworks.com/vFabric-Data-Director.asp#:~:text=VMware%C2%AE%20vFabric%E2%84%A2%20Data,agility%20and%20reducing%20database%20TCO (accessed Jun. 28, 2021).
Viveros, P., et al. "Optimal grouping and scheduling of preventive maintenance activities" Research Publishing, Singapore. Nov. 1, 2020. Retrieved from https://re.public.polimi.it/retrieve/handle/11311/1181262/685019/ (accessed Sep. 28, 2023).

(56) References Cited

OTHER PUBLICATIONS

VMware "VMware vFabric Data Director Administrator and User Guide: Clone a Database" (2012) from https://pubs.vmware.com/datadirector/index.jsp?topic=%2Fcom.vmware.datadirector.admin.doc%2FGUID-426EEA1E-BF44-462F-B400-E2421F53144D.html (accessed Dec. 17, 2019).
VMware Horizon, "Horizon Control Plane Services Architecture", Sep. 2021, https://images.techzone.vmware.com/sites/default/files/resource/horizon_control_plane_services_architecture noindex.pdf.
VMware Tanzu, "Innovate and grow your business on any and many clouds—fast", 2022.
VMware, "Clone a Virtual Machine," VMware Fusion, published Sep. 3, 2020, retrieved Sep. 11, 2022 from https://docs.vmware.com/en/VMware-Fusion/12/com.vmware.fusion.using.doc/GUID-482C606F-0143-4466-A64A-F64116BC5430.html.
VMware, "Create a Workload Cluster Template," VMware Telco Cloud Automation, published Apr. 6, 2021, retrieved on Sep. 29, 2022 from https://docs.vmware.com/en/VMware-Telco-Cloud-Automation/1.9/com.vmware.tca.userguide/GUID-E33A228F-4FB6-41BB-BC8E-ABOD3642B788.html.
VMware, "Deploy a Virtual Machine from a Template in the vSphere Web Client," VMware vSphere, published Apr. 8, 2021, retrieved Sep. 29, 2022 from https://docs.vmware.com/en/VMware-vSphere/6.7/com.vmware.vsphere.vm_admin.doc/GUID-8254CD05-CC06-491D-BA56-A773A32A8130.html.
VMware, "Getting Started with Database Ingestion," VMware vFabric Data Director 2.0, retrieved Sep. 11, 2022 from https://www.vmware.com/pdf/vfabric-data-director-20-database-ingestion-guide.pdf.
VMware, "Horizon 7 Administration," VMware Horizon 7 7.13, published Oct. 2020, retrieved Sep. 11, 2022 from https://docs.vmware.com/en/VMware-Horizon-7/7.13/horizon-administration.pdf.
VMware, "Horizon Cloud on Microsoft Azure Architcture", https://techzone.vmware.com/resource/horizon-cloud-on-microsoft-azure-architecture#introduction.
VMware, "Horizon Cloud Pods in Microsoft Azure—Create a VDI Multi-Cloud Assignment in Your Horizon Cloud Tenant Environment", Aug. 8, 2022, https://docs.vmware.com/en/VMware-Horizon-Cloud-Service/services/hzncloudmsazure.admin15/GUID-9EE86FC9-49CB-4995-8346-3AA76CCE96F8.html.
VMware, "Horizon Control Plane Services Architecture", Sep. 2021, https://images.techzone.vmware.com/sites/default/files/resource/horizon_control_plane_services_architecture_noindex.pdf.
VMware, "Horizon Messaging", Nov. 16, 2022. https://docs.vmware.com/en/VMware-Horizon-7/7.13/horizon-architecture-planning/GUID-39B5D03B-F619-4355-A30A-F8544D95539C.html.
VMware, "Learn More About Network Profiles in vRealize Automation Cloud", Jan. 23, 2022. https://docs.vmware.com/en/vRealize-Automation/services/Using-and-Managing-Cloud-Assembly/GUID-01E442EE-4004-4ED1-AA32-9CF73F24CB09.html.
VMware, "Managing Virtual Machines in VMware Cloud on AWS," VMware Cloud on AWS, published Feb. 11, 2021, retrieved on Sep. 29, 2022 from https://docs.vmware.com/en/VMware-Cloud-on-AWS/services/com.vmware.vsphere.vmc-aws-manage-data-center-vms.doc/GUID-5ED3C460-9E84-4E12-90CF-48EB9EDDCDD6.html.
VMware, "Setting Up Virtual Desktops in Horizon Console," VMware Horizon 7 7.13, published Oct. 2020, retrieved Sep. 11, 2022 from https://docs.vmware.com/en/VMware-Horizon-7/7.13/virtual-desktops.pdf.
VMware, "Snapshot Files," VMware vSphere, published Jul. 29, 2022, retrieved Sep. 11, 2022 from https://docs.vmware.com/en/VMware-vSphere/7.0/com.vmware.vsphere.vm_admin.doc/GUID-38F4D574-ADE7-4B80-AEAB-7EC502A379F4.html.
VMware, "Understanding Clones in VMware vSphere 7," Performance Study, published May 27, 2021, retrieved on Sep. 11, 2022 from https://www.vmware.com/content/dam/digitalmarketing/vmware/en/pdf/techpaper/performance/cloning-vSphere7-perf.pdf.
VMware, "Using VMware Workstation Pro," VMware Workstation Pro 16.0, published 2021, retrieved Sep. 11, 2022 from https://docs.vmware.com/en/VMware-Workstation-Pro/16.0/workstation-pro-16-user-guide.pdf.
VMware, "VMware Horizon 7 Instant-Clone Desktops And RDSH Servers," VMware Horizon 7.x, published Jul. 2017, retrieved Sep. 11, 2022 from https://www.vmware.com/content/dam/digitalmarketing/vmware/en/pdf/techpaper/vmware-horizon-view-instant-clone-technology.pdf.
VMware, "VMware Horizon on VMware vSAN Best Practices," Technical White Paper, published Dec. 2020, retrieved Sep. 11, 2022 from https://www.vmware.com/content/dam/digitalmarketing/vmware/en/pdf/products/vsan/vmware-horizon-7-on-vmware-vsan-best-practices.pdf.
VMware, "VMware vFabric Data DirectorAdministrator and User Guide," vFabric Data Director 1.0, retrieved Sep. 11, 2022 from https://usermanual.wiki/vmware/vfabricdatadirector10ag.715740134/view.
VMware, "VMware vStorage Virtual Machine File System," Vmware Technical White Paper Updated for VMware Vsphere 4 Version 2.0, retrieved Sep. 11, 2022 from https://www.vmware.com/content/dam/digitalmarketing/vmware/en/pdf/techpaper/vmware-vmfs-tech-overview-white-paper.pdf.
VMware, "vRealize Automation Cloud and VMware Cloud on AWS", May 11, 2021. https://www.vmware.com/content/dam/digitalmarketing/vmware/en/pdf/vrealize-automation/vmw-vrealize-automation-cloud-on-aws-solution-brief.pdf.
VMware, "Create a Workload Cluster Template" (published Apr. 6, 2021) from https://docs.vmware.com/en/VMware-Telco-Cloud-Automation/1.9/com.vmware.tca.userguide/GUID-E33A228F-4FB6-41BB-BC8E-AB0D3642B788.html (accessed Sep. 10, 2021).
VMware, "Deploy a Virtual Machine from a Template in the vSphere Web Client" (published Apr. 8, 2021) from https://docs.vmware.com/en/VMware-vSphere/6.7/com.vmware.vsphere.vm_admin.doc/GUID-8254CD05-CC06-491D-BA56-A773A32A8130.html (accessed Sep. 10, 2021).
VMware, "Getting Started with Database-as-a-Service" VMware vFabric Data Director 2.0 (2012) from https://www.vmware.com/pdf/vfabric-data-director-20-database-as-a-service-guide.pdf (accessed Jun. 2, 2021).
VMware, "Managing Virtual Machines in VMware Cloud on AWS" (published Feb. 11, 2021) from https://docs.vmware.com/en/VMware-Cloud-on-AWS/services/com.vmware.vsphere.vmc-aws-manage-data-center-vms.doc/GUID-5ED3C460-9E84-4E12-90CF-48EB9EDDCDD6.html (accessed Sep. 10, 2021).
VMware, "Virtual Volumes and Replication" VMware Docs (May 31, 2019) from https://docs.vmware.com/en/VMware-vSphere/6.5/com.vmware.vsphere.storage.doc/GUID-6346A936-5084-4F38-ACB5-B5EC70AB8269.html (accessed Jun. 2, 2021).
VMware, "VMware vFabric Data Director 2.0: Getting Started with Database Provisioning" (2012) from https://www.vmware.com/pdf/vfabric-data-director-20-database-provision-guide.pdf (accessed Dec. 18, 2019).
VMware, "What's New in vSphere 7 Core Storage" VMware The Cloud Platform Tech Zone (May 17, 2021) from https://core.vmware.com/resource/whats-new-vsphere-7-core-storage#sec2-sub5 (accessed Jun. 2, 2021).
VMware, "What's New: vSphere Virtual Volumes" VMware Storage Business Unit Documentation (Aug. 2015) from https://www.vmware.com/content/dam/digitalmarketing/vmware/en/pdf/products/virtualvolumes/vmware-whats-new-vsphere-virtual-volumes.pdf (accessed Jun. 2, 2021).
VMWare, Cloud Control Plane Management, "Horizon Control Plane Services", Mar. 3, 2021. https://www.vmware.com/in/products/horizon/controlplane.html.
VMware, Create Network Profiles, https://vdc-repo.vmware.com/vmwb-repository/dcr-public/e07569a6-6154-45d7-acdf-595e0b089892/44bb2e01-dd74-44e8-98da-b16f257b9a8d/GUID-35DF1889-6E34-449E-915A-3BC5C4DA172C.html.
Vogels, Werner. "Under the Hood of Amazon EC2 Container Service" All Things Distributed. Jul. 20, 2015. Retrieved from https://www.allthingsdistributed.com/2015/07/under-the-hood-of-the-amazon-ec2-container-service.html (accessed Apr. 6, 2023).

(56) References Cited

OTHER PUBLICATIONS

Warner, Alex et al., "Chapter 16—Canarying Releases" (published 2018) Google Workbook published by O'Reilly Media, Inc., from https://sre.google/workbook/canarying-releases/ (accessed Sep. 14, 2021).
Warren, "Internet Archive Wayback Machine Introduces New Beta Version With Calendar View." warren's blog, published Jan. 23, 2011 (Retrieved from the Internet Apr. 7, 2020). Internet URL: <warrenduecker.blogspot.com/2011/01/internet-archive-wayback-machine.html> (Year: 2011).
WebDeveloper Juice, "7 Beatiful Web Based Timeline Using Javascript and CSS," WebDeveloper Juice, published Sep. 28, 2011, retrieved Feb. 11, 2022 from <https://www.webdeveloperjuice.com/2011/09/28/7-beautiful-web-based-timeline-using-javascript-and-css/> (Year: 2011).
Westermann, Daniel. "pg_auto_failover: Failover and switchover scenarios" Application Integration & Middleware. Nov. 11, 2020. Retrieved from https://www.dbi-services.com/blog/pg_auto_failover-failover-and-switchover-scenarios/ (accessed Jul. 26, 2023).
Wickstrom, Frank, "Keeping personal data personal with database sanitization" Anders. (Jun. 26, 2019) from https://www.anders.com/en/blog/keeping-personal-data-personal-with-database-sanitization/ (accessed Jun. 28, 2021).
Wong, Julie. "OS Management with Oracle Cloud Infrastructure" Oracle Cloud Infrastructure Blog. Mar. 11, 2020. Retrieved from https://blogs.oracle.com/cloud-infrastructure/post/os-management-with-oracle-cloud-infrastructure (accessed Aug. 30, 2023).
YouTube Video for Delphix Corp., "How To Create Database Copies with Delphix," YouTube, Apr. 3, 2018, https://www.youtube.com/watch?v=1 EjR-k4EJ68 [youtube.com].
YouTube Video for Rubrik, "Item-level Recovery with Rubrik SQL Server Live Mount," YouTube, Jul. 12, 2018, https://www.youtube.com/watch?app=desktop&v=Upp4Ume03P0&feature=youtu.be [youtube.com].
YouTube Video screenshots for "Nutanix Business Critical Applications & Databases—.NEXT Europe 2019," YouTube, Oct. 16, 2019, https://www.youtube.com/watch?v=KI7IEmm6j6o [youtube.com].
YouTube Video screenshots for "Nutanix Era .NEXT 2019 Demo," YouTube, May 10, 2019, https://www.youtube.com/watch?v=8hbpfrOSwOU [youtube.com].
YouTube Video screenshots for Alibaba Cloud. "How-to | Launch a MySQL Instance on Alibaba Cloud ApsaraDB for Relational Database Service" YouTube. Feb. 27, 2017. https://youtu.be/E5wGoIVFBuU [youtube.com].
YouTube Video screenshots for Alibaba Cloud. "How-to | Launch a MySQL Instance on Alibaba Cloud ApsaraDB for Relational Database Service" YouTube. Feb. 27, 2017. https://youtube.com/watch?v=E5wGolVFBuU [youtube.com].
YouTube Video screenshots for Alibaba Cloud. "How-to | Set Up a Multi tier WordPress Site on Alibaba Cloud" YouTube. Jun. 25, 2018. https://youtu.be/yWXhibylW6M [youtube.com].
YouTube Video screenshots for Amazon Web Services. "Amazon ECS: Core Concepts" YouTube. Aug. 31, 2017. https://www.youtube.com/watch?app=desktop&v=eq4wL2MiNqo&feature=youtu.be [youtube.com].
YouTube Video screenshots for AOS Note. "How to Create an RDS Database Using CloudFormation" YouTube. Feb. 17, 2021. https://youtu.be/h73xPAwffec [youtube.com].
YouTube Video screenshots for Cloud Advocate. "Google Cloud Deployment Manager—Getting Started" YouTube. Aug. 28, 2020. https://youtu.be/qVKp7W1bfrE [youtube.com].
YouTube Video screenshots for Cloudemy. "Plan Database Disaster Recovery Strategy with RDS Backups & Snapshots | AWS New" YouTube. Jun. 24, 2021. Retrieved from https://www.youtube.com/watch?v=DbK07ptOd-I [youtube.com] (accessed Dec. 7, 2023).
YouTube Video screenshots for Elias Khnaser. "Tessell: A Game-Changer in Cloud Database Technology" You Tube. May 31, 2023. https://youtu.be/snw7Qf8lglk [youtube.com].
YouTube Video screenshots for Firemind. "AWS: How to setup an AWS backup plan—Tutorial" YouTube. Jun. 25, 2020. Retrieved from https://www.youtube.com/watch?v=eYZBRdKnRbc [youtube.com] (accessed Dec. 7, 2023).
YouTube Video screenshots for Nutanix , "Unify Private and Public Clouds with Nutanix Clusters", YouTube, Jul. 31, 2020, https://www.youtube.com/watch?v=xuw4F4wBDoc [youtube.com].
YouTube Video screenshots for Nutanix University. "How To Provision a PostgreSQL cluster using Nutanix Era | Nutanix University" YouTube. Aug. 8, 2019. https://youtube.com/watch?v=FoDGtORWNnU [youtube.com].
YouTube Video screenshots for Nutanix University. "Multicloud Database Provisioning with Nutanix Era Part 1 | Tech Bytes | Nutanix University" YouTube. Oct. 28, 2021. https://youtu.be/q3KOcdyM7PY [youtube.com].
YouTube Video screenshots for Nutanix University. "NDB Administration Settings Part 1 | DB Solution Series #6 | Tech Bytes" YouTube. Jan. 5, 2023. https://youtu.be/8e2vOqzn2Qo [youtube.com].
YouTube Video screenshots for Nutanix University. "Nutanix Era: Provision a database from a backup file Nutanix University" YouTube. Jul. 1, 2021. https://youtu.be/SfpGqaqXsbo [youtube.com].
YouTube Video screenshots for Nutanix, "Nutanix Era .NEXT 2019 Demo", YouTube, May 10, 2019, https://youtu.be/PAWHHdCEArc [youtube.com].
YouTube Video screenshots for Nutanix. "Zero Byte Clone Data Management | Build it Better: DBaaS with Nutanix Era | Part 2%" YouTube. Mar. 17, 2021. https://youtube.com/watch?v=XIGtTA2dM80 [youtube.com].
YouTube Video screenshots for PostgreSQL India. "PGConf India 2023—Nitro Boost your PostgreSQL Workloads by Maneesh Rawat (Tessell)" YouTube. Mar. 21, 2023. https://youtu.be/xV127nWNzMM [youtube.com].
YouTube Video screenshots for Progress User Assistance. "Creating tenants, domains, and users in a Progress OpenEdge multi tenant database" YouTube. May 23, 2016. Retrieved from https://youtu.be/3kGL2afVV_E [youtube.com] (accessed Sep. 28, 2023).
YouTube Video screenshots for Progress. "Data Management: Table Partitioning and Multi-tenancy" YouTube. Oct. 8, 2018. Retrieved from https://www.youtube.com/watch?v=NbEuNmSazh8 [youtube.com] (accessed Sep. 28, 2023).
YouTube Video screenshots for Progress. "Evolving Your OpenEdge Architecture" YouTube. Apr. 26, 2019. Retrieved from https://youtu.be/-7r7xISRe3U [youtube.com] (accessed Sep. 28, 2023).
YouTube Video screenshots for Tessell. "Data management architecture in Azure Tessell" YouTube. Jun. 11, 2023. https://youtu.be/T9owpeb1xuc?t [youtube.com].
YouTube Video screenshots for Tessell. "What is Tessell? Why Tessell?" YouTube. May 19, 2023. https://youtu.be/PB-8HOaSf6c [youtube.com].
YouTube Video screenshots for Tessell. "10X performance/price with Tessell DBaaS" YouTube. Apr. 13, 2023. Retrieved from https://www.youtube.com/watch?v=rwlp9juJOCM [youtube.com] (accessed Dec. 7, 2023).
YouTube Video screenshots for Tessell. "Add Disaster Recovery and Read Replica" YouTube. Nov. 24, 2023. Retrieved from https://www.youtube.com/watch?v=IgPCmfFclX4&ab_channel=Tessell [youtube.com] (accessed Dec. 7, 2023).
YouTube Video screenshots for Tessell. "Compute Curation and Governance in Tessell" YouTube. Nov. 24, 2023. Retrieved from https://www.youtube.com/watch?v=WMk0om-70Gg&ab_channel=Tessell [youtube.com] (accessed Dec. 7, 2023).
YouTube Video screenshots for Tessell. "Create a Clone via Dataflix" YouTube. Nov. 24, 2023. Retrieved from https://www.youtube.com/watch?v=2TvRvnbf30c&ab_channel=Tessell [youtube.com] (accessed Dec. 7, 2023).
YouTube Video screenshots for Tessell. "Create a Multi-AZ Highly Available Database Service" YouTube. Nov. 24, 2023. Retrieved from https://www.youtube.com/watch?v=U6rZPgNmPTQ&ab_channel=Tessell [youtube.com] (accessed Dec. 7, 2023).
YouTube Video screenshots for Tessell. "Create Data Access Policy in Availability Machine" YouTube. Nov. 24, 2023. Retrieved from

(56) References Cited

OTHER PUBLICATIONS https://www.youtube.com/watch?v=8Q4_mdSpAqU&ab_channel=Tessell [youtube.com] (accessed Dec. 7, 2023).
YouTube Video screenshots for Tessell. "Create Start/Stop/Delete Schedule" YouTube. Nov. 24, 2023. Retrieved from https://www.youtube.com/watch?v=2UEqkvz2yJ8&ab_channel=Tessell [youtube.com] (accessed Dec. 7, 2023).
YouTube Video screenshots for Tessell. "Customer database journey with Tessell" YouTube. Nov. 27, 2023. Retrieved from https://www.youtube.com/watch?v=ql286zgyMpE&ab_channel=Tessell [youtube.com] (accessed Dec. 7, 2023).
YouTube Video screenshots for Tessell. "Data management architecture in AWS Tessell" YouTube. Nov. 6, 2023. Retrieved from https://www.youtube.com/watch?v=mKJxVIDbPqs&ab_channel=Tessell [youtube.com] (accessed Dec. 7, 2023).
YouTube Video screenshots for Tessell. "Dataflix—Netflix for Enterprise Data" YouTube. Jul. 10, 2023. Retrieved from https://www.youtube.com/watch?v=euXmHbzl14I [youtube.com] (accessed Dec. 7, 2023).
YouTube Video screenshots for Tessell. "Eliminate IOPS metering for your cloud data infrastructure" YouTube. Oct. 20, 2022. https://www.youtube.com/watch?v=PukOfQ43PmA [youtube.com].
YouTube Video screenshots for Tessell. "Father's Day 2023 at Tessell" YouTube. Jun. 18, 2023. Retrieved from https://www.youtube.com/watch?v =- gd63KGAu8g [youtube.com] (accessed Dec. 7, 2023).
YouTube Video screenshots for Tessell. "Identity and Access Management (IAM) in Tessell" YouTube. Nov. 24, 2023. Retrieved from https://www.youtube.com/watch?v=kUlt4_pPLIM&ab_channel=Tessell [youtube.com] (accessed Dec. 7, 2023).
YouTube Video screenshots for Tessell. "Integrate a Tessell Database Service with Datadog" YouTube Nov. 24, 2023. Retrieved from https://www.youtube.com/watch?v=QIPE_cOkbil&ab_channel=Tessell [youtube.com] (accessed Dec. 7, 2023).
YouTube Video screenshots for Tessell. "Lightning eMotors' mission critical database runs on Tessell" YouTube. Oct. 16, 2023. Retrieved from https://www.youtube.com/watch?v=IXcJ33ydhrY&ab_channel=Tessell [youtube.com] (accessed Dec. 7, 2023).
YouTube Video screenshots for Tessell. "Network Management and Governance in Tessell" YouTube. Nov. 24, 2023. Retrieved from https://www.youtube.com/watch?v =_ QNZI5mLnyU&ab_channel=Tessell [youtube.com] (accessed Dec. 7, 2023).
YouTube Video screenshots for Tessell. "Run mission-critical Oracle databases on Azure" YouTube. May 25, 2023. Retrieved from https://www.youtube.com/watch?v=eqq_IAR6UVc [youtube.com] (accessed Dec. 7, 2023).
YouTube Video screenshots for Tessell. "Security Governance in Tessell" YouTube. Nov. 24, 2023. Retrieved from https://www.youtube.com/watch?v=tc82Y86SFow&ab_channel=Tessell [youtube.com] (accessed Dec. 7, 2023).
YouTube Video screenshots for Tessell. "Subscription Management in Tessell" YouTube. Nov. 24, 2023. Retrieved from https://www.youtube.com/watch?v=K1wGtiyu8lw&ab_channel=Tessell [youtube.com] (accessed Dec. 7, 2023).
YouTube Video screenshots for Tessell. "Switchover in Multi-AZ HA Database Service" YouTube. Nov. 24, 2023. Retrieved from https://www.youtube.com/watch?v=YkiMr716JuQ&ab_channel=Tessell [youtube.com] (accessed Dec. 7, 2023).
YouTube Video screenshots for Tessell. "Tessell—the only DBaaS platform for Oracle on Azure" YouTube. Jun. 2, 2023. Retrieved from https://www.youtube.com/watch?v=icXnpKYoD1w [youtube.com] (accessed Dec. 7, 2023).
YouTube Video screenshots for Tessell. "Tessell—the only DBaaS with zero lock-in policy" YouTube. Sep. 7, 2023. Retrieved from https://www.youtube.com/watch?v=O0WjVMie9C8 [youtube.com] (accessed Dec. 7, 2023).
YouTube Video screenshots for Tessell. "Tessell Availability machine" YouTube. Jul. 2, 2023. Retrieved from https://www.youtube.com/watch?v=CpknFXWaksU [youtube.com] (accessed Dec. 7, 2023).
YouTube Video screenshots for Tessell. "Tessell DBaaS on your choice of cloud at your terms" YouTube. Sep. 14, 2022. https://www.youtube.com/watch?v=sfWo0KyT1 Do [youtube.com].
YouTube Video screenshots for Tessell. "Tessell deployment in your Azure account (BYOA)" YouTube. May 22, 2023. Retrieved from https://www.youtube.com/watch?v=BZRnFURBPpw [youtube.com] (accessed Dec. 7, 2023).
YouTube Video screenshots for Tessell. "Tessell Deployment Options" YouTube. Sep. 16, 2023. Retrieved from https://www.youtube.com/watch?v=ZCBvQzOZOUs [youtube.com] (accessed Dec. 7, 2023).
YouTube Video screenshots for Tessell. "Tessell fixes the broken DBaaS in the Cloud" YouTube. Apr. 25, 2023. Retrieved from https://www.youtube.com/watch?v=-t8bHvHNYwU [youtube.com] (accessed Dec. 7, 2023).
YouTube Video screenshots for Tessell. "Tessell team @ 2 years" YouTube. Apr. 25, 2023. Retrieved from https://www.youtube.com/watch?v=9oefRACSV5w [youtube.com] (accessed Dec. 7, 2023).
YouTube Video screenshots for Tessell. "Tessell team @ 2 years" YouTube. Apr. 25, 2023. Retrieved from https://www.youtube.com/watch?v=T-jLCTJ38MM [youtube.com] (accessed Dec. 7, 2023).
YouTube Video screenshots for Tessell. "Tessell's 2nd anniversary" YouTube. Apr. 13, 2023. Retrieved from https://www.youtube.com/watch?v=tx0ymSLkSdM [youtube.com] (accessed Dec. 7, 2023).
YouTube Video screenshots for Tessell. "Tessell's Deployment Architecture on AWS" YouTube. Oct. 3, 2023. Retrieved from https://www.youtube.com/watch?v=qL-CFPZhcfs&ab_channel=Tessell [youtube.com] (accessed Dec. 7, 2023).
YouTube Video screenshots for Tessell. "Tessell's Deployment Architecture on Azure" YouTube. Oct. 27, 2023. Retrieved from https://www.youtube.com/watch?v=UMT1M5MjgDo&ab_channel=Tessell [youtube.com] (accessed Dec. 7, 2023).
YouTube Video screenshots for Tessell. "Tessell's high-performance durable data infrastructure" YouTube. Sep. 7, 2023. Retrieved from https://www.youtube.com/watch?v=nHZHmCXBF6E [youtube.com] (accessed Dec. 7, 2023).
YouTube Video screenshots for Tessell. "Tessell's Security Architecture on AWS" YouTube. Oct. 18, 2023. Retrieved from https://www.youtube.com/watch?v=GuXKIHhcL8A&ab_channel=Tessell [youtube.com] (accessed Dec. 7, 2023).
YouTube Video screenshots for Tessell. "Tessell's Security Architecture on Azure" YouTube. Oct. 27, 2023. Retrieved from https://www.youtube.com/watch?v=lgV6gQnJ5pQ&ab_channel=Tessell [youtube.com] (accessed Dec. 7, 2023).
YouTube Video screenshots for Tessell. "Tessell. Choice. Power to you." YouTube. Mar. 6, 2023. https://www.youtube.com/watch?v=4DduLUdikRY [youtube.com].
YouTube Video screenshots for Tessell. "Tessell: A Game-Changer in Cloud Database Technology" You Tube. May 31, 2023. Retrieved from https://youtu.be/snw7Qf8lglk [youtube.com] (accessed Dec. 7, 2023).
YouTube Video screenshots for Tessell. "Tessell: DBaaS @ Customer Terms" YouTube. Jun. 27, 2023. Retrieved from https://www.youtube.com/watch?v=u0XBmLyV7EU [youtube.com] (accessed Dec. 7, 2023).
YouTube Video screenshots for Tessell. "Tessell: The de facto data infrastructure and data management platform" YouTube. Jul. 26, 2023. Retrieved from https://www.youtube.com/watch?v=MIv-xA2y9XQ [youtube.com] (accessed Dec. 7, 2023).
YouTube Video screenshots for Tessell. "Time Travel using Dataflix" YouTube. Nov. 24, 2023. Retrieved from https://www.youtube.com/watch?v=IAMkSq7GRKE&ab_channel=Tessell [youtube.com] (accessed Dec. 7, 2023).
YouTube Video screenshots for Tessell. "Unrivaled Data Management by Tessell DBaaS" YouTube. Apr. 13, 2023. Retrieved from https://www.youtube.com/watch?v=ko2e8bFUWg0 [youtube.com] (accessed Dec. 7, 2023).
YouTube Video screenshots for Tessell. "Why Tessell?" YouTube. Jan. 15, 2023. https://www.youtube.com/watch?v=JSOPhTgwrXI [youtube.com].
Yun, Channy. "Amazon RDS Custom for Oracle—New Control Capabilities in Database Environment" AWS News Blog. Oct. 26, 2021. Retrieved from https://aws.amazon.com/blogs/aws/amazon-

(56) References Cited

OTHER PUBLICATIONS rds-custom-for-oracle-new-control-capabilities-in-database-environment/ (accessed Aug. 30, 2023).
Zhang, Junchi, "vFabric Data Director 2.7 customer deck," published May 17, 2013, retrieved Sep. 11, 2022 from https://www.slideshare.net/harryaya/vfabric-data-director-27-customer-deck.
Zhou, Siyuan, et al. "Fault-Tolerant Replication with Pull-Based Consensus in MongoDB" Usenix. Mar. 10, 2021. Retrieved from https://www.usenix.org/system/files/nsdi21-zhou.pdf (accessed Aug. 30, 2023).
"Creating Instances," Google Cloud ("Google") (Wayback Machine Capture, Sep. 18, 2018), available at https://www.archive.org/web/20180918103721/https://cloud.google.com/sql/docs/mysql/create-instance.
&#x201CNutanix Era: Databases Made Simple,&#x201D as archived by the Internet Archive on Sep. 26, 2020, available at http://web.archive.org/web/20200926222827/https://www.nutanix.com/blog/nutanix-era-databases-made-simple (1 of 3).
&#x201CTaking a Backup Using Snapshots&#x201D (&#x201CLVM—Howto&#x201D) (Wayback Machine Capture, Jan. 20, 2007), available at https://web.archive.org/web/20070120200004/https://tldp.org/HOWTO/LVM-HOWTO/snapshots_backup.html (2 of 3).
&#x201CWindows Geo-Clustering: SQL Server, &#x201D published Oct. 12, 2014 ( 3 of 3).
7 more ways to Query Always on Availability Groups, as archived by the Internet Archive on Mar. 30, 2019, available at https://web.archive.org/web/20190330182441/https://sqlundercover.com/2019/02/19/7-more-ways-to-query-always-on-availability-groups/.
Amazon Relational Database Service User Guide (2016) (&#x201CRDS &#x201D) (Wayback Machine Capture, Apr. 12, 2016), available at https://web.archive.org/web/20160412105355/http://docs.aws.amazon.com/AmazonRDS/latest/UserGuide/rds-ug.pdf.
Federal Court Management Statistics&#x2013Profiles, U.S. District Courts&#x2013Combined Civil and Criminal (Dec. 2024).
Order Granting Defendant&#x2019s Motion to Compel Arbitration (staying the remaining claims) in *Nutanix, Inc.* v. *Tessell, Inc.,* Case No. 3:24-cv-01729 (N.D. Cal. Mar. 20, 2024).
SQL Server AlwaysOn Availability Group Backup Preference Setting, as archived by the Internet Archive on Sep. 25, 2020, available at https://www.mssqltips.com/sqlservertip/4976/sql-server-alwayson-availability-group-backup-preference-setting/.
The American Heritage Dictionary of the English Language (5th ed. 2011) ("Heritage").
Use the Availability Group Wizard (SQL Server Management Studio), as archived by the Interne Archive on Jan. 20, 2020, available at https://web.archive.org/web/20200120100053/https://docs.microsoft.com/en-us/sql/database-engine/availability-groups/windows/use-the-availability-group-wizard-sql-server-management-studio?view=sql-server-ver15.
Using Oracle Database Cloud Service &#x2013 Creating a Database Deployment (2017) (&#x201COracle&#x201D) (Wayback Machine Capture, Jan. 18, 2017), available at https://web.archive.org/web/20170118071307/https://docs.oracle.com/en/cloud/paas/database-dbaascloud/csdbi/create-db-deployment.html.
Communication under Rule 71(3) EPC for EP application 23159241.1, Oct. 2, 2025.
Enterprise Manager Lifecycle Management Administrator's Guide, "14 Cloning Oracle Databases and Pluggable Databases", https://web.archive.org/web/20170829005212/https://docs.oracle.com/cd/E24628_01/em.121/e27046/cloning_database.htm#EMLCM93230, 2017, Oracle.
Oracle®, "Oracle® Enterprise Manager Cloud Administration Guide 120 Release 5 (12.1.0.5)E28814-19", Dec. 2015 (Year: 2015).
"Database Management Revolutionized by AI", OCI, https://www.oracle.com/artificial-intelligence/transform-database-management-with-ai/, Oct. 16, 2025.
"AI agents in Azure Cosmos DB", https://learn.microsoft.com/en-us/azure/cosmos-db/ai-agents, Mar. 9, 2025.
"MCP: Transform Database Admin Tasks with LLMs", https://builder.aws.com/content/2umKOtgxiPzrAf0RzQOdnFhGedg/mcp-transform-database-admin-tasks-with-llms, Jun. 8, 2025.
"Oracle Autonomous Database", White Paper Series, 13 pages, Sep. 2018.
"What are the future trends in DBMS technology? Advances in data and systems have led to the following advances in DBMS technology. ", https://aws.amazon.com/what-is/dbms/, Oct. 16, 2025.
Garg, "Neon: The Serverless PostgreSQL Platform Built for AI Agents", Gocodeo, Jun. 16, 2025, https://www.gocodeo.com/post/neon-the-serverless-postgresql-platform-built-for-ai-agents.
Marodia, Democratizing database observability with AI-assisted troubleshooting, https://cloud.google.com/blog/products/databases/inside-ai-assisted-troubleshooting-for-databases, May 13, 2025.
Oracle, "Oracle Autonomous Database Technical Overview", Version [2.1], 20 page, Jul. 2020.
M. A. Murphy, M. Fenn, L. Abraham, J. A. Canter, B. T. Sterrett and S. Goasguen, "Distributed management of virtual cluster infrastructures," 2009 IEEE International Symposium on Parallel & Distributed Processing, Rome, Italy, 2009, pp. 1-8 (Year: 2009).
"An SQL Server DBA&#x2019s Guide to Acfifio GO", https://docs.actifiocom/static/Actifio-GO/PDFs/DBA_SLQServer.pdf, 2001.

* cited by examiner

3100

DATABASE GROUP MANAGEMENT

CROSS-REFERENCE TO RELATED APPLICATIONS

This application is a Continuation of U.S. patent application Ser. No. 17/686,167 filed on Mar. 3, 2022 and claims priority and the benefit of U.S. Provisional Application No. 63/271,585, filed on Oct. 25, 2021, which are incorporated by reference herein in their entireties.

BACKGROUND

Virtual computing systems are widely used in a variety of applications. Virtual computing systems include one or more host machines running one or more virtual machines and other entities (e.g., containers) concurrently. Modern virtual computing systems allow several operating systems and several software applications to be safely run at the same time, thereby increasing resource utilization and performance efficiency. However, the present-day virtual computing systems have limitations due to their configuration and the way they operate.

SUMMARY

In accordance with some aspects of the present disclosure, a non-transitory computer-readable media having computer-readable instructions stored thereon is disclosed. The computer-readable instructions when executed by a processor of a database management system cause the processor to receive request to create a database group, receive selection of a database server virtual machine on which to create the database group to add to the database group, receive selection of at least one database from a list of databases that are not part of another database group, receive selection of a Service Level Agreement ("SLA") and a protection schedule, and create the database group on the database server virtual machine, including associating the database group with the SLA and the protection schedule and adding the at least one database to the database group, wherein each of the at least one database is protected using the same SLA and the protection schedule that is associated with the database group.

In accordance with some aspects of the present disclosure, a system is disclosed. The system includes a memory having computer-readable instructions stored thereon and a processor that executes the computer-readable instructions to receive request to create a database group, receive selection of a database server virtual machine on which to create the database group, receive selection of at least one database from a list of databases that are not part of another database group to add to the database group, receive selection of a Service Level Agreement ("SLA") and a protection schedule, and create the database group on the database server virtual machine, including associating the database group with the SLA and the protection schedule and adding the at least one database to the database group, wherein each of the at least one database is protected using the same SLA and the protection schedule that is associated with the database group.

In accordance with some aspects of the present disclosure, a method is disclosed. The method includes receiving request to create a database group, receiving selection of a database server virtual machine on which to create the database group, receiving selection of at least one database from a list of databases that are not part of another database group to add to the database group, receiving selection of a Service Level Agreement ("SLA") and a protection schedule, and creating the database group on the database server virtual machine, including associating the database group with the SLA and the protection schedule and adding the at least one database to the database group, wherein each of the at least one database is protected using the same SLA and the protection schedule that is associated with the database group.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
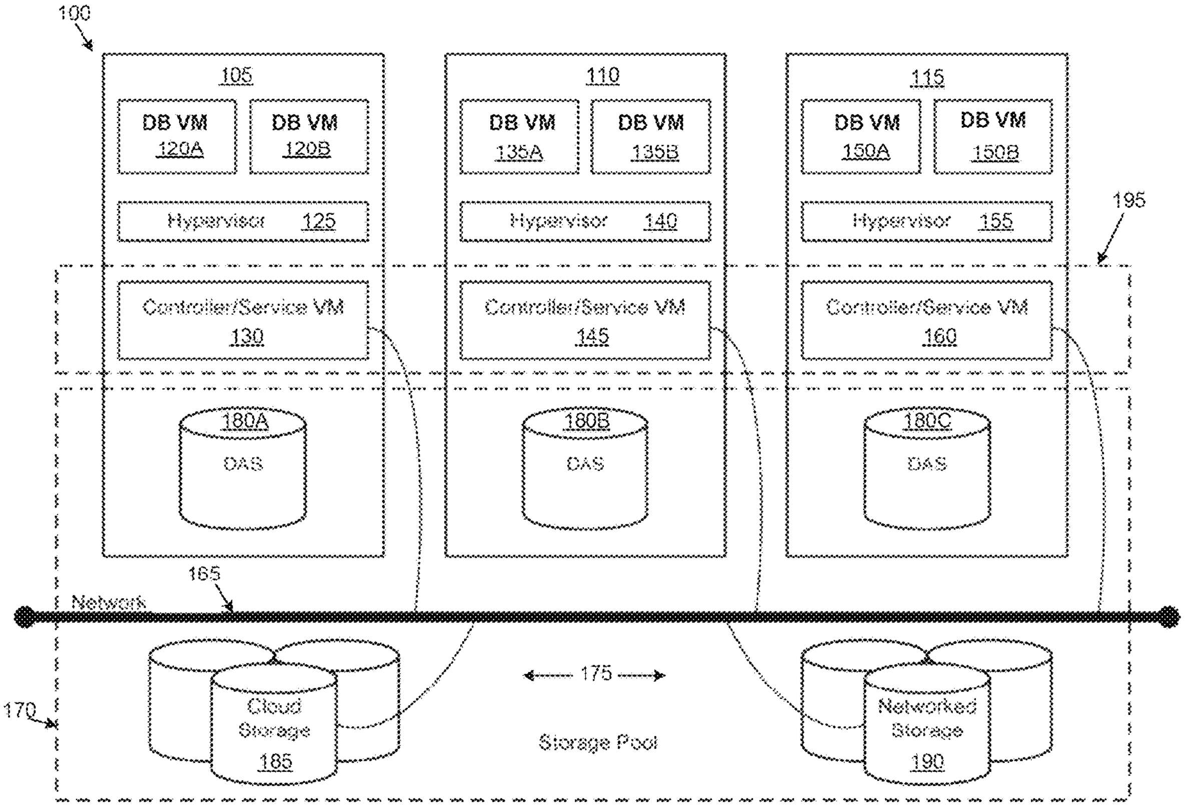
FIG. 1 is an example block diagram of a cluster in a hyperconverged virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

The present disclosure is generally directed to a virtual computing system (e.g., a hyperconverged virtual computing system) having at least one cluster, with the at least one cluster having at least one node. The at least one node includes one or more virtual machines, which may be managed by an instance of a monitor such as a hypervisor. These and other components may be part of a datacenter (whether on-premise or cloud), which may be managed by a user (e.g., an administrator or other authorized personnel). A distributed storage system, for providing storage and protection capabilities, may be associated with the virtual computing system and shared at least partially by each of the at least one node. The virtual computing system may be configured as a database system for providing database management services. For example, at least some of the one or more virtual machines within the virtual computing system may be configured as database server virtual machines (also referred to herein as database virtual machines, database server instances, virtual machine instances, and the like) for storing one or more databases. These databases may be managed by a database management system. The database management system may provide a plurality of database services. For example, in some embodiments, the database system may provide database provisioning services and copy data management services.

Database provisioning services involve creating or provisioning new databases. Creating a database may be a time intensive process and inconvenient for the user. In some embodiments, creating a database may take multiple days. The user may not have the time or desire to wait for multiple days to create a database. Additionally, the user may not be fully privy to or even understand the various configurational details that may be needed to create a database. The present disclosure provides technical solutions to the above problems.

Specifically, the database management system of the present disclosure greatly simplifies the database provisioning service. The database management system of the present disclosure allows the user to quickly and conveniently create a new database and associate the database with the database management system, thereby increasing the usability of the database management system and improving the operations/functionality of the database management system. The entire process of creating and associating the database with the database management system may be completed by the user within a span of a few minutes (or less) instead of the multiple days mentioned above. The database management system of the present disclosure provides a user friendly, intuitive user interface that solicits information from and conveniently walks the user through the various steps for creating a new database within minutes. The database management system may include a catalog of standardized configurations, which the user may select from the user interface for creating the database. The user may modify the standardized configurations or create custom configurations to suit their needs. By virtue of providing standardized configurations, the present disclosure simplifies the database creation process for the user. The user interface also hides the complexity of creating the database from the user. For example, the user need not worry about creating, partitioning, or associating storage space (e.g., storage disk space) with the database that is being created. The user may simply specify a size of the database that is desired in the user interface and the database management system may automatically translate that size into storage space. Thus, based upon the needs of the user, the user is able to specifically tailor the database during creation and create the database easily and quickly using the user interface.

The database management system may also provide the ability to register an existing database with the database management system. Such existing databases may have been created outside of the database management system (e.g., by a different database provider or vendor). Users having existing databases may desire to associate their databases with the database management system (e.g., when changing vendors). Similar to creating a new database in the database management system, registering an existing database with the database management system is easy, convenient, and may be completed within a span of a few minutes (or less) via the user interface(s). As with the creation of a new database, the user interface(s) walk the user through the registration process, provides standardized configurations for the user to select from, ability to modify the standardized configurations, and create new configurations. Upon registering the database with the database management system, the database may take advantage of other database management services offered by the database system.

Another database management service may include copy data management. Copy data management services involve protecting a database. Protecting a database may include replicating a state of the database. Replicating the state of the database may involve creating fully functional read/write copy (e.g., clone) of the database. Replicating the state of the database may also include restoring a database. Since the clones are fully functional copies of the original or source database, a user may perform operations on the cloned copy that would otherwise be performed on the original database. For example, the user may perform reporting, auditing, testing, data analysis, etc. on the cloned copy of the original database. A cloned database or restored database may be created by periodically capturing snapshots of the database. A snapshot stores the state of the database at the point in time at which the snapshot is captured. The snapshot is thus a point in time image of the database. The snapshot may include a complete encapsulation of the virtual machine on which the database is created, including the configuration data of the virtual machine, the data stored within the database, and any metadata associated with the virtual machine. Any of a variety of snapshotting techniques may be used. For example, in some embodiments, copy-on-write, redirect-on-write, near-sync, or other snapshotting methods may be used to capture snapshots. From the snapshot, the source database may be recreated to the state at which the snapshot was captured.

However, the number of snapshots that are captured in a given day may be limited. Specifically, because capturing a snapshot requires quiescing (e.g., pausing) the database and entering a safe mode in which user operations are halted, it may be desirable to take only a minimum number of snapshots in a day. Thus, choices of state that may recreated from a snapshot may be limited. If a state is desired that falls between the capture of two snapshots, the user may be out of luck. Thus, the desire to limit the number of snapshots in a day results in a significant technical problem that results in losing changes made to a database since the last snapshot capture or between two snapshot captures. The present disclosure provides technical solutions to these problems.

Specifically, the present disclosure automatically creates an instance of a database protection system (e.g., time machine) for each database (e.g., source database) that is provisioned or registered with the database management system. The database protection system instance may be configured to protect the database by automatically capturing snapshots of the database. Additionally, to avoid losing changes in state between two snapshot captures or since the last snapshot capture, the database system may capture transactional logs. Backup using transactional logs may create one or more transactional log backup files (e.g., with extension.trn) that record every transaction or change that occurs on the source database since a last snapshot capture. Thus, by using the snapshots or a combination of snapshots and transactional logs, any state of the source database down to the last second (or even fractions of seconds or other time granularities) may be recreated. Specifically, states of the source database that fall between the capture of two snapshots may be recreated by using a combination of snapshots and transactional logs.

The frequency of capturing transactional logs may be higher than the frequency of capturing snapshots in a day. For example, in some embodiments, a transactional log may be captured every 15 minutes. In other embodiments, the user may define the frequency of capturing transactional logs. Further, since the source database is not quiesced (paused) for capturing the transactional log, user operations may continue while the transactional logs are being captured. Further, since the transactional logs only capture the changes in the database since the last snapshot capture, the transactional logs do not consume a lot of space. Thus, clones of the database may be created to a point in time by using a combination of transactional logs and snapshots (e.g., between two snapshot captures), or based upon available snapshots (e.g., at the point of snapshot capture).

Further, the frequency with which the snapshots and transactional logs are captured by the database system may depend upon the level of protection desired by the user. The database management system may solicit a protection schedule and definition of a Service Level Agreement ("SLA") from the user while creating the database (or registering the database). For convenience, the database management system may include built-in defaults of the protections schedule and SLA levels that the user may select from. The user may modify the defaults or define new parameters for the protection schedule and SLA. Thus, the level of protection accorded to each database associated with the database management system may be individually tailored based upon the requirements of the user. The protection schedule may allow the user to define the frequency of snapshots and transactional logs to be captured each day, and the time-period for capturing daily, weekly, monthly, and/or quarterly snapshots based upon the SLA.

In addition to provisioning and copy data management services, the database management system of the present disclosure may be configured for performing a variety of other database services, such as patching, load balancing database snapshot replication for improved scalability (particularly in a multi-cluster environment), cross availability zone database as a service, a singular database as a service for a multi-cloud environment, etc. Thus, in some embodiments, each database that is either provisioned or registered within the database management system or that exists within the database management system (e.g., source database, cloned or restored database) may need to be managed in one way or the other. Further, the operations that may be performed on these databases for a particular type of management operation may be at least somewhat similar.

For example, for every database within the database management system from which a cloned database or restored database is desired, snapshots and/or transactional logs may be captured. As noted above, in some embodiments, a database protection may be associated with each database that is provisioned or registered with the database management system. In some embodiments, the database management system may be managing hundreds or thousands of databases. Thus, hundreds or thousands of database protection system instances may exist within the database management system, all performing the same operations—capturing snapshots and/transactional logs from their associated database. As the number of databases in the database management system increases, the complexity of management of these databases increases as well. Further, the cost of maintaining these databases may increase as well due to need for providing extra resources (e.g., extra storage space, extra servers, etc.). In some embodiments, the performance in the database management system may be impacted as well (e.g., increased latency due to hundreds or thousands of database protection system instances quiescing and unquiescing databases).

Thus, the present disclosure provides a mechanism for performing group operations. Specifically, in some embodiments, certain databases in the database management system may be grouped together to form a group database (also referred to herein as database group, grouped databases, anchor or anchored databases, and the like). Operations may be performed on the grouped databases. For example, instead of performing the same operation individually on each database that forms part of the database group, a single operation may be performed on all the databases in the group, thereby reducing the number of instances that the operation is performed, thereby increasing performance and reducing complexity and cost of management. For example, if 50 databases are in a database group, instead of creating and maintaining 50 different time machines, each individually capturing snapshots and/or transactional logs from their associated database, by grouping the 50 databases in a single group, a single time machine may be created for the entire group and the single time machine may capture snapshots and/or transactional logs from the 50 databases that are in the group. Further, in some embodiments, instead of capturing 50 separate snapshots or staging drive snapshots for the 50 individual databases, a single snapshot and/or a single staging drive snapshot may be captured from the 50 databases that have been grouped together in the single database group.

Thus, the present disclosure provides technical solutions that enable better management of databases by a database management system while increasing performance of the databases and the database management system, as well as consuming fewer computing resources allowing additional functionality to be supported by the database management system.

Referring now to FIG. 1, a cluster 100 of a virtual computing system is shown, in accordance with some embodiments of the present disclosure. The cluster 100 includes a plurality of nodes, such as a first node 105, a second node 110, and a third node 115. Each of the first node 105, the second node 110, and the third node 115 may also be referred to as a "host" or "host machine." The first node 105 includes database virtual machines ("database virtual machines") 120A and 120B (collectively referred to herein as "database virtual machines 120"), a hypervisor 125 configured to create and run the database virtual machines, and a controller/service virtual machine 130 configured to manage, route, and otherwise handle workflow requests between the various nodes of the cluster 100. Similarly, the second node 110 includes database virtual machines 135A and 135B (collectively referred to herein as "database virtual machines 135"), a hypervisor 140, and a controller/service virtual machine 145, and the third node 115 includes database virtual machines 150A and 150B (collectively referred to herein as "database virtual machines 150"), a hypervisor 155, and a controller/service virtual machine 160. The controller/service virtual machine 130, the controller/service virtual machine 145, and the controller/service virtual machine 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165. Further, although not shown, one or more of the first node 105, the second node 110, and the third node 115 may include one or more containers managed by a monitor (e.g., container engine).

The cluster 100 also includes and/or is associated with a storage pool 170 (also referred to herein as storage subsystem). The storage pool 170 may include network-attached storage 175 and direct-attached storage 180A, 180B, and 180C. The network-attached storage 175 is accessible via the network 165 and, in some embodiments, may include cloud storage 185, as well as a networked storage 190. In contrast to the network-attached storage 175, which is accessible via the network 165, the direct-attached storage 180A, 180B, and 180C includes storage components that are provided internally within each of the first node 105, the second node 110, and the third node 115, respectively, such that each of the first, second, and third nodes may access its respective direct-attached storage without having to access the network 165.

It is to be understood that only certain components of the cluster 100 are shown in FIG. 1. Nevertheless, several other components that are needed or desired in the cluster 100 to perform the functions described herein are contemplated and considered within the scope of the present disclosure.

Although three of the plurality of nodes (e.g., the first node 105, the second node 110, and the third node 115) are shown in the cluster 100, in other embodiments, greater than or fewer than three nodes may be provided within the cluster. Likewise, although only two database virtual machines (e.g., the database virtual machines 120, the database virtual machines 135, the database virtual machines 150) are shown on each of the first node 105, the second node 110, and the third node 115, in other embodiments, the number of the database virtual machines on each of the first, second, and third nodes may vary to include other numbers of database virtual machines. Further, the first node 105, the second node 110, and the third node 115 may have the same number of database virtual machines (e.g., the database virtual machines 120, the database virtual machines 135, the database virtual machines 150) or different number of database virtual machines.

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the cluster 100. In some embodiments, the cluster 100 may be part of a data center. Further, one or more of the first node 105, the second node 110, and the third node 115 may be organized in a variety of network topologies. Each of the first node 105, the second node 110, and the third node 115 may also be configured to communicate and share resources with each other via the network 165. For example, in some embodiments, the first node 105, the second node 110, and the third node 115 may communicate and share resources with each other via the controller/service virtual machine 130, the controller/service virtual machine 145, and the controller/service virtual machine 160, and/or the hypervisor 125, the hypervisor 140, and the hypervisor 155.

Also, although not shown, one or more of the first node 105, the second node 110, and the third node 115 may include one or more processors configured to execute instructions. The instructions may be carried out by a special purpose computer, logic circuits, or hardware circuits of the first node 105, the second node 110, and the third node 115. The processors may be implemented in hardware, firmware, software, or any combination thereof. The term "execution" is, for example, the process of running an application or the carrying out of the operation called for by an instruction. The instructions may be written using one or more programming language, scripting language, assembly language, etc. The processors, thus, execute an instruction, meaning that they perform the operations called for by that instruction.

The processors may be operably coupled to the storage pool 170, as well as with other elements of the first node 105, the second node 110, and the third node 115 to receive, send, and process information, and to control the operations of the underlying first, second, or third node. The processors may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. In some embodiments, the processors may execute instructions without first copying the instructions to the RAM. Further, the processors may include a single stand-alone processor, or a plurality of processors that use the same or different processing technology.

With respect to the storage pool 170 and particularly with respect to the direct-attached storage 180A, 180B, and 180C, each of the direct-attached storage may include a variety of types of memory devices that are suitable for a virtual computing system. For example, in some embodiments, one or more of the direct-attached storage 180A, 180B, and 180C may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the network-attached storage 175 may include any of a variety of network accessible storage (e.g., the cloud storage 185, the networked storage 190, etc.) that is suitable for use within the cluster 100 and accessible via the network 165. The storage pool 170, including the network-attached storage 175 and the direct-attached storage 180A, 180B, and 180C, together form a distributed storage system configured to be accessed by each of the first node 105, the second node 110, and the third node 115 via the network 165, the controller/service virtual machine 130, the controller/service virtual machine 145, the controller/service virtual machine 160, and/or the hypervisor 125, the hypervisor 140, and the hypervisor 155. In some embodiments, the various storage components in the storage pool 170 may be configured as virtual disks for access by the database virtual machines 120, the database virtual machines 135, and the database virtual machines 150.

Each of the database virtual machines 120, the database virtual machines 135, the database virtual machines 150 is a software-based implementation of a computing machine. The database virtual machines 120, the database virtual machines 135, the database virtual machines 150 emulate the functionality of a physical computer. Specifically, the hardware resources, such as processor, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the database virtual machines 120, the database virtual machines 135, the database virtual machines 150 that may run its own operating system and applications on the underlying physical resources just like a real computer. By encapsulating an entire machine, including CPU, memory, operating system, storage devices, and network devices, the database virtual machines 120, the database virtual machines 135, the database virtual machines 150 are compatible with most standard operating systems (e.g. Windows, Linux, etc.), applications, and device drivers.

Thus, each of the hypervisor 125, the hypervisor 140, and the hypervisor 155 is a virtual machine monitor that allows a single physical server computer (e.g., the first node 105, the second node 110, third node 115) to run multiple instances of the database virtual machines 120, the database virtual machines 135, and the database virtual machines 150 with each virtual machine sharing the resources of that one physical server computer, potentially across multiple environments. For example, each of the hypervisor 125, the hypervisor 140, and the hypervisor 155 may allocate memory and other resources to the underlying virtual machines (e.g., the database virtual machines 120, the database virtual machines 135, the database virtual machine 150A, and the database virtual machine 150B) from the storage pool 170 to perform one or more functions. In some embodiments, a different type of monitor (or no monitor) may be used instead of the hypervisor 125, the hypervisor 140, and the hypervisor 155.

By running the database virtual machines 120, the database virtual machines 135, and the database virtual machines 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow. When new database virtual machines are created (e.g., installed) on the first node 105, the second node 110, and the third node 115, each of the new database virtual machines may be configured to be associated with certain hardware resources, software resources, storage resources, and other resources within the cluster 100 to allow those virtual machines to operate as intended.

The database virtual machines 120, the database virtual machines 135, the database virtual machines 150, and any newly created instances of the database virtual machines may be controlled and managed by their respective instance of the controller/service virtual machine 130, the controller/service virtual machine 145, and the controller/service virtual machine 160. The controller/service virtual machine 130, the controller/service virtual machine 145, and the controller/service virtual machine 160 are configured to communicate with each other via the network 165 to form a distributed system 195. Each of the controller/service virtual machine 130, the controller/service virtual machine 145, and the controller/service virtual machine 160 may be considered a local management system configured to manage various tasks and operations within the cluster 100. For example, in some embodiments, the local management system may perform various management related tasks on the database virtual machines 120, the database virtual machines 135, and the database virtual machines 150.

The hypervisor 125, the hypervisor 140, and the hypervisor 155 of the first node 105, the second node 110, and the third node 115, respectively, may be configured to run virtualization software, such as, ESXi from virtual machines are, AHV from Nutanix, Inc., XenServer from Citrix Systems, Inc., etc. The virtualization software on the hypervisor 125, the hypervisor 140, and the hypervisor 155 may be configured for running the database virtual machines 120, the database virtual machines 135, the database virtual machine 150A, and the database virtual machine 150B, respectively, and for managing the interactions between those virtual machines and the underlying hardware of the first node 105, the second node 110, and the third node 115. Each of the controller/service virtual machine 130, the controller/service virtual machine 145, the controller/service virtual machine 160, the hypervisor 125, the hypervisor 140, and the hypervisor 155 may be configured as suitable for use within the cluster 100.

The network 165 may include any of a variety of wired or wireless network channels that may be suitable for use within the cluster 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications. The network 165 may also include or be associated with network interfaces, switches, routers, network cards, and/or other hardware, software, and/or firmware components that may be needed or considered desirable to have in facilitating intercommunication within the cluster 100.

Referring still to FIG. 1, in some embodiments, one of the first node 105, the second node 110, or the third node 115 may be configured as a leader node. The leader node may be configured to monitor and handle requests from other nodes in the cluster 100. For example, a particular database virtual machine (e.g., the database virtual machines 120, the database virtual machines 135, or the database virtual machines 150) may direct an input/output request to the controller/service virtual machine (e.g., the controller/service virtual machine 130, the controller/service virtual machine 145, or the controller/service virtual machine 160, respectively) on the underlying node (e.g., the first node 105, the second node 110, or the third node 115, respectively). Upon receiving the input/output request, that controller/service virtual machine may direct the input/output request to the controller/service virtual machine (e.g., one of the controller/service virtual machine 130, the controller/service virtual machine 145, or the controller/service virtual machine 160) of the leader node. In some cases, the controller/service virtual machine that receives the input/output request may itself be on the leader node, in which case, the controller/service virtual machine does not transfer the request, but rather handles the request itself.

The controller/service virtual machine of the leader node may fulfil the input/output request (and/or request another component within/outside the cluster 100 to fulfil that request). Upon fulfilling the input/output request, the controller/service virtual machine of the leader node may send a response back to the controller/service virtual machine of the node from which the request was received, which in turn may pass the response to the database virtual machine that initiated the request. In a similar manner, the leader node may also be configured to receive and handle requests (e.g., user requests) from outside of the cluster 100. If the leader node fails, another leader node may be designated.

Additionally, in some embodiments, although not shown, the cluster 100 may be associated with a central management system that is configured to manage and control the operation of multiple clusters in the virtual computing system. In some embodiments, the central management system may be configured to communicate with the local management systems on each of the controller/service virtual machine 130, the controller/service virtual machine 145, the controller/service virtual machine 160 for controlling the various clusters.

Again, it is to be understood again that only certain components and features of the cluster 100 are shown and described herein. Nevertheless, other components and features that may be needed or desired to perform the functions described herein are contemplated and considered within the scope of the present disclosure. It is also to be understood that the configuration of the various components of the cluster 100 described above is only an example and is not intended to be limiting in any way. Rather, the configuration of those components may vary to perform the functions described herein.

Figure 2:
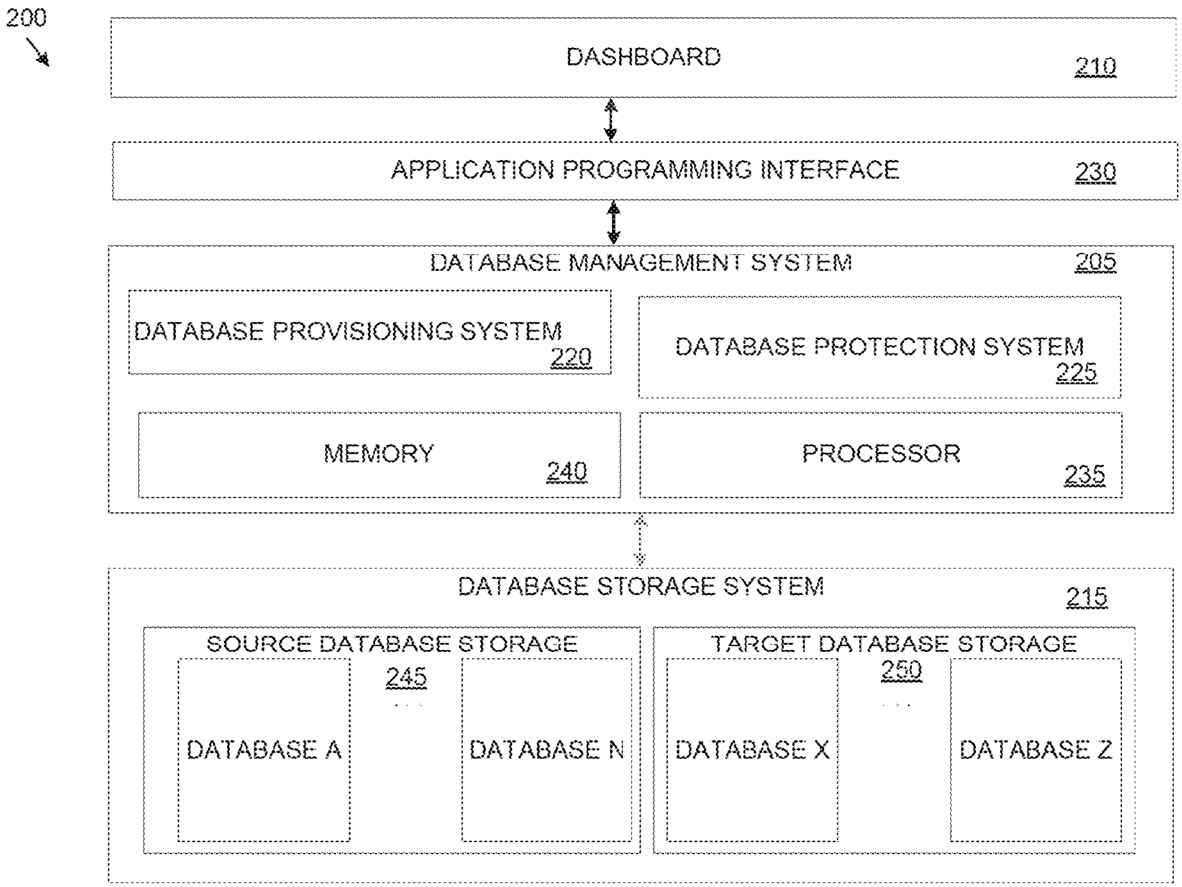
FIG. 2 is an example block diagram of a database system in the virtual computing system of FIG. 1, in accordance with some embodiments of the present disclosure.

Turning now to FIG. 2, an example block diagram of a database system 200 is shown, in accordance with some embodiments of the present disclosure. FIG. 2 is discussed in conjunction with FIG. 1. The database system 200 or portions thereof may be configured as utility software for creating and implementing database management services. The database system 200 is configured to facilitate creation/registration, protection, querying, and/or administration of the databases associated therewith. In other words, the database system 200 is configured to provide a variety of database services or database management services related to the databases associated therewith. Thus, the database system 200 includes a database management system 205 that is configured to receive input from and provide output to a user via a dashboard 210. The database management system 205 is also associated with a database storage system 215 that is configured to store one or more databases under management of the database system 200. In association with the dashboard 210 and the database storage system 215, the database management system 205 is configured to implement one or more database management services of the database system 200. For example, the database management system 205 may be configured to provide database provisioning services to create new databases or database registration services to register existing databases with the database system 200 using a database provisioning system 220. The database management system 205 may also be configured to protect databases created or registered by the database provisioning system 220 via a database protection system 225, as well as provide other types of database management services. Although the database provisioning system 220 and the database protection system 225 are shown as separate components, in some embodiments, the database provisioning system and the database protection system may be combined, and the combined component may perform the operations of the individual components. Although not shown, the database management system 205 may include other or additional components that provide other or additional database management services. The database management system 205 may also be referred to herein as a "database service," "Era service," or "Era server."

The database system 200 may be installed on a database virtual machine (e.g., the database virtual machines 120, the database virtual machines 135, the database virtual machines 150 of FIG. 1). The database system 200 may be installed via the controller/service virtual machine (e.g., the controller/service virtual machine 130, the controller/service virtual machine 145, the controller/service virtual machine 160) of the node (e.g., the first node 105, the second node 110, and the third node 115) on which the database system is to be installed. For example, an administrator desiring to install the database system 200 may download a copy on write image file (e.g., qcow or qcow2 image file) on the controller/service virtual machine to define the content and structure of a disk volume to be associated with the database system 200. In some embodiments, instead of a copy on write image file, another type of disk image file, depending upon the type of underlying hypervisor, may be installed. Further, the administrator may create or one or more new database virtual machines on which the database system 200 is to reside. As part of creating the database virtual machines, the administrator may allocate a particular number of virtual central processors (vCPU) to each of the database virtual machines, define the number of cores that are desired in each vCPU, designate a specific amount of memory to each of the database virtual machines, and attach a database storage device (e.g., a virtual disk from the storage pool 170) with each of the database virtual machines. In some embodiments, at least a portion of the database storage device attached to the database system 200 may form the database storage system 215. The administrator may also create a new network interface (e.g., associate a virtual local area network (VLAN), assign an Internet Protocol ("IP") address to access the database system 200, etc.) with each of the database virtual machines. The administrator may perform additional and/or other actions to create the database virtual machines on which the database system 200 resides upon creation and installation of the disk image file.

In some embodiments, the database virtual machines on which the database system 200 resides may all be located on a single node (e.g., one of the first node 105, the second node 110, and the third node 115). In other embodiments, the database virtual machines on which the database system 200 resides may be spread across multiple nodes within a single cluster, or amongst multiple clusters. When spread across multiple clusters, each of the associated multiple clusters may be configured to at least indirectly communicate with one another to facilitate operation of the database system 200. Upon installing the database system 200, a user (e.g., the administrator or other user authorized to access the database system) may access the dashboard 210. The dashboard 210, thus, forms the front end of the database system 200 and the database management system 205 and the database storage system 215 form the backend of the database system.

The database system 200 may be accessed via a computing device associated with the virtual computing system (e.g., of FIG. 1). In other embodiments, instead of or in addition to being accessible via a particular computing device, the database system 200 or at least portions thereof may be hosted on a cloud service and may be accessed via the cloud. In some embodiments, the database system 200 may additionally or alternatively be configured as a mobile application suitable for access from a mobile computing device (e.g., a mobile phone). In some embodiments, the database system 200 and particularly the dashboard 210 may be accessed via an Application Programming Interface ("API") 230. To access the dashboard 210 via the API 230, a user may use designated devices such as laptops, desktops, tablets, mobile devices, other handheld or portable devices, and/or other types of computing devices that are configured to access the API. These devices may be different from the computing device on which the database system 200 is installed.

In some embodiments and when the dashboard 210 is configured for access via the API 230, the user may access the dashboard via a web browser and upon entering a uniform resource locator ("URL") for the API such as the IP address or other indicator of the database system 200 or other web address. Using the API 230 and the dashboard 210, the users may then send instructions to the database management system 205 and receive information back from the database management system. In some embodiments, the API 230 may be a representational state transfer ("REST") type of API. In other embodiments, the API 230 may be any other type of web or other type of API (e.g., ASP.NET) built using any of a variety of technologies, such as Java, Net, etc., that is capable of accessing the database management system 205 and facilitating communication between the users and the database management system. In some embodiments, the API 230 may be configured to facilitate communication via a hypertext transfer protocol ("HTTP") or hypertext transfer protocol secure ("HTTPS") type request. The API 230 may receive an HTTP/HTTPS request and send an HTTP/HTTPS response back. In other embodiments, the API 230 may be configured to facilitate communication using other or additional types of communication protocols. In other embodiments, the database system 200 may be configured for access in other ways.

The dashboard 210 provides a user interface that facilitates human-computer interaction between the users and the database management system 205. The dashboard 210 is configured to receive user inputs from the users via a graphical user interface ("GUI") and transmit those user inputs to the database management system 205. The dashboard 210 is also configured to receive outputs/information from the database management system 205 and present those outputs/information to the users via the GUI of the management system. The GUI may present a variety of graphical icons, windows, visual indicators, menus, visual widgets, and other indicia to facilitate user interaction. In other embodiments, the dashboard 210 may be configured as other types of user interfaces, including for example, text-based user interfaces and other man-machine interfaces. Thus, the dashboard 210 may be configured in a variety of ways.

Further, the dashboard 210 may be configured to receive user inputs in a variety of ways. For example, the dashboard 210 may be configured to receive the user inputs using input technologies including, but not limited to, a keyboard, a stylus and/or touch screen, a mouse, a track ball, a keypad, a microphone, voice recognition, motion recognition, remote controllers, input ports, one or more buttons, dials, joysticks, etc. that allow an external source, such as the user, to enter information into the database system 200. The dashboard 210 may also be configured to present outputs/information to the users in a variety of ways. For example, the dashboard 210 may be configured to present information to external systems such as users, memory, printers, speakers, etc. Therefore, although not shown, dashboard 210 may be associated with a variety of hardware, software, firmware components, or combinations thereof. Generally speaking, the dashboard 210 may be associated with any type of hardware, software, and/or firmware component that enables the database management system 205 to perform the functions described herein.

Thus, the dashboard receives a user request (e.g., an input) from the user and transmits that user request to the database management system 205. In some embodiments, the user request may be to request a database management service. For example, in some embodiments, the user request may be to request a database provisioning service. In response to the user request for a database provisioning service, the database management system 205 may activate the database provisioning system 220.

The database management system 205, including the database provisioning system 220 and the database protection system 225 may be configured as, and/or operate in association with, hardware, software, firmware, or a combination thereof. Specifically, the database management system 205 may include a processor 235 configured to execute instructions for implementing the database management services of the database system 200. In some embodiments, each of the database provisioning system 220 and the database protection system 225 may have their own separate instance of the processor 235. The processor 235 may be implemented in hardware, firmware, software, or any combination thereof. "Executing an instruction" means that the processor 235 performs the operations called for by that instruction. The processor 235 may retrieve a set of instructions from a memory for execution. For example, in some embodiments, the processor 235 may retrieve the instructions from a permanent memory device like a read only memory (ROM) device and copy the instructions in an executable form to a temporary memory device that is generally some form of random access memory (RAM). The ROM and RAM may both be part of the storage pool 170 and/or provisioned separately from the storage pool. In some embodiments, the processor 235 may be configured to execute instructions without first copying those instructions to the RAM. The processor 235 may be a special purpose computer, and include logic circuits, hardware circuits, etc. to carry out the instructions. The processor 235 may include a single stand-alone processor, or a plurality of processors that use the same or different processing technology. The instructions may be written using one or more programming language, scripting language, assembly language, etc.

The database management system 205 may also include a memory 240. The memory 240 may be provisioned from or be associated with the storage pool 170. In some embodiments, the memory 240 may be separate from the storage pool 170. The memory 240 may be any of a variety of volatile and/or non-volatile memories that may be considered suitable for use with the database management system 205. In some embodiments, the memory 240 may be configured to store the instructions that are used by the processor 235. Further, although not shown, in some embodiments, the database provisioning system 220 and the database protection system 225 may each, additionally or alternatively, have their own dedicated memory. In some embodiments, the memory 240 may be configured to store metadata associated with managing the various databases in the database system 200. Thus, in some embodiments, the memory 240 may be a repository for metadata and other types of data that may be needed to provide the database management services (the terms database management services, database services, and the like are used interchangeably herein).

Further, the database management system 205 may be configured to handle a variety of database engines. For example, in some embodiments, the database management system 205 may be configured to manage PostgreSQL, Oracle, Microsoft SQL server, and MySQL database engines. In other embodiments, the database management system 205 may be configured to manage other or additional database engines. Each database that is provisioned (e.g., created or registered) within the database system 200 may be of a particular "database engine." The database engine may identify the type of database management system (e.g., Oracle, PostgreSQL, etc.) of a particular database. By virtue of creating or registering a database with a particular database engine, that database is managed in accordance with the rules and protocols of that database engine. Thus, the database management system 205 is configured to be operable with and manage databases associated with a variety of database engines.

It is to be understood that only some components of the database management system 205 are shown and discussed herein. In other embodiments, the database management system 205 may also include other components that are considered necessary or desirable in implementing the various database management services discussed herein. Similarly, the database provisioning system 220 and the database protection system 225 may have components that are considered necessary or desirable in implementing the various database management services discussed herein.

Referring still to FIG. 2, the database storage system 215 is configured to store one or more databases that are provisioned in the database system 200. The database storage system 215 may include a source database storage 245 and a target database storage 250. The source database storage 245 may be configured to store the original or recovered instances of the databases (also referred to herein as source databases) that are created within, registered with, or recovered in, the database system 200. The target database storage 250 may be configured to store the clones of the source databases (also referred to herein as cloned databases). In some embodiments, the source database storage 245 and the target database storage 250 may be provisioned from the storage pool 170 and may include virtual disk storage that is associated with the database virtual machines (e.g., the database virtual machines 120, the database virtual machines 135, the database virtual machines 150) on which the database system 200, the source databases, and the cloned databases reside.

For example, in some embodiments, the source database storage 245 may be associated with one or more source database virtual machines (referred to herein as source database virtual machines or source database server virtual machines) and the source databases stored within the source database storage may be stored within the virtual disks associated with the source database virtual machines. Similarly, in some embodiments, the target database storage 250 may be associated with one or more database virtual machines (referred to herein as target database virtual machines or target database server virtual machines) and the databases stored within the target database storage may be stored within the virtual disks associated with the target database virtual machines. In some embodiments, one or more source databases and/or one or more cloned databases may be stored on a cloud. In some embodiments, each source database virtual machine may be configured to store one or more source databases and each target database virtual machine may be configured to store one or more target databases. In other embodiments, the source database storage 245 and the target database storage 250 may additionally or alternatively be provisioned from other types of storage associated with the database system 200. In some embodiments, a source database virtual machine and/or a target database virtual machine may store source databases, restored databases, and/or cloned databases.

Further, depending upon the size of a particular database and the size of the storage space associated with a particular source database virtual machine, a source (or restored) database may be stored in its entirety on a single source database virtual machine or may span multiple source database virtual machines. Further, as the size of that source database increases, the source (or restored) database may be moved to another source database virtual machine, may be stored onto multiple source database virtual machines, and/or additional storage space may be provisioned to the source database virtual machines to house the increased size of the source database. Similarly, depending upon the size of a cloned database and the size of the storage space associated with a particular target database virtual machine, the cloned database may be stored on a single or multiple target database virtual machines. Further, as the size of the cloned database increases, the cloned database may be moved to another target database virtual machine of appropriate size, may be divided amongst multiple target database virtual machines, and/or additional storage space may be provisioned to the target database virtual machine. Thus, the database storage system 215 is structured with the flexibility to expand and adapt to accommodate databases of various sizes.

Additionally, in some embodiments, the databases of the source database storage 245 and/or the target database storage 250 may be stored on a single cluster or span across multiple clusters. For example, in some embodiments, the databases of the source database storage 245 may span across a first set of clusters and the databases of the target database storage 250 may span across a second set of clusters. In some embodiments, the source databases and the cloned databases may be stored on separate designated clusters. In other embodiments, a cluster may be configured to store both source and cloned databases.

Figure 3:
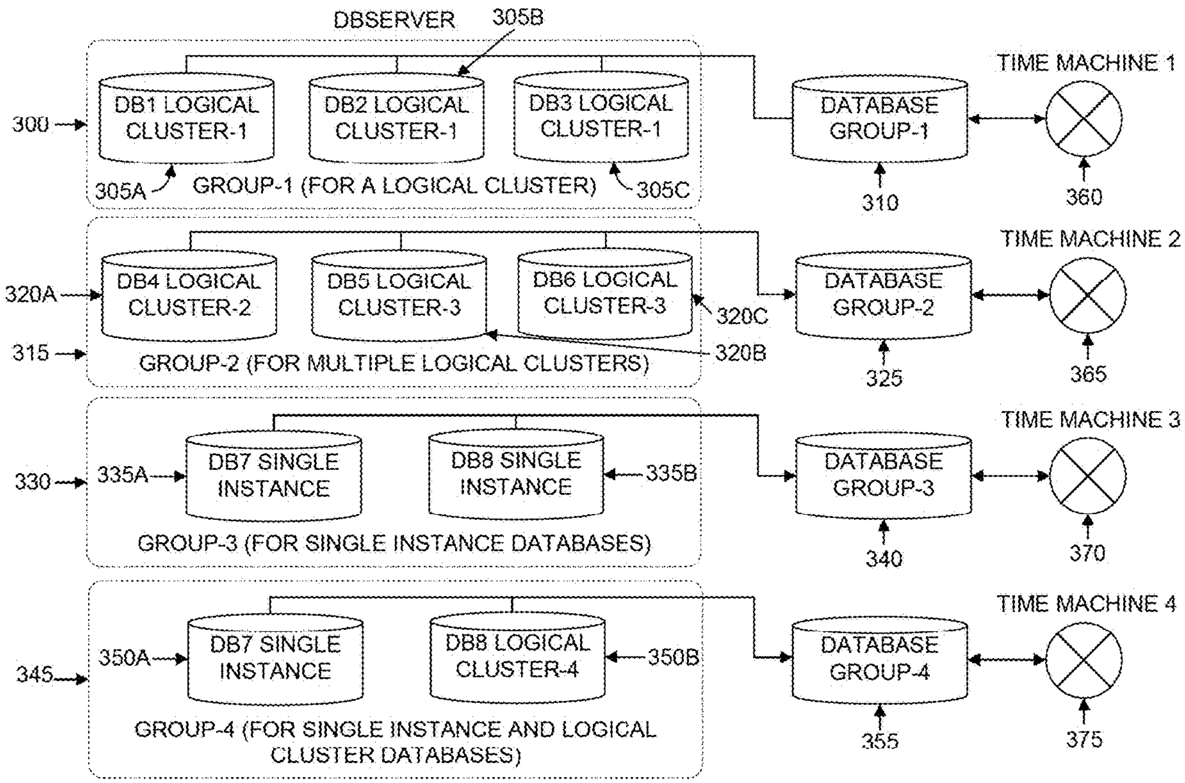
FIG. 3 is an example block diagram showing various configurations of a database group, in accordance with some embodiments of the present disclosure.

Turning to FIG. 3, an example block diagram showing various example configurations of database groups is shown, in accordance with some embodiments of the present disclosure. In some embodiments, databases that are grouped together may share a common trait. For example, in some embodiments, databases that are part of a same logical cluster may be grouped together. In some embodiments, databases that reside on the same database server virtual machine may be grouped together. In other embodiments, databases may be grouped together based on other shared traits.

For example, a first group 300 shows three databases 305A, 305B, and 305C (collectively referred to as databases 305) that may be grouped together into a single database group 310. Although 3 databases are shown to be grouped together in the first group 300, greater or fewer than 3 databases may be in the database group 310. Since all the databases in a database group may be snapshotted together, in some embodiments, the number of databases that may be in a single database group may be dependent upon the number of databases that may be snapshotted together. For example, in some embodiments, 84 databases may be snapshotted together. Thus, in some embodiments, the number of databases that may be in a single database group may not exceed 84 to allow all the databases in the database group to be snapshotted together. In other embodiments, any number of databases may be in a database group (e.g., there may be no limit or the limit may be defined in other ways).

In some embodiments, the databases 305 in the first group 300 may all belong to a same logical cluster. Specifically, in some embodiments, the databases 305 may be part of a highly available group of databases. For example, in some embodiments, the databases 305 may be part of an Always-On Availability Group (AG). Specifically, in some embodiments, disaster recovery services may be desired. Such disaster recovery services may provide data recovery and data backup facilities to maintain a continuity of operation in the aftermath of a disaster condition. A disaster condition may include planned outages, performance related failures, component failures, power failures, natural calamities, or any other condition that hampers the normal operation. Generally speaking, and as used herein, a disaster condition is any condition that causes hardware failure or otherwise prevents a hardware component from operating as intended, or results in a downtime at the client site. The disaster condition may also be referred to a failover event. When the downtime is preplanned, the disaster condition or failover event may be a planned failover event. When the downtime is not preplanned, the disaster condition or failover event may be an unplanned failover event.

In some embodiments, the disaster recovery services may involve creating highly available databases, such as an Always-On Availability Group ("AG"), that provide replication of databases to multiple locations. When a disaster condition is detected at one location, a replica of the database stored at another location may be used to maintain continuity of operation. For example, in some embodiments, multiple copies of a database may be stored on multiple database virtual machines of a single node or multiple nodes of a single cluster (e.g., one copy on one virtual machine). In other embodiments, multiple copies of a highly available database may be stored on multiple clusters. The various locations (e.g., various database virtual machines, nodes, and/or clusters) where copies of a highly available database may be stored may form a logical cluster. In some embodiments, the databases that form part of a single logical cluster may be grouped together into a single database group (e.g., the database group 310), as shown in the first group 300. Thus, in some embodiments, each of the databases 305 may be part of a highly available database, and therefore, part of a single logical cluster. In some embodiments, each of the databases 305 may have the same database engine, allowing them to be managed in accordance with the same rules and protocols of the database engine.

In other embodiments, databases that are part of different logical clusters may be grouped together in a single database group. For example, a second group 315 shows databases 320A, 320B, 320C (collectively referred to as databases 320) that may be grouped together into a single database group 325. As shown in FIG. 3, the database 320A may be part of one logical cluster (e.g., one highly available database) and the databases 320B, 320C may be part of another logical cluster (e.g., another highly available database). Although 3 databases are shown to be grouped together in the second group 315, greater or fewer than 3 databases may be in the database group 325. Further, the number of databases in the database group 325 may be varied, as discussed above with respect to the database group 310. In some embodiments, each of the databases 320 may be stored on a single database server virtual machine. In other embodiments, one or more of the databases 320 may be stored on different database server virtual machines of the same cluster or even on different clusters. In some embodiments, each of the databases 320 may have the same database engine, allowing those databases to be managed together regardless of their locations. In other embodiments, the databases 320 may have other common traits that may allow multiple logical clusters to be grouped together into a single database group.

A third group 330 may include databases 335A and 335B (collectively referred to as databases 335) grouped together into a database group 340. Unlike the databases 305 and 320, each of which were clustered databases (e.g., highly available databases associated with a logical cluster), in some embodiments, the databases 335 may be single instance databases, or in other words, non-highly available databases that reside on one location only. Although 2 databases are shown to be grouped together in the third group 330, greater or fewer than 2 databases may be in the database group 340. Further, the number of databases in the database group 340 may be varied, as discussed above with respect to the database group 310. In some embodiments, the databases 335 that are in the database group 340 may all reside on the same database server virtual machine but be single instances databases. Further, in some embodiments, the databases 335 may include the same database engine. In other embodiments, the database 335 that are in the database group 340 may be located on multiple virtual machines (whether of the same cluster or different clusters) and share another common trait.

A fourth group 345 may include databases 350A and 350B (collectively referred to as databases 350) grouped together into a database group 355. Although 2 databases are shown to be grouped together in the fourth group 345, greater or fewer than 2 databases may be in the database group 355. Further, the number of databases in the database group 355 may be varied, as discussed above with respect to the database group 310. In some embodiments, the databases 350 that are in the database group 355 may all reside on the same database server virtual machine of a cluster. In some embodiments, the databases 350 may include the same database engine. Further, in some embodiments, the database 350 may either be single instance databases (e.g., non-highly available) or clustered databases (e.g., highly available database that belong to a logical cluster). For example, as shown in FIG. 3, the database 350A may be a single instance database and the database 350B may be a clustered database (e.g., a highly available database) belonging to a logical cluster.

Thus, in some embodiments, the databases that may be grouped together may share one or more common traits. For example, the databases that are grouped together may all be single instance databases, all be clustered databases being part of one or more logical clusters, all located on the same database server virtual machine, all sharing the same database engine, etc. In some embodiments, a database may be part of a single database group. In other embodiments, a database may be part of multiple database groups. Further, in some embodiments, not all databases on a database virtual machine may necessarily belong to a database group. In some embodiments, a database server virtual machine may have databases that are part of a database group, as well as databases that are part of no database groups. Additionally, in some embodiments, each database server virtual machine may have multiple database groups. In general, databases that are desired to be managed together may be put into a database group. If the number of databases in the database group exceeds the permitted number, another database group may be created.

Referring still to FIG. 3 and as indicated above, in some embodiments, databases that are in a database group may be managed together. For example, in some embodiments, databases that are in a database group may be associated with a single time machine (e.g., data protection system instance). For example, a time machine 360 may be defined to protect the database in the database group 310. Instead of capturing individual snapshots and/or transactional logs from each of the databases 305, the time machine 360 may capture a single snapshot and/or single transactional log for the database group 310 based on a protection schedule. For example, if the protection schedule requires capturing a snapshot every hour, the time machine 360 may capture a single snapshot of the databases 305 every hour instead of capturing 3 separate snapshots (1 for each of the databases 305) every hour.

To capture a single snapshot, in some embodiments, the time machine 360 may quiesce the databases 305 to capture the state of each of those databases at the time of the snapshot capture. In some embodiments, the time machine 360 may make a copy of the virtual disk associated with each of the databases 305. Upon capturing the snapshot, the time machine 360 may unquiesce the databases 305 to resume normal operation. The time machine 360 may similarly capture transactional logs. In some embodiments, the time machine 360 may not need to quiesce the databases 305 to capture transactional logs. In other embodiments, the time machine 360 may capture snapshots and/or transactional logs in other ways.

Similarly, the database group 325, the database group 340, and the database group 355 may be associated with time machines 365, 370, and 375, respectively. Each of the time machines 365-375 may be configured to protect the databases that are associated with the respective database group, similar to the time machine 360. Further, in some embodiments, the time machines 360-375 may be configured to automatically detect the addition or deletion of databases in their respective database group. For example, if a new database is added to the database group 310, the time machine 360 may detect the addition of the new database to the database group 310 and include the new database during the next round of snapshot and/or transactional log capture. In some embodiments, when a database group is created, the database management system 205 may save database information of each database that is managed by the database management system in metadata. During the next log catchup (e.g., to capture transactional log) or snapshot capture, if a new database is added or removed (e.g., from a database server virtual machine), the database management system 205 may know/detect the update (e.g., addition or removal) by verifying the current databases on the database server virtual machine relative to the ones saved in the metadata of the database management system. In other embodiments, the database management system 205 may detect updates to databases in other ways.

Although the present disclosure describes protecting databases in a database group as a single operation, in other embodiments, other management operations may be similarly grouped. For example, in some embodiments, the databases in a database group may all be cloned/restored together using a single snapshot as part of the same cloning/restoring operation, thereby avoiding the need to clone/restore each database in the database group separately. In some embodiments, a user may pick which database the user desires to clone/restore and selectively clone/restore the selected database using the snapshot captured from the database group of which that database is a part is of. The cloning/restoring aspects are discussed further below.

Figure 4:
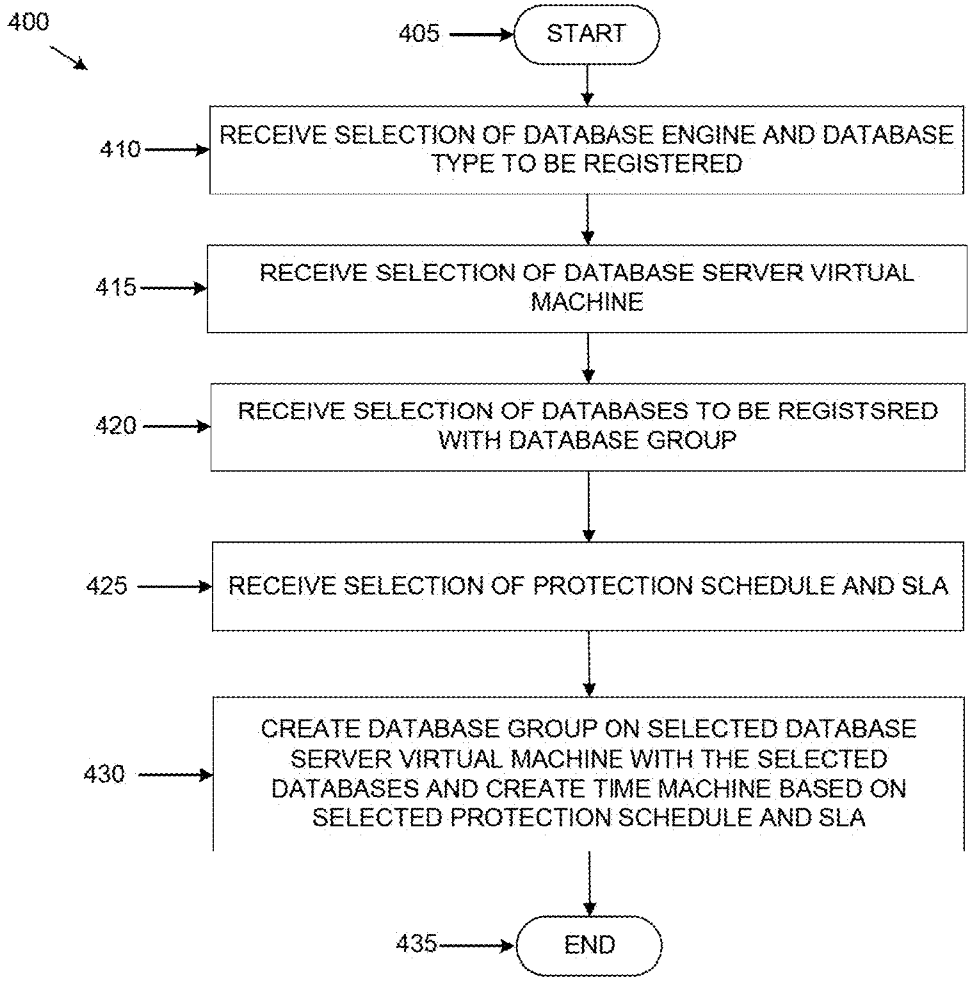
FIG. 4 is an example flowchart outlining operations for creating a database group, in accordance with some embodiments of the present disclosure.

Turning now to FIG. 4, an example flowchart outlining operations of a process 400 is shown, in accordance with some embodiments of the present disclosure. The process 400 may be implemented by the database management system 205 and may be used to create a new database group. The process 400 may also be used to add a database to the newly created database group. Specifically, the database management system 205 receives inputs from the user (e.g., via the dashboard 210) and performs operations in response to those inputs to create a new database group and add an existing database to the newly created database group. FIG. 4 is explained in conjunction with FIGS. 5-11, which display various example user interfaces, in accordance with some embodiments of the present disclosure. The process 400 may include other or additional operations depending upon the particular embodiment. The process 400 starts at operation 405 when the user desires to create a new database group and add one or more databases to the newly created database group. For example, and referring to FIG. 5, the user may access a dashboard 500 (e.g., the dashboard 210) of the database management system 205 to start the process 400.

Specifically, once the database system 200 is installed and the user is able to access the dashboard 500, the dashboard may present a provision option 505 to provision a database or a register option 510 to register a database. To perform the process 400, the user may select the register option 510. Upon selecting the register option 510, the user may be presented with a drop down list 515 presenting available database engines (e.g., database engines that are supported by the database management system). In some embodiments, instead of the drop down list 515, the list of database engines may be presented in a different form (e.g., via a separate user interface or another way).

Figure 5:
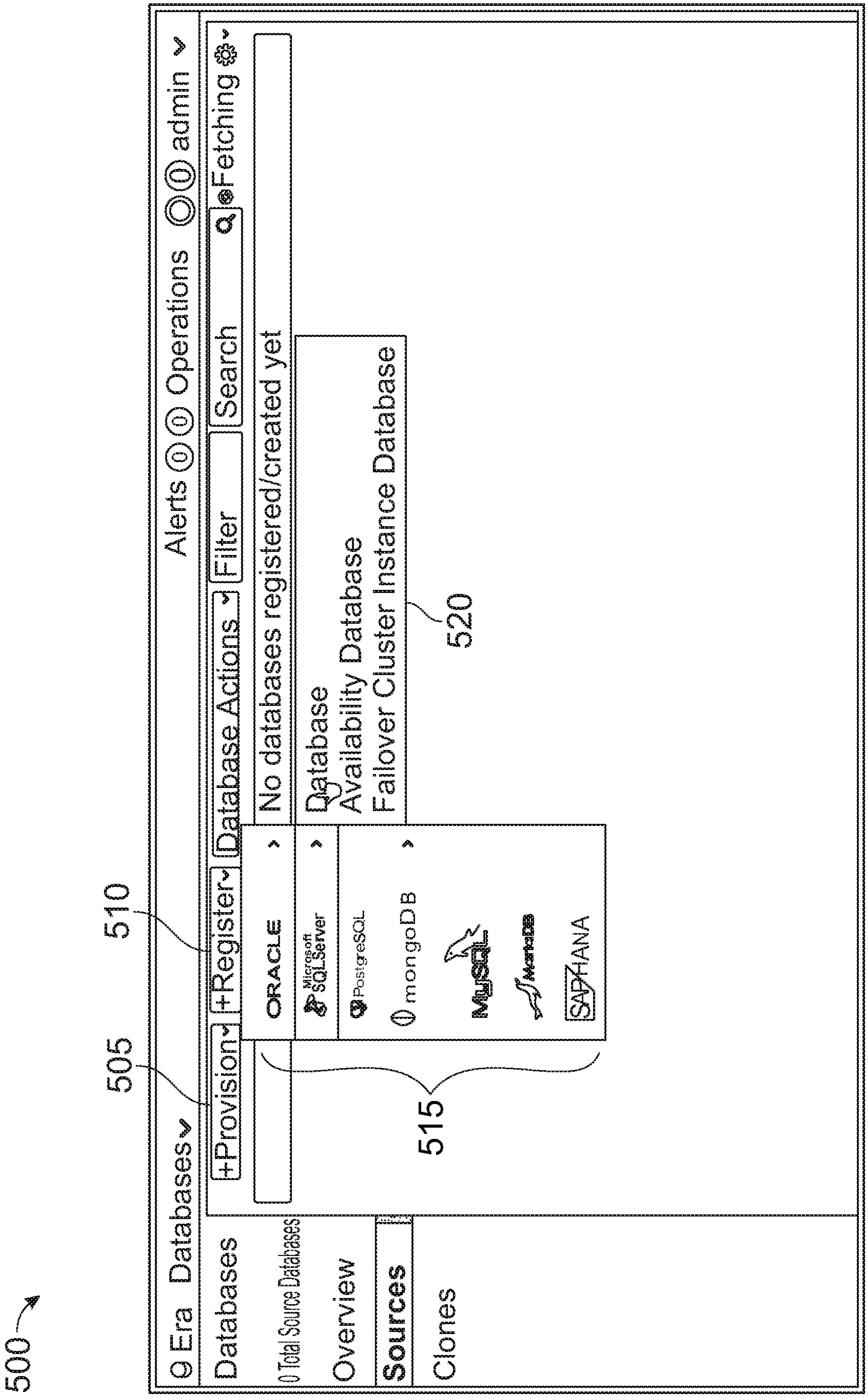
FIGS. 5-11 are example user interfaces showing the creation of the database group, as outlined in the flowchart of FIG. 4, in accordance with some embodiments of the present disclosure.

To create a database group for a particular database engine, the user may select the desired database engine from the drop down list 515. For example, and as shown in FIG. 5, to create a database group for an SQL Server database engine, the user may select SQL Server. Upon selecting a database engine, the user may also be shown a list 520 of available database types for which the user may create a database group. For example, and as discussed above, in some embodiments, database groups may be created for stand-alone databases (e.g., non-highly available databases) or clustered databases (e.g., highly available databases). Thus, depending upon the type of database desired for the database group, the user may select one database type from the list 520. In some embodiments, such different database types may not be available for the selected database engine. Rather, a single database type option may be available. In such cases, the list 520 may not be displayed (or the list may be tailored according to the associated database engine). Thus, at operation 410, the database management system 205 receives a selection of a database engine (e.g., SQL Server) from the drop down list 515 and selection of a database type (e.g., stand-alone database) from the list 520. As discussed above, the database engine defines the rules and protocols to be applied to the databases. Thus, the database management system 205 configures the remaining user interfaces that are presented to the user based on the database engine selected by the user at the operation 410.

In some embodiments, if the user selects the clustered database type from the list 520, in addition to the user interfaces discussed above, an additional user interface or option may be presented to the user to request the AG name and discover the databases in the AG.

Figure 6:
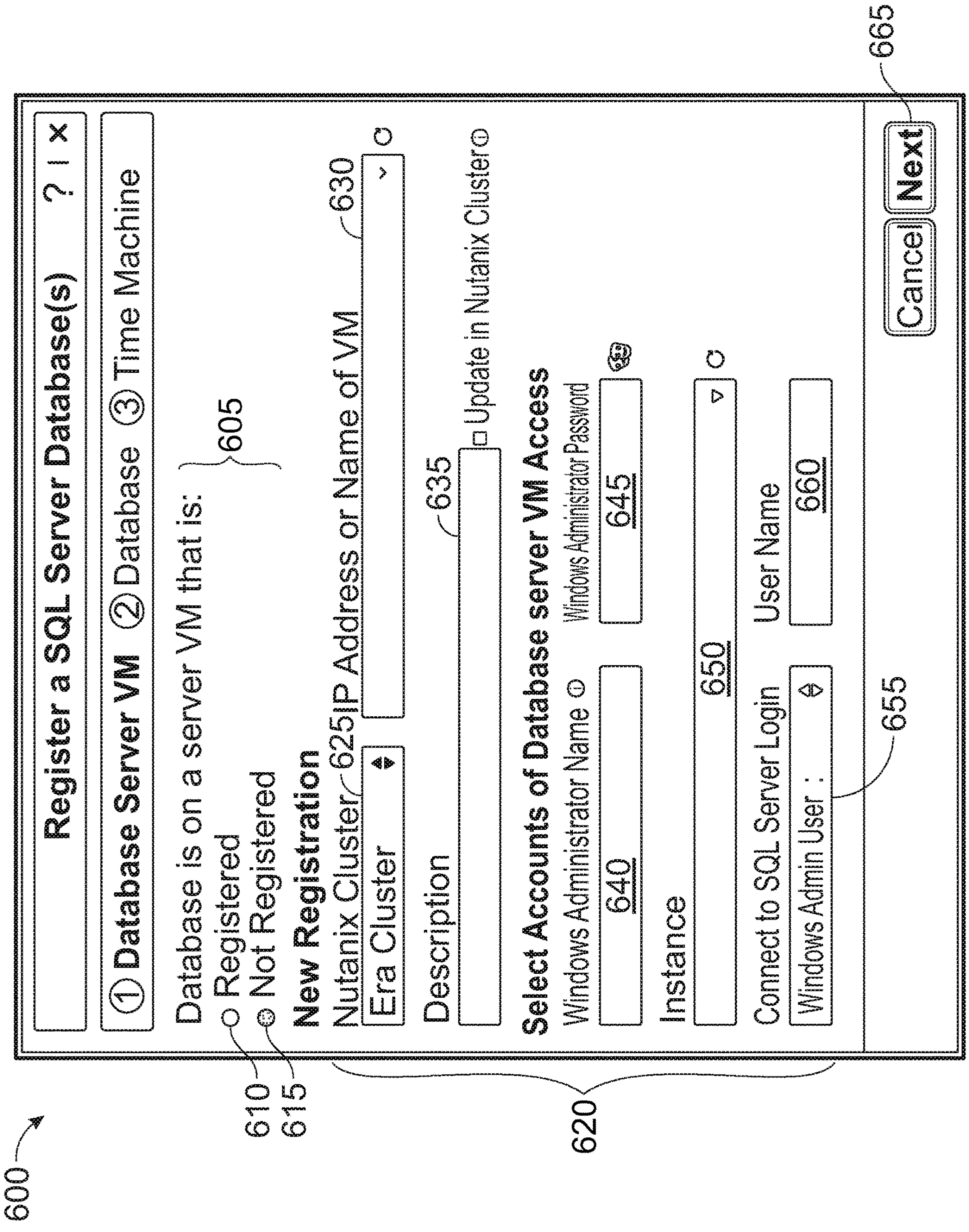

At operation 415, the database management system 205 receives a selection of a database server virtual machine on which the database group is to reside. Referring to FIG. 6 in conjunction with FIG. 4, upon selecting the database type from the list 520, a user interface 600 of FIG. 6 may be displayed in some embodiments. The user interface 600 may present a database server virtual machine selection option 605 having a first choice 610 for selecting a previously registered database server virtual machine and a second choice 615 for selecting a database server virtual machine to be newly registered with the database management system 205. The remaining of the user interface 600 shows the fields that may be displayed upon receiving selection of the second choice 615 for a database server virtual machine to be newly registered with the database management system 205.

In some embodiments, database server virtual machines may need to be registered with the database management system 205 to allow the database management system to manage databases located on those database server virtual machines. Thus, in some embodiments, if a virtual machine (e.g., that was previously created) was not previously registered with the database management system 205 and the user desires to use such a database virtual machine for creating the database group, the user may select the second choice 615. Upon receiving selection of the second choice 615, the database management system 205 may present user interface 620 to newly register a database server virtual machine. In some embodiments, the user interface 620 may be presented in a separate user interface.

The user interface 620 may request the user for selections of a cluster 625 on which the database server virtual machine resides, a network profile (e.g., IP address, name, etc.) 630 to identify the network location of the database server virtual machine, a description 635 of the database server virtual machine to identify the database virtual machine, username 640 and password 645 of a user authorized to create the database group, an instance 650 to select the specific instance (e.g., the database server virtual machine) at the network location identified by the network profile 630, and admin username 655/password 660 for accessing the database engine selected at the operation 410. Upon completing the required fields (e.g., not all fields may be required), the user may click on a next button 665 to go to the next operation.

Figure 7:
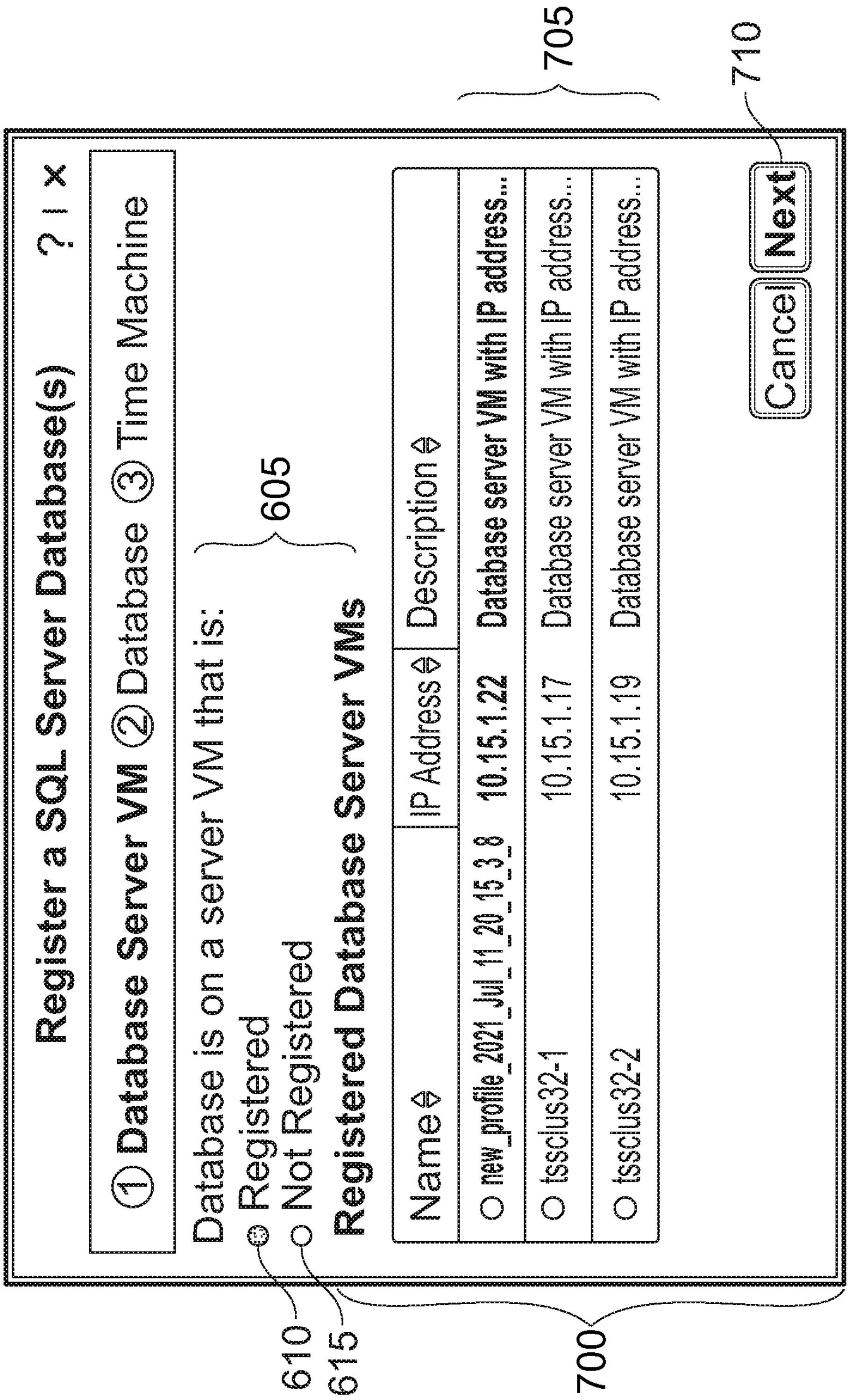
Figure 8:
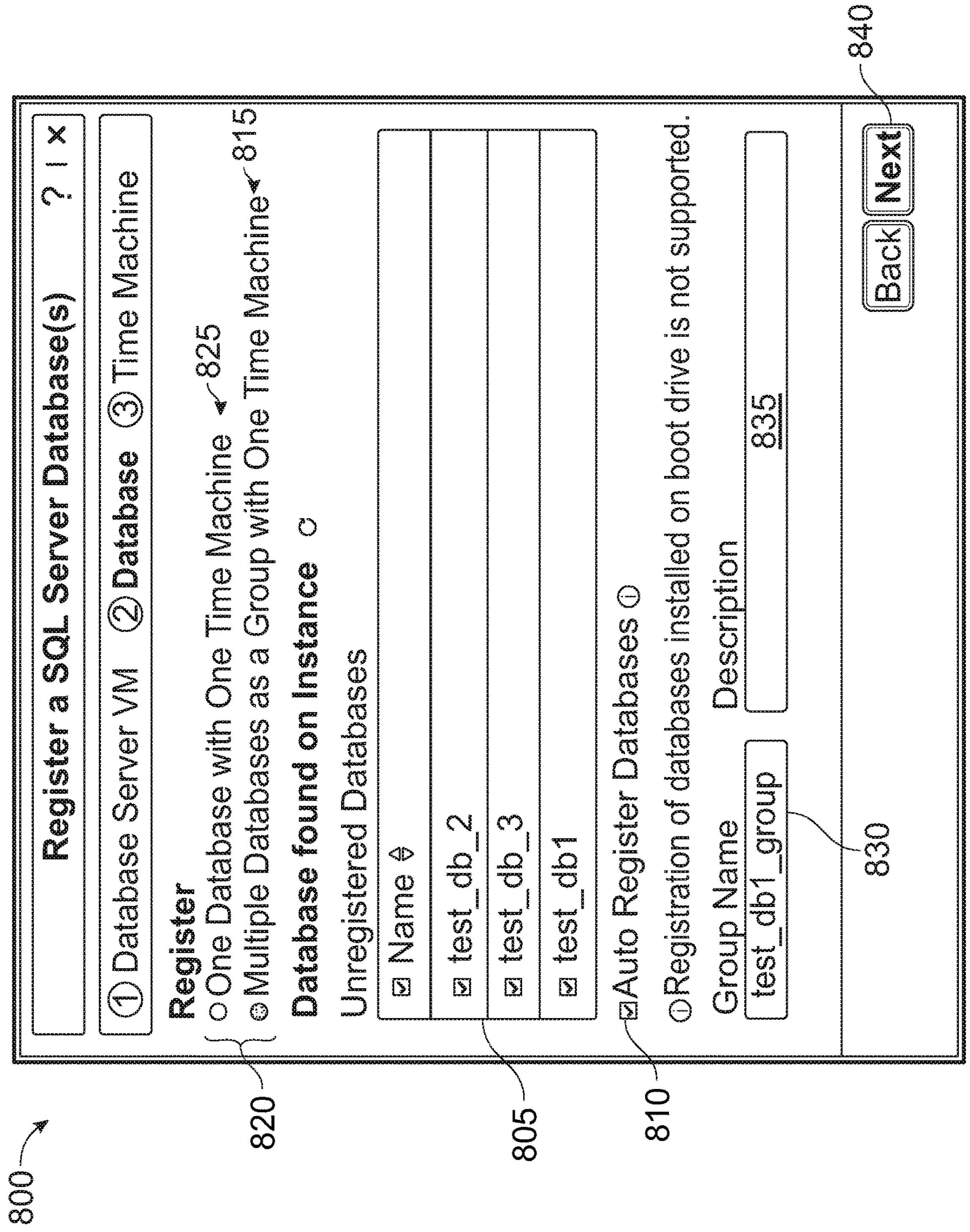
Figure 9:
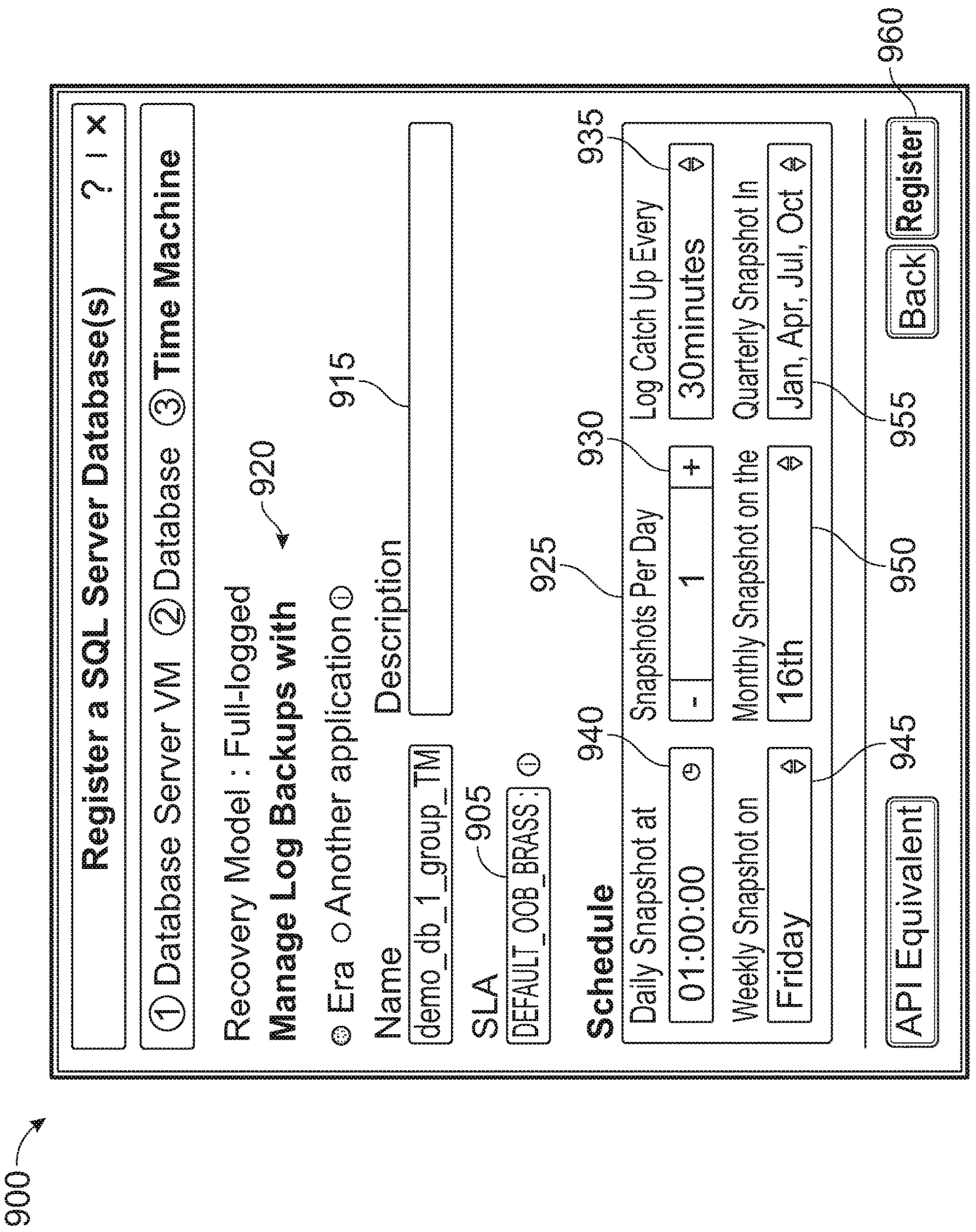
Figure 10:
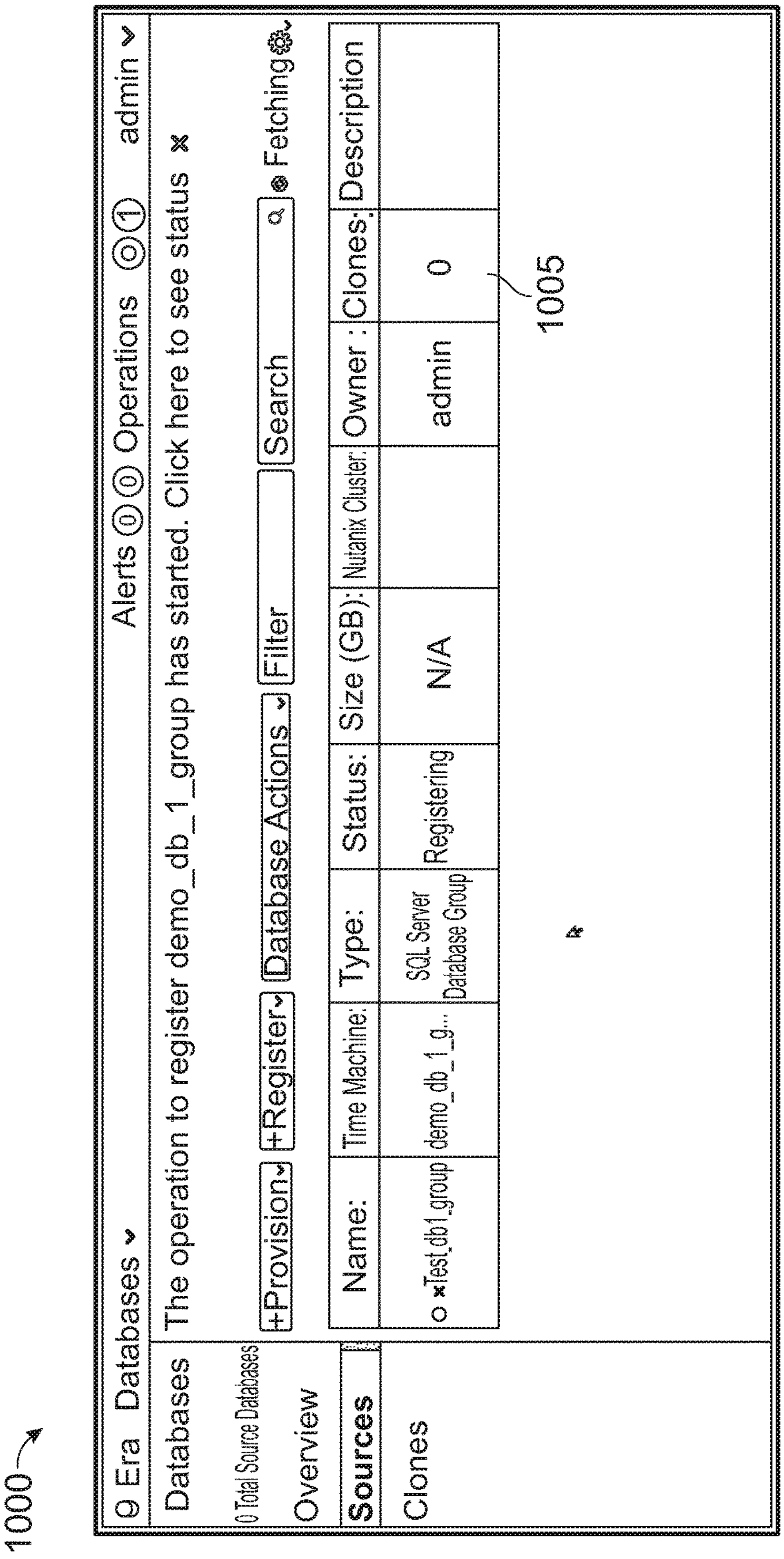
Figure 11:
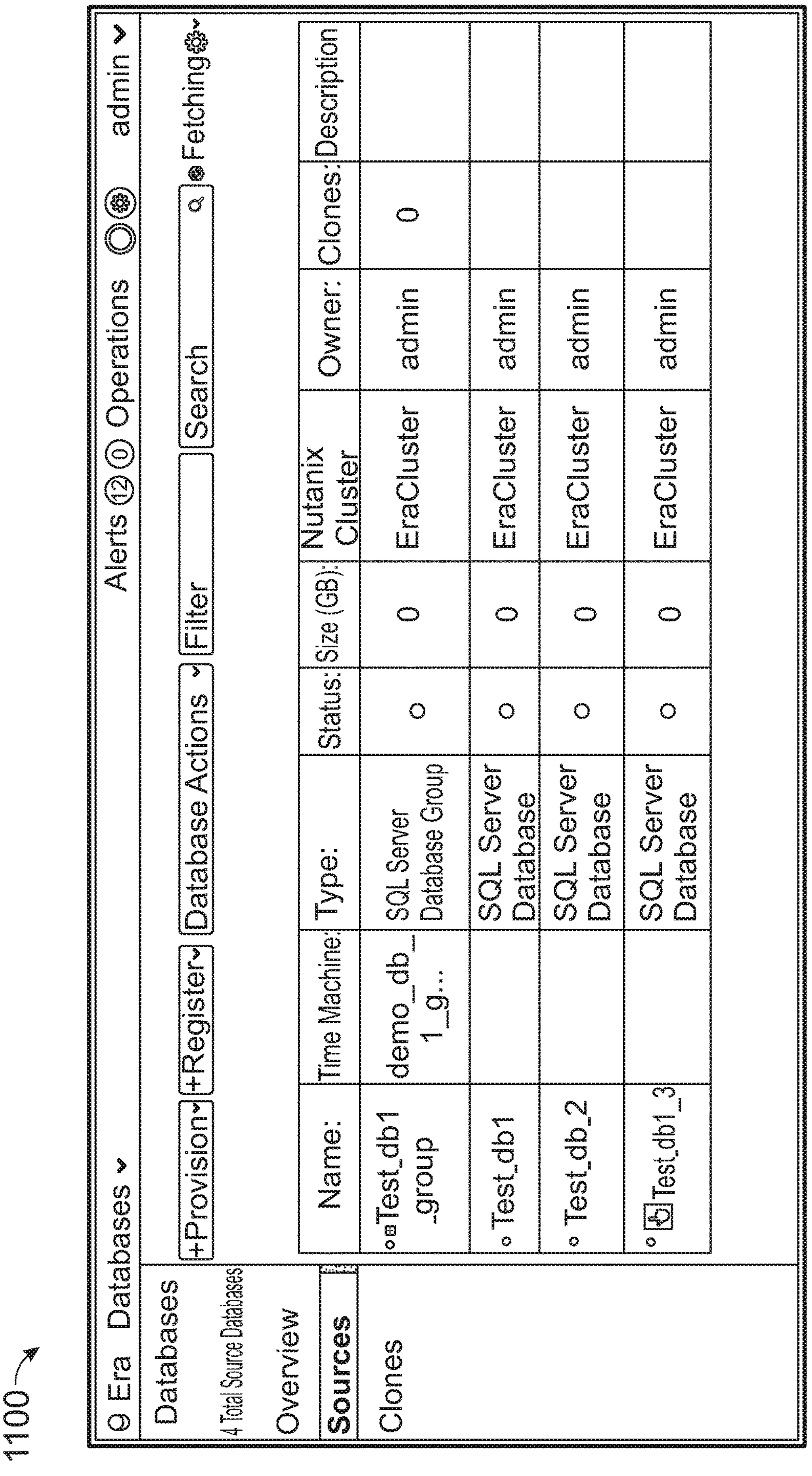

On the other hand, if the user selects the first choice 610 for using a previously registered database server virtual machine, a user interface 700 of FIG. 7 may be displayed. The user interface 700 may present a list 705 of previously registered database server virtual machines. The user may select a database server virtual machine from the list 705 and click on a next button 710 to go to the next operation. Thus, at the operation 415, the database management system 205 receives a selection of a database server virtual machine from the user. At operation 420, the database management system 205 receives selection of the specific databases to be added to the database group that is being created. Specifically, upon clicking on the next button 665 or 710, the user may be directed to user interface 800 of FIG. 8. The user interface 800 may present a list 805 of databases that exist on the database server virtual machine that was selected in FIG. 6 or 7 and are not part of any database group. In some embodiments, databases in the list 805 may all have the same database engine as the one selected from the list 515. In other words, databases on the database server virtual machine that don't have the database engine as that selected from the list 515 may not be displayed in the list 805 in some embodiments. Although the list 805 shows 3 databases, that number may vary in other embodiments. The user may select none, one, or any number of databases from the list 805 to add to the database group. In some embodiments, the user may also select an auto-register option 810 if the user desires to automatically register new databases that are created on the database server virtual machine that was selected in FIG. 6 or 7.

For example, the list 805 shows 3 databases that currently exist on the database server virtual machine that was selected in FIG. 6 or 7 and that are not part of any database group. If the auto-register option 810 is checked, any new database that is added in the future to that database server virtual machine may be automatically added to the database group that is being created by the process 400. In some embodiments, a single database group may exist on a database server virtual machine. In that case, any new database may automatically be added to that database group. In some embodiments, more than one database group may exist on a database server virtual machine. In that case, additional criteria may be used to select the database group to which newly databases may be added. Thus, the new databases may be automatically protected using the same time machine that protects the other databases in the database group. If the auto-register option 810 is not selected, any new database that is created on the database server virtual machine selected in FIG. 6 or 7 may not be automatically added to the database group associated with that database server virtual machine. Such databases that are not automatically added to a database group may show up in the list 805 when a new database group is created on that database server virtual machine.

In some embodiments, the user may select a group option 815 from options 820. The group option 815 may be indicative of user's desire to create a database group in which multiple databases may be grouped together and protected with one time machine. Alternatively, the user may select stand-alone option 825 to indicate no desire to add the database selected from the list 805 to a database group. In such cases, a time machine may be created solely for the database that is selected. Thus, in some embodiments, the user may use the same work flow (e.g., the user interfaces of FIGS. 5-11) to register databases on a database virtual machine either as part of a database group or without a database group. If desiring to create a database group, the user may provide a name 830 for the database group and a description 835 for the database group. Upon completing the required fields in the user interface 800, the user may click on a next button 840 to move to the next operation.

Thus, at the operation 420, the database management system 205 receives a selection indicating whether a user desires to create a database group, the database(s) to be part of the database group (if a database group is being created), and a name for the database group. As discussed above, a time machine may be associated with each database group to protect database that are in the database group. Thus, at operation 425, the database management system 205 receives selection of an SLA and a protection schedule. In some embodiments, the selection of the SLA and/or protection schedule may be defined after creating the database group. To define an SLA and protection schedule as part of the process 400, upon clicking on the next button 840, the user may be directed to a user interface 900 of FIG. 9.

An SLA or Service Level Agreement is an agreement between a service provider (e.g., the owner of the database system 200) and the user (e.g., the owner of the database) that outlines, among other things, the protection scope of the databases associated with the database group. In some embodiments, the SLA may define various protection parameters such as continuous, daily, weekly, monthly, quarterly, or yearly protection parameters for determining the protection scope of the database group. In other embodiments, the SLA may define other or additional protection parameters. As discussed above, databases within the database group may be protected by capturing snapshots and/or transactional logs. The number of snapshots and transactional logs to be captured on each day may be defined by the user in a protection schedule. As used herein, a "day" may be any 24-hour period (e.g., from midnight to Noon). In some embodiments, the protection schedule may define default values to define the frequency of capturing snapshots and/or transactional logs, which the user may modify. Thus, based upon the frequency of capturing snapshots and/or transactional logs defined in the protection schedule, the time machine may be configured to capture one or more snapshots and/or one or more transactional logs from the databases in the database group that is being created. Generally speaking, the number of transactional logs that are captured each day may be higher than the number of snapshots that are captured on that day. Since it may be impractical and expensive to indefinitely store the captured snapshots and the transactional logs, the protection parameters in the SLA may define the duration for how long those snapshots and transactional logs are stored.

For example, the continuous protection parameter within the SLA defines the duration in days for which all captured snapshots and transactional logs are retained. For example, if the continuous protection parameter is defined as 30 days, the time machine may be configured to retain all snapshots and transactional logs that are captured within the last 30 days. By retaining all snapshots and the transactional logs, the user may replicate any or substantially any state of the database (down to a second or even a fraction of a second, thereby providing a point in time recovery).

The SLA may also define a daily protection parameter, which defines the duration in days for which a daily snapshot is stored. For example, if the daily protection parameter is 90 days, the time machine is configured to store a daily snapshot for 90 days after the expiration of the number of days indicated in the continuous protection parameter. The protection schedule may define the time of day to identify the snapshot that is designated as the daily snapshot. For example, if the user specifies that the snapshot captured at 11:00 AM every day is the daily snapshot and the SLA defines the daily protection parameter for 90 days, the time machine may be configured to store a daily snapshot that was captured at or closest to 11:00 AM and store the daily snapshot for 90 days.

Similarly, the SLA may define weekly, monthly, and quarterly protection parameters. A weekly protection parameter in the SLA may define the duration in weeks for which a weekly snapshot is stored after the expiration of the number of days indicated in the daily protection parameter. The protection schedule may define the day of the week to identify which snapshot is designated as the weekly snapshot. For example, if the user defines in the protection schedule that the snapshot captured on Monday is to be designated as the weekly snapshot, and the weekly protection parameter in the SLA specifies a duration of 8 weeks, the time machine may store the snapshot captured every week on Monday for 8 weeks. If multiple snapshots are captured each day, the protection schedule may also define which snapshot captured on the designated day of the week (e.g., Monday) serves as the weekly snapshot. In some embodiments, the time defined in the protection schedule for capturing a daily snapshot may be used. For example, if the protection schedule defines that the snapshot captured at 11:00 AM is the daily snapshot, and the weekly snapshot is to be captured on Monday, the instance of the database protection system 225 may store the snapshot captured at or closest to 11:00 AM every Monday as the weekly snapshot. In other embodiments, another time period may be used.

Likewise, a monthly protection parameter in the SLA may define a duration in months for which a monthly snapshot is to be stored after the expiration of the number of weeks indicated in the weekly protection parameter. The user may specify the date within the protection schedule for identifying which snapshot corresponds to the monthly snapshot. For example, the user may specify storing the snapshot captured on the $20^{th}$ of every month as the monthly snapshot in the protection schedule, and the monthly protection parameter may specify a duration of 12 months for storing the monthly snapshot. Thus, the time machine stores a monthly snapshot captured on the $20^{th}$ of every month and stores that monthly snapshot for 12 months. A quarterly protection parameter in the SLA may define a duration in quarters for which a quarterly snapshot is to be stored after the expiration of the number of months indicated in the monthly protection parameter. The user may specify in the protection schedule which months correspond to the various quarters. For example, the user may specify January, April, July, and October as the quarters and the quarterly protection parameter may specify storing the quarterly snapshots for 20 quarters. Thus, the time machine may designate a snapshot captured on the first day of January, April, July, and October (e.g., January 1, April 1, July 1, and October 1) as the quarterly snapshot and store the quarterly snapshot for 20 quarters.

It is to be understood that the various protection parameters and the protection schedules mentioned above are only examples and may vary from one embodiment to another as desired. Further, when the duration specified by a protection parameter expires, any snapshots or transactional logs that are expired (e.g., past their duration) may be deleted. As an example, if a snapshot is to be stored for 30 days, on the 31st day, that snapshot may be deleted. Thus, each snapshot and transactional log is managed based on the SLA and protection schedule independent from other snapshots and transactional logs.

Additionally, to simplify user selection, in some embodiments, various levels of SLA may be pre-defined within the database management system 205. Each level of the SLA may have default values of the various protection parameters. For example, in some embodiments, the various levels of SLA may be GOLD, SILVER, BRONZE and the various protection parameters for these levels may be as follows:

| Name | Continuous | Daily | Weekly | Monthly | Quarterly |
|---|---|---|---|---|---|
| GOLD | 30 Days | 90 Days | 16 Weeks | 12 Months | 75 Quarters |
| SILVER | 14 Days | 60 Days | 12 Weeks | 12 Months | 0 Quarters |
| BRONZE | 7 Days | 30 Days | 8 Weeks | 6 Months | 0 Quarters |

It is to be understood that the nomenclature of the GOLD, SILVER, BRONZE levels of the SLA is only an example and the levels may be given different names in other embodiments. Further, although three levels of the SLA are described herein, in other embodiments, greater or fewer than three SLA levels may be used. Additionally, the values of the protection parameters in each level of the SLA may vary from one embodiment to another.

The user interface 900 may present the various pre-defined SLA levels to the user to select from in an option 905. In some embodiments, the database management system 205 may allow the user to modify the values of one or more protection parameters in the pre-defined SLA levels. For example, if the user desires to select the GOLD level, but would like continuous protection for 45 days instead of the default value of 30 days shown in the table above, the user may modify the continuous protection parameter of the GOLD level. Thus, the pre-defined SLA levels provide the convenience and flexibility of tailoring the various protection parameters to suit the user's needs. Alternatively, in some embodiments, the option 905 may allow the user to create a new, custom SLA.

The user interface 900 also requests a name 910 and description 915 for the time machine to be associated with the database group being created, selection of an application (e.g., the database management system 205 or another application) 920 associated with the database engine to manage the capturing of the snapshots and transactional logs, and a protection schedule 925. Within the protection schedule 925, the user interface 900 requests the user to provide a number of snapshots 930 desired each day, a frequency of capturing transactional logs 935, and time period 940 for identifying which snapshot to designate as the daily snapshot, time period 945 for identifying which snapshot to designate as the weekly snapshot, time period 950 for identifying which snapshot to designate as the monthly snapshot, and time period 955 for identifying which snapshot to designate as the quarterly snapshot. In some embodiments, the SLA and/or protection schedule maybe defined after creation of the database group. Upon providing the various parameters in the user interface 900, the user may select a next button 960 to start the database group creation process and registering the selected databases with the database group.

Thus, at operation 430, the database management system 205 creates a database group on the selected the database server virtual machine and registers the selected databases with the newly created database group. The database management system 205 also creates a time machine for the database group for protecting the databases of the database group with the time machine. Therefore, upon clicking on the next button 960, the user may be directed to a user interface 1000 of FIG. 10 that shows an entry 1005 for creating the database group with the database group specified in FIG. 8. Upon creating the database group, the database group and the registered databases may be viewed, as shown in user interface 1100 of FIG. 11.

Figure 12:
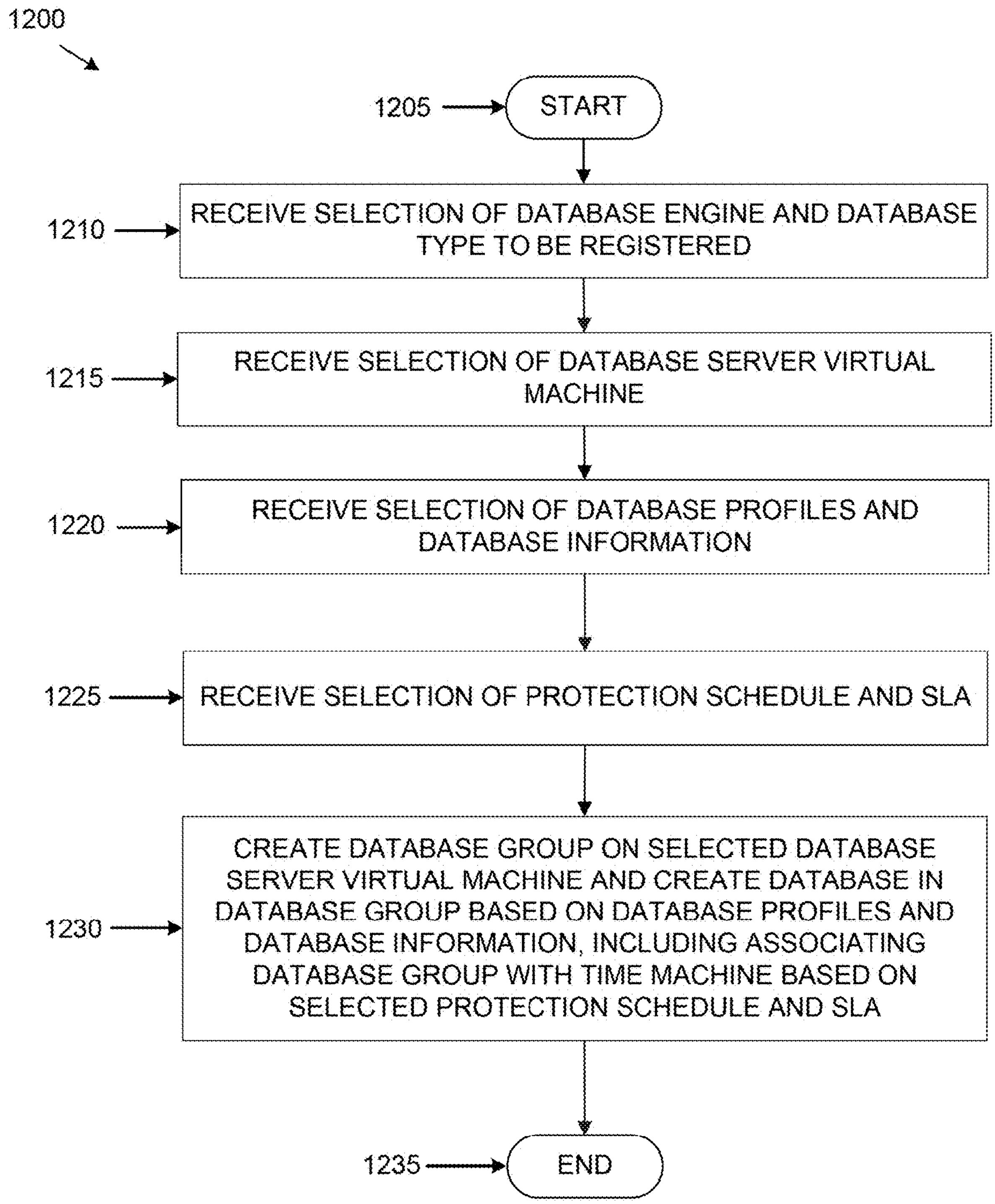
FIG. 12 is another example flowchart outlining operations for creating a database group, in accordance with some embodiments of the present disclosure.

Turning now to FIG. 12, an example flowchart outlining operations of a process 1200 is shown, in accordance with some embodiments of the present disclosure. The process 1200 may be implemented by the database management system 205 and may be used to create a new database group. The process 1200 may also be used to provision a new database and add the newly provisioned database to the newly created database group. Specifically, the database management system 205 receives inputs from the user (e.g., via the dashboard 210) and performs operations in response to those inputs to create a new database group and a new database, as well as add the new database to the newly created database group. FIG. 12 is explained in conjunction with FIGS. 13-17, which display various example user interfaces, in accordance with some embodiments of the present disclosure. The process 1200 may include other or additional operations depending upon the particular embodiment. The process 1200 starts at operation 1205 when the user desires to create a new database group and provision a new database within the newly created database group. For example, and as shown in FIG. 5, the user may access the dashboard 500 (e.g., the dashboard 210) of the database management system 205 to start the process 1200. From the dashboard 500, the user may select the provision option 505 to start the process 1200.

At operation 1210, upon selecting the provision option 505, the database management system 205 presents the user with a list of available database engines (e.g., similar to the drop down list 515, the list 520). Thus, at the operation 1210 and similar to the operation 410, the user selects either a stand-alone database or a clustered database for provisioning. The database management system 205 configures the remaining user interfaces that are presented to the user based on the database engine selected by the user at the operation 1210. The description below is with respect to stand-alone databases. For a clustered database, an additional user interface may be presented to request the AG name under which the database is to be provisioned.

Figure 13:
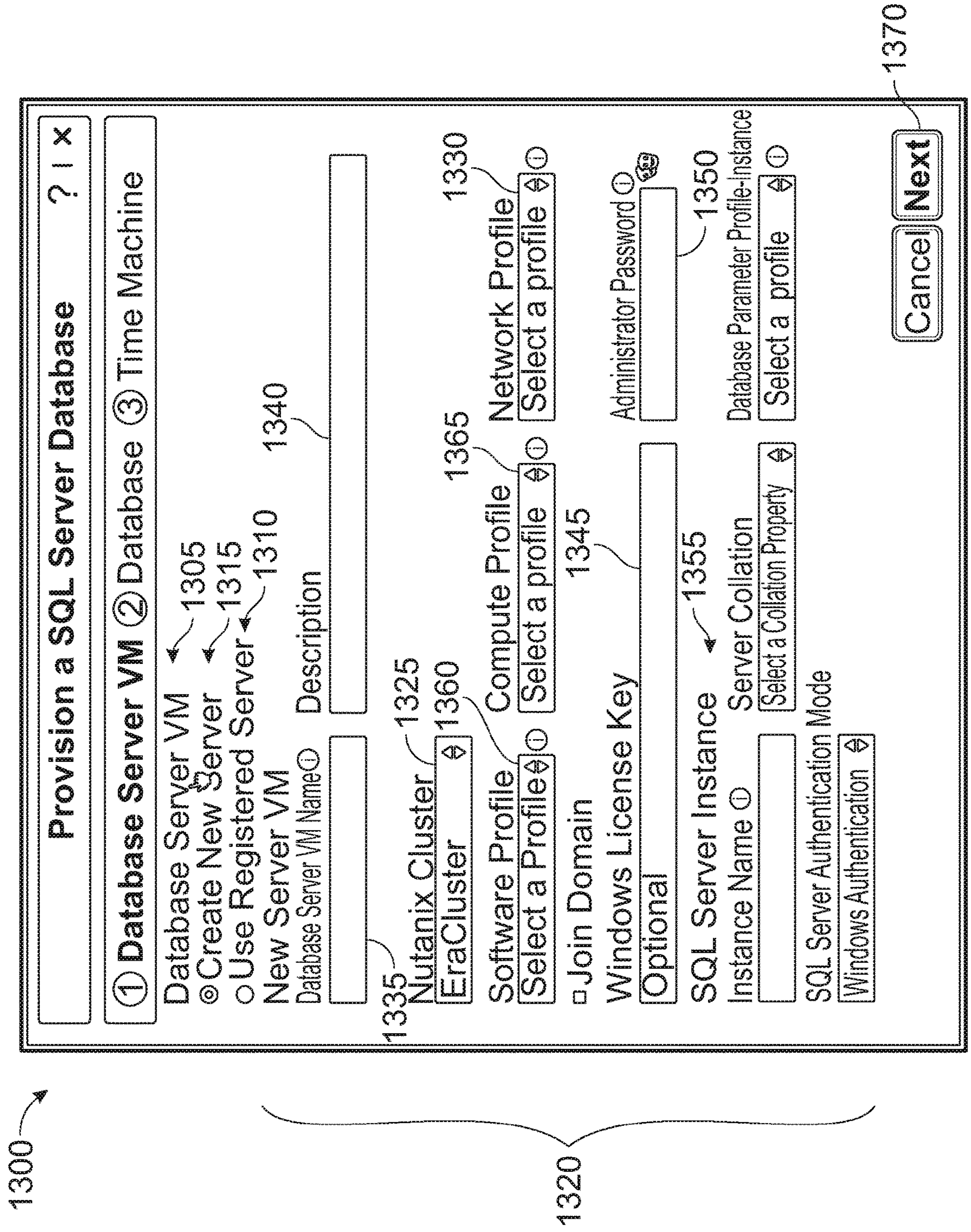
FIGS. 13-17 are example user interfaces showing the creation of the database group, as outlined in the flowchart of FIG. 12, in accordance with some embodiments of the present disclosure.
Figure 14:
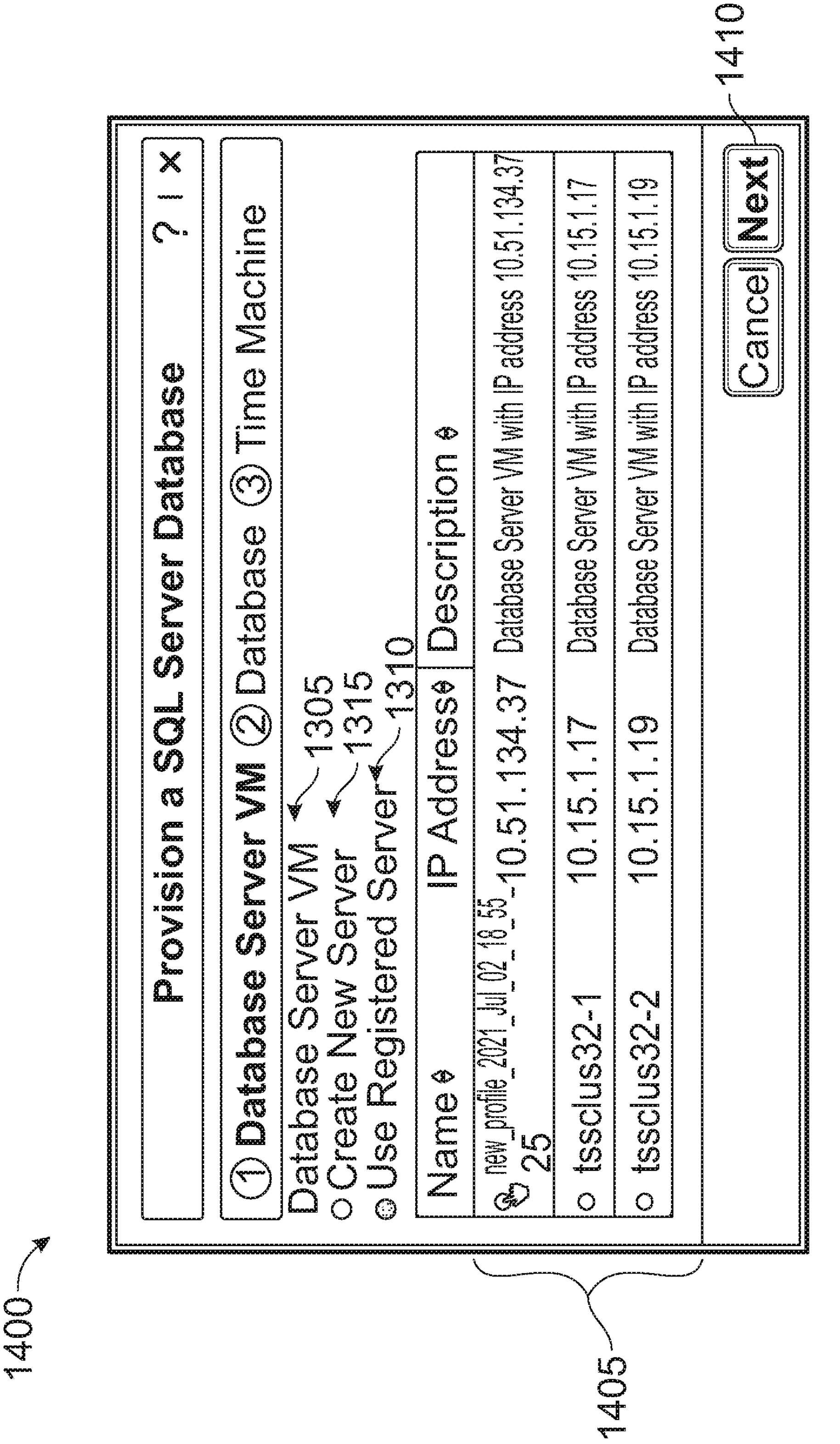
Figure 15A:
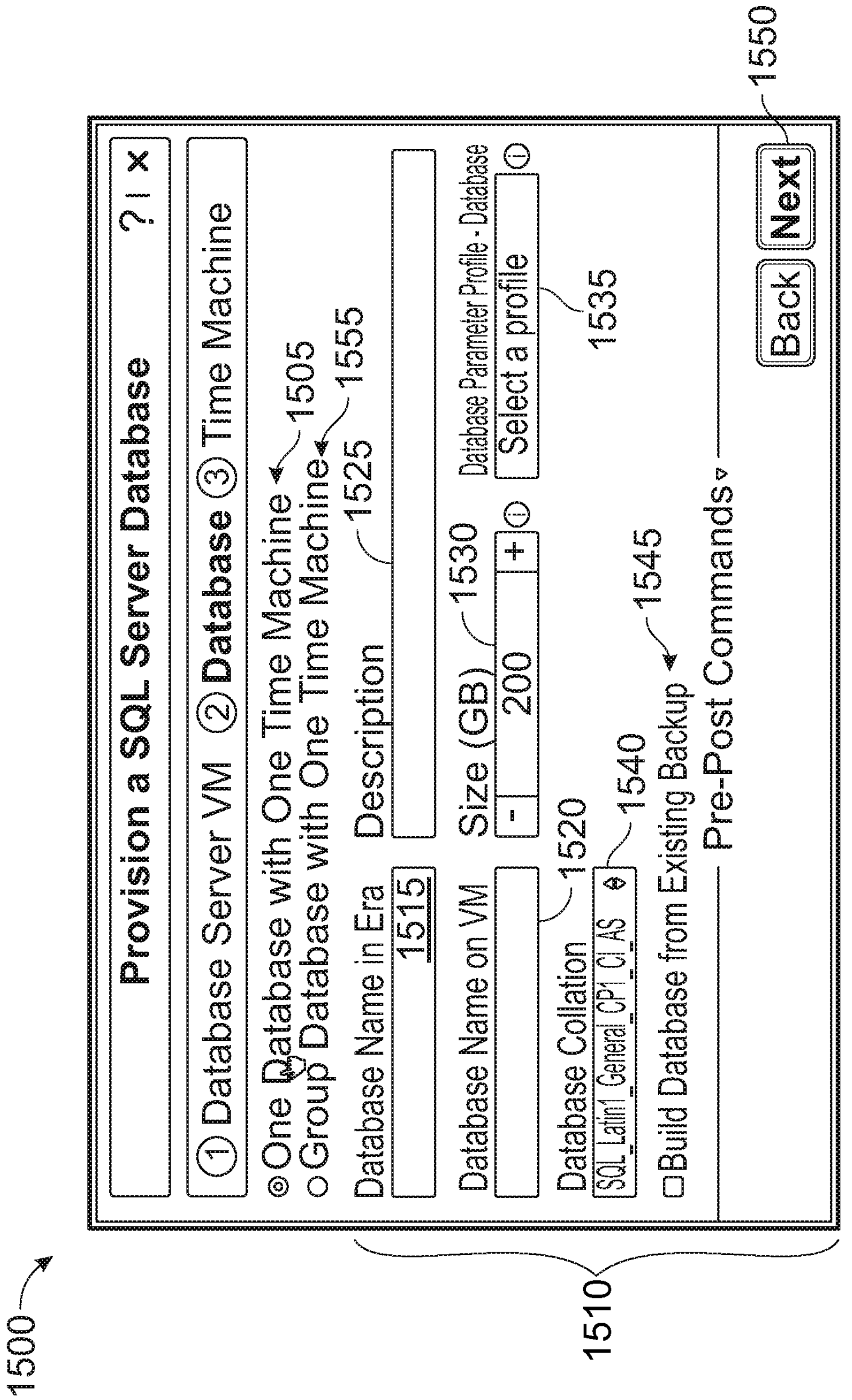
Figure 15B:
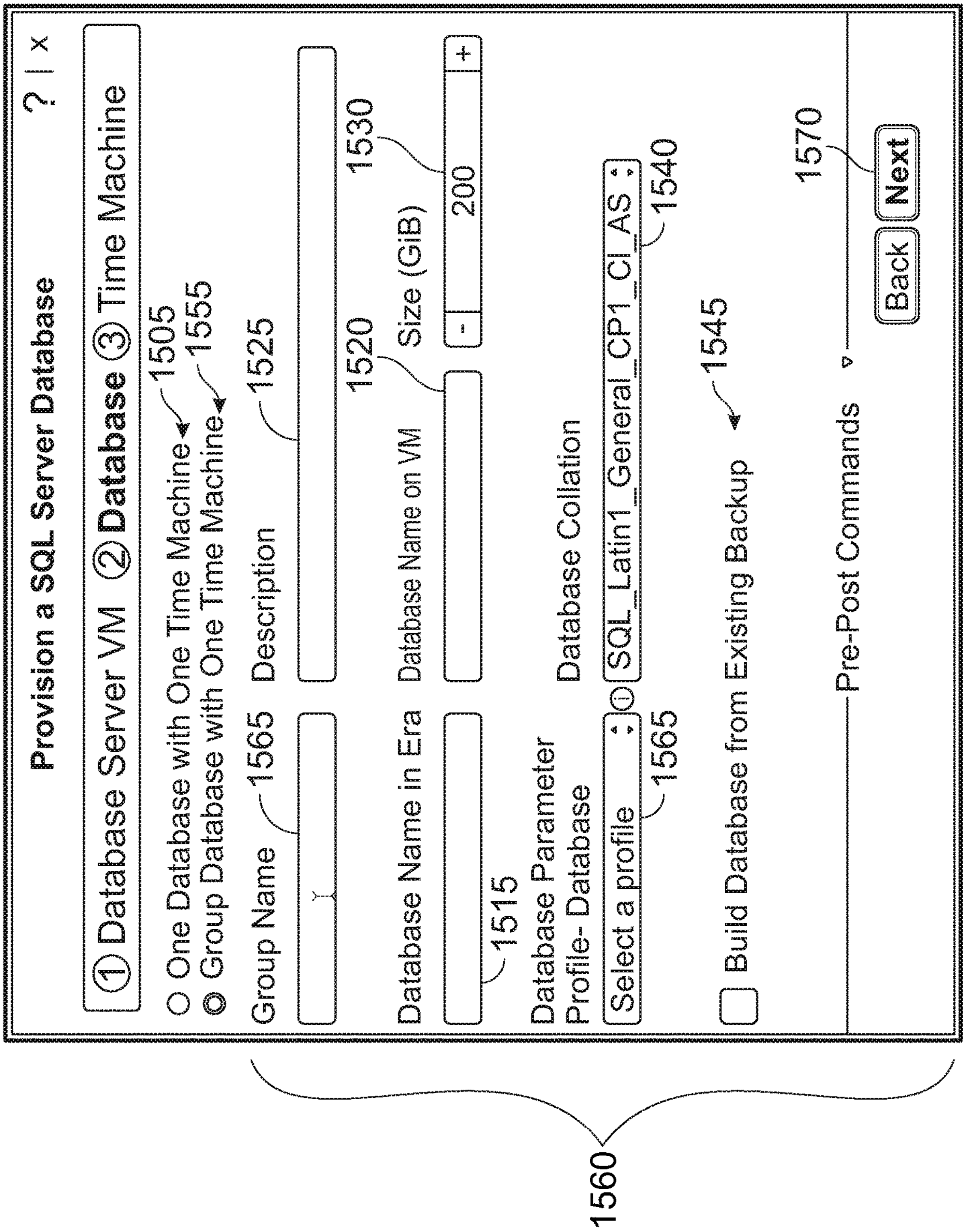
Figure 16:
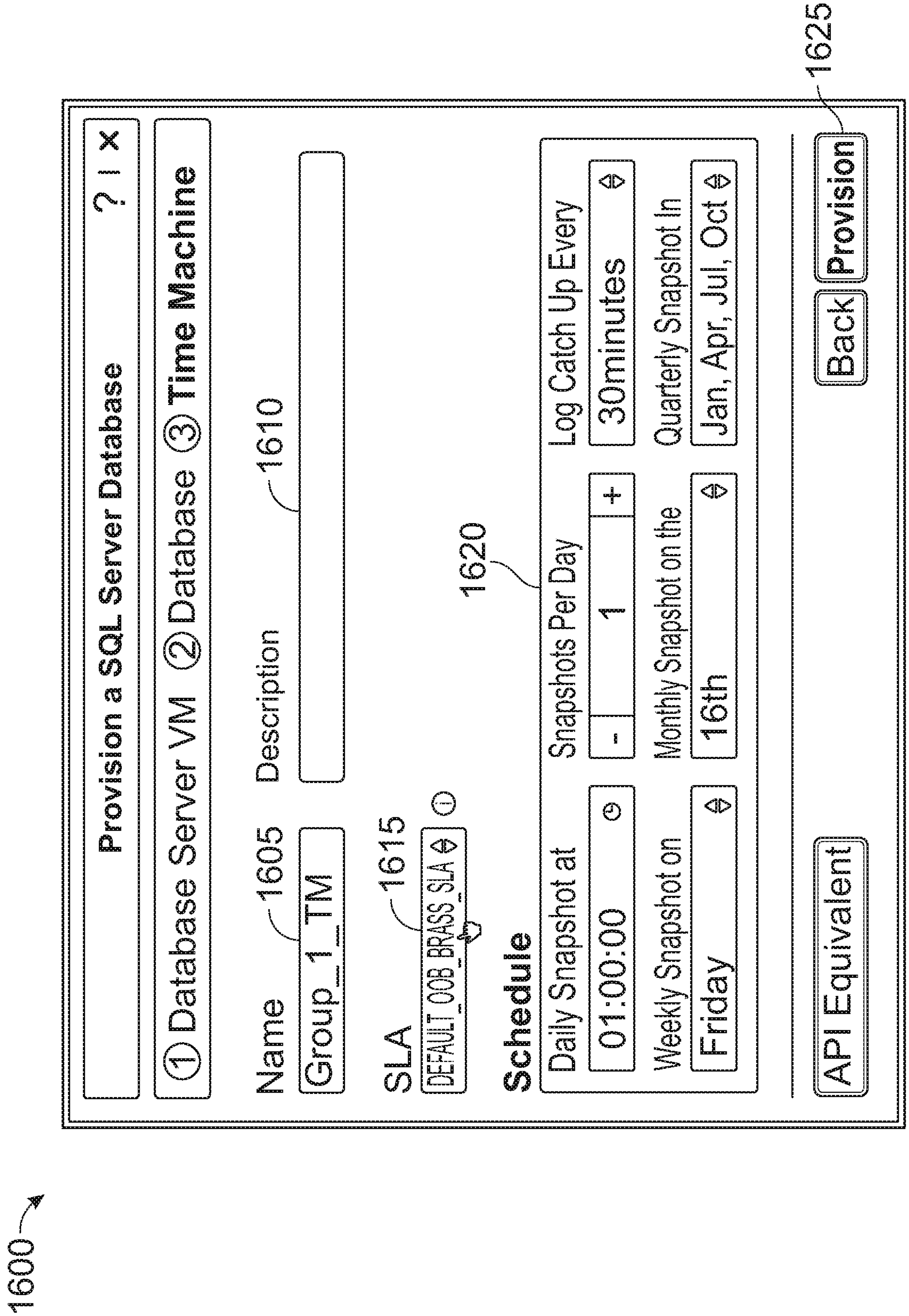
Figure 17:
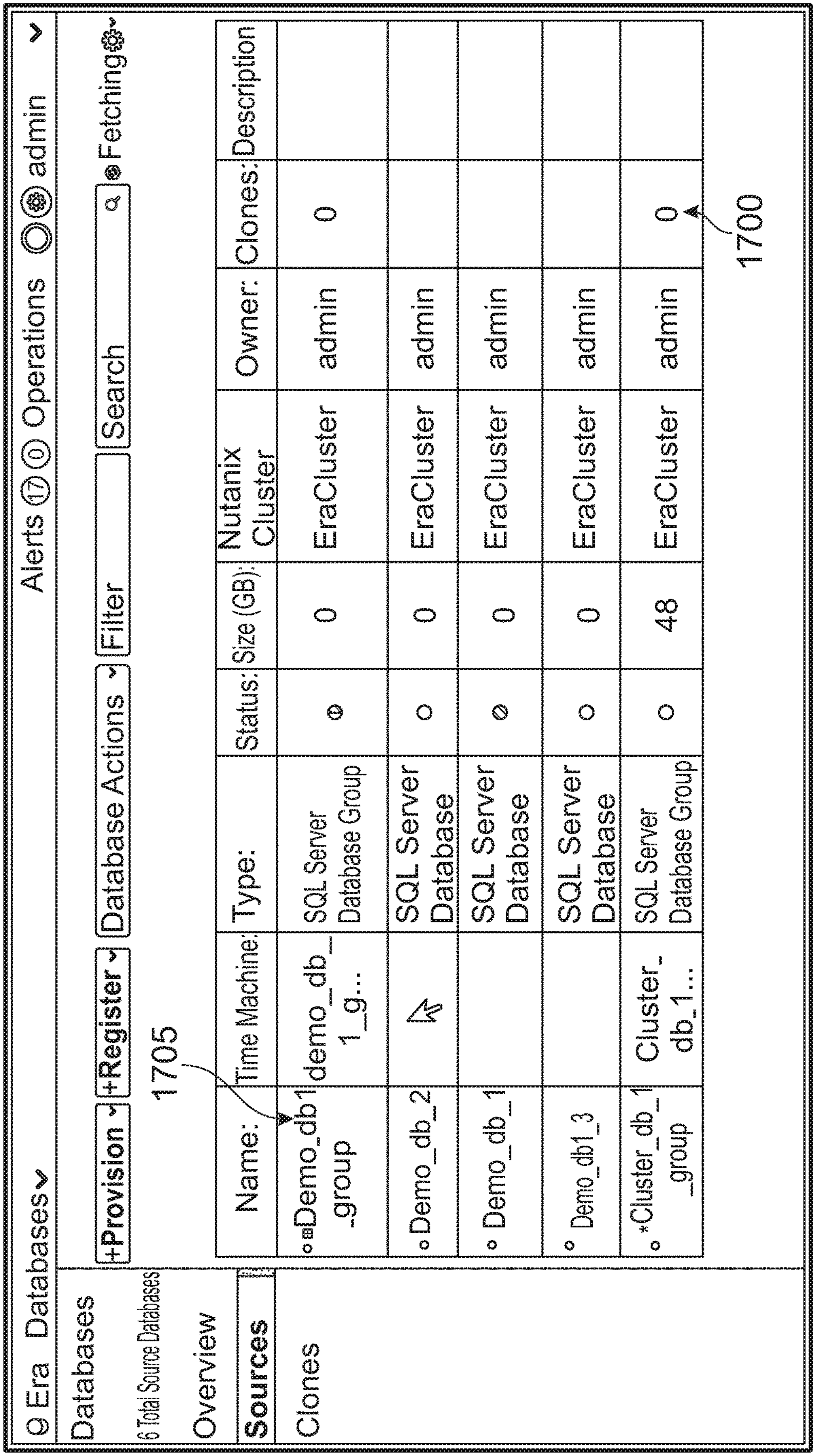

At operation 1215, the database management system 205 receives a selection of a database server virtual machine on which the database group is to reside. Referring to FIG. 13 in conjunction with FIG. 12, upon selecting the database type from the list 520, a user interface 1300 of FIG. 13 may be displayed in some embodiments. The user interface 1300 may present a database server virtual machine selection option 1305 having a first choice 1310 for selecting a previously registered database server virtual machine and a second choice 1315 for registering a new database server virtual machine with the database management system 205. The remaining of the user interface 1300 shows the fields that may be displayed upon receiving selection of the second choice 1315 for a database server virtual machine to be newly registered with the database management system 205. Specifically, upon receiving selection of the second choice 1315, the database management system 205 may present user interface 1320 to newly register a database virtual machine. In some embodiments, the user interface 1320 may be presented in a separate user interface.

The user interface 1320 may request similar information as the user interface 620. For example, the user interface 1320 may request the user for selections of a cluster 1325 on which the database server virtual machine resides, a network profile (e.g., IP address, name, etc.) 1330 to identify where the database server virtual machine is located, a name 1335 and description 1340 of the database server virtual machine to identify the database server virtual machine, username 1345 and password 1350 of a user authorized to create the database group, details of an instance 1355 to select the specific instance (e.g., the database virtual machine) associated with the network profile, and any other details that may be needed. In some embodiments, the user interface 1320 may request selection of additional profiles, as discussed in operation 1220.

For example, in some embodiments, the user interface 1320 may request for a software profile 1360 and a compute profile 1365. A software profile defines the software and operating system parameters for the database engine that is selected at the operation 1210. For example, if at the operation 1210, the database engine is selected as SQL Server, the software profile may include one or more software and operations system image profiles associated with SQL Server. Each software profile may define the rules that are to be applied in managing the database/database group being created. In some embodiments, one or more sample software profiles may be available for the user to select. In other embodiments, the user may create their own custom software profile or modify an existing software profile to suit their needs. When creating their own custom software profile or modifying an existing software profile, in some embodiments, the user may be required to create/modify the software profile before starting the process 1200, while in other embodiments, the user may be able to create the custom software profile as part of the operations 1215/1220.

A compute profile defines the size/configuration of the database server. For example, the compute profile may define the number of vCPUs, number of cores per vCPU, and memory capacity to be associated with the database virtual machine. In other embodiments, the compute profile may define other or additional configurational parameters. A network profile (e.g., the network profile 1330) identifies the network location of the cluster and/or the database server virtual machine. Similar to the software profile, a sample network profile may be available for the user to select. Alternatively, the user may create a new network profile or modify an existing network profile either before starting the process 1200 or during the operations 1215/1220.

In other embodiments, other or additional information may be requested for creating a new database server virtual machine. Upon completing the required fields (e.g., not all fields may be required), the user may click on a next button 1370 to go to the next operation. On the other hand, if the user selects the first choice 1310 for using a previously registered database server virtual machine, a user interface 1400 of FIG. 14 may be displayed. The user interface 1400 may present a list 1405 of previously registered database server virtual machines. The user may select a database server virtual machine from the list 1405 and click on a next button 1410 to go to the next operation. Thus, at the operation 1215, the database management system 205 receives a selection of a database server virtual machine from the user.

At operation 1220, the database management system 205 receives selection of additional profiles and information related to the database being provisioned. For example, upon clicking on the next button 1370 or the next button 1410, the user may be directed to a user interface 1500 of FIG. 15A. The user interface 1500 may request selection of whether the user desires to associate the database being provisioned with a database group. For example, the user may select a first option 1505 if the user desires to provision a database having its own dedicated time machine. In such a case, the provisioned database does not become part of a database group (e.g., no database group will be created through the process 1200). If the user selects the first option 1505, a user interface portion 1510 requests names 1515 and 1520 of the database, a description 1525, a size 1530 of the database being provisioned, a database parameter profile 1535, and a database collation 1540 if appropriate. Database collation may be a set of rules that tell the database engine how to compare and sort the character data in SQL server. In some embodiments, collation may be set at different levels in the SQL server. The name 1515 may be the name that may be displayed on the dashboard 500 and a database list page. The name 1520 may be the name of the database on the database server virtual machine. In some embodiments, the names 1515 and 1520 may be same. In other embodiments, the names 1515 and 1520 may be different. In some embodiments, the user interface portion 1510 may also present an option 1545 to provision a database from a backup.

For example, when a user wants to migrate their databases from a 3-tier architecture to a hyperconverged architecture, the user may take a native backup of the database and use the database management system 205 to provision the database from the native backup. Thus, if the option 1545 is selected, the database may be created from a native backup. The user may need to provide a backup path when the native backup is located and the name of the native backup, and the database management system 205 may provision a new database from the native backup. A database created from a native backup may be different from a cloned database. A cloned database is a database created from the snapshot taken by the database management system 205.

A database parameter profile defines the custom parameters that are applied to the database being created. A sample database parameter profile may be available for the user to select in some embodiments. Alternatively, the user may create a custom database parameter profile or modify an existing database parameter profile, either before starting the process 1200 or during the operation 1220. In other embodiments, the user interface portion 1510 may request for other or additional information. Upon completing the user interface portion 1510, the user may click on a next button 1550 to go to the next operation.

Instead of using the first option 1505 in which the provisioned database is not part of a database group, the user may select a second option 1555. The second option 1555 may be for creating a database group and associating the provisioned database with the database group. When creating the database group, a single time machine may be created for all the databases in the database group. Upon selecting the second option 1555, the user may be presented with a user interface portion 1560 shown in FIG. 15B. The user interface portion 1560 may request similar information as the user interface portion 1510. The user interface portion

1560 may also request a name 1565 for the database group being created. The user may click on a next button 1570 to move to the next operation.

At operation 1225, the database management system 205 receives selection of an SLA and protection schedule to create a time machine. If the user selected the first option 1505, the time machine is created for the database being provisioned only. If the user selected the second option 1555, the time machine is created for the database group and the same time machine applies to all databases within the database group. To select the SLA and protection schedule, a user interface 1600 of FIG. 16 may be displayed upon clicking on the next button 1550 or 1570. The user interface 1600 is similar to the user interface 900, and therefore, not described in detail again. The user interface 1600 allows the user to create a name 1605 for the time machine, enter a description 1610 of the time machine, and select an SLA 1615 and a protection schedule 1620. The protection schedule 1620 may require selection of similar parameters as in the protection schedule 925.

Upon completing the user interface 1600, the user may click on a provision button 1625 to be taken back to the dashboard 500 where the newly created database group is displayed, as indicated by field 1700, upon creation at operation 1230. To create the database and the database group, the database management system 205 may initiate a series of operations. For example, the database management system 205 may create one or more database server virtual machine (if a new database virtual machine is being created/registered), convert the database size into a number of virtual disks associated with that cluster and that are needed to house the database, create a database profile having a database name, description, network information, etc., attach the software and parameters of the database engine type with the database, create an instance of the time machine, associate the SLA and schedule with the database protection system, designate storage for storing snapshots and transactional logs, etc. Once the database is created, database management services (e.g., copy data management services) may be applied to the databases within the database group.

Figure 18:
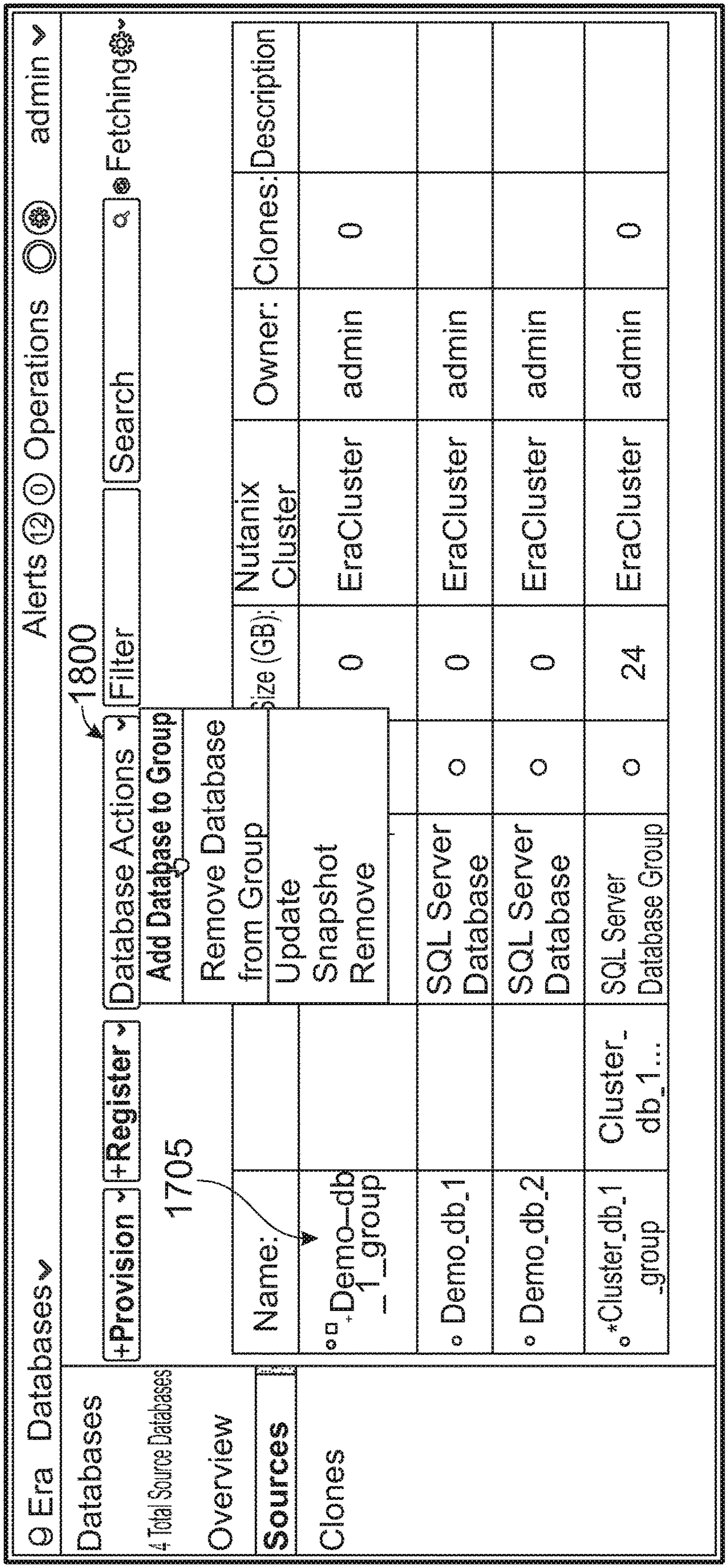
FIGS. 18-19B are example user interfaces showing addition of a database to a database group, in accordance with some embodiments of the present disclosure.

In some embodiments, instead of creating a new database group when registering or provisioning a database, the user may desire to simply register or provision a database to an existing database group. In such embodiments, the user may start with the dashboard (e.g., the dashboard 500, 210). From the dashboard, the user may select a database group with which a new database is to be registered or provisioned. For example and referring to FIG. 17, say the user desires to add a new database to a database group 1705 that was previously created. The user may select the database group, as shown in FIG. 18, and select an "add database to group" option from a database actions list 1800. The database actions list 1800 may present other actions (e.g., capture manual snapshot, delete the database group, update the database group, remove a database from the database group, etc.) that the user may take on the database group.

Figure 19A:
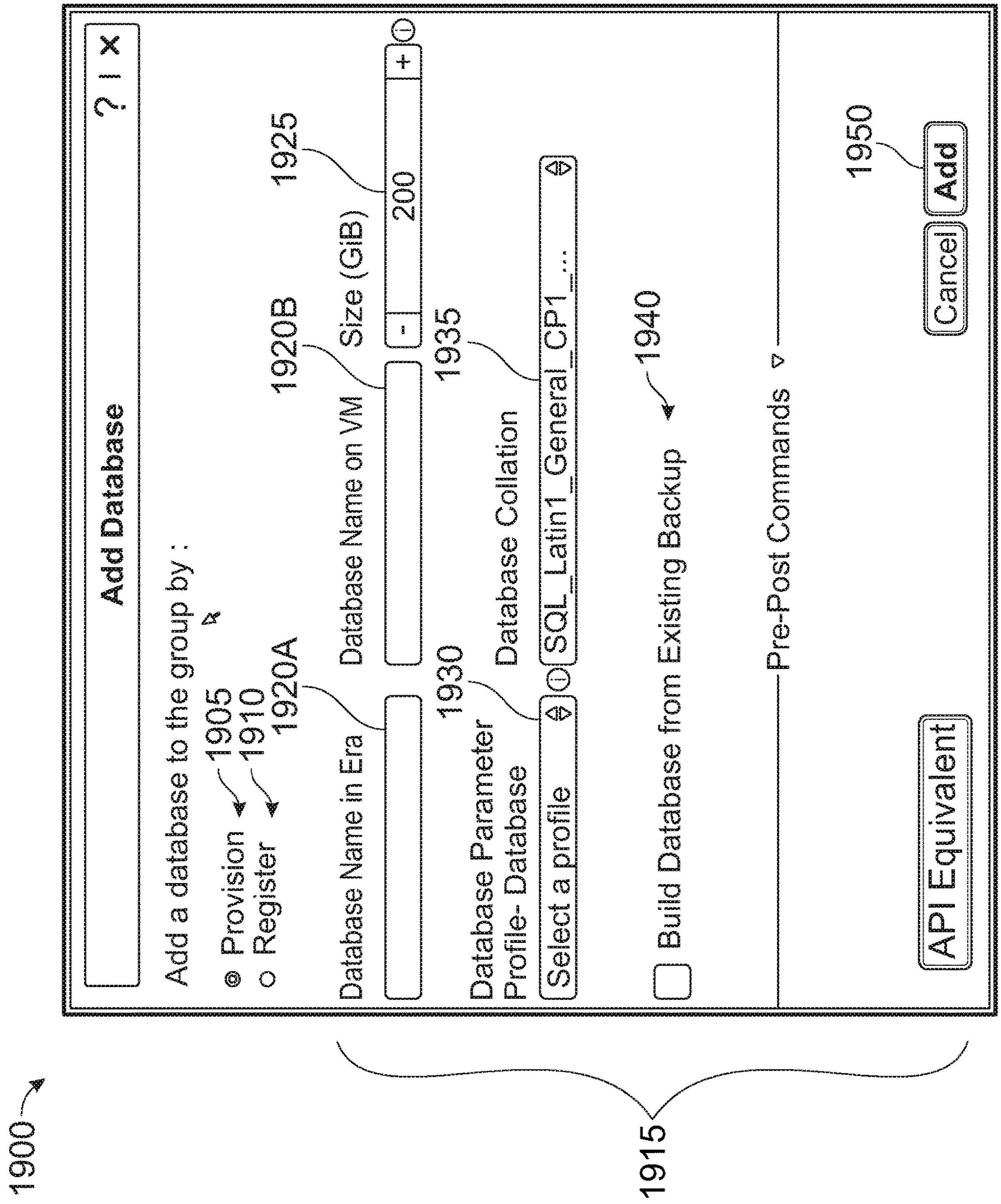
Figure 19B:
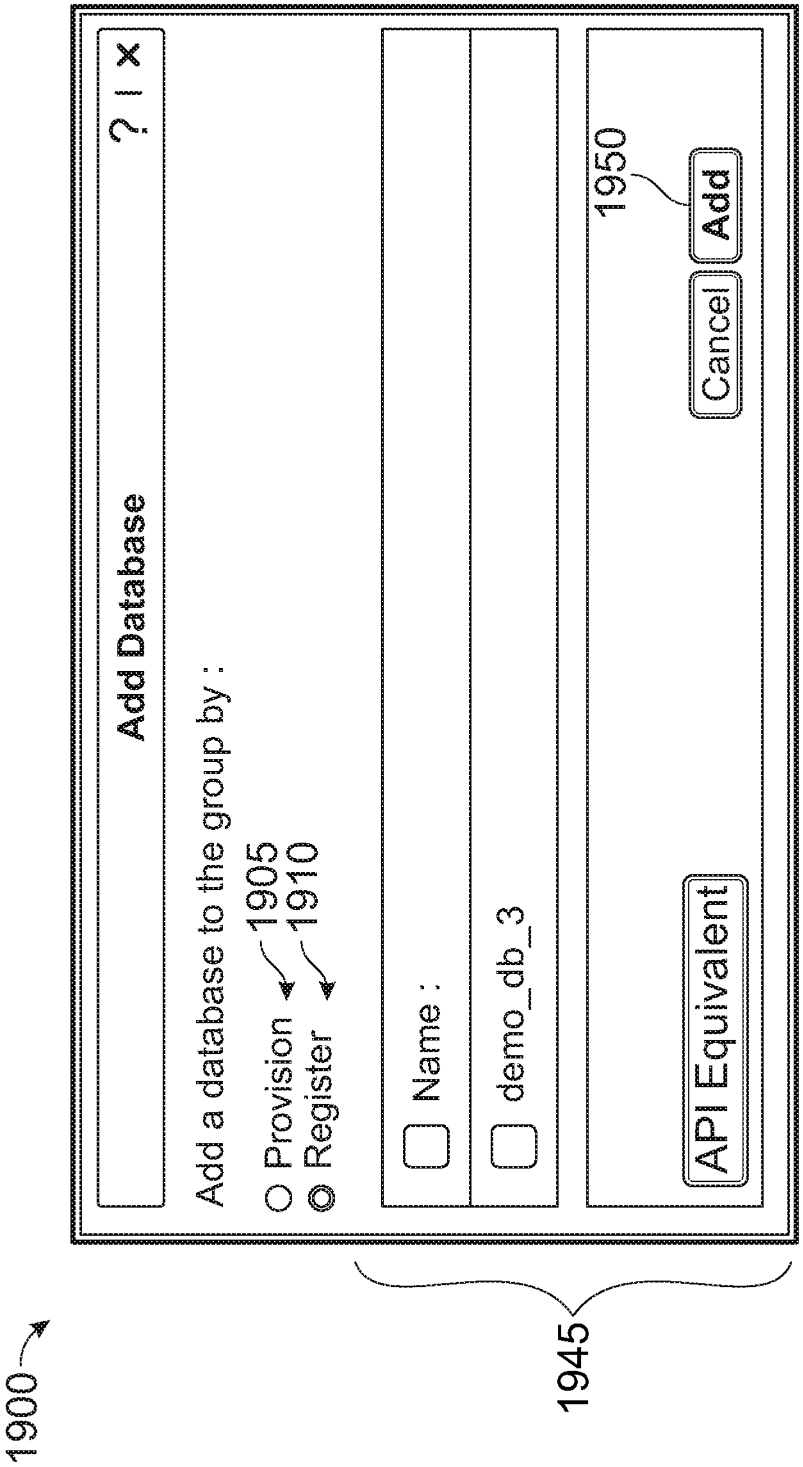

Upon selecting the "add database to group" option from the database actions list 1800, the user may be presented with a user interface 1900 of FIG. 19A or FIG. 19B. The user interface 1900 presents a provision option 1905 to allow a user to provision a new database on an existing database group or a register option 1910 if the user desires to register an existing database with the existing database group. For example, if the user selects the provision option 1905 as shown in FIG. 19A, a user interface portion 1915 may be displayed in which the user is requested for names 1920A, 1920B, size 1925, a database parameters profile 1930, a database collation 1935, and option 1940 to provision database from an existing backup. In other embodiments, the user interface portion 1915 may request for other or additional information. On the other hand, if the user desires to register an existing database, the user may select the register option 1910 in which case a user interface portion 1945 of FIG. 19B may be displayed. The user interface portion 1945 may discover and list all databases that reside on the database virtual machine associated with the database group 1705 that are currently not part of any database group. In some embodiments, only those databases may be presented that are not currently managed by the database management system 205 (e.g., do not have a time machine associated therewith) and that are not part of any database group. In some embodiments, databases that have the same database engine as the database group may be presented. In some embodiments, to make a database that is already managed by the database management system 205 (e.g., has a time machine associated therewith) part of a database group, the database may be removed from the management of the database management system and/or the time machine associated with the database may be deleted to allow adding that database to the database group. Upon adding the database to the database group, the database may be managed by the time machine associated with the database group.

The user may select one or more databases from that list. Upon completing the user interface portion 1915 or 1945, the user may click on an add button 1950 to either provision a new database with the database group 1705 or register an existing database with the database group. Upon being added, the database that was provisioned or registered may be displayed in the database group 1705 in the dashboard. Further, the time machine that is applicable to the database group 1705 may now be applied to the added database.

Figure 20:
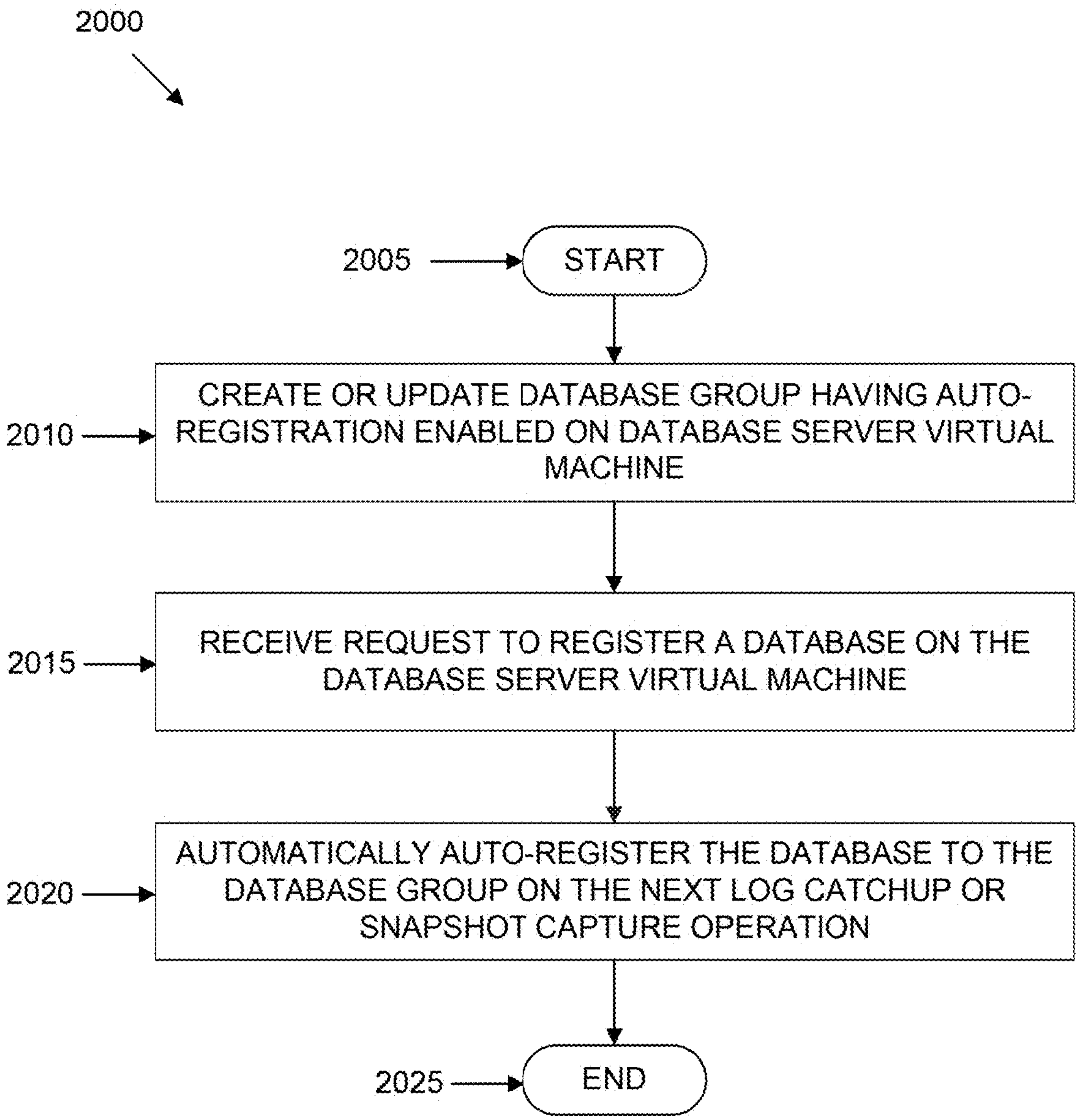
FIG. 20 is an example flowchart outlining operations for auto-registering databases with a database group, in accordance with some embodiments of the present disclosure.

Turning now to FIG. 20, an example flowchart outlining a process 2000 is shown, in accordance with some embodiments of the present disclosure. The process 2000 may be used to add databases to an existing database group via the auto-registration feature, discussed above. By adding database to a database group through auto-registration, those databases may be protected using the same time machine of the database group, thereby avoiding the need for users to individually create time machines for respective databases. Further, by adding databases automatically to a database group, a user may not need to specifically identify which database group a database should be part of and manually add the database to the database group. Rather, the database management system 205 may make the determination for the user and automatically add the database to an appropriate database group.

Thus, upon starting at operation 2005, the database management system 205 creates a new database group with the auto-registration feature enabled or updates an existing database group to enable the auto-registration feature at operation 2010. In some embodiments, the database management system 205 may create a new database group, as discussed above in FIGS. 4-19B. In other embodiments, the database group may be created with at least one database registered or provisioned therein, as discussed above. In some embodiments, the auto-registration feature may be available only for databases being registered (e.g., not available for databases being provisioned). In other embodiments, the auto-registration feature may also be available for databases being provisioned.

At operation 2015, the database management system 205 receives a request to register a new database within the database management system. During the registration process, which is described in greater detail in U.S. application Ser. No. 16/234,553, filed on Dec. 27, 2018, the entirety of which is incorporated by reference herein, the database management system 205 may decide if the database is to be automatically added (e.g., auto-registered) to a database group. For example, in some embodiments, the database management system 205 may receive selection of a database server virtual machine for the database being registered. The database management system 205 may then determine if any suitable database groups exist on the database server virtual machine. If no database groups are found on the database server virtual machine (e.g., if a new database server is being created), then the database management system 205 may create a new database group, as discussed above, and add the database being registered to the newly created database group. If yes, the database management system 205 may identify a database group to add the database group to add the database to.

For example, in some embodiments, the database management system 205 may determine that a single database group exists on the database server virtual machine and that the auto-registration feature of that database group is enabled. If so, at operation 2020, the database management system 205 adds the database being registered to the database group. In some embodiments, the database management system 205 may determine that there are multiple database groups on the database server virtual machine. In such cases, auto-registration may be enabled on only one database group. Thus, the database management system may identify the database group that has the auto-registration feature enabled to add the database. If multiple database groups have auto-registration feature enabled, the database management system 205 may use other mechanisms to select one of the database groups that have the auto-registration enabled for adding the database being registered. Upon selecting one database group, the database management system 205 adds the database to the database group at the operation 2020. The process 2000 ends at operation 2025.

Figure 21:
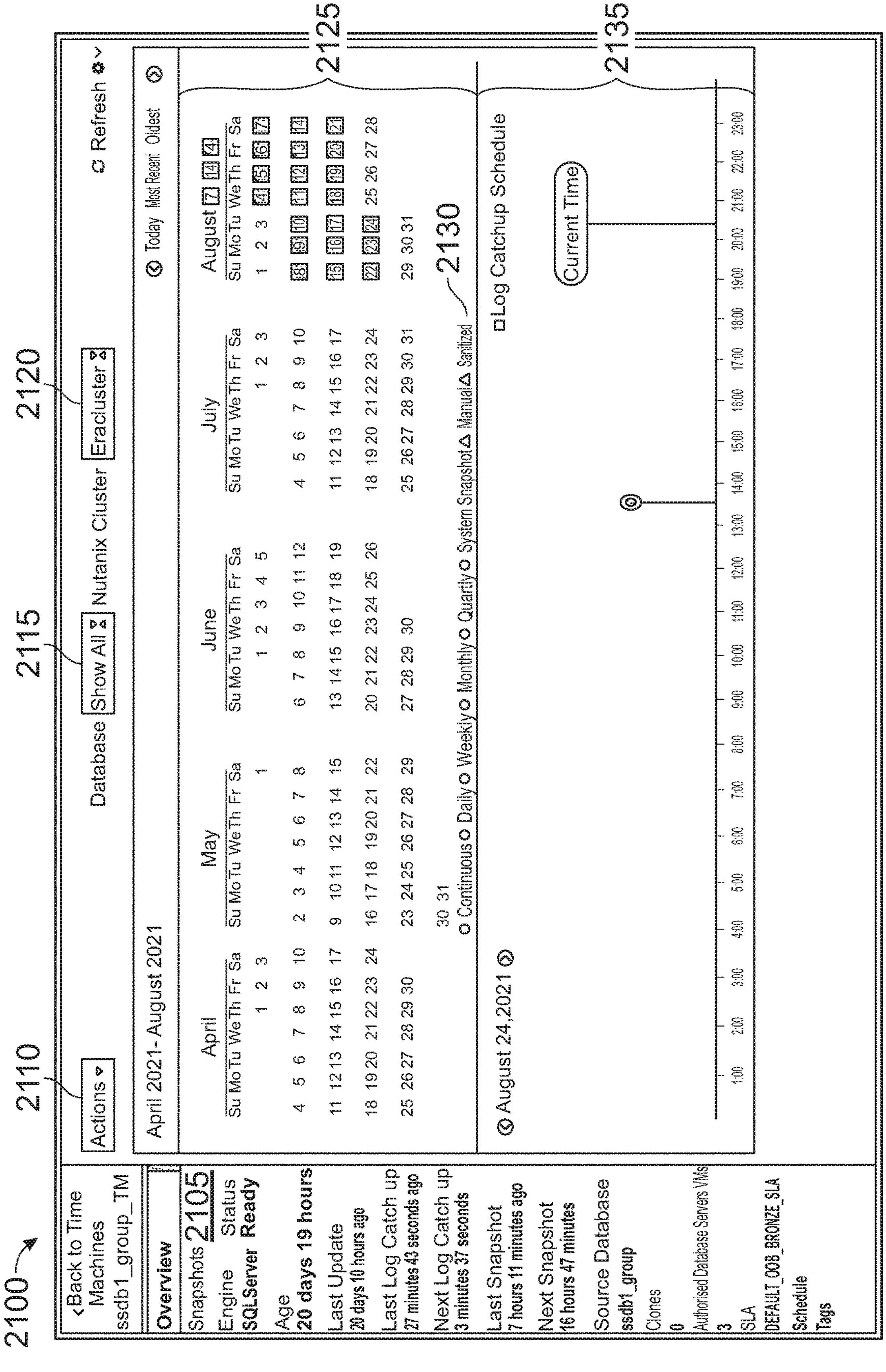
FIG. 21 is an example user interface showing a time machine dashboard of a database group, in accordance with some embodiments of the present disclosure.

Referring to FIG. 21, an example time machine dashboard 2100 is shown, in accordance with some embodiments of the present disclosure. The time machine dashboard 2100 is similar to the dashboard 210. The time machine dashboard 2100 may be associated with a time machine of a database group. Thus, the time machine dashboard 2100 may show a summary or default collective view of all the databases in the database group that is associated with the time machine dashboard 2100. The time machine dashboard 2100 may include a summary section 2105. The summary section 2105 may display one or more configurational features of the database group such as the database engine, how long ago was the database group created (e.g., age), the last time the database group was updated (e.g., last update), the last time transactional log was captured, the next period for capturing a transactional log (e.g., next log catch up), when the last snapshot was captured, when the next snapshot is to be captured, the name of the database group, the number of clones previously made from the database group (e.g., clones), the SLA level of the source database (e.g., SLA), and the protection schedule (e.g., schedule). In other embodiments, other or additional details may be provided in the summary section 2105.

The time machine dashboard 2100 may also include an actions tab 2110 that provides various actions that a user may take. For example, the user may select a clone option to create a new clone of one or more databases of the database group. The user may elect to manually capture transactional logs or snapshots, restore one or more databases of the database group, and/or perform other allowed operations. The time machine dashboard 2100 may also include a database selection field 2115 that allows the user to customize the view of the time machine dashboard. For example, if a "show all" option is selected, as shown in FIG. 21, then the time machine dashboard 2100 may show a collective view of all the databases in the database group. Alternatively, the user may select one or more specific databases of the database group to show the time machine view of the selected databases. The data that may be displayed within the time machine dashboard 2100 may be associated with the selected databases. Additionally, the time machine dashboard 2100 may include a cluster tab 2120 showing the cluster on which the database group is located. Additional or other pieces of information may be displayed on the time machine dashboard 2100.

Further, the time machine dashboard 2100 may display a calendar 2125. The calendar 2125 may visually display the SLA associated with the database group. For example, the calendar 2125 may include a color coded legend to represent the duration for the continuous, daily, weekly, monthly, and quarterly protection parameters for a selected number of months. For example, the calendar 2125 shows five months (April-August) with dates highlighted based upon the protection parameter that applies to that date.

For example, by looking at the calendar 2125, the user may quickly determine that August 18-August 24 fall under the continuous protection parameter and August 4-August 17 fall under the daily protection parameter. The calendar 2125 also shows that manual snapshots were captured on August 4-6 and 13. Although not shown, the calendar 2125 may show the dates for weekly, monthly, quarterly protection, in color coded format represented by color legend 2130. The calendar 2125 may show additional information as well. Further, upon selecting a particular date from the calendar 2125, the user may view additional details of available snapshots and transactional logs for that date from which a clone may be created. For example, in FIG. 21, August 24 is shown as selected. Thus, for August 24, a time scale 2135 shows the available snapshots/transactional logs. The line between 13:00 and 14:00 on the time scale 2135 may show when the snapshot was captured. Since August 24 falls under the continuous protection parameter, the user may select any time on the time scale 2135 to create a clone of one or more databases in the database group. If for example August 9 is selected by the user, the time scale 2135 may highlight the time at which the daily snapshot was captured (as identified from the protection schedule) and which the user may be able to select to create a clone from. Thus, the time machine dashboard 2100 provides a user friendly, visual, and intuitive interface for easily and quickly determining how the database group is protected and the level of protection that is available to the databases within the database group.

Figure 22:
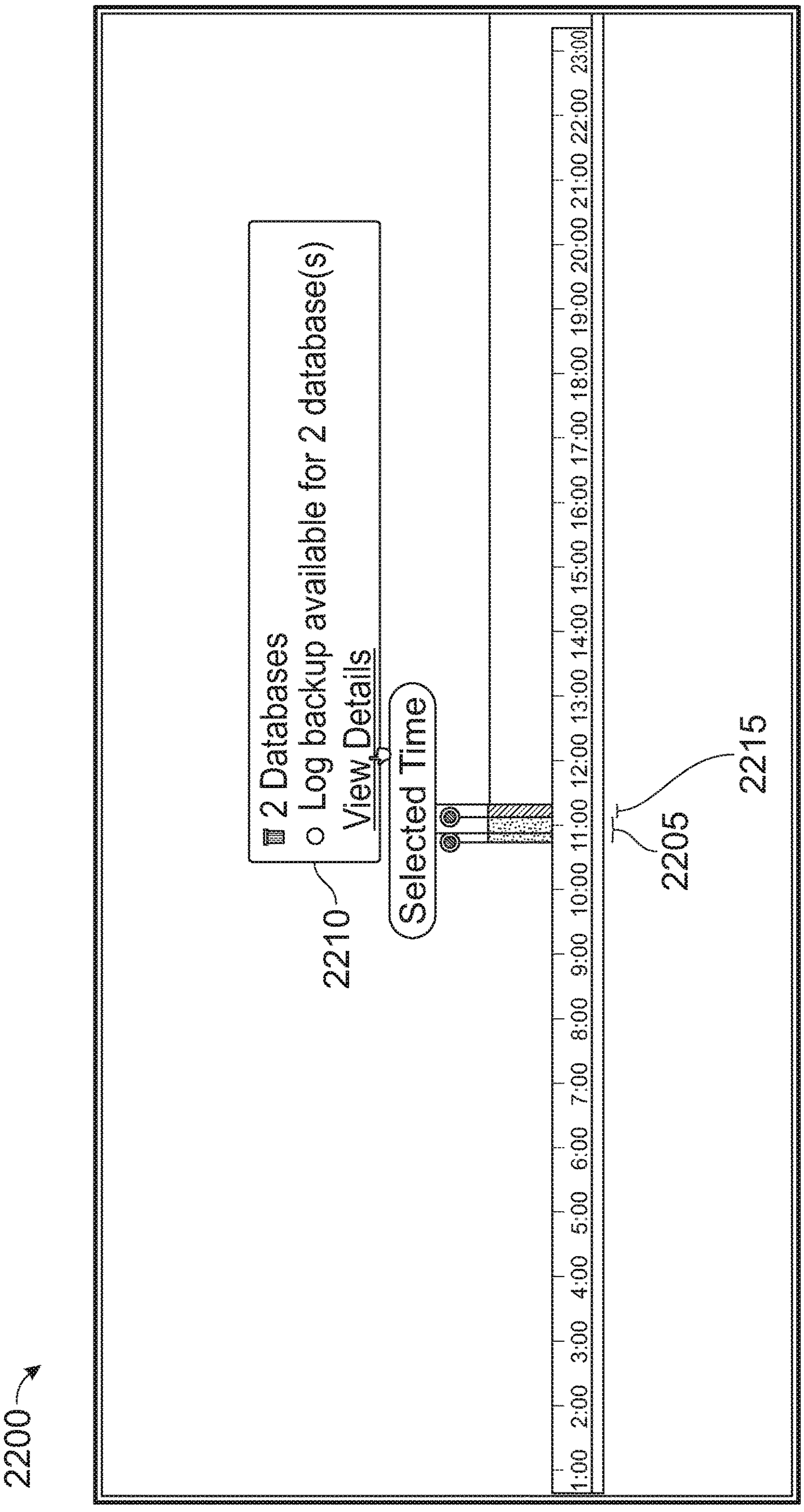
FIG. 22 is an example user interface showing additional details of a time scale portion of a time machine dashboard of a database group, in accordance with some embodiments of the present disclosure.

In some embodiments, the time scale 2135 may show a color coded legend indicating the number of databases within the database that are protected for a particular time. For example, in some embodiments, for each time period, the time scale 2135 may show a green coded portion if all databases within the database group have transactional logs available, a yellow coded portion if transactional logs are available for some but not all databases within the database group, and a white or pink coded portion if no transactional logs are available for any databases within the database group. For example, FIG. 22 shows an example time scale 2200 for a particular date in which a first color (e.g., green) coded portion 2205 indicating that all databases in the associated database group have available transactional logs. By interacting (e.g., clicking, hovering, etc.) with the first color coded portion 2205, the user may see in a box 2210 that the database group includes 2 databases and both databases have transactional logs available. Other or additional information may be displayed within the box 2210. For example, by clicking on the "view details" option, the user may be displayed which databases are part of the database group and any additional information associated with those databases. The time scale 2200 may also include a second color (e.g., pink) coded portion 2215 that may be indicative of transactional logs not being available for some databases in the database group. For example, a box similar to the box 2210 may be displayed when the interacts (e.g., clicks, hovers, etc.) on the second color coded portion 2215 that shows which databases in the database group have available transactional logs and which databases in the database group do not have available transactional logs. Thus, the time scale 2200 provides an easy, visual, and convenient mechanism to identify the protection status of the databases in a database group.

In other embodiments, other colors or legends may be used to show how the databases within the database group are protected. In some embodiments, one or more of the color coded portions may be interactive and may provide additional information to the user. For example, in some embodiments, by hovering or clicking on the yellow coded portion, the user may determine the number of databases in the database group that have transactional logs available and the number of databases in the database group that do not have transactional logs available. In some embodiments, which databases have transactional logs and which database don't may also be shown, along with any other details that may be needed or considered desirable.

Figure 23:
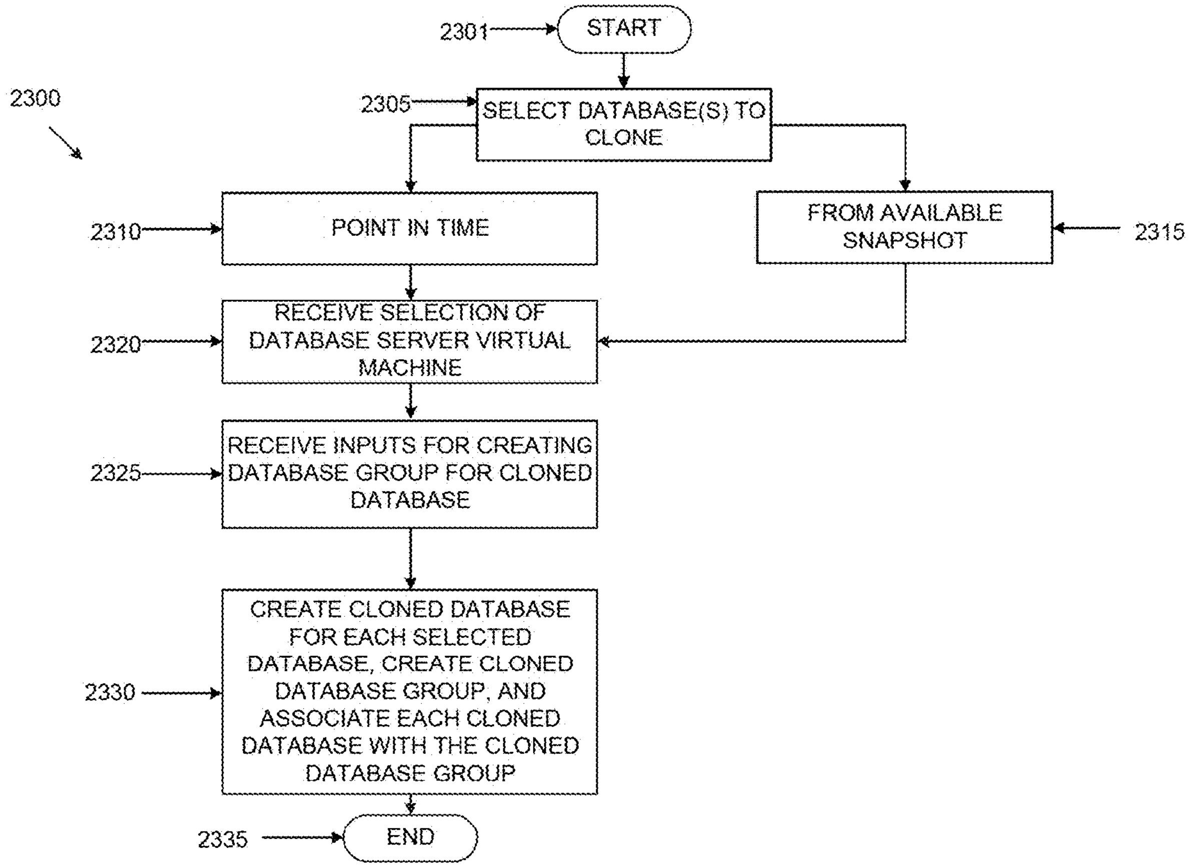
FIG. 23 is an example flowchart outlining operations for cloning a database in a database group and adding the cloned database to a cloned database group, in accordance with some embodiments of the present disclosure.

Turning now to FIG. 23 and referring to FIG. 23 in conjunction with FIGS. 24-29, an example flowchart outlining operations of a process 2300 is shown, in accordance with some embodiments of the present disclosure. The process 2300 may include additional, other, or different operations depending upon the embodiment. The process 2300 may be used to create a cloned database from a database group. In some embodiments, the cloned database may be created for all databases in a database group. In other embodiments, the cloned database may be created for a selected one or more of the databases in the database group. Further, in some embodiments, the cloned database may be made using a point in time recovery feature of the time machine. In other words, the cloned database may be a point in time database created from a snapshot and/or one or more transactional logs. In some embodiments, the cloned database may be created from a specific selected snapshot.

Figure 24:
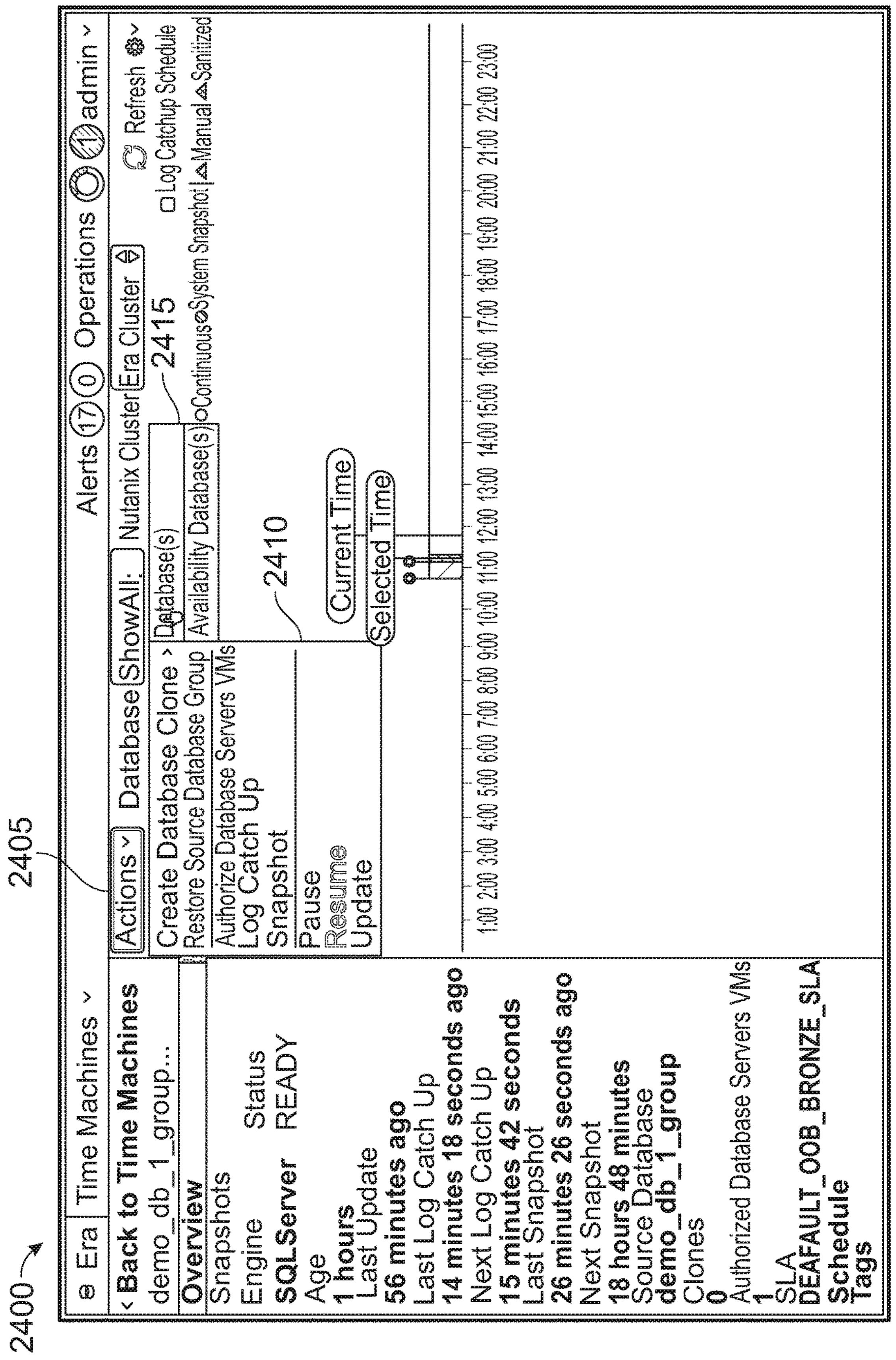
FIGS. 24-29 are example user interfaces showing the cloning of the database, as outlined in FIG. 23, in accordance with some embodiments of the present disclosure.
Figure 25:
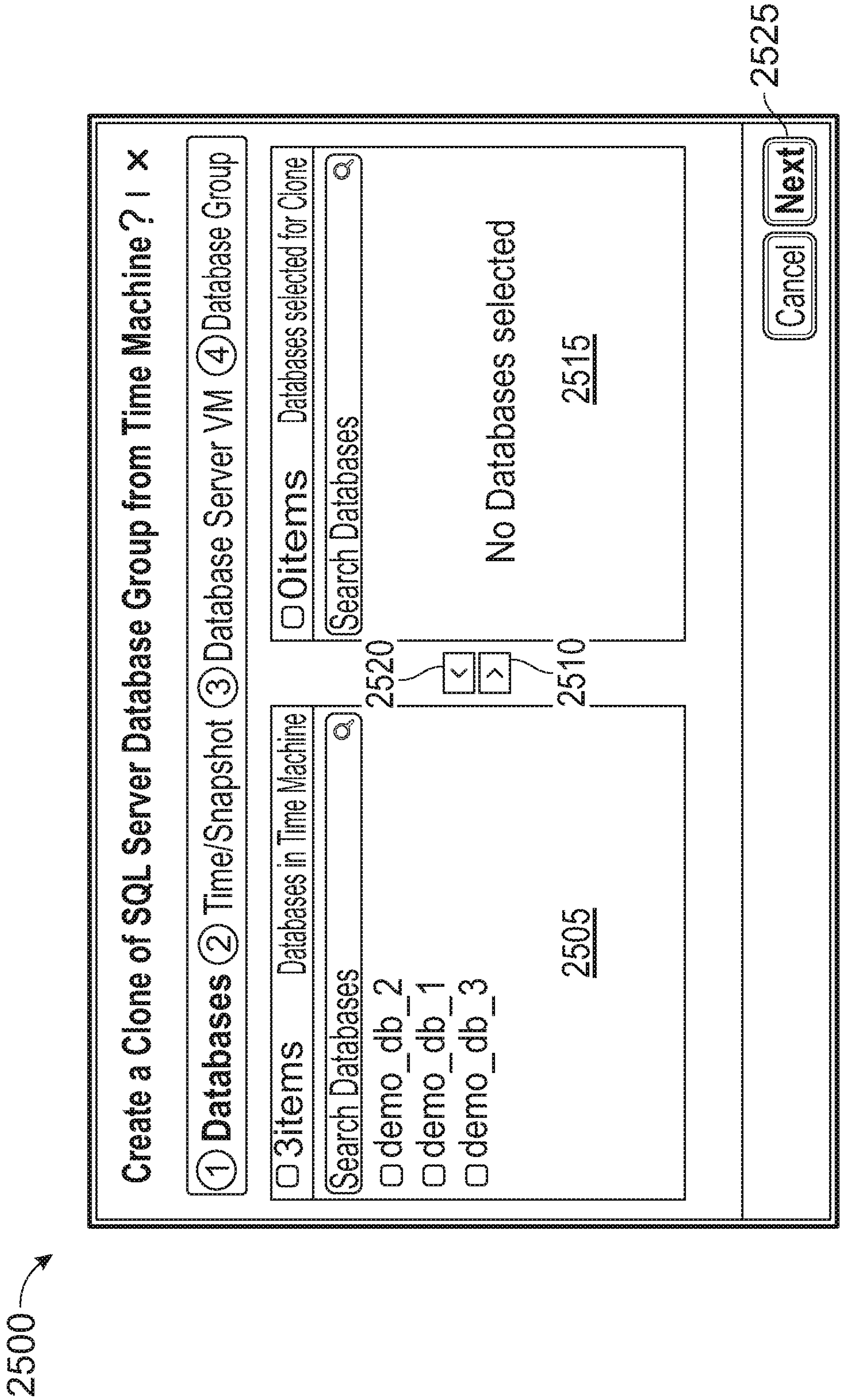
Figure 26:
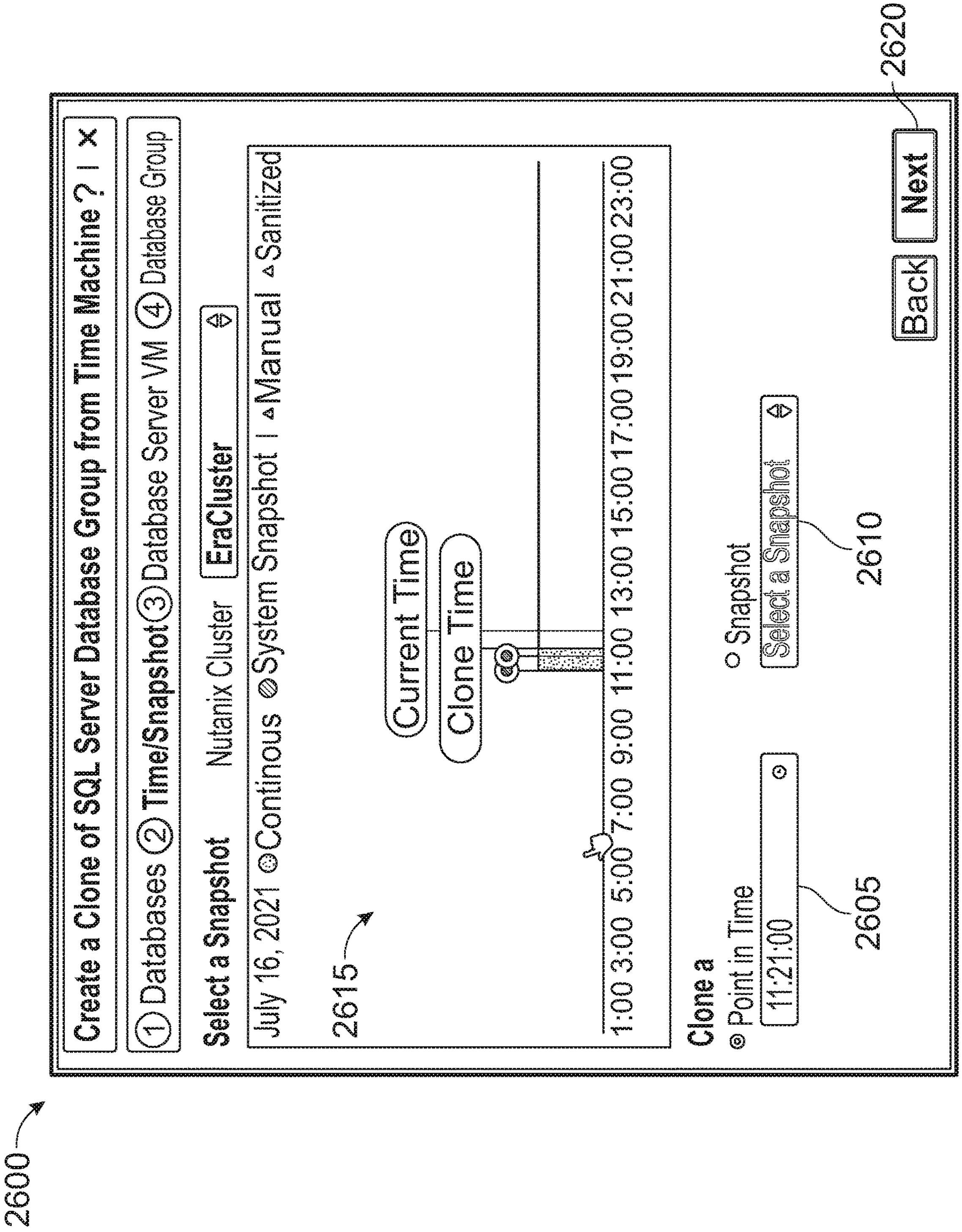

The process 2300 may be implemented by the database management system 205. The process 2300 starts at operation 2301 with the database management system 205 receiving a user request for creating a clone from a database group. As discussed in FIG. 21, the user may request creation of a clone database via the time machine dashboard 2100 associated with the time machine of the database group from which a cloned database is to be created, and specifically by requesting a clone operation via the actions tab 2110. For example, FIG. 24 shows an example time machine dashboard 2400 with an actions tab 2405. To create a clone of one or more databases in a database group, the user may navigate to the time machine dashboard 2400 of the time machine associated with the database group from which a cloned database is to be created and select a "create database clone" option from a list 2410 accessed from the actions tab 2405. In some embodiments, the "create database clone" option may further present a list 2415 requesting whether the user desires to create a cloned database that is a stand-alone database (e.g., non-highly available) or a clustered database (e.g., highly available). The user may select one option to request a cloned database and start the cloning process. The discussion below is also a stand-alone database. For a clustered database, an AG name under which the database needs to be cloned may also be requested.

Upon receiving the user request, at operation 2305, the database management system 205 receives a selection of one or more databases from the database group from which the cloned database is to be created. For example, upon selecting an option (e.g., "database(s)") from the list 2410, the database management system 205 presents a user interface 2500 of FIG. 25. The user interface 2500 requests a selection of the databases in the database group for creating a cloned database. The user interface 2500 presents a list 2505 showing all the databases that are part of the database group and protected by the time machine. From the list 2505, the user may select one or more databases. For example, to add a database to the cloned database, the user may select that database from the list 2505 and using an add button 2510, add that database to a list 2515. In some embodiments, multiple databases may be simultaneously selected from the list 2505 and added to the list 2515. To remove a database from the list 2515, the user may select the database to be removed from the list 2515 and click on a remove button 2520 to move that database back to the list 2505. Thus, the databases that are in the list 2515 are selected for creating a cloned database. Upon selecting the desired database(s) for creating the cloned database, the user may click on a next button 2525.

Returning back to FIG. 23, upon selecting one or more databases, the database management system 205 receives selection from the user of creating the cloned database either based on a point in time or an available snapshot. If the user selects the point in time option, the process 2300 proceeds to operation 2310. At the operation 2310, the database management system 205 receives selection of a specific point of time at which the cloned database is to be created. The cloned database is created based on the state of the selected database(s) at that specific point of time. Alternatively, if the user desires to create the cloned database from a particular snapshot, the process 2300 proceeds to operation 2315. At the operation 2315, the database management system 205 receives selection of a specific snapshot from which the cloned database is to be created. The selection of either a point in time based cloned database or a snapshot based cloned database may be via a user interface 2600 of FIG. 26.

Specifically, upon clicking on the next button 2525, the user interface 2600 may be displayed. Although not shown, in some embodiments, the user interface 2600 (or another user interface) may allow the user to select a particular date (e.g., from a calendar) on which the cloned database is desired. If the particular date that the user selects is protected by one of the protection parameters (e.g., continuous, daily, weekly, monthly, or quarterly), the user may select either a point in time option 2605 or a snapshot option 2610. In some embodiments, the point in time option 2605 may only be available for dates protected by the continuous protection parameter. If the user desires a cloned database based on a point in time, the user may select the point in time option 2605 and if the user desires to a cloned database based on an available snapshot, the user may select the snapshot option 2610. The user interface 2600 may also present a time scale 2615. Although the time scale 2615 is shown for the point in time option 2605 (which is shown selected in FIG. 26), a similar time scale but with different information may be shown if the snapshot option 2610 is selected.

For the point in time option 2605, the time scale 2615 may solicit the exact time from which the cloned database is to be created. The time scale 2615 may display the times that are available for the user to select for the point in time option 2605. For example, in some embodiments, the time scale 2615 may include an activated slot from which the user may pick a time and an inactivated slot that is unavailable to the user. In other embodiments, the available times may be presented in other ways on the time scale 2615. In some embodiments, the user may pick a desired time by interacting with the time scale 2615 or by entering the time in a box associated with the point in time option 2605. For example, the time scale 2615 (and the box associated with the point in time option 2605) shows that the state of the selected database(s) at 11:21:00 is selected for creating the cloned database. If the snapshot option 2610 is selected, the time scale 2615 may display the times for which snapshots are available. Upon selecting the point in time option 2605 or the snapshot option 2610 (as well as selecting the desired point in time or available snapshot, respectively), the user may click on a next button 2620 to move to the next operation.

At operation 2320, the database management system 205 receives a selection of a database server virtual machine on which the cloned database is to reside. Specifically, upon clicking on the next button 2620, a user interface 2700 of FIG. 27A or a user interface 2705 of FIG. 27B may be displayed through which the user may select a database server virtual machine. The user interface 2700/2705 may provide a first option 2710 to allow the user to create a new database server virtual machine or a second option 2715 to allow the user to use an existing database server virtual machine. To create a new database server virtual machine, the user may select the first option 2710 and provide information in a user interface portion 2720 to create a new database server virtual machine. For example, the user interface portion 2720 may request a database server virtual machine name 2725, description 2730 of the database server virtual machine, a compute profile 2735 to define the computing resources to be associated with the database server virtual machine, a network profile 2740 to identify the network location for the database server virtual machine, username or license key 2745, and password 2750. Upon providing any required information in the user interface portion 2720, the user may click on a next button 2755 to move to the next operation.

Figure 27A:
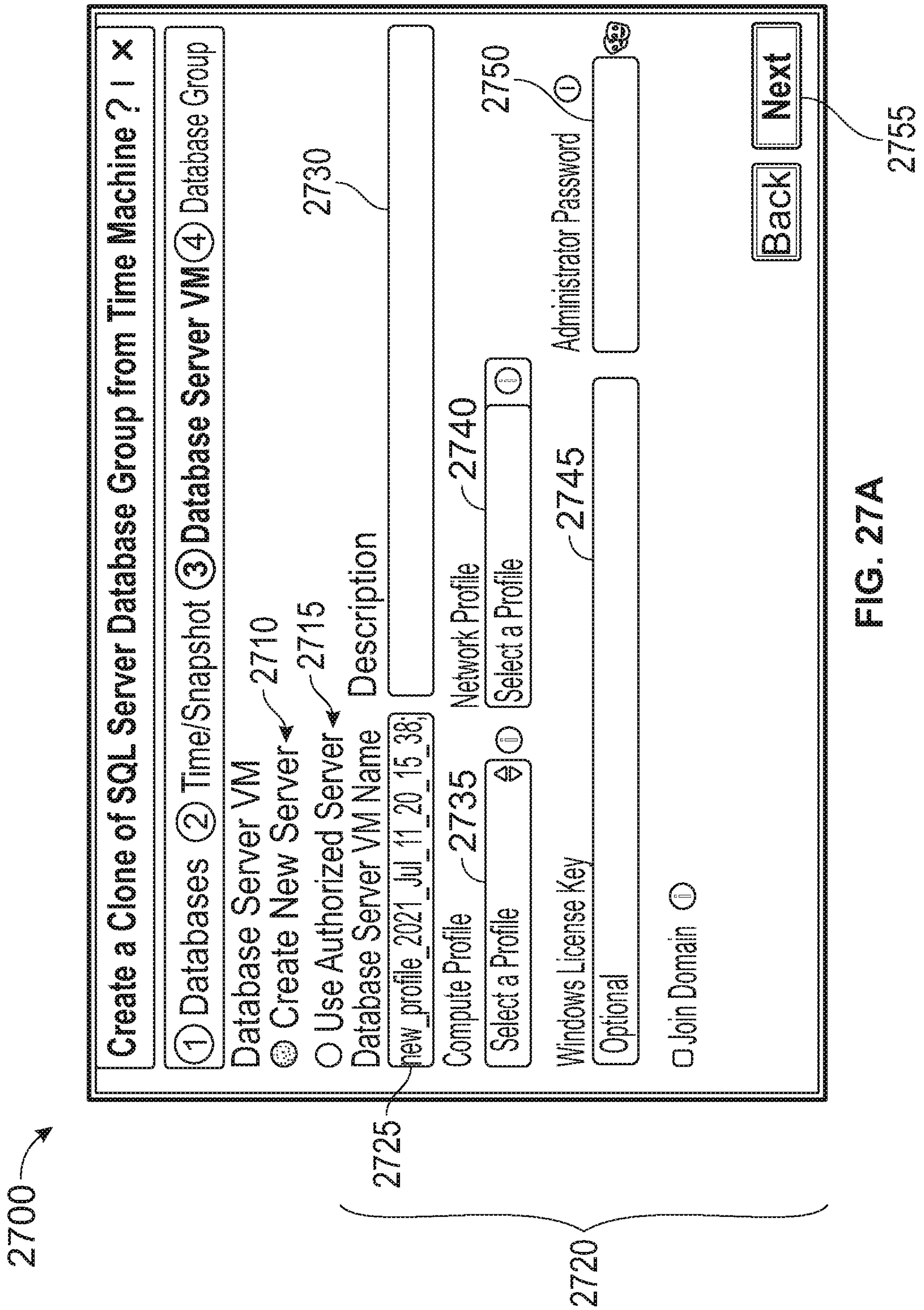
Figure 27B:
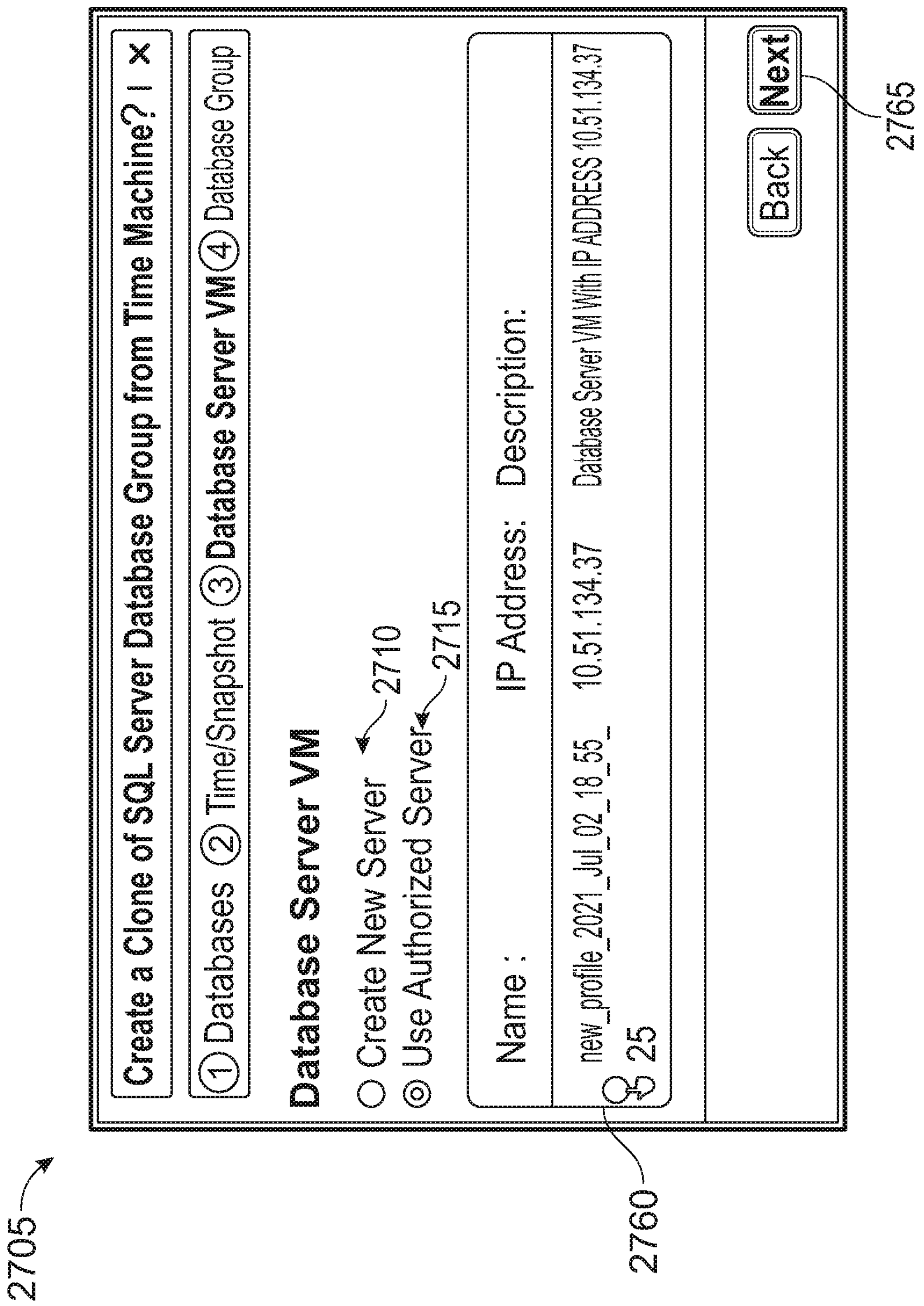

Alternatively, if the user selects the second option 2715 to use an existing database server virtual machine, a user interface portion 2760 of FIG. 27B may be displayed. The user interface portion 2760 may present a list of available database server virtual machines from which the user may select one database server virtual machine for the cloned database. Upon selecting the database server virtual machine, the user may click on a next button 2765 to proceed to the next operation. Returning back to FIG. 23, at operation 2325, the database management system 205 receives inputs to create a new database group (e.g., a cloned database group) for the cloned database. In some embodiments, the cloned databases may be added to the cloned database group. Similar advantages may be had by creating a cloned database group and associating the cloned databases with that database group, as discussed above. For example, in some embodiments, a time machine may be associated with the cloned database group to protect the cloned databases. Once the cloned database group is created, additional cloned databases may be added to that database group. In some embodiments, the cloned database group may also be used for source databases.

Figure 28:
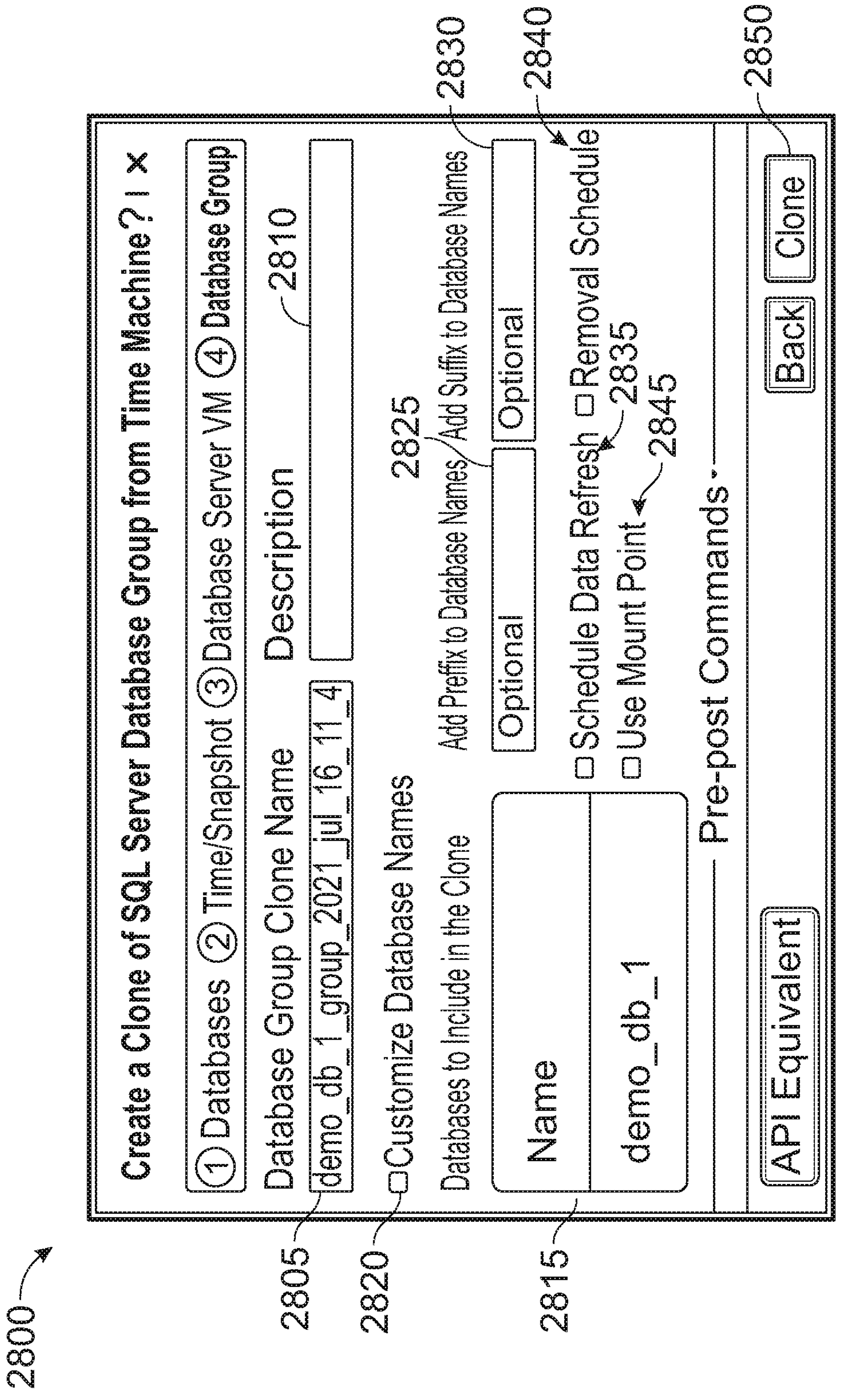

To create a new cloned database group, upon clicking on the next button 2755 or 2765, a user interface 2800 of FIG. 28 may be displayed. The user interface 2800 may request for inputs to create a new cloned database group. For example, in some embodiments, the user interface 2800 may request a name 2805 for the cloned database group, a description 2810 for the cloned database group, a list 2815 of database(s) that are to be part of the cloned database group (e.g., the clones of the databases selected in FIG. 25), an option 2820 to allow the user to customize the name of the cloned database(s) (e.g., change the name from that shown in the list 2815), a prefix option 2825 to add a prefix to the database name shown in the list 2815, a suffix option 2830 to add a suffix to the database name shown in the list 2815, and a schedule data refresh option 2835 if the user wants to refresh the content of the cloned database from the source database periodically (e.g., set a refresh schedule), a removal schedule option 2840 if the user desires to remove the refresh schedule, a use mount point option 2845 if the user desires to mount the clone to a location different from the default location. Upon provided required information in the user interface 2800, the user may click on a clone button 2850 to create a cloned database for each database that is in the list 2815, create a cloned database group, and add each of the cloned databases to that cloned database group. In some embodiments, a time machine may be associated with the cloned database as well. In some embodiments, additional user interfaces may be presented to select the information associated with the time machine (e.g., SLA and protection schedule). In some embodiments, a default time machine may be associated with the cloned database and the user may edit the time machine upon creation of the cloned database.

To create a clone database for each selected database, the database management system 205 may retrieve a snapshot and/or any associated transactional log(s). For example, if the user selected the point in time option 2605, the database management system 205 may retrieve a snapshot closest to the time selected by the user for the point in time and/or any transactional logs that may be needed. For example, if the snapshot that is retrieved is captured at the specific time selected by the user, then the cloned database may be created from that snapshot. However, if the snapshot is captured before or after the specific time selected by the user, then one or more transactional logs may exist between the time the snapshot is captured and the specific time. For example, if the specific time is 11:00 AM and the closest snapshot to 11:00 AM is from 10:00 AM, the database management system 205 may determine if there are transactional logs available between 10:00 AM and 11:00 AM. The database management system 205 may retrieve any transactional logs that may be available. If no transactional logs are available between 10:00 AM and 11:00 AM, the database management system 205 may create the clone from the snapshot of 10:00 AM. Otherwise, the database management system 205 may use the snapshot of 10:00 AM and any available transactional logs between 10:00 AM and 11:00 AM to create a point in time clone of the selected database(s). Alternatively, if the user selected the snapshot option 2610, the database management system 205 retrieves the selected snapshot. Based on the snapshot, the database management system 205 may create a clone of each of the selected databases.

Figure 29:
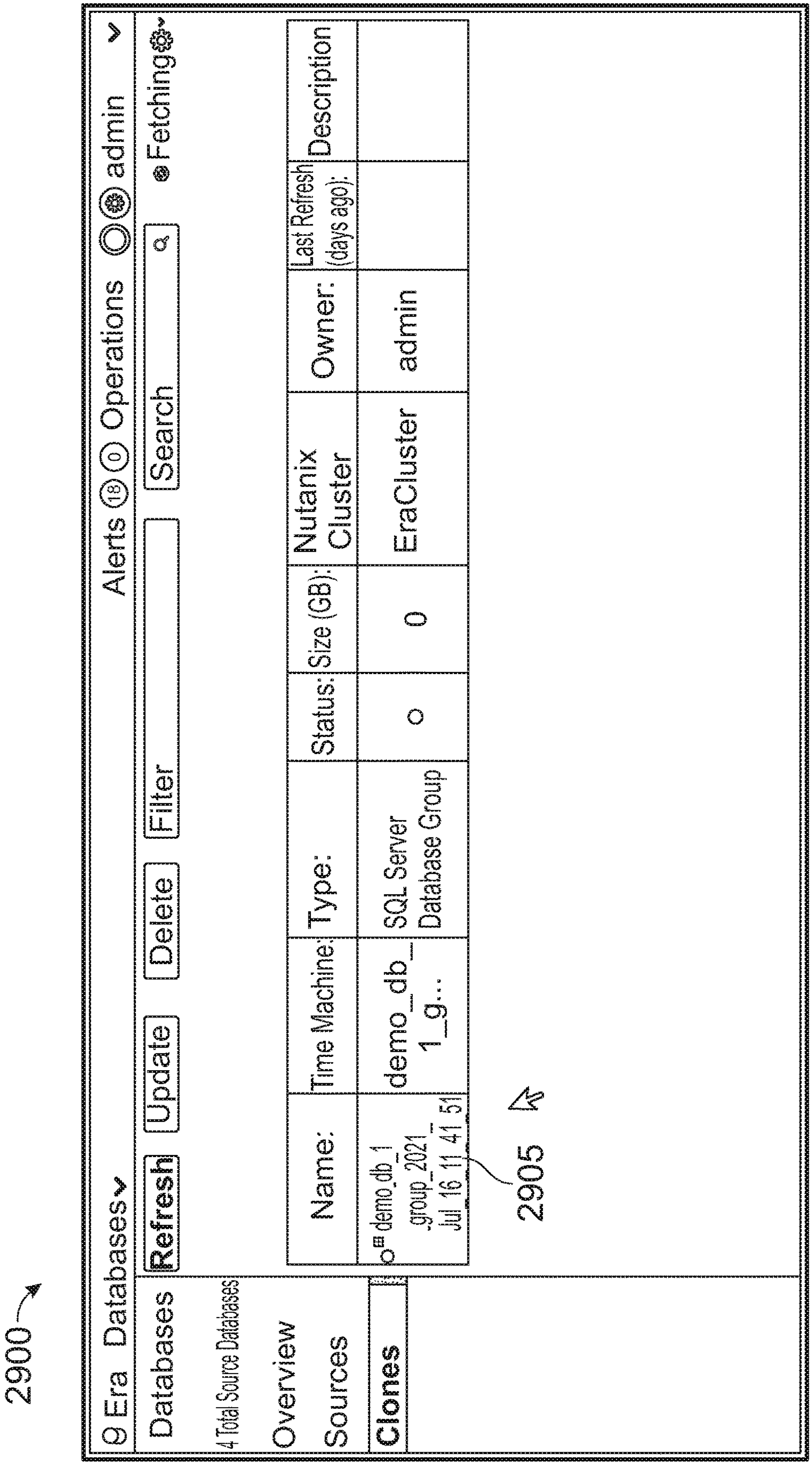

Additionally, database management system 205 may create a new database server virtual machine if the user selected the first option 2710 to create a new database virtual machine for the cloned databases. The database server virtual machine may be associated with computing resources (e.g., CPU, memory, etc.) in accordance with the compute profile 2735 and be created at the network location identified by the network profile 2740. Further, the database management system 205 may create a cloned database group to house each of the cloned databases. The cloned database group may then be accessed from the time machine dashboard. For example, user interface 2900 of FIG. 29 shows an example time machine dashboard. Field 2905 shows the cloned database group created by the process 2300. The process 2300 ends at operation 2335.

Figure 30:
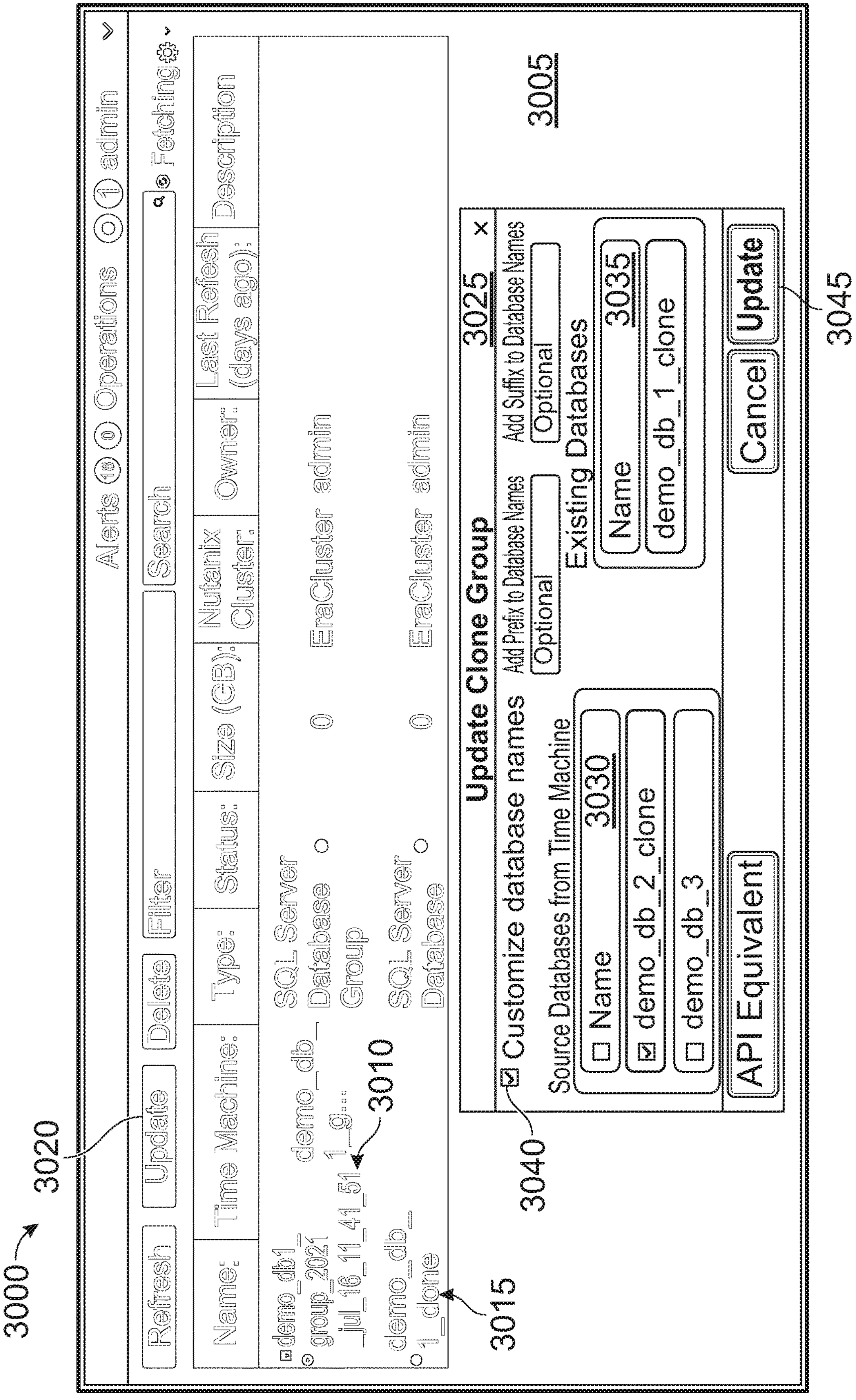
FIGS. 30 and 31 are example user interfaces showing adding new cloned databases to a cloned database group, in accordance with some embodiments of the present disclosure.

Upon creating a cloned database group, a user may add additional databases to the cloned database group. For example, and referring to FIG. 30, an example user interface 3000 is shown, in accordance with some embodiments of the present disclosure. The user interface 3000 shows a time machine dashboard 3005 showing a cloned database group 3010 having a cloned database 3015 therein. To add another cloned database to the cloned database group 3010, the user may select the cloned database group and select an update option 3020 to display a user interface 3025. The user interface 3025 may be used to add additional cloned databases to the cloned database group 3010. The user interface 3025 shows a list 3030 of databases that are available to be added to the cloned database group 3010. Specifically, the list 3030 includes those databases that reside on the database server virtual machine on which the cloned database group resides and which are not part of any database group.

Figure 31:
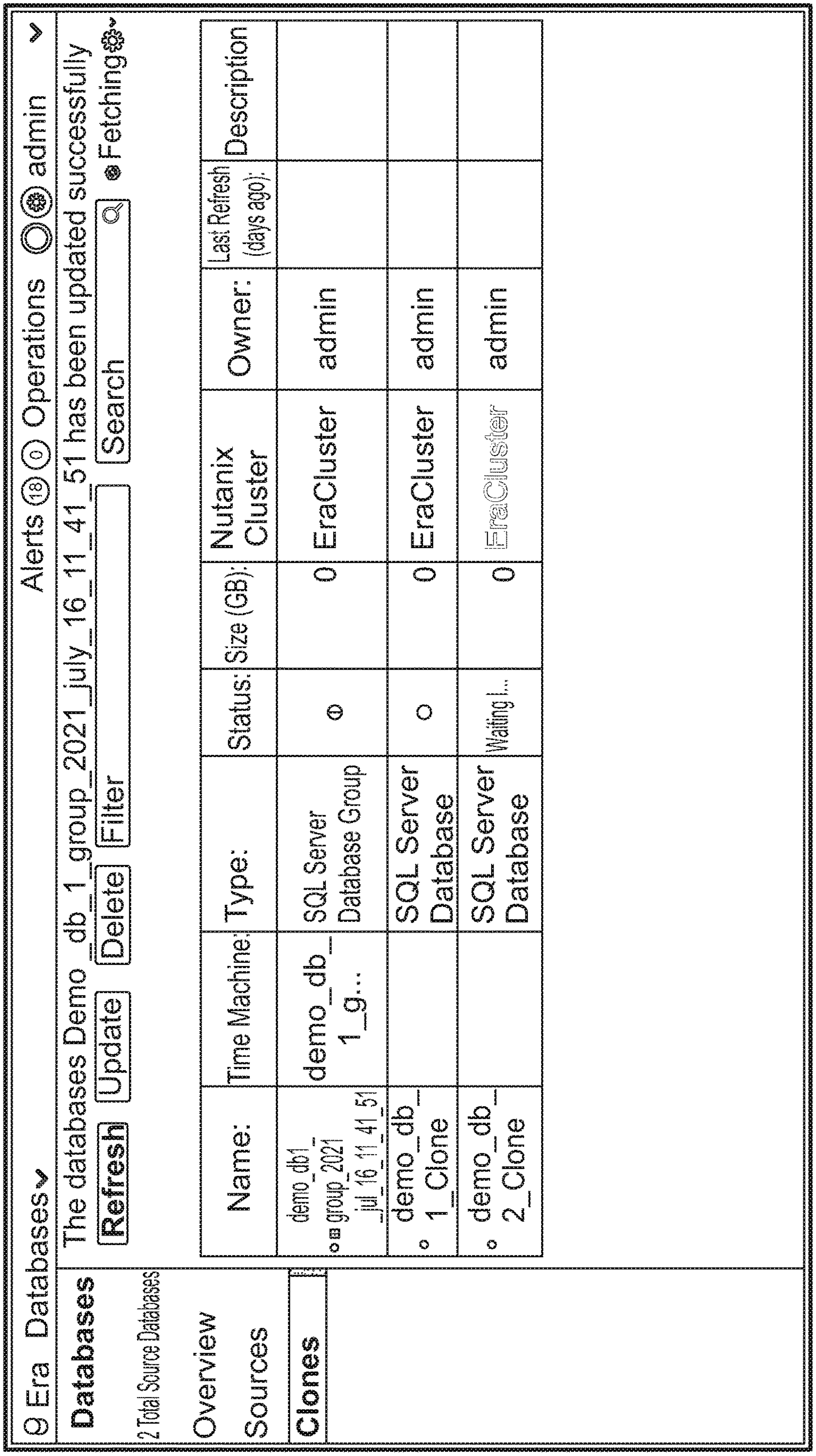

The user may select one or more databases from the list 3030 to be cloned and added to the cloned database group 3010. The user interface 3025 also shows a list 3035, which shows the databases that are already in the cloned database group (e.g., the cloned database 3015). The user may customize the name of the cloned databases that are to be created from the databases selected from the list 3030. Upon clicking on an update button 3045, the database management system 205 creates a clone of the database(s) selected from the list 3030 and add those clones to the cloned database group 3010. Upon adding, the newly cloned database is displayed in the list of databases associated with the cloned database group on the time machine dashboard 3005, as shown in user interface 3100 of FIG. 31.

Figure 32:
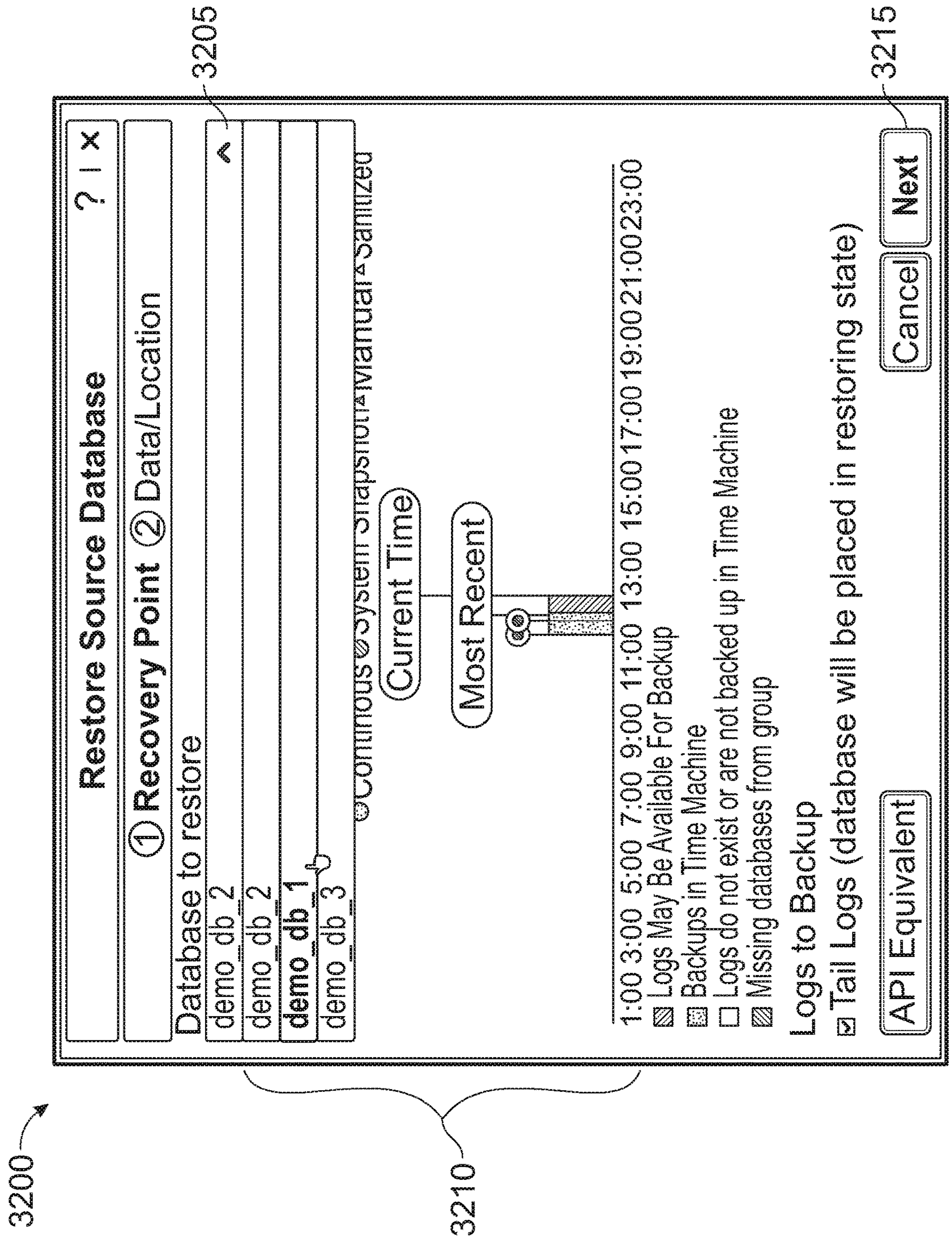
FIGS. 32 and 33 are example user interfaces for restoring a database in a database group, in accordance with some embodiments of the present disclosure.
Figure 33:
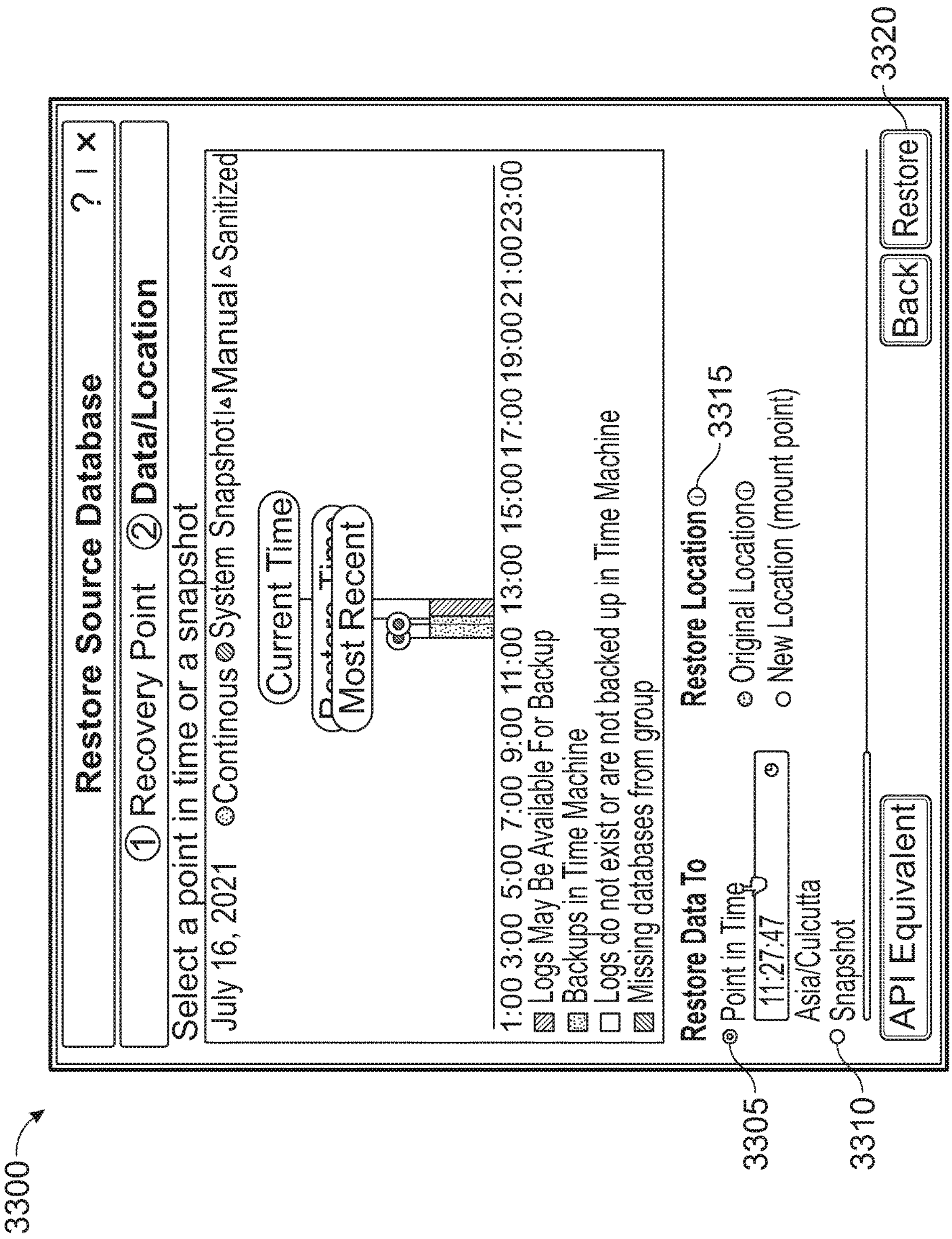

In some embodiments, the time machine dashboard may also be used to restore one of more databases from a database group. For example, and as shown in FIG. 24, from the actions tab 2405 of the time machine dashboard 2400 associated with a database group, the user may select the "restore source database group" option to display a user interface 3200 of FIG. 32. From the user interface 3200, the user may select one or more databases from that database group to restore from a list 3205. The user may also select a point of recovery from a time scale 3210 at which the database(s) selected from the list 3205 are to be restored and click on a next button 3215 to display a user interface 3300 of FIG. 33. The user interface 3300 further allows the user to restore a database to a point in time by selecting a point in time option 3305, restore using an available snapshot by selecting a snapshot option 3310, and select a restore location 3315. Upon clicking on a restore button 3320, the database(s) selected from the list 3205 may be restored to the restore location 3315 that is selected. In some embodiments, the restore may be an in place restore, such that the database's contents may be restored to the snapshot or the point in time selected.

It is to be understood that the shape, size, configuration, actual text, and details shown on the user interfaces discussed above are only an example and not intended to be considered limiting in any way. In other information may be presented in other ways, may be presented on multiple interfaces, and the general mechanism in which the information is solicited from the user may vary in other embodiments.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A non-transitory computer-readable media comprising computer-readable instructions stored thereon that when executed by a processor of a database management system cause the processor to:

select a database from a list of databases that are not part of another database group to add to a database group;

receive selection of a Service Level Agreement ("SLA") and a protection schedule, wherein the protection schedule defines a frequency of capturing snapshots and transactional logs; and associate the database group with the SLA and the protection schedule and add the database to the database group, wherein the database is protected using the same SLA and the protection schedule that is associated with the database group.

2. The non-transitory computer-readable media of claim 1, wherein the database group comprises a plurality of databases, including at least one database, and wherein each of the plurality of databases is a stand-alone database.

3. The non-transitory computer-readable media of claim 2, wherein each of the plurality of databases in the database group resides on a database server virtual machine on which the database group is created.

4. The non-transitory computer-readable media of claim 1, wherein the database group comprises a plurality of databases, including at least one database, and wherein each of the plurality of databases is part of a same logical cluster.

5. The non-transitory computer-readable media of claim 1, wherein the database group comprises a plurality of databases, including at least one database, and wherein at least some databases of the plurality of databases are part of a first logical cluster and remaining databases of the plurality of databases are part of a second logical cluster.

6. The non-transitory computer-readable media of claim 1, wherein the database group comprises a plurality of databases, including at least one database, and wherein at least some databases of the plurality of databases are stand-alone databases and remaining databases of the plurality of databases are part of one or more logical clusters.

7. The non-transitory computer-readable media of claim 1, wherein the processor further executes computer-readable instructions to:

enable an auto-registration feature in the database group;

receive request to register a new database on a database server virtual machine on which the database group resides; and upon determining that the auto-registration feature in the database group is enabled, automatically add the new database to the database group, wherein, upon being added to the database group, the new database is protected using the same SLA and the protection schedule as at least one database.

8. A system comprising:

a memory having computer-readable instructions stored thereon; and a processor that executes the computer-readable instructions to:

select a database from a list of databases that are not part of another database group to add to a database group;

receive selection of a Service Level Agreement ("SLA") and a protection schedule, wherein the protection schedule defines a frequency of capturing snapshots and transactional logs; and associate the database group with the SLA and the protection schedule and add the database to the database group, wherein the database is protected using the same SLA and the protection schedule that is associated with the database group.

9. The system of claim 8, wherein the database group comprises a plurality of databases, including at least one database, and wherein each of the plurality of databases is a stand-alone database.

10. The system of claim 9, wherein each of the plurality of databases in the database group resides on a database server virtual machine on which the database group is created.

11. The system of claim 8, wherein the database group comprises a plurality of databases, including at least one database, and wherein each of the plurality of databases is part of a same logical cluster.

12. The system of claim 8, wherein the database group comprises a plurality of databases, including at least one database, and wherein at least some databases of the plurality of databases are part of a first logical cluster and remaining databases of the plurality of databases are part of a second logical cluster.

13. The system of claim 8, wherein the database group comprises a plurality of databases, including at least one database, and wherein at least some databases of the plurality of databases are stand-alone databases and remaining databases of the plurality of databases are part of one or more logical clusters.

14. A method comprising:

select a database from a list of databases that are not part of another database group to add to a database group;

receiving selection of a Service Level Agreement ("SLA") and a protection schedule, wherein the protection schedule defines a frequency of capturing snapshots and transactional logs; and associate the database group with the SLA and the protection schedule and add the database to the database group, wherein the database is protected using the same SLA and the protection schedule that is associated with the database group.

15. The method of claim 14, wherein the database group comprises a plurality of databases, including at least one database, and wherein each of the plurality of databases is a stand-alone database.

16. The method of claim 15, wherein each of the plurality of databases in the database group resides on a database server virtual machine on which the database group is created.

17. The method of claim 14, wherein the database group comprises a plurality of databases, including at least one database, and wherein each of the plurality of databases is part of a same logical cluster.

18. The method of claim 14, wherein the database group comprises a plurality of databases, including at least one database, and wherein at least some databases of the plurality of databases are part of a first logical cluster and remaining databases of the plurality of databases are part of a second logical cluster.

19. The method of claim 14, wherein the database group comprises a plurality of databases, including at least one database, and wherein at least some databases of the plurality of databases are stand-alone databases and remaining databases of the plurality of databases are part of one or more logical clusters.

20. The method of claim 14, further comprising:

enabling an auto-registration feature in the database group;

receiving request to register a new database on a database server virtual machine on which the database group resides; and upon determining that the auto-registration feature in the database group is enabled, automatically adding the new database to the database group, wherein, upon being added to the database group, the new database is protected using the same SLA and the protection schedule as at least one database.

* * * * *